(12) United States Patent
Dowdell et al.

(10) Patent No.: US 12,508,592 B2
(45) Date of Patent: Dec. 30, 2025

(54) ELECTROCHEMICAL CELL DEVICES AND METHODS OF MANUFACTURING

(71) Applicant: MESO SCALE TECHNOLOGIES, LLC., Rockville, MD (US)

(72) Inventors: Scott Dowdell, Cascade, MD (US); Nicholas Carbone, Newton, MA (US); Charles Clinton, Clarksburg, MD (US); Mark Billadeau, Knoxville, MD (US); Manish Kochar, Rockville, MD (US); Nicholas Fox-Lyon, Bethesda, MD (US); Alexander Tucker-Schwartz, Bethesda, MD (US); George Sigal, Rockville, MD (US); Gisbert Spieles, Bethesda, MD (US); Jules Vandersarl, Gaithersburg, MD (US); Jacob Wohlstadter, Potomac, MD (US); Aaron Leimkuehler, St. Cloud, PA (US); Jeffrey Pettingill, Denver, CO (US); Leo Tabakin, Germantown, MD (US); Bandele Jeffrey-Coker, Gaithersburg, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 424 days.

(21) Appl. No.: 17/887,191

(22) Filed: Aug. 12, 2022

(65) Prior Publication Data

US 2023/0061508 A1 Mar. 2, 2023

Related U.S. Application Data

(60) Provisional application No. 63/233,167, filed on Aug. 13, 2021.

(51) Int. Cl.
*B01L 3/00* (2006.01)
*G01N 27/327* (2006.01)
(Continued)

(52) U.S. Cl.
CPC ........ *B01L 3/5085* (2013.01); *G01N 27/3272* (2013.01); *G01N 27/3273* (2013.01);
(Continued)

(58) Field of Classification Search
CPC ............... B01L 3/5085; B01L 2200/12; B01L 2300/0645; B01L 2300/0829;
(Continued)

(56) References Cited

U.S. PATENT DOCUMENTS 4,933,048 A * 6/1990 Lauks .................. G01N 27/301
427/125
2006/0120204 A1 * 6/2006 Abassi ................. G01N 29/036
365/232

(Continued)

FOREIGN PATENT DOCUMENTS

DE 102017208461 A1 * 11/2018

*Primary Examiner* — Luan V Van
*Assistant Examiner* — Kaylee Tseng
(74) *Attorney, Agent, or Firm* — MEDLER FERRO WOODHOUSE & MILLS PLLC

(57) ABSTRACT

Electrochemical cells and methods for their production are provided. In particular, multi-well assay plates including multi-electrode wells are provided. The multi-electrode wells contain multiple electrodes that are electrically isolated from one another, permitting the various electrodes of the various wells to be addressed in any suitable combination.

34 Claims, 128 Drawing Sheets

(51) Int. Cl.
   *G01N 27/403*   (2006.01)
   *G01N 27/49*    (2006.01)
(52) U.S. Cl.
   CPC ....... *G01N 27/3277* (2013.01); *G01N 27/403* (2013.01); *G01N 27/49* (2013.01)
(58) Field of Classification Search
   CPC ........... G01N 27/3272; G01N 27/3273; G01N 27/3277; G01N 27/403; G01N 27/49; G01N 27/27
   See application file for complete search history.

(56) References Cited

U.S. PATENT DOCUMENTS

| | | | |
|---|---|---|---|
| 2006/0216203 A1 | 9/2006 | Fuller et al. | |
| 2017/0370827 A1* | 12/2017 | Wohlstadter | ........... G01N 21/76 |
| 2020/0240903 A1 | 7/2020 | Wohlstadter et al. | |
| 2020/0324289 A1* | 10/2020 | Chen | ................ B01L 3/502715 |

* cited by examiner

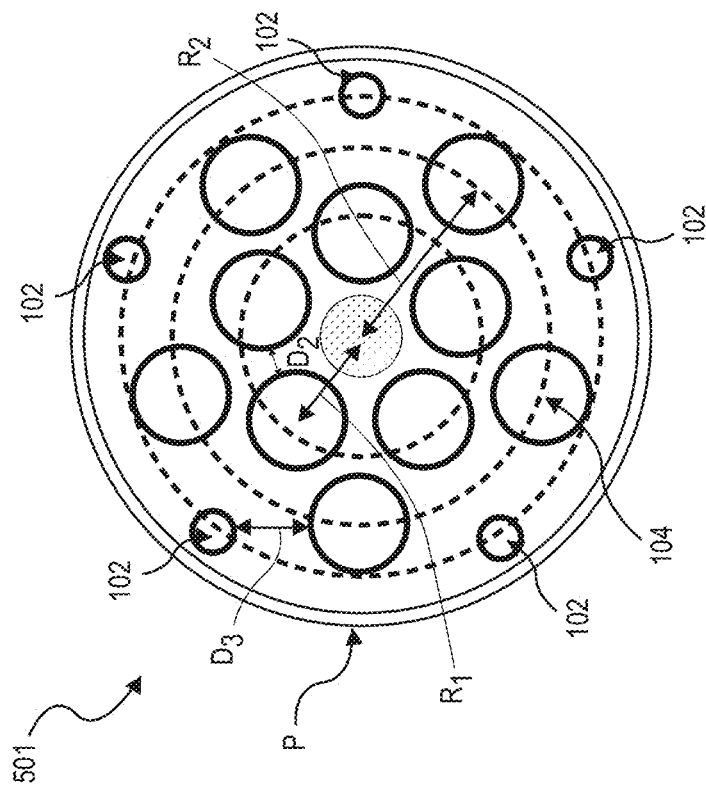
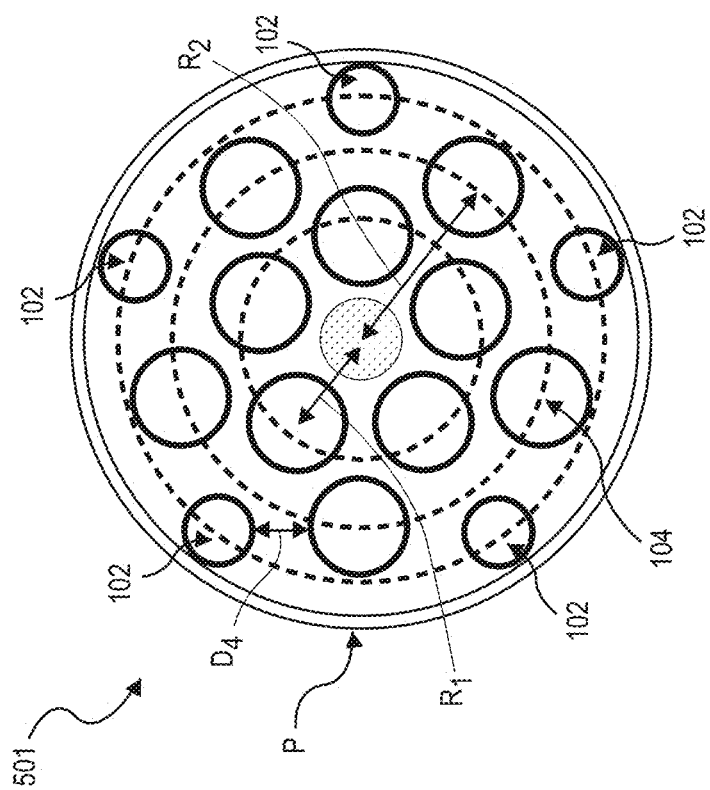
FIG. 5A
FIG. 5B

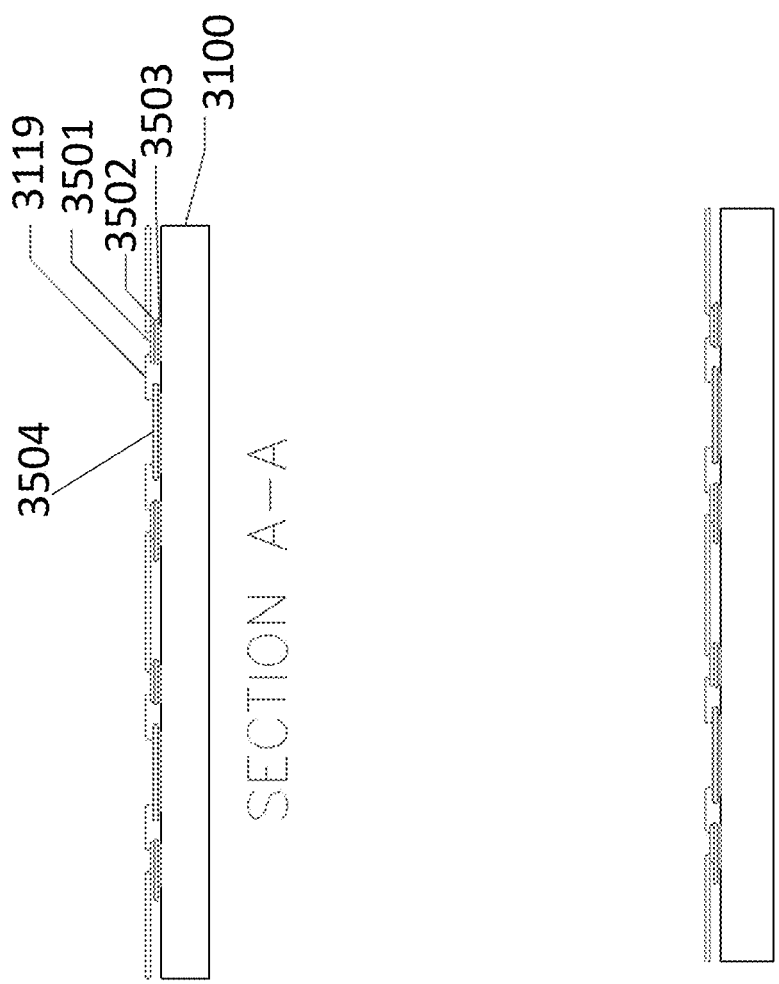
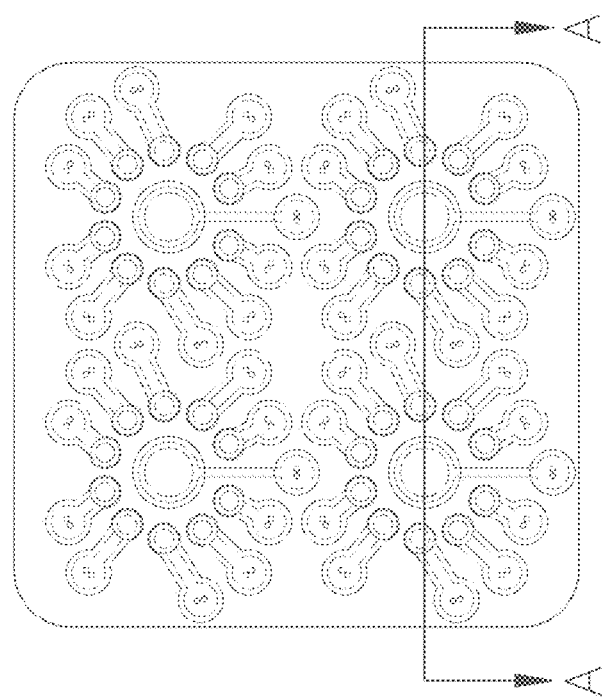
FIG. 39L

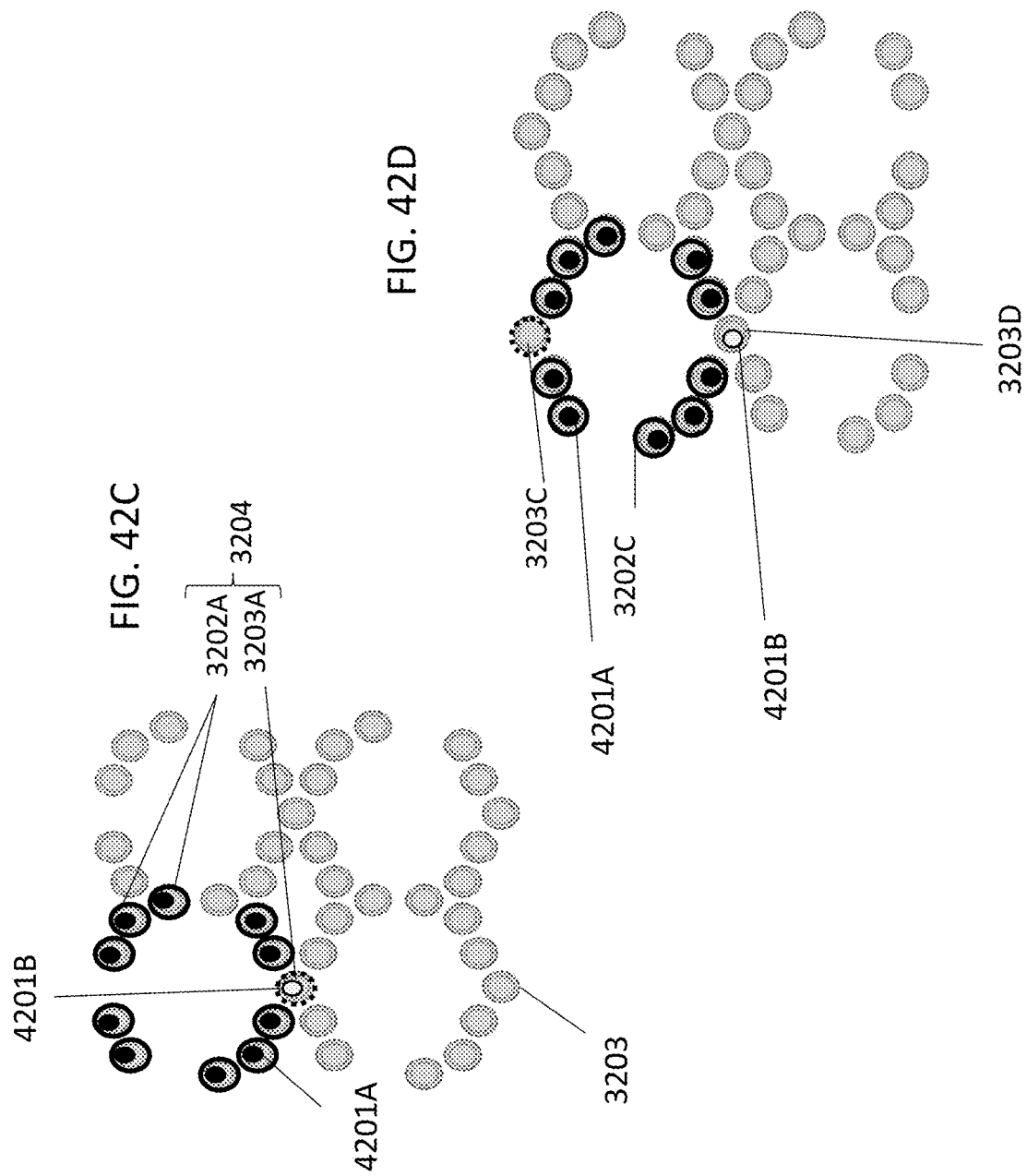

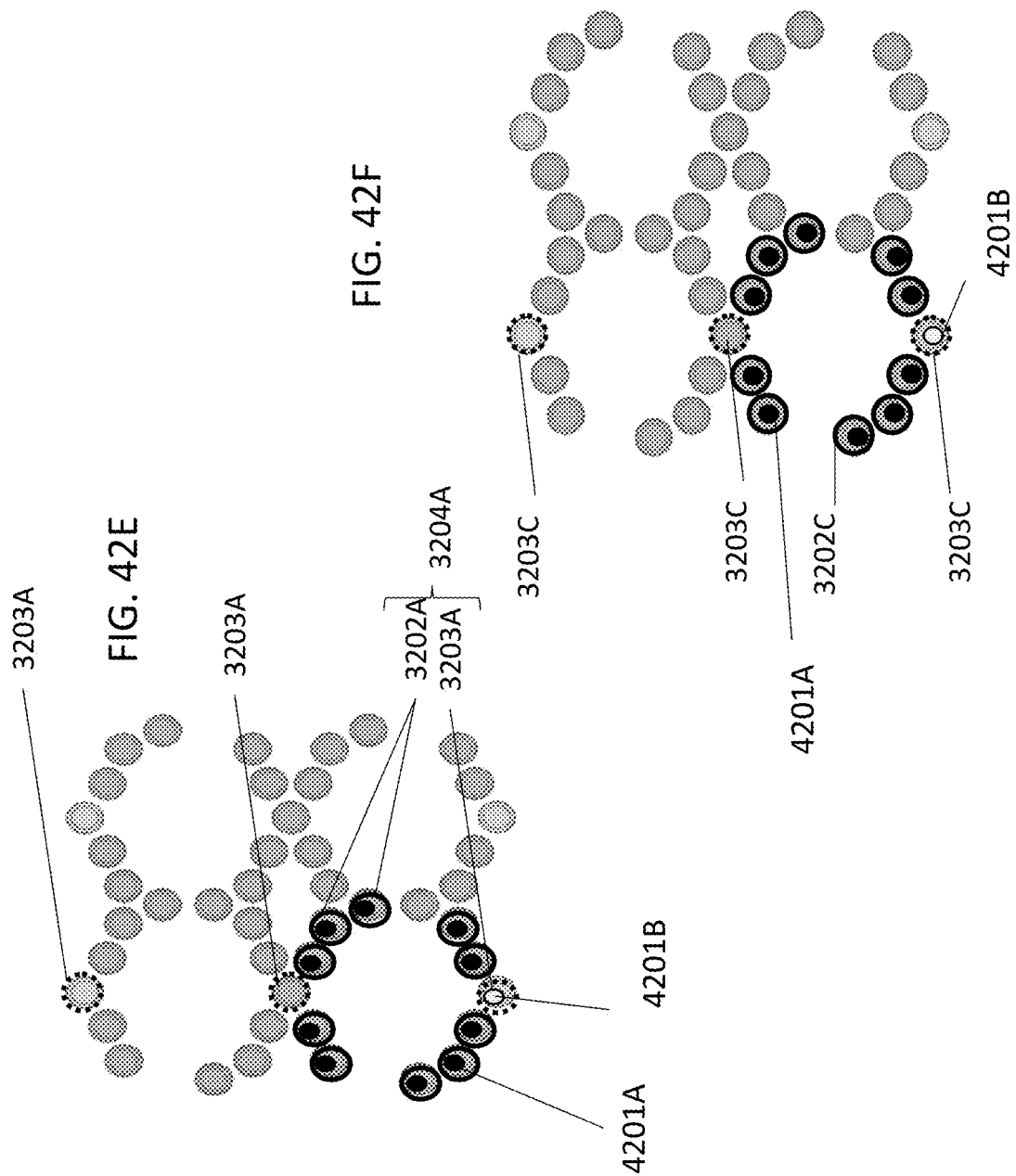

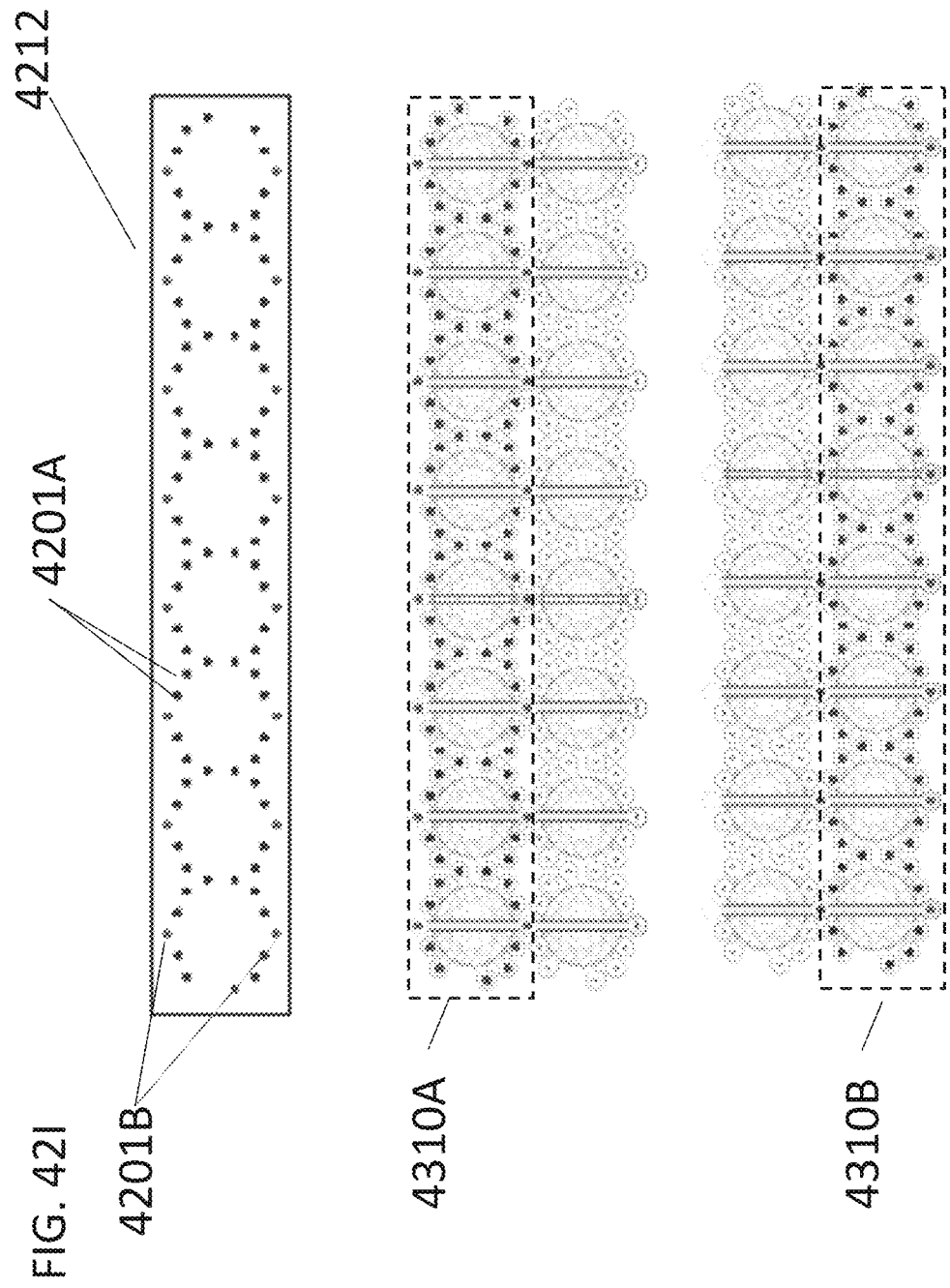

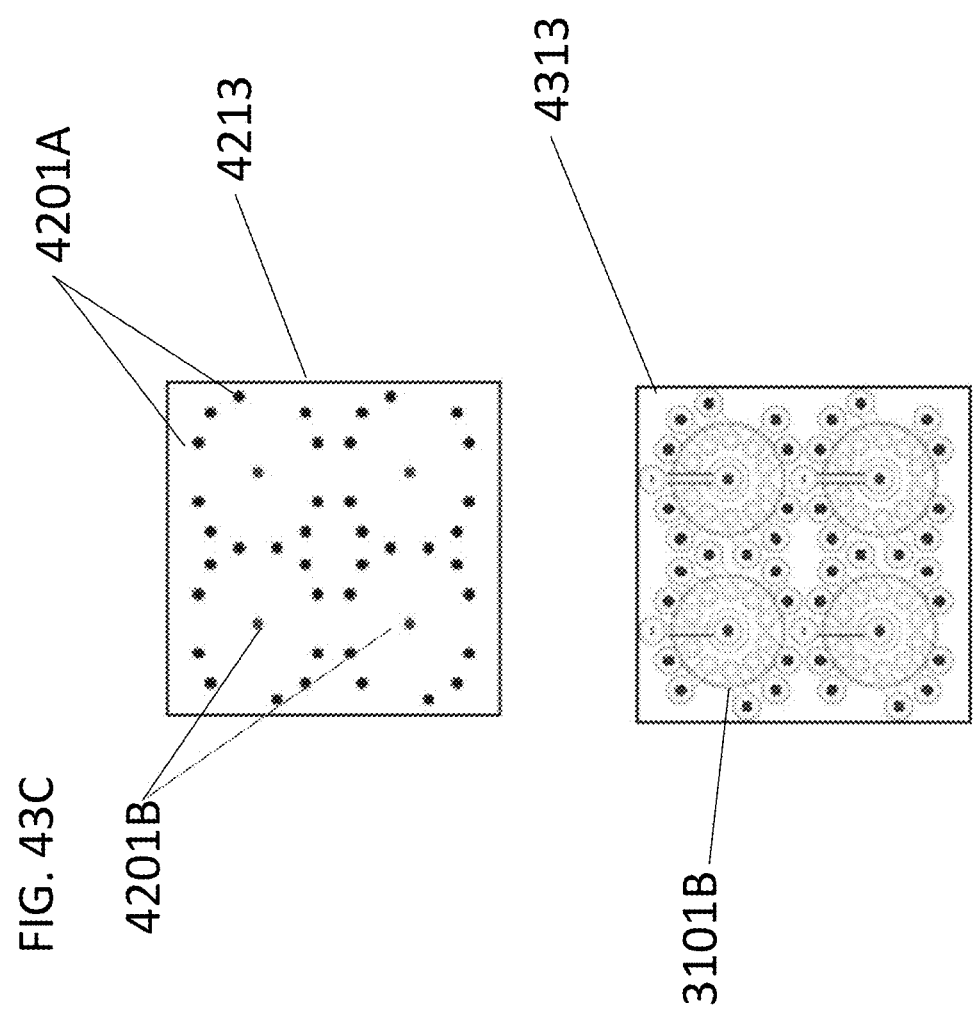

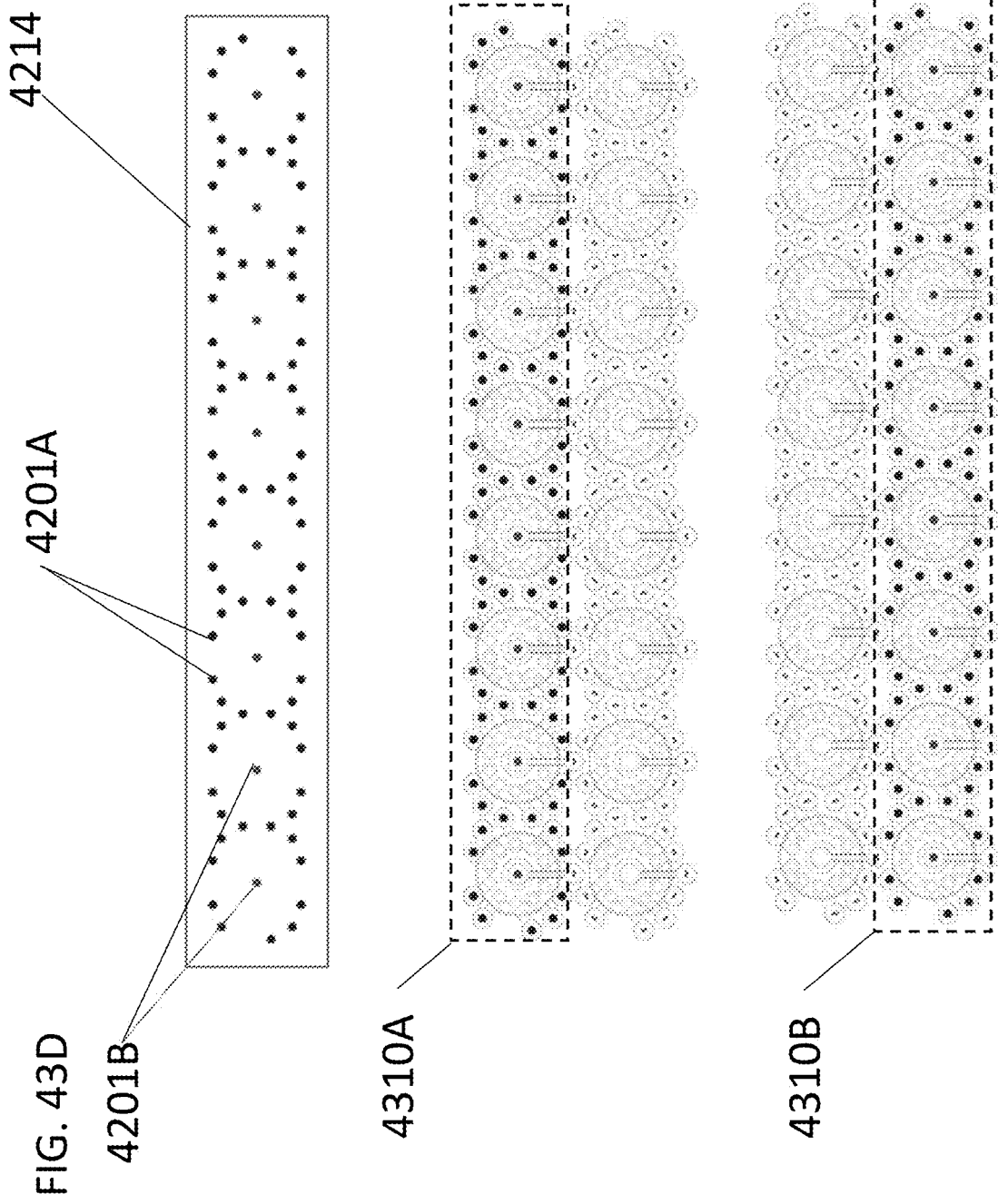

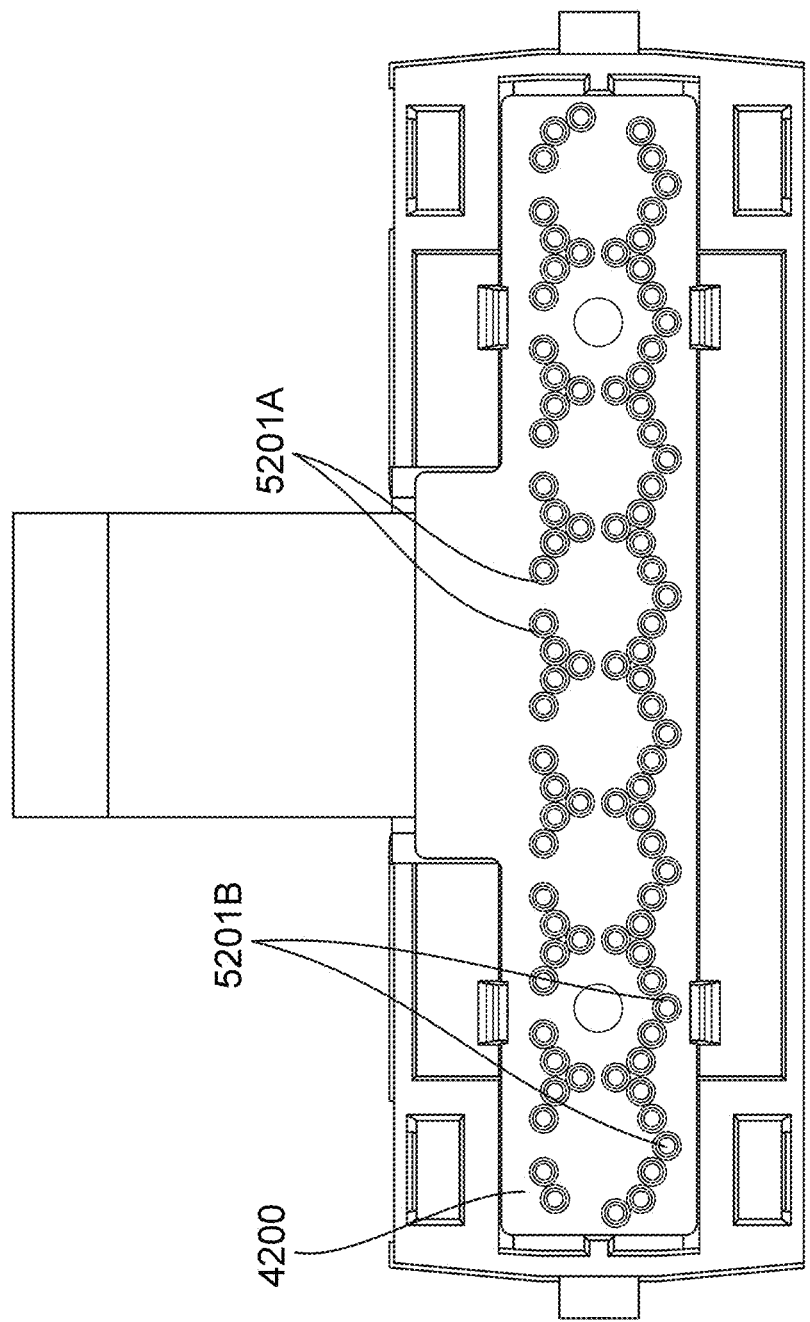

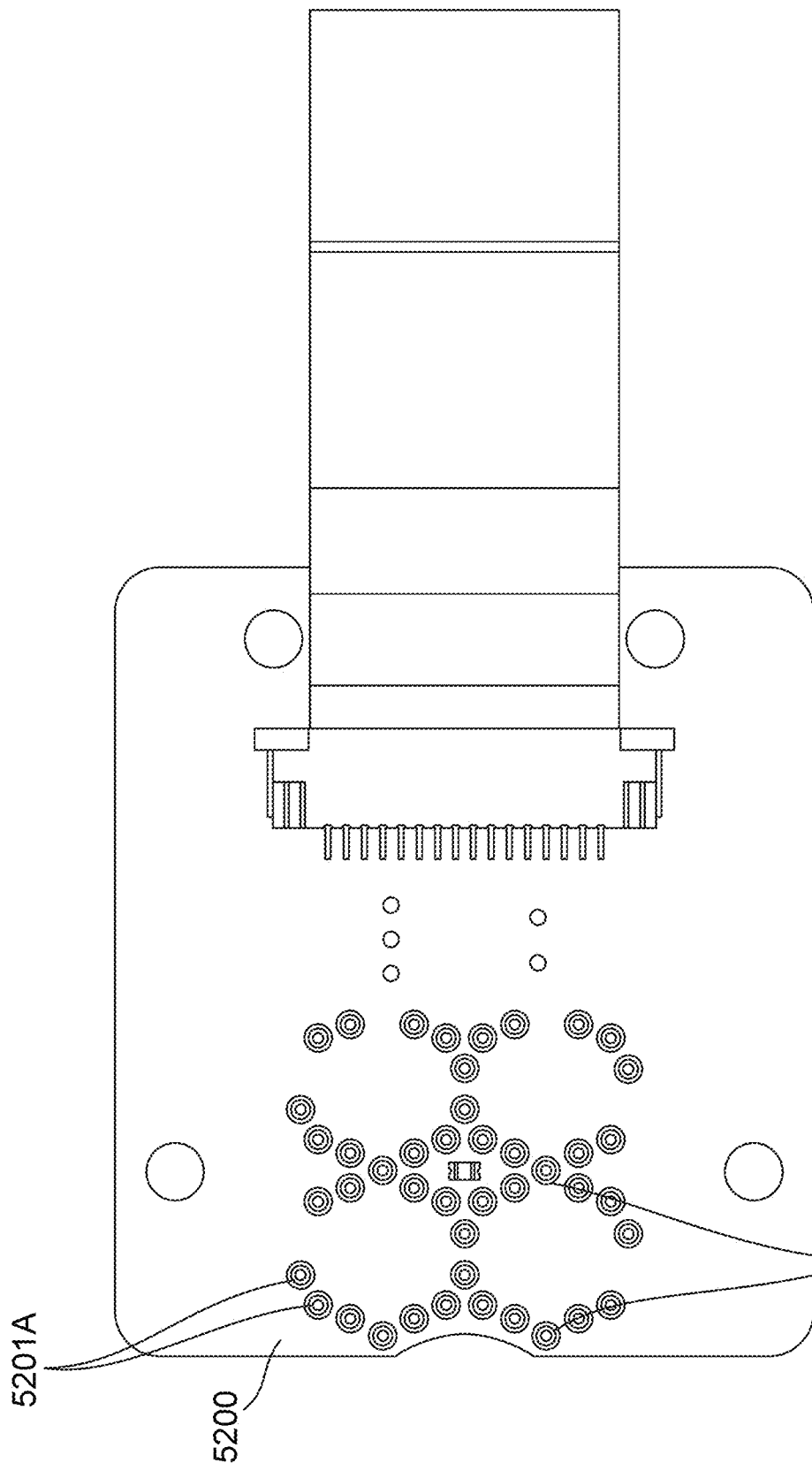

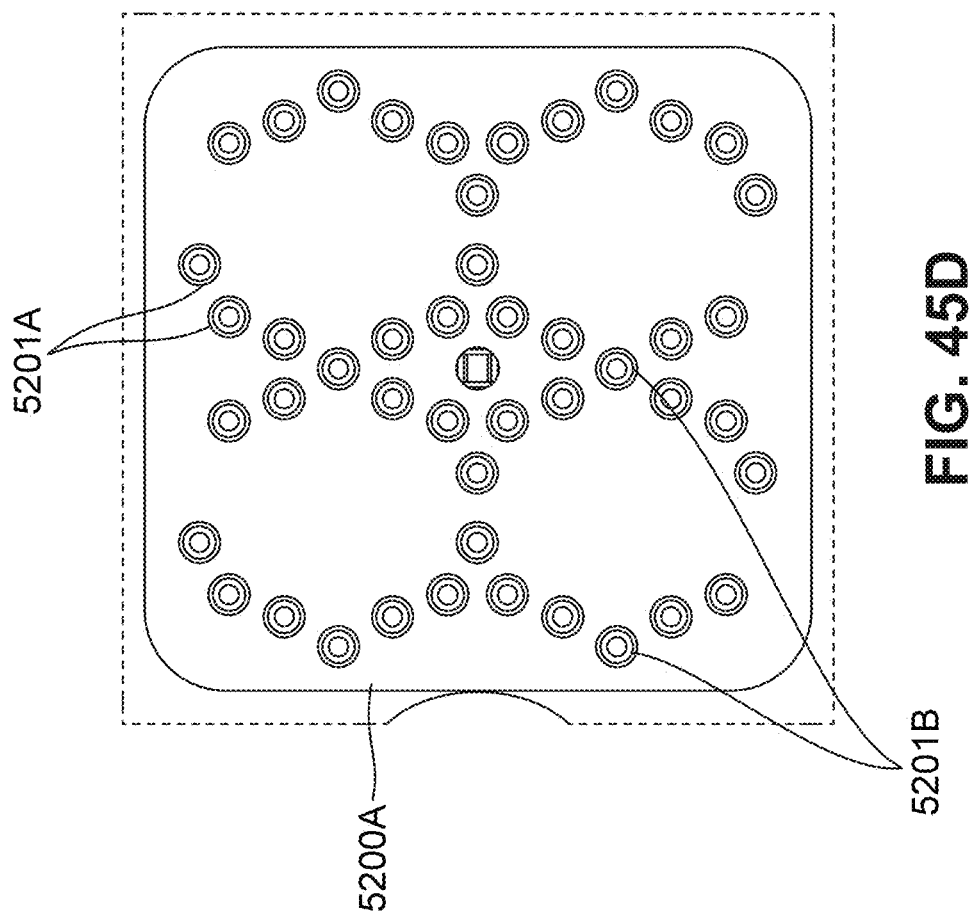

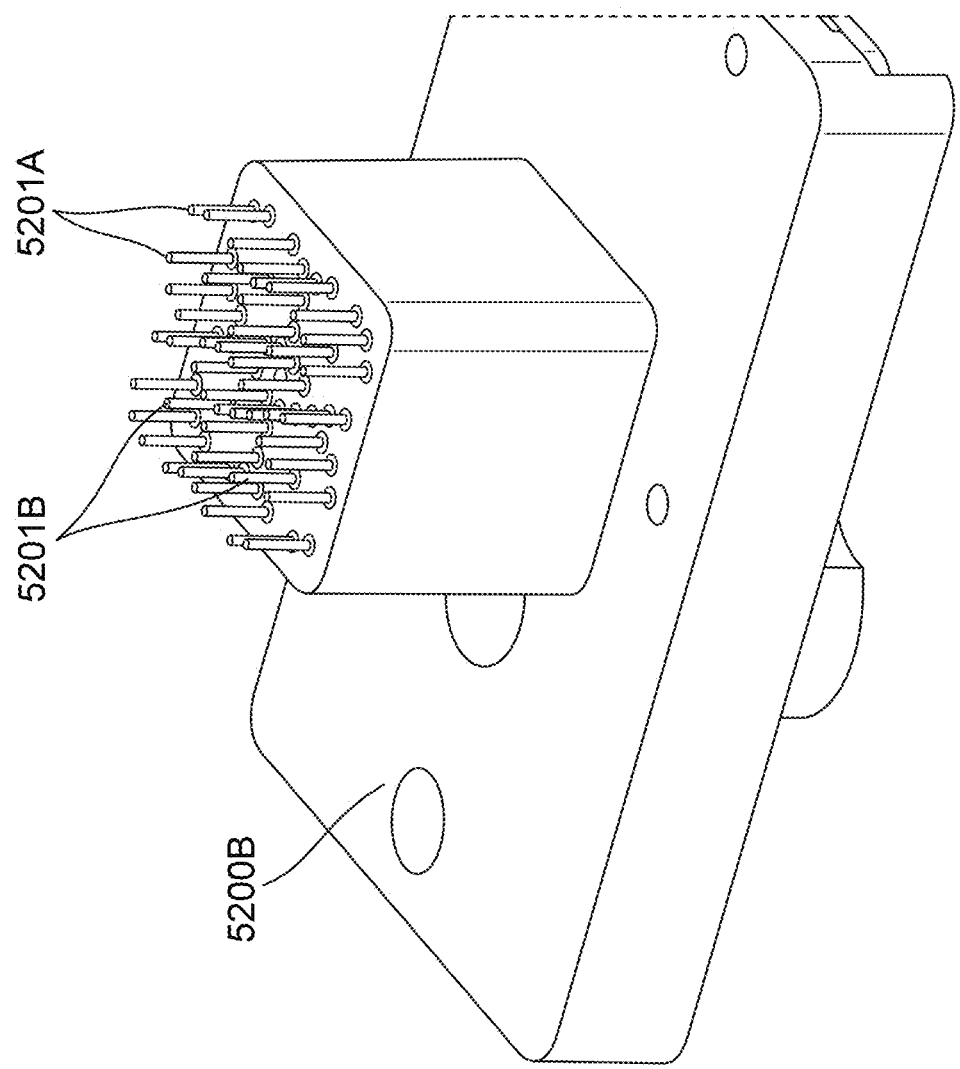

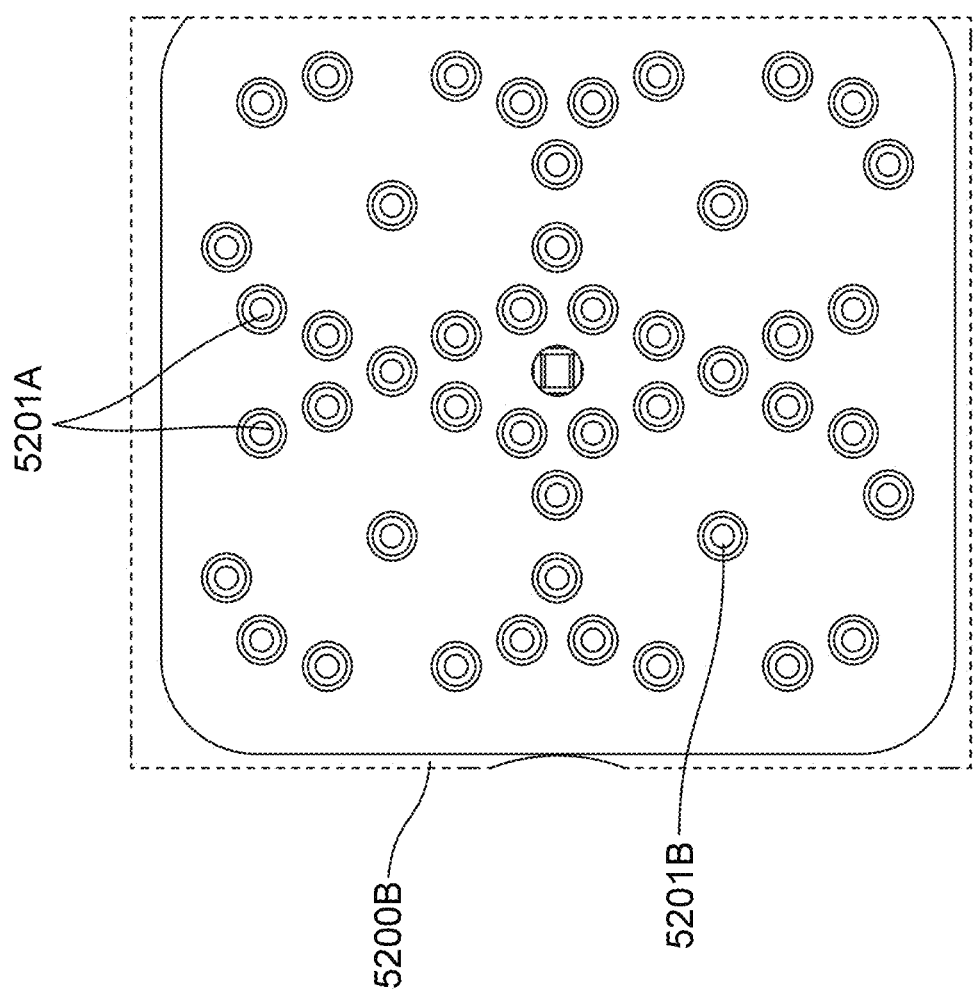

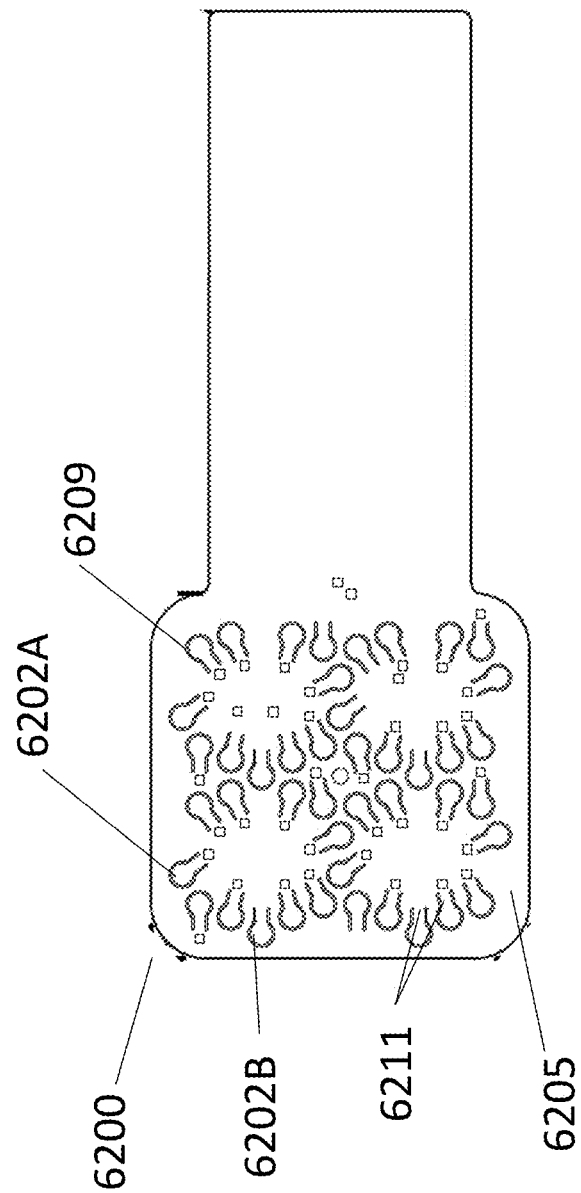

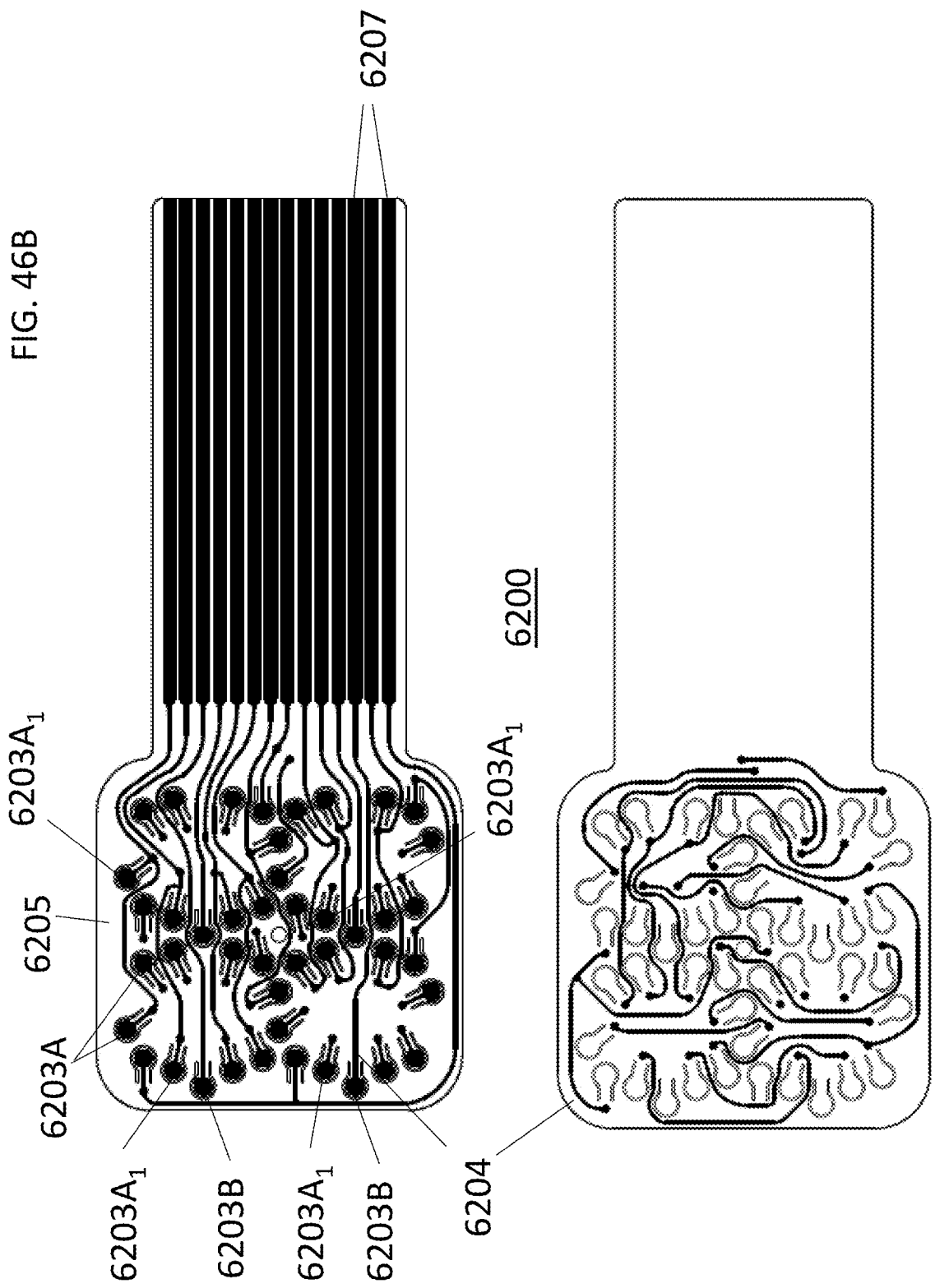

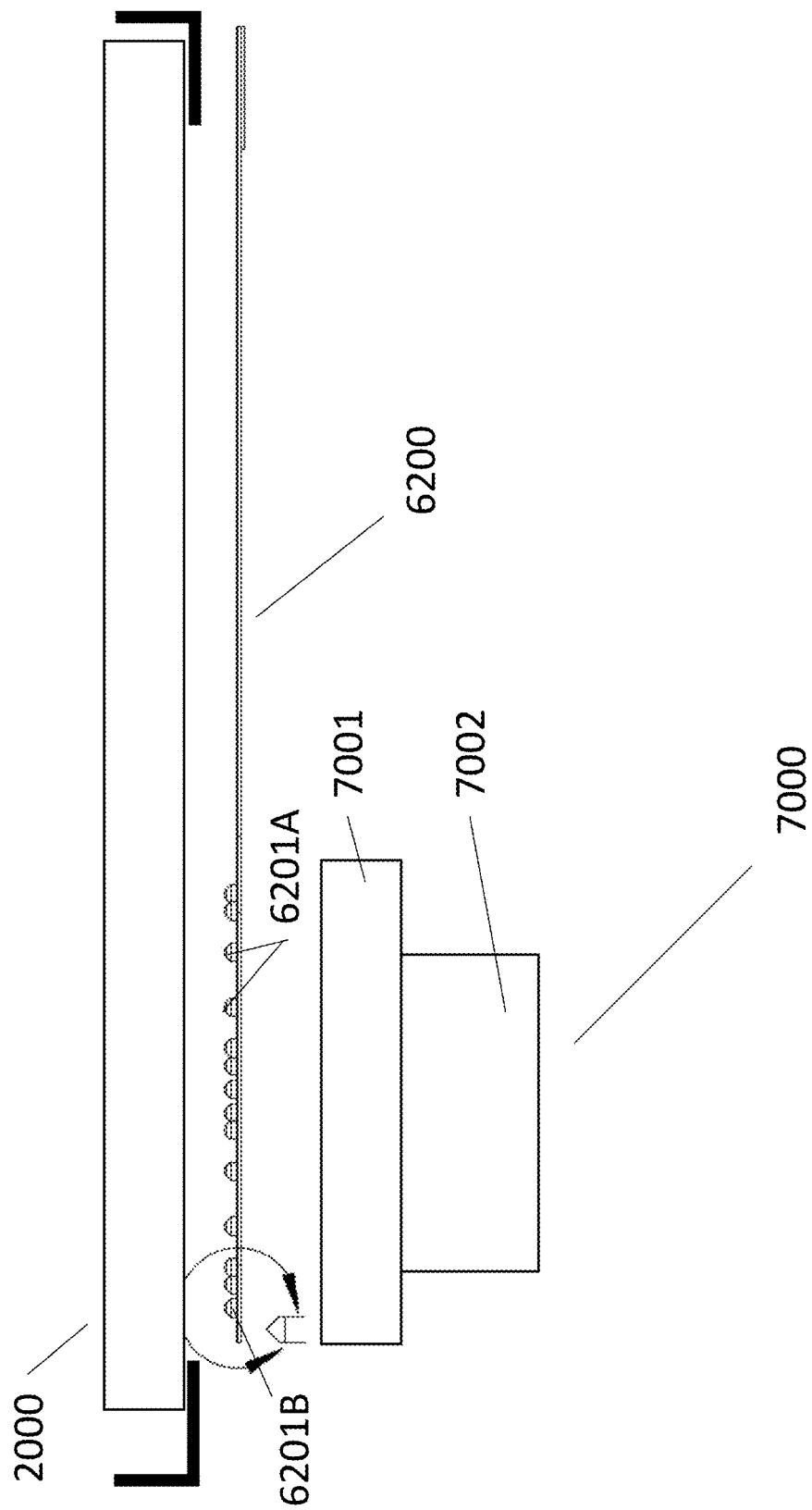

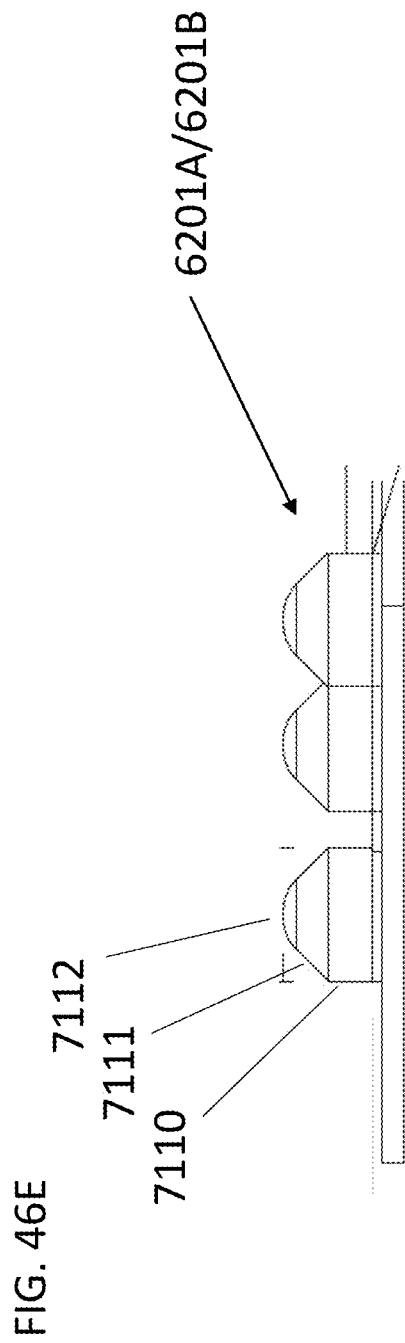

ELECTROCHEMICAL CELL DEVICES AND METHODS OF MANUFACTURING

RELATED APPLICATIONS

This application claims priority to U.S. Provisional Application No. 63/233,167, filed on Aug. 13, 2021, and titled "Electrochemical Cell Devices and Methods of Manufacturing," which is incorporated herein by reference in its entirety.

FIELD

Embodiments hereof relate to systems, devices, and methods employing electrochemical cells in the performance of chemical, biochemical, and biological assays and analysis, and methods for manufacturing the same.

BACKGROUND

An assay is an investigative (analytic) procedure in chemistry, laboratory medicine, pharmacology, environmental biology, molecular biology, etc. for qualitatively assessing or quantitatively measuring the presence, amount, or functional activity of a target entity (e.g., an analyte). An assay system may use electrochemical properties and procedures to assess a target entity qualitatively and quantitatively. For example, the assay system may assess a target entity by measuring electrical potential, electrical current, and/or luminance in a sample area containing the target entity that are caused by electrochemical process and by performing various analytical procedures (e.g., potentiometry, coulometry, voltammetry, optical analysis, etc.) on the measured data.

An assay system, utilizing electrochemical properties and procedures, may include sample areas (e.g., a well, wells in a multi-well plates, etc.) that have one or more electrodes (e.g., working electrodes, counter electrodes, and references electrodes) for initiating and controlling the electrochemical processes and for measuring the resultant data. Depending on the design and configuration of the electrodes, assay systems may be classified as referenced and unreferenced systems. For example, the working electrode is the electrode in the assay system on which the reaction of interest is occurring. The working electrode is used in conjunction with the counter electrode to establish potential differences, current flow, and/or electric fields in the sample area. The potential difference may be split between interfacial potentials at the working and counter electrodes. In an unreferenced system, an interfacial potential (the force that drives the reactions at an electrode) applied to the working electrode is not controlled or known. In the referenced system, the sample area includes a reference electrode, which is separate from the working and counter electrode. The reference electrode has a known potential (e.g., reduction potential), which can be referenced during reactions occurring in the sample area.

One example of these assay systems is an electrochemiluminescence (ECL) immunoassay. ECL immunoassay involves a process that uses ECL labels designed to emit light when electrochemically stimulated. Light generation occurs when a voltage is applied to an electrode, located in a sample area that holds a material under testing. The voltage triggers a cyclical oxidation and reduction reaction, which causes light generation and emission. In ECL, the electrochemical reactions responsible for ECL are driven by applying a potential difference between the working and counter electrodes.

Currently, both referenced and unreferenced assay systems have drawbacks in the measurement and analysis of a target entity. For an unreferenced assay system, the unknown nature of the interfacial potentials introduces a lack of control in the electrochemical processes, which may be further affected by the design of the assay system. For example, for an ECL immunoassay, the interfacial potential applied at the working electrode may be affected by electrode areas (working and/or counter), composition of the solution, and any surface treatment of the electrodes (e.g., plasma treatments). This lack of control has previously been addressed by choosing to ramp the potential difference from before the onset of ECL generation to after the end of ECL generation. For a referenced system, while the potential may be known and controllable, the addition of the reference electrode increases the cost, complexity, size, etc. of the assay system. Further, the addition of the reference electrode may limit the design and placement of the working and/or counter electrode in the sample area due to the need to accommodate the extra electrode. Additionally, both the referenced and unreferenced assay system may have slow read times due to voltage signals required to operate the systems. The reference systems may have a higher cost due to fabricating both the counter and reference electrode.

Further difficulties with existing systems include a lack of flexibility related to electrode addressability. Current systems lack an ability to address electrodes and electrode zones individually and independently of one another. This lack limits the ability of an operator in assay and experimental design.

These and other drawbacks exist with conventional assay systems, devices, and instruments. What is needed, therefore, are systems, devices and methods that provide the controllable potential of a referenced system while reducing the cost, complexity, and size introduced by having a reference electrode. Further, systems, devices, and methods that provide greater flexibility in electrode addressability are desired. These drawbacks are addressed by embodiments described herein.

BRIEF SUMMARY

Embodiments of the present disclosure include systems, devices, and methods for electrochemical cells including an auxiliary electrode design and electrochemical analysis apparatuses and devices including the electrochemical cells.

Embodiments of the present disclosure include an electrochemical cell for performing electrochemical analysis, the electrochemical cell including: a plurality of working electrode zones disposed, and defining a pattern, on a surface of the cell; and at least one auxiliary electrode disposed on the surface, wherein each of the plurality of working electrode zones are electrically isolated from one another and from the auxiliary electrode.

An embodiment includes a multi-well assay plate including: a top plate having top plate opening defining wells of the multi-well assay plate arranged in a well pattern, each well being defined by a well area; a base plate including a substrate having a top surface and a bottom surface, the top surface being mated to the top plate; and a plurality of well electrode structures, each of the plurality of well electrode structures including: an electrode grouping patterned on the top surface and having an auxiliary electrode and a plurality of working electrodes electrically isolated from the auxiliary electrode and remainder of the plurality of working electrodes; and an electrode contact grouping patterned on the bottom surface corresponding to the electrode grouping and including a plurality of electrode contacts including a plurality of working electrode contacts electrically connected to corresponding working electrodes and an auxiliary electrode contact electrically connected to the auxiliary electrode.

Another embodiment includes a method of using a multi-well assay plate, the multi-well assay plate including: a plurality of wells arranged in a well pattern; a plurality of well electrode structures, each corresponding to a well of the plurality of wells, each of the plurality of well electrode structures including: an electrode grouping patterned at a bottom of the well and having an auxiliary electrode and a plurality of working electrodes electrically isolated from the auxiliary electrode and a remainder of the plurality of working electrodes; the method including: generating a voltage potential between a selected working electrode and a selected auxiliary electrode associated with a selected well electrode structure; maintaining substantial electrical isolation of unenergized working electrodes of the selected well electrode structure; and measuring a response to the voltage potential.

Another embodiment includes a method of making a multi-well assay plate, the method including: forming a plurality of holes in a substrate; applying a first conductive layer of material on a first side of the substrate, the first conductive layer filling the plurality of holes to form a plurality of vias; applying a second conductive layer of material on the first side of the substrate, the second conductive layer overlaying the first conductive layer to form a plurality of electrode contacts; applying a third conductive layer of material on a second side of the substrate, the third conductive layer forming a plurality of electrical traces, the plurality of electrical traces connecting the plurality of vias to a plurality of auxiliary electrodes and a plurality of working electrodes; applying a fourth conductive layer of material on the second side of the substrate, the fourth conductive layer forming the plurality of auxiliary electrodes; applying a fifth conductive layer of material overlaying the third conductive layer on the second side of the substrate; applying a sixth conductive layer of material on the second side of the substrate, the sixth conductive layer forming the plurality of working electrodes; applying an insulating layer of material on the second side of the substrate, the insulating layer exposing the plurality of auxiliary electrodes and the plurality of working electrodes and insulating a remainder of the second side of the substrate; and adhering the substrate to a top plate having top plate openings defining wells of the multi-well assay plate arranged in a well pattern, each well being defined by a well area.

Another embodiment includes an electrochemical cell for performing electrochemical analysis, the electrochemical cell including: a plurality of working electrode zones disposed, and defining a pattern, on a surface of the cell; and at least one auxiliary electrode disposed on the surface, wherein each of the plurality of working electrode zones are electrically isolated from one another and from the auxiliary electrode.

Another embodiment includes an electrical connector configured to provide an interface between a multi-well assay plate and an assay instrument, the electrical connector including: a first plurality of electrode connectors arranged according to a pattern of working electrode contacts on a bottom surface of a multi-well assay plate; a second plurality of electrode connectors arranged according to a pattern of auxiliary electrode contacts on the bottom surface of the multi-well assay plate; and a plurality of circuits configured to connect the first plurality of electrode connectors and the second plurality of electrode connectors to the assay instrument.

Another embodiment includes a method of using a multi-well assay plate, the multi-well assay plate including: a plurality of wells arranged in a well patter; a plurality of well electrode structures; each corresponding to a well of the plurality of wells, each of the plurality of well electrode structures including: an electrode contact grouping patterned in an orientation neutral pattern at a bottom of multi-well assay plate and having an auxiliary electrode contact in electrical communication with an auxiliary electrode and a plurality of working electrode contacts in electrical communication with a plurality of working electrodes; the method including: loading the multi-well assay plate into an instrument configured to generate the voltage potential, generating a voltage potential between a selected working electrode and a selected auxiliary electrode associated with a selected well electrode structure; and measuring a response to the voltage potential.

Another embodiment includes a multi-well assay plate including: a top plate having top plate opening defining wells of the multi-well assay plate arranged in a well pattern, each well being defined by a well area; a base plate including a substrate having a top surface and a bottom surface, the top surface being mated to the top plate; and a plurality of well electrode structures, each of the plurality of well electrode structures including: an electrode grouping patterned on the top surface; and an electrode contact grouping patterned on the bottom surface in an orientation neutral pattern corresponding to the electrode grouping and including a plurality of electrode contacts including a plurality of working electrode contacts electrically connected to corresponding working electrodes and an auxiliary electrode contact electrically connected to the auxiliary electrode.

BRIEF DESCRIPTION OF DRAWINGS

The foregoing and other features and advantages of the present invention will be apparent from the following description of embodiments hereof as illustrated in the accompanying drawings. The accompanying drawings, which are incorporated herein and form a part of the specification, further serve to explain the principles of various embodiments described herein and to enable a person skilled in the pertinent art to make and use various embodiments described herein. The drawings are not necessarily drawn to scale.

FIGS. 3A-3F, 4A-4F, 5A-5C, 6A-6F, 7A-7F, and 8A-8D illustrate several examples of designs of electrodes for use in the electrochemical cell of FIGS. 1A-1C or the multi-well plate of FIGS. 2A-2C, according to embodiments disclosed herewith.

FIGS. 39A-39L illustrate aspects of the construction of individually addressable electrode electrochemical cells according to embodiments disclosed herein.

FIGS. 42A-42I illustrate features of an orientation neutral electrode contact pattern according to embodiments disclosed herein.

FIGS. 43A-43D illustrate features of an orientation neutral electrode contact pattern according to embodiments disclosed herein.

FIGS. 44A-44C illustrate aspects of an electrical connector according to embodiments disclosed herein.

FIGS. 45A-45F illustrate aspects of an electrical connector according to embodiments disclosed herein.

FIGS. 46A-46E illustrate features of a flexible connector according to embodiments hereof.

DETAILED DESCRIPTION

Specific embodiments of the present invention are now described with reference to the figures. The following detailed description is merely exemplary in nature and is not intended to limit the present invention or the application and uses thereof. Furthermore, there is no intention to be bound by any expressed or implied theory presented in the preceding technical field, background, brief summary or the following detailed description.

Embodiments of the present disclosure are directed to electrochemical cells including an auxiliary electrode design and electrochemical analysis apparatuses and devices including the electrochemical cells. In embodiments, the auxiliary electrodes are designed to include a redox couple (e.g., Ag—AgCl) that provides a stable interfacial potential. Although specific materials and compositions of electrodes may be mentioned in various places throughout this disclosure, the disclosure is not so limited, and any suitable electrode materials or compositions may be employed. In certain embodiments, materials, compounds, etc., can be doped to create a redox couple, although other manners of creating redox couples are contemplated as well. The auxiliary electrodes with a reduction-oxidation couple that defines a stable interfacial potential allows the auxiliary electrodes to serve as dual-function electrodes. That is, the one or more auxiliary electrodes operate concurrently as a counter electrode and a reference electrode. Because the auxiliary electrodes operate as dual-function electrodes, the space occupied by the auxiliary electrodes in an electrochemical cell is reduced thereby allowing additional configurations and numbers of working electrode zones to be included in the electrochemical cell.

In embodiments, the utilization of the one or more auxiliary electrodes also improves read times for electrochemical analysis apparatuses and devices during electrochemical analysis processes, for example, ECL processes. While it is common in conventional unreferenced ECL systems to employ slow voltage ramps that pass through the voltage that provides maximum ECL to provide tolerance to variability in the potential at the auxiliary electrode, the use of the auxiliary electrodes of the inventions, such as auxiliary electrode comprising a redox couple, provides improved control over this potential and enables the use of more efficient and faster waveforms such as short voltage pulses or fast voltage ramps.

Figure 1A:
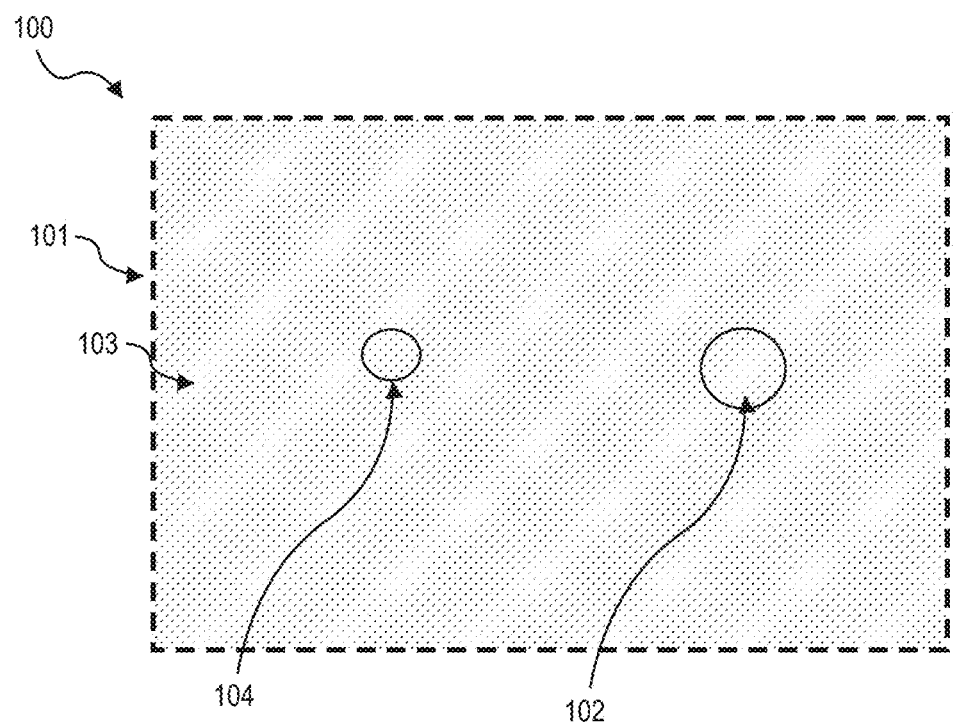
FIGS. 1A-1C illustrate several views of an electrochemical cell, according to embodiments disclosed herewith

FIG. 1A illustrates an example of an electrochemical cell 100 in accordance with an embodiment hereof. As illustrated in FIG. 1A, the electrochemical cell 100 defines a working space 101 in which electrical energy is utilized to cause one or more chemical reactions. Within the working space (or sample area) 101, the electrochemical cell 100 may include one or more auxiliary electrodes 102 and one or more working electrode zones 104. The auxiliary electrode 102 and the working electrode zone 104 may be in contact with an ionic medium 103. The electrochemical cell 100 may operate through reduction-oxidation (redox) reactions caused by introducing electrical energy via the auxiliary electrode 102 and the working electrode zone 104. In some embodiments, the ionic medium 103 may include an electrolyte solution such as water or other solvent in which ions are dissolved, such as salts. In some embodiments, as described below in further detail, the ionic medium 103 or a surface of working electrode 102 may include luminescent species that generate and emit photons during the redox reaction. During operation of the electrochemical cell 100, an external voltage may be applied to one or more of auxiliary electrode 102 and the working electrode zone 104 to cause redox reactions to occur at these electrodes.

As described herein, when in use an auxiliary electrode will have an electrode potential that may be defined by the redox reactions occurring at the electrode. The potential may be defined, according to certain non-limiting embodiments, by: (i) a reduction-oxidation (redox) couple confined to the surface of the electrode or (ii) a reduction-oxidation (redox) couple in solution. As described herein, a redox couple includes a pair of elements, chemical substances, or compounds that interconvert through redox reactions, e.g., one element, chemical substance, or compound that is an electron donor and one element, chemical substance, or compound that is an electron acceptor. Auxiliary electrodes with a reduction-oxidation couple that defines a stable interfacial potential can serve as a dual-function electrodes. That is, the one or more auxiliary electrodes 102 may provide the functionality associated with both the counter and reference electrodes in a three electrode electrochemical system by providing high current flow (the function of the counter electrode in the three electrode system) while providing the ability to define and control the potential at the working electrodes (the function of the reference electrode in the three electrode system). The one or more auxiliary electrodes 102 may operate as a counter electrode by providing a potential difference with one or more of the one or more working electrode zones 104 during redox reactions that occur in the electrochemical cell 100 in which the one or more auxiliary electrodes 102 are located. Based on a chemical structure and composition of the one or more auxiliary electrodes 102, the one or more auxiliary electrodes 102 may also operate as a reference electrode for determining a potential difference with one or more of the working electrode zones 104.

In embodiments, the auxiliary electrode 102 may be formed of a chemical mixture of elements and alloys with a chemical composition permitting the auxiliary electrode 102 to function as a reference electrode. The chemical mixture (e.g., the ratios of elements and alloys in the chemical composition of the auxiliary electrode) can provide a stable interfacial potential during a reduction or oxidization of the chemical mixture, such that a quantifiable amount of charge is generated throughout the reduction-oxidation reactions occurring in the electrochemical cell 100. Although certain reactions described herein may be referred to as reduction or oxidation reactions, it is understood that the electrodes described herein can support both reduction and oxidation reactions, depending on the voltages applied. Specific descriptions of reduction or oxidation reactions do not limit the functionality of the electrodes to a specific type of reaction. In some embodiments, the chemical mixture of the one or more auxiliary electrodes 102 may include an oxidizing agent that provides a stable interfacial potential during a reduction of the chemical mixture, and an amount of the oxidizing agent in the chemical mixture may be greater than or equal to an amount of oxidizing agent required to provide for the entirety of the reduction-oxidation reactions in the electrochemical cell that occur during electrochemical reactions. In embodiments, the auxiliary electrode 102 is formed of a chemical mixture that provides a interfacial potential during a reduction of the chemical mixture, such that a quantifiable amount of charge is generated throughout the reduction-oxidation reactions occurring in the electrochemical cell 100. The chemical mixture of an auxiliary electrode 102 includes an oxidizing agent that supports redox reactions during operations of the electrochemical cell 100, e.g., during biological, chemical, and/or biochemical assays and/or analysis, such as, ECL generation and analysis.

In an embodiment, an amount of an oxidizing agent in a chemical mixture of the one or more auxiliary electrodes 102 is greater than or equal to an amount of oxidizing agent required for an entirety of a redox reaction that is to occur in the electrochemical cell 100, e.g., during one or more biological, chemical, and/or biochemical assays and/or analysis, such as ECL generation. For example, a sufficient amount of the chemical mixture in the one or more auxiliary electrodes 102 will still remain after a redox reaction occurs for an initial biological, chemical, and/or biochemical assays and/or analysis, thus allowing one or more additional redox reactions to occur throughout subsequent biological, chemical, and/or biochemical assays and/or analysis.

Figure 1B:
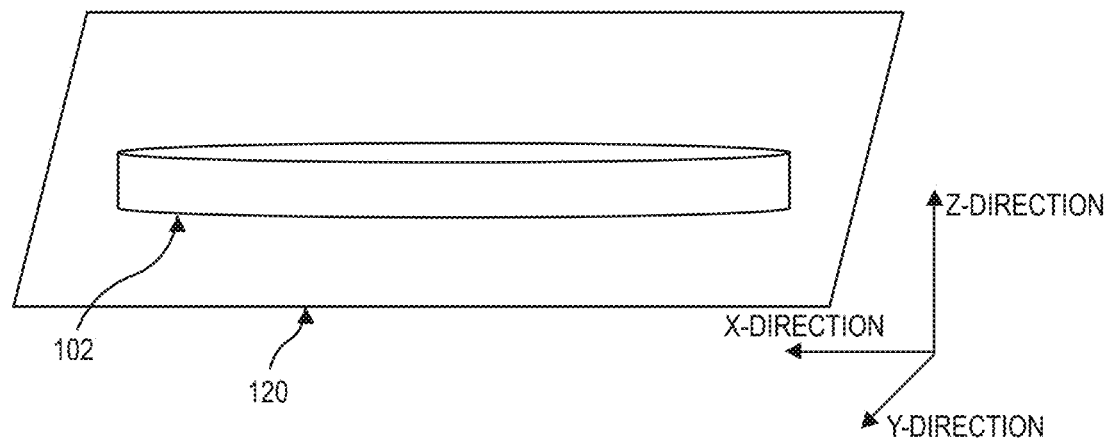

In some embodiments, an amount of an oxidizing agent in a chemical mixture of the one or more auxiliary electrodes 102 is based at least in part on a ratio of an exposed surface area (also referred to as areal surface area) of each of the one or more working electrode zones 104 to an exposed surface area of the one or more auxiliary electrode 102. As described herein, exposed surface area (also referred to as areal surface area) of the one or more auxiliary electrodes 102 refers to a two-dimensional (2D) cross-sectional area of the one or more auxiliary electrodes 102 that is exposed to the ionic medium 103. That is, as illustrated in FIG. 1B, an auxiliary electrode 102 may be formed in a three-dimensional (3D) shape that extends from a bottom surface of the electrochemical cell 100 in the Z-direction. The exposed surface area of the auxiliary electrode 102 may correspond to a 2D cross-sectional area taken in the X-Y plane. In embodiments, the 2D cross-sectional area may be taken at any point of the auxiliary electrode 102, for example, at the interface with the bottom surface 120. While FIG. 1B illustrates the auxiliary electrode 102 being a regularly shaped cylinder, the auxiliary electrode 102 may have any shape whether regular or irregular. Likewise, the exposed surface area of the one or more working electrode zones 104 refers to a 2D cross-sectional area of the one or more auxiliary electrode zones 104 that is exposed to the ionic medium 103, for example, similar to the 2D cross-sectional area of the auxiliary electrode 102 described in FIG. 1B. In certain embodiments, the areal surface area (exposed surface area) can be distinguished from the true surface area, which would include the actual surface of the electrode, accounting for any height or depth in the z-dimension. Using these examples, the areal surface area is less than or equal to the true surface area.

In embodiments, the one or more auxiliary electrodes 102 may be formed of a chemical mixture that includes a redox couple that provides an interfacial potential that is at or near the standard reduction potential for the redox couple. In some embodiments, the one or more auxiliary electrodes 102 may including a mixture of silver (Ag) and silver chloride (AgCl), or other suitable metal/metal halide couples. In some embodiments, the one or more auxiliary electrodes 102, formed of a mixture of Ag—AgCl can provide an interfacial potential that is at or near the standard reduction potential for Ag—AgCl, approximately 0.22 V. Other examples of chemical mixtures may include metal oxides with multiple metal oxidation states, e.g., manganese oxide, or other metal/metal oxide couples, e.g., silver/silver oxide, nickel/nickel oxide, zinc/zinc oxide, gold/gold oxide, copper/copper oxide, platinum/platinum oxide, etc.) In some embodiments, the chemical mixture may provide an interfacial potential that ranges from approximately 0.1 V to approximately 3.0 V. Table 1 lists examples of reduction potentials of redox couples for chemical mixtures, which may be included in the one or more auxiliary electrodes 102. One skilled in the art will realize that the examples of reduction potentials are approximate values and may vary by, for example, +/−5.0% based on chemical composition, temperature, impurities in the chemical mixture, or other conditions.

TABLE 1

| Reduction Potential at approximately 25 degrees Celsius | |
|---|---|
| Redox Couple | Approximate Reduction Potential (V) |
| Ag—AgCl | 0.22 |
| Ag—Ag$_2$O | 1.17 |
| Ag—Ag$_2$O$_3$ | 1.67 |
| Ag—AgO | 1.77 |
| Mn—MnO$_2$ | 1.22 |
| Ni—NiO$_2$ | 1.59 |
| Fe—Fe$_2$O$_3$ | 0.22 |
| Au—AuCl$_2$ | 1.15 |
| Pt—PtCl$_6$ | 0.73 |
| Au—AuCl$_4$ | 0.93 |
| Pt—PtCl$_4$ | 0.73 |

In embodiments, the chemical mixture of the redox couple in the one or more auxiliary electrodes can be based on a molar ratio of the redox couple that falls within a specified range. In some embodiments, the chemical mixture has a molar ratio of Ag to AgCl within a specified range, for example, approximately equal to or greater than 1. In some embodiments, the one or more auxiliary electrodes 102 may maintain a controlled interfacial potential until all of one or more chemical moieties, involved in the redox reaction, have been oxidized or reduced.

In some embodiments, the one or more auxiliary electrodes 102 may include a redox couple that maintains an interface potential of between −0.15 V to −0.5 V while passing a charge of approximately $1.56 \times 10^{-5}$ to $5.30 \times 10^{-4}$ C/mm$^2$ of electrode surface area. In some embodiments, the one or more auxiliary electrodes 102 may include a redox couple that passes approximately 0.5 mA to 4.0 mA of current throughout a redox reaction of the redox couple to generate ECL at a range of approximately 1.4 V to 2.6 V. In some embodiments, the one or more auxiliary electrodes 102 may include a redox couple that passes an average current of approximately 2.39 mA throughout a redox reaction to generate ECL at a range of approximately 1.4 V to 2.6 V.

In embodiments, the one or more auxiliary electrodes 102 may an amount of an oxidizing agent in the redox couple is greater than or equal to an amount of charge required to pass through the auxiliary electrode to complete the electrochemical analysis. In some embodiments, the one or more auxiliary electrodes 102 may include approximately $3.07 \times 10^{-7}$ to $3.97 \times 10^{-7}$ moles of oxidizing agent. In some embodiments, the one or more auxiliary electrodes 102 may include between approximately $1.80 \times 10^{-7}$ to $2.32 \times 10^{-7}$ moles of oxidizing agent per mm$^2$ ($1.16 \times 10^{-4}$ to $1.5 \times 10^{-4}$ moles/in$^2$) of exposed surface area. In some embodiments, the one or more auxiliary electrodes 102 may include at least approximately $3.7 \times 10^{-9}$ moles of oxidizing agent per mm$^2$ ($2.39 \times 10^{-6}$ moles/in$^2$) of total (or aggregate) exposed surface area of the one or more working electrode zones 104. In some embodiments, the one or more auxiliary electrodes may include at least approximately $5.7 \times 10^{-9}$ moles of oxidizing agent per mm$^2$ ($3.69 \times 10^{-6}$ moles/in$^2$) of total (or aggregate) exposed surface area of the one or more working electrode zones 104.

In embodiments, the one or more auxiliary electrodes 102 may include a redox couple where, when a voltage or potential is applied, a reaction of a species in the redox couple is a predominate redox reaction occurring at the one or more auxiliary electrodes 102. In some embodiments, the applied potential is less than a defined potential required to reduce water or perform electrolysis of water. In some embodiments, less than 1 percent of current is associated with the reduction of water. In some embodiments, less than 1 of current per unit area (exposed surface area) of the one or more auxiliary electrodes 102 is associated with the reduction of water.

In embodiments, the one or more auxiliary electrodes 102 (and the one or more working electrode zones 104) may be formed using any type of manufacturing process, e.g., printing, deposition, lithography, etching etc. In embodiments, a form of the chemical mixture of metal/metal halide can depend on the manufacturing process. For example, if one or more auxiliary electrodes 102 (and the one or more working electrode zones 104) are printed, the chemical mixture may be in the form of an ink or paste.) In some embodiments, one or more additional substances may be added to the one or more auxiliary electrodes 102 and/or the one or more working electrode zones 104 utilizing a doping process.

The working electrode zones 104 may be locations on an electrode on which a reaction of interest can occur. Reactions of interest may be chemical, biological, biochemical, electrical in nature (or any combination of two or more of these types of reactions). As described herein, an electrode (auxiliary electrode and/or working electrode) may be a continuous/contiguous area for which a reaction can occur, and an electrode "zone" may be a portion (or the whole) of the electrode on which a particular reaction of interest occurs. In certain embodiments, a working electrode zone 104 may comprise an entire electrode, and in other embodiments, more than one working electrode zone 104 may be formed within and/or on a single electrode. For example, the working electrode zones 104 may be formed by individual working electrodes. In this example, the working electrode zones 104 may be configured as a single electrode formed of one or more conducting materials. In another example, the working electrode zones 104 may be formed by isolating portions of a single working electrode. In this example, a single working electrode may be formed of one or more conducting materials, and the working electrode zones may be formed by electrically isolating areas ("zones") of the single working electrode using insulating materials such as a dielectric to create electrically isolated working electrode zones. In any embodiment, the working electrode zones 104 may be formed of any type of conducting materials such as metals, metal alloys, carbon compounds, doped metals, etc. and combinations of conducting and insulating materials.

In embodiments, the working electrode zones 104 may be formed of a conductive material. For example, the working electrode zones 104 may include a metal such as gold, silver, platinum, nickel, steel, iridium, copper, aluminum, a conductive alloy, or the like. In some embodiments, the working electrode zones 104 may include oxide coated metals (e.g., aluminum oxide coated aluminum). In some embodiments, the working electrode zones 104 may be formed of carbon-based materials such as carbon, carbon black, graphitic carbon, carbon nanotubes, carbon fibrils, graphite, carbon fibers and mixtures thereof. In some embodiments, the working electrode zones 104 may be formed of conducting carbon-polymer composites, conducting particles dispersed in a matrix (e.g., carbon inks, carbon pastes, metal inks), and/or conducting polymers. In some embodiments, as disclosed below in further detail, the working electrode zones 104 may be formed of carbon and silver layers fabricated using screen printing of carbon inks and silver inks. In some embodiments, the working electrode zones 104 may be formed of semiconducting materials (e.g., silicon, germanium) or semi-conducting films such as indium tin oxide (ITO), antimony tin oxide (ATO) and the like.

Figure 1C:
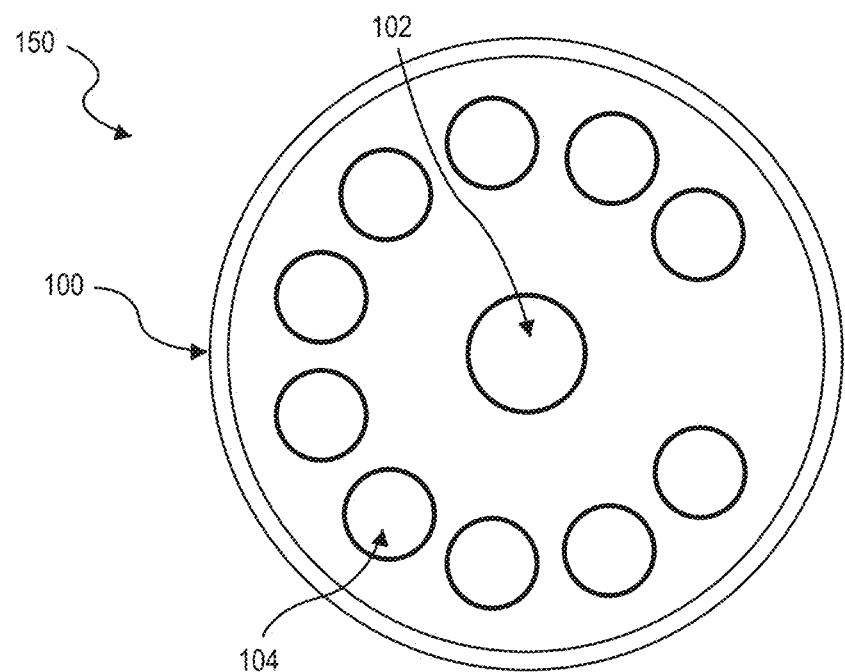

In embodiments, as described below in further detail, the one or more auxiliary electrodes 102 and the one or more working electrode zones 104 may be formed in different electrode designs (e.g., different sizes and/or shapes, different numbers of auxiliary electrodes 102 and working electrode zones 104, different positioning and patterns within the electrochemical cell 100, etc.) to improve electrochemical properties and analysis (e.g., ECL analysis) performed by apparatus and devices containing the electrochemical cell. FIG. 1C illustrates one example of an electrode design 150 for the electrochemical cell 100 including multiple working electrode zones. As illustrated in FIG. 1C, the electrochemical cell 100 may include ten (10) working electrode zones 104 and a single auxiliary electrode 102. Various other examples of the electrode design are discussed below in reference to FIGS. 3A-3F, 4A-4F, 5A-5C, 6A-6F, 7A-7F, and 8A-8D.

In embodiments, a configuration and placement of the working electrodes zones 104 within the electrochemical cell 100 may be defined according to an adjacency between the working electrode zones 104 and/or adjacency between the working electrode zones 104 and the one or more auxiliary electrodes 102. In some embodiments, adjacency can be defined as a relative number of neighboring working electrode zones 104 and/or the one or more auxiliary electrodes 102. In some embodiments, adjacency can be defined as a relative distance between the working electrode zones 104 and/or the one or more auxiliary electrodes 102. In some embodiments, adjacency can be defined as a relative distance from the working electrode zones 104 and/or the one or more auxiliary electrodes 102 to other features of the electrochemical cell 100 such as a perimeter of the electrochemical cell.

In embodiments in accordance herewith, for example, the one or more auxiliary electrodes 102 and the one or more working electrode zones 104 of a respective electrochemical cell 100 may be formed to have respective sizes such that a ratio of an aggregate of exposed surface area of the one or more working electrode zones 104 to an exposed surface area of the one or more auxiliary electrodes 102 is greater than 1, although other ratios are contemplated as electrochemical cell 100 (e.g., ratios equal to or less than or greater than 1). In some embodiments in accordance herewith, for example, each of the one or more auxiliary electrodes 102 and/or the one or more working electrode zones 104 may be formed in a circular shape having surface area that substantially defines a circle, although other shapes (e.g., rectangles, squares, ovals, clovers, or any other regular or irregular geometric shape).

In embodiments in accordance herewith, for example, the one or more auxiliary electrodes 102 and/or the one or more working electrode zones 104 may be formed in a wedge shape having a wedged-shape surface area, also referred to herein as a trilobe shape. That is, the one or more auxiliary electrodes 102 and/or the one or more working electrode zones 104 may be formed having two opposing boundaries that have different dimensions, and two side boundaries that connect the two opposing boundaries. For example, the two opposing boundaries may include a wide boundary and a narrow boundary, where the wide boundary has a length that is longer than the narrow boundary. In some embodiments, the wide boundary and/or the narrow boundary may be blunt, e.g., rounded corners at a connection to the side boundaries. In some embodiments, the wide boundary and/or the narrow boundary may be sharp, e.g., angular corner at a connection to the side boundaries. In embodiments, the wedge shape described herein may be generally trapezoidal, with rounded or angular corners. In embodiments, the wedge shape described herein may be generally triangular with a flattened or rounded apex and rounded or angular corners. In embodiments, the wedge shape may be utilized to maximize the available area at the bottom surface 120 of the electrochemical cell. For example, if the working area 101 of the electrochemical cell is circular, one or more working electrode zones 104, with the wedge shape, can be arranged such that the wide boundary is adjacent to an outer perimeter of the working area 101 and the narrow boundary is adjacent to a center of the working area 101.

In embodiments, the electrochemical cell 100 may be included in an apparatus or device for performing electrochemical analysis. In some embodiments, the electrochemical cell 100 can form a portion of a well for an assay device that performs electrochemical analysis, such as an ECL immunoassay, as described below. In some embodiments, the electrochemical cell 100 may form a flow cell in a cartridge that is used in an analysis device or apparatus, e.g., ECL cartridges (such as, for example, those provided in U.S. Pat. Nos. 10,184,884 and 10,935,547), flow cytometers, etc. One skilled in the art will realize that the electrochemical cell 100 may be utilized in any type of apparatus or device in which a controlled redox reaction is performed.

Figure 2A:
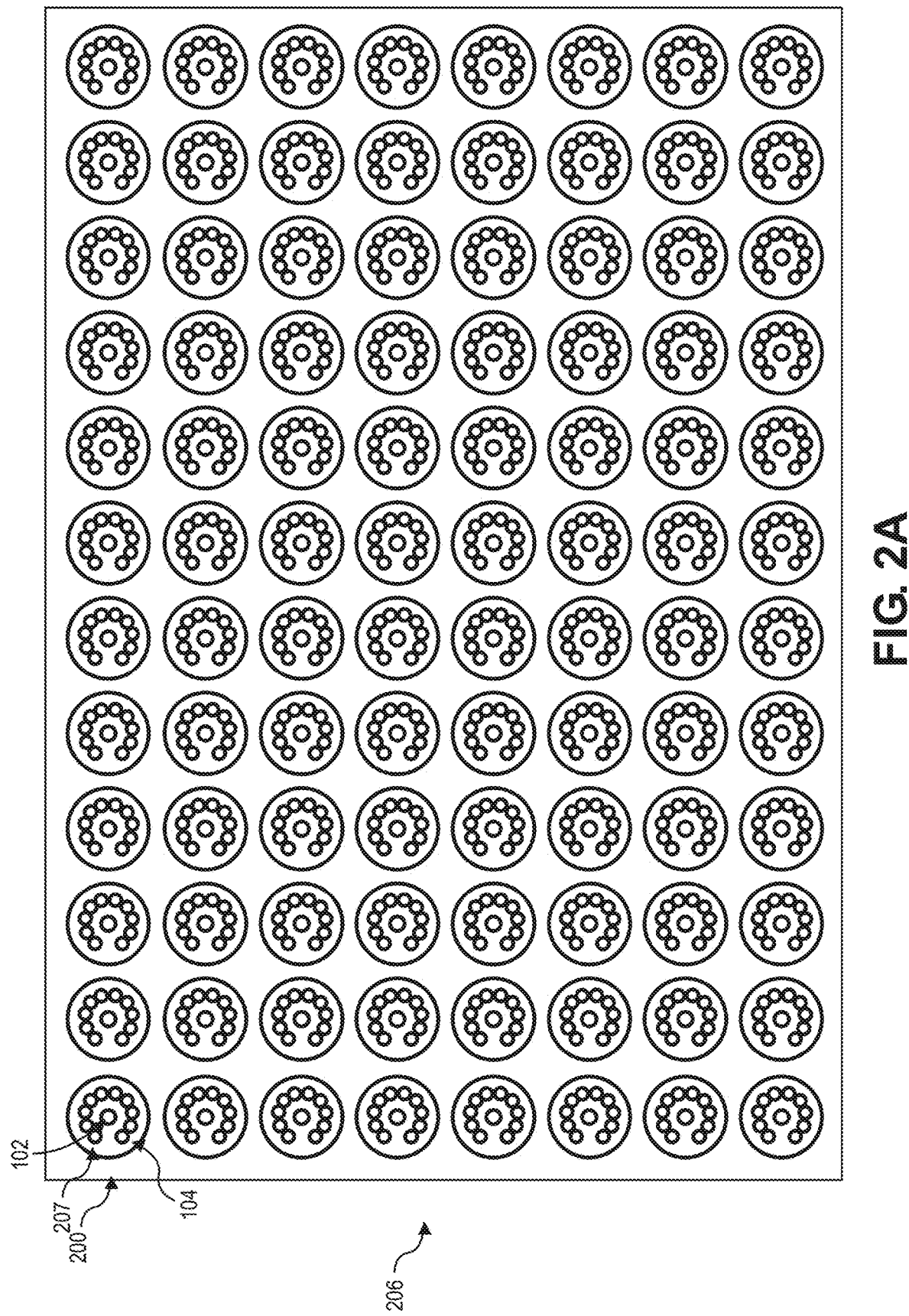
FIG. 2A illustrates a top view of a multi-well plate including multiple sample areas, according to embodiments disclosed herewith.
Figure 2B:
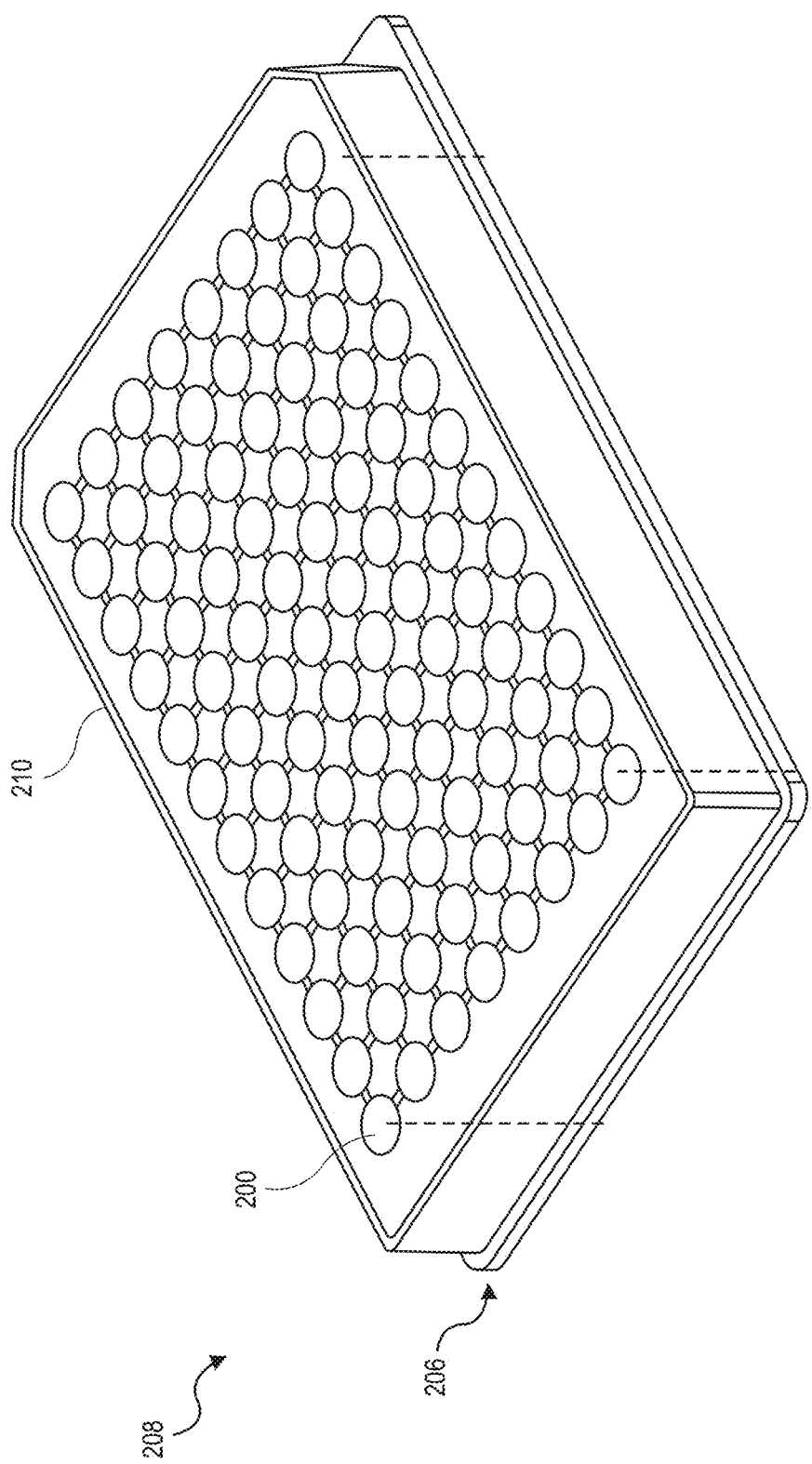
FIG. 2B illustrates a multi-well plate for use in an assay device including multiple sample areas, according to embodiments disclosed herewith.
Figure 2C:
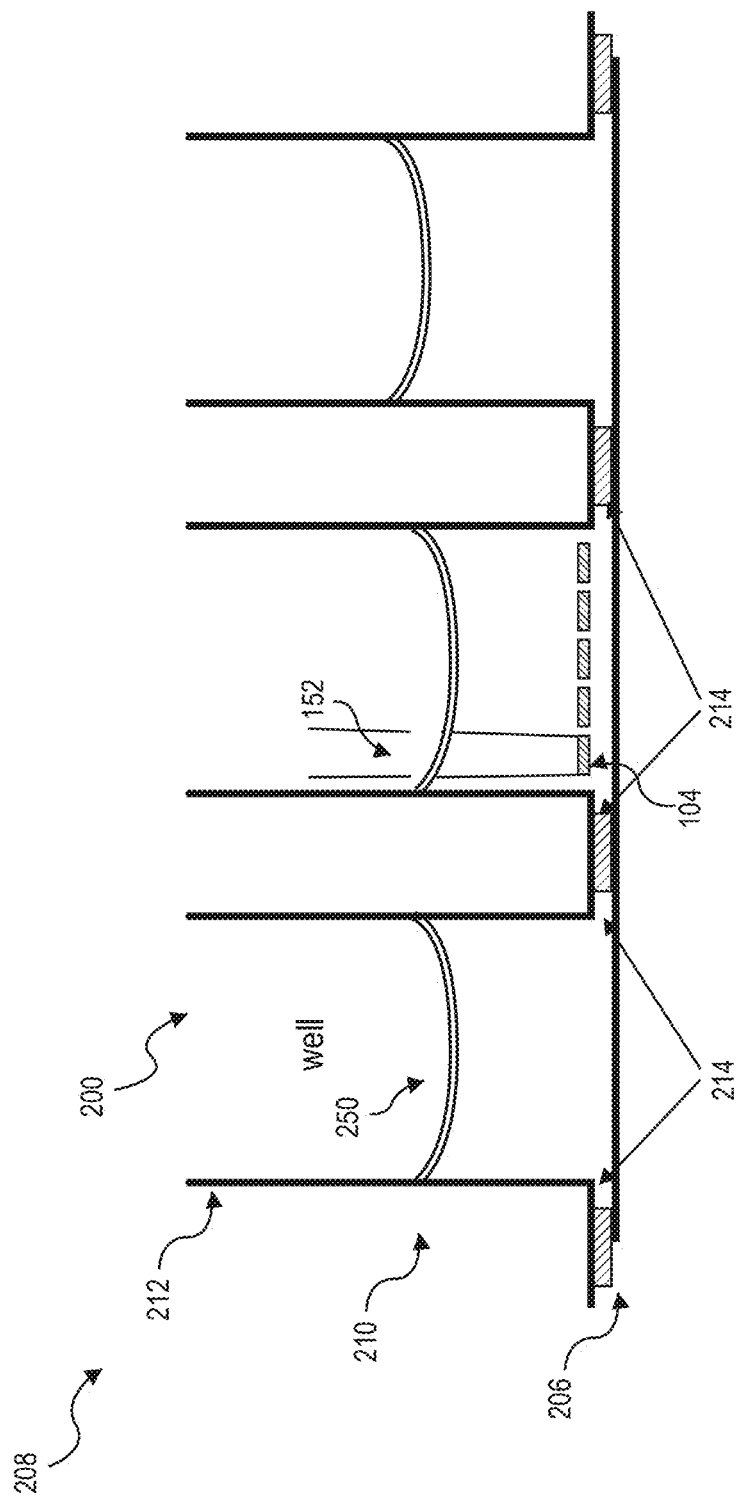
FIG. 2C illustrates a side view of a sample area of the multi-well plate of FIG. 1C, according to embodiments disclosed herewith.

FIGS. 2A-2C illustrate several views of a sample area ("well") 200 including an electrochemical cell (e.g., electrochemical cell 100), including an auxiliary electrode design, for use in an assay device for biological, chemical, and/or biochemical analysis in accordance with an embodiment hereof. One skilled in the art will realize that FIGS. 2A-2C illustrate one example of wells in an assay device and that existing components illustrated in FIGS. 2A-2C may be removed and/or additional components may be added without departing from the scope of embodiments described herein.

As illustrated in FIG. 2A, which is a top view, a base plate 206 of a multi-well plate 208 (illustrated in FIG. 2B) may include multiple wells 200. The base plate 206 may include a surface that forms a bottom portion of each well 200 and may include one or more auxiliary electrodes 102 and one or more working electrode zones 104 disposed on and/or within the surface of the base plate 206 of the multi-well plate 208. As illustrated in FIG. 2B, which is a perspective view, the multi-well plate 208 may include a top plate 210 and the base plate 206. The top plate 210 may define the wells 200 that extend from a top surface of the top plate 210 to the base plate 206, where the base plate 206 forms a bottom surface 207 of each well 200. In operation, light generation occurs when a voltage is applied across the one or more working electrode zones 104 and the one or more auxiliary electrodes 102 located in a well 200 that holds a material under testing. The applied voltage triggers a cyclical oxidation and reduction reaction, which causes photon (light) generation and emission. The emitted photon may then be measured to analyze the material under testing.

Depending on whether the reaction occurring at a working electrode zone 104 is accepting or supplying electrons, the reaction at the working electrode zone 104 is a reduction or an oxidation, respectively. In embodiments, the working electrode zones 104 may be derivatized or modified, for example, to immobilize assay reagents such as binding reagents on electrodes. For example, the working electrode zones 104 may be modified to attach antibodies, fragments of antibodies, proteins, enzymes, enzyme substrates, inhibitors, cofactors, antigens, haptens, lipoproteins, liposaccharides, bacteria, cells, sub-cellular components, cell receptors, viruses, nucleic acids, antigens, lipids, glycoproteins, carbohydrates, peptides, amino acids, hormones, protein-binding ligands, pharmacological agents, and/or combinations thereof. Likewise, for example, the working electrode zones 104 may be modified to attach non-biological entities such as, but not limited to polymers, elastomers, gels, coatings, ECL tags, redox active species (e.g., tripropylamine, oxalates), inorganic materials, chemical functional groups, chelating agents, linkers etc. Reagents may be immobilized on the one or more working electrode zones 104 by a variety of methods including passive adsorption, specific binding and/or through the formation of covalent bonds to functional groups present on the surface of the electrode.

For example, ECL species may be attached to the working electrode zones 104 that may be induced to emit ECL for analytical measurements to determine the presence of a substance of interest in a fluid in the well 200. For example, species that may be induced to emit ECL (ECL-active species) have been used as ECL labels. Examples of ECL labels include: (i) organometallic compounds where the metal is from, for example, the noble metals that are resistant to corrosion and oxidation, including Ru-containing and Os-containing organometallic compounds such as the tris-bipyridyl-ruthenium (RuBpy) moiety and ii) luminol and related compounds. Species that participate with the ECL label in the ECL process are referred to herein as ECL coreactants. Commonly used coreactants include tertiary amines such as triisopropylamine (TPA), oxalate, and persulfate for ECL from RuBpy and hydrogen peroxide for ECL from luminol. The light generated by ECL labels may be used as a reporter signal in diagnostic procedures. For instance, an ECL label may be covalently coupled to a binding agent such as an antibody or nucleic acid probe; the participation of the binding reagent in a binding interaction may be monitored by measuring ECL emitted from the ECL label. Alternatively, the ECL signal from an ECL-active compound may be indicative of the chemical environment.

In embodiments, the working electrode zones 104 and/or the auxiliary electrodes 102 (or other components of the well 200) may also be treated (e.g., pretreated) with materials and/or processes that improve attachment (e.g., absorption) of materials, used in the electrochemical processes (e.g., reagents, ECL species, labels, etc.), to the surface of the working electrode zones 104 and/or the auxiliary electrodes. In some embodiments, the working electrode zones 104 and/or the auxiliary electrodes 102 (or other components of the well 200) may be treated using a process (e.g., plasma treatment) that causes a surface of the working electrode zones 104 and/or the auxiliary electrodes 102 (or other components of the well 200) to exhibit hydrophilic properties (also referred to herein as "High Bind" or "HB"). In some embodiments, the working electrode zones 104 and/or the auxiliary electrodes 102 (or other components of the well 200) may be untreated or treated using a process that causes a surface of the working electrode zones 104 and/or the auxiliary electrodes 102 (or other components of the well 200) to exhibit hydrophobic properties (also referred to herein as "Standard" or "Std").

As illustrated in FIG. 2C, which is a side sectional view of a portion of the multi-well plate 208 of FIG. 2B, a number of the wells 200 may be included on the multi-well plate 208—three of which are shown in FIG. 2C. Each well 200 may be formed by the top plate 210 that includes one or more sidewalls 212 that form a boundary of the electrochemical cell 100. The one or more sidewalls 212 that extend from a bottom surface of the top plate 210 to the top surface of the top plate 210. The wells 200 may be adapted to hold one or more fluids 250, such as an ionic medium as described above. In certain embodiments, one or more wells 200 may be adapted to hold gases and/or solids in place of or in addition to the one or more fluids 250. In embodiments, the top plate 210 may be secured to the base plate 206 with an adhesive 214 or other connection material or device.

The multi-well plate 208 may include any number of the wells 200. For example, as illustrated in FIGS. 2A and 2B, the multi-well plate 208 may include 96 wells 200. One skilled in the art will realize that the multi-well plate 208 may include any of number of the wells 200 such as 6 wells, 24, 384, 1536, etc., formed in a regular or irregular pattern. In other embodiments, the multi-well plates 208 may be replaced by a single-well plate or any other apparatus suitable for conducting biological, chemical, and/or biochemical analysis and/or assays. Although wells 200 are depicted in FIGS. 2A-2C in a circular configuration (thus forming cylinders) other shapes are contemplated as well, including ovals, squares, and/or other regular or irregular polygons. Further, the shape and configuration of multi-well plate 108 can take multiple forms and are not necessarily limited to a rectangular array as illustrated in these figures.

In some embodiments, as discussed above, the working electrode zones 104 and/or the auxiliary electrodes 102 used in the multi-well plate 108 may be non-porous (hydrophobic). In some embodiments, the working electrode zones 104 and/or the auxiliary electrodes 102 may be porous electrodes (e.g., mats of carbon fibers or fibrils, sintered metals, and metals films deposited on filtration membranes, papers or other porous substrates). When configured as porous electrodes, the working electrode zones 104 and/or the auxiliary electrodes 102 can employ filtration of solutions through the electrode so as to: i) increase mass transport to the electrode surface (e.g., to increase the kinetics of binding of molecules in solution to molecules on the electrode surface); ii) capture particles on the electrode surface; and/or iii) remove liquid from the well.

In embodiments as discussed above, each of the auxiliary electrodes 102 in the wells 200 is formed of a chemical mixture that provides a defined potential during a reduction of the chemical mixture, such that a quantifiable amount of charge is generated throughout the reduction-oxidation reactions occurring in the well 200. The chemical mixture of an auxiliary electrode 102 includes an oxidizing agent that supports reduction-oxidation reaction, which can be used during biological, chemical, and/or biochemical assays and/ or analysis, such as, for example, ECL generation and analysis. In an embodiment, an amount of an oxidizing agent in a chemical mixture of an auxiliary electrode 102 is greater than or equal to an amount of oxidizing agent required for the amount of charge that will pass through the auxiliary electrode, and/or the amount of charge needed to drive the electrochemical reactions at the working electrodes in the at least one well 200 during one or more biological, chemical, and/or biochemical assays and/or analysis, such as ECL generation. In this regard, a sufficient amount of the chemical mixture in the auxiliary electrode 102 will still remain after a redox reaction occurs for an initial biological, chemical, and/or biochemical assays and/or analysis, thus allowing one or more additional redox reactions to occur throughout subsequent biological, chemical, and/or biochemical assays and/or analysis. In another embodiment, an amount of an oxidizing agent in a chemical mixture of an auxiliary electrode 102 is at least based in part on a ratio of an exposed surface area of each of the plurality of working electrode zones to an exposed surface area of the auxiliary electrode.

In embodiments, the one or more auxiliary electrodes 102 of the well 200 may be formed of a chemical mixture that includes a redox couple, as discussed above. In some embodiments, the one or more auxiliary electrodes 102 of the well 200 may be formed of a chemical mixture that includes a mixture of silver (Ag) and silver chloride (AgCl), or other suitable metal/metal halide couples. Other examples of chemical mixtures can include metal oxides with multiple metal oxidation states, e.g., manganese oxide, or other metal/metal oxide couples, e.g., silver/silver oxide, nickel/nickel oxide, zinc/zinc oxide, gold/gold oxide, copper/copper oxide, platinum/platinum oxide, etc.) In embodiments, the auxiliary electrodes 102 (and the working electrode zones 104) may be formed using any type of manufacturing process, e.g., printing, deposition, lithography, etching etc. In embodiments, the form of the chemical mixture of metal/metal halide may depend on the manufacturing process. For example, if the auxiliary electrodes are printed, the chemical mixture may be in the form of an ink or paste.

For certain applications, such as ECL generation, various embodiments of the auxiliary electrodes 102 could be adapted to prevent polarization of the electrode throughout ECL measurements by including a sufficiently high concentration of accessible redox species. The auxiliary electrodes 102 may be formed by printing the auxiliary electrodes 102 on the multi-well plate 208 using an Ag/AgCl chemical mixture (e.g., ink, paste, etc.) that has a defined ratio of Ag to AgCl. In an embodiment, an amount of oxidizing agent in a chemical mixture of an auxiliary electrode is at least based in part of a ratio of Ag to AgCl in the chemical mixture of the auxiliary electrode. In an embodiment, a chemical mixture of an auxiliary electrode having Ag and AgCl comprises approximately 50 percent or less AgCl, for example, 34 percent, 10 percent, etc.

In some embodiments, the one or more auxiliary electrodes 102 in a well 200 may include at least approximately $3.7 \times 10^{-9}$ moles of oxidizing agent per $mm^2$ of total working electrode area in the well 200. In some embodiments, the one or more auxiliary electrodes 102 in a well 200 may include at least approximately $5.7 \times 10^{-9}$ moles of oxidizing agent per $mm^2$ of total working electrode area in the well.

In various embodiments, the one or more auxiliary electrodes 102 and the working electrode zones 104 may be formed in different electrode designs (e.g., different sizes and/or shapes, different numbers of auxiliary electrodes 102 and working electrode zones 104, different positioning and patterns within the well, etc.) to improve electrochemical analysis (e.g., ECL analysis) performed by an assay device including one or more of the wells 200, examples of which are discussed below in reference to FIGS. 3A-3F, 4A-4F, 5A-5C, 6A-6F, 7A-7F, and 8A-8D. In embodiments in accordance herewith, for example, the one or more auxiliary electrodes 102 and the one or more working electrode zones 104 of a respective well 200 may be formed to have respective sizes such that a ratio of an aggregate of exposed surface area of the working electrode zones 104 to an exposed surface area of the auxiliary electrodes 102 is greater than 1, although other ratios are contemplated as well (e.g., ratios equal to or less than or greater than 1). In embodiments in accordance herewith, for example, each of the auxiliary electrodes 102 and/or the working electrode zones 104 may be formed in a circular shape having surface area that substantially defines a circle, although other shapes (e.g., rectangles, squares, ovals, clovers, or any other regular or irregular geometric shape). In embodiments in accordance herewith, for example, the auxiliary electrodes 102 and/or the working electrode zones 104 may be formed in a wedge shape having a wedged-shape surface area, where a first side or end of the wedged-shape surface area, adjacent to a sidewall of the well 200, is greater than a second side or end of the wedged-shape surface area, adjacent a center of the well 200. In other embodiments the second side or end of the wedged-shape surface area is greater than the first side or end of the wedged-shape surface. For example, the auxiliary electrodes 102 and the working electrode zones 104 may be formed in a pattern that maximizes space available for the auxiliary electrodes 102 and the working electrode zones 104.

In some embodiments, the one or more auxiliary electrodes 102 and/or the one or more working electrode zones 104 may be formed having a wedge shape, where two opposing boundaries that have different dimensions, and two side boundaries that connect the two opposing boundaries. For example, the two opposing boundaries may include a wide boundary and a narrow boundary, where the wide boundary has a length that is longer than the narrow boundary. In some embodiments, the wide boundary and/or the narrow boundary may be blunt, e.g., rounded corners at a connection to the side boundaries. In some embodiments, the wide boundary and/or the narrow boundary may be sharp, e.g., angular corner at a connection to the side boundaries. In embodiments, the wedge shape may be utilized to maximize the available area at the bottom surface 120 of the electrochemical cell. For example, if the working area 101 of the electrochemical cell is circular, one or more working electrode zones 104, with the wedge shape, can be arranged such that the wide boundary is adjacent to an outer perimeter of the working area 101 and the narrow boundary is adjacent to a center of the working area 101.

In embodiments in accordance herewith, auxiliary electrodes 102 and one or more working electrode zones 104 of a respective well 200 may be formed in the bottom of a well 200 according to different positioning configurations or patterns. The different positioning configuration or patterns may improve electrochemical analysis (e.g., ECL analysis) performed by an assay device including one or more of the wells 200, examples of which are discussed below in reference to FIGS. 3A-3F, 4A-4F, 5A-5C, 6A-6F, 7A-7F, and 8A-8D. The auxiliary electrodes 102 and the working electrode zones 104 may be positioned within the well according to a desired geometric pattern. For example, the auxiliary electrodes 102 and the working electrode zones 104 may be formed in a pattern that minimizes the number of working electrode zones 104 that are adjacent to one another for each of the working electrode zones 104 among the total number of working electrode zones 104. This may allow for more working electrode zones to be positioned adjacent to an auxiliary electrode 102. For instance, as illustrated in FIGS. 3A-3F and described in detail below, the working electrode zones 104 may be formed in a circular or semicircular shape that minimizes the number of working electrode zones 104 that are adjacent to one another.

Figure 5C:
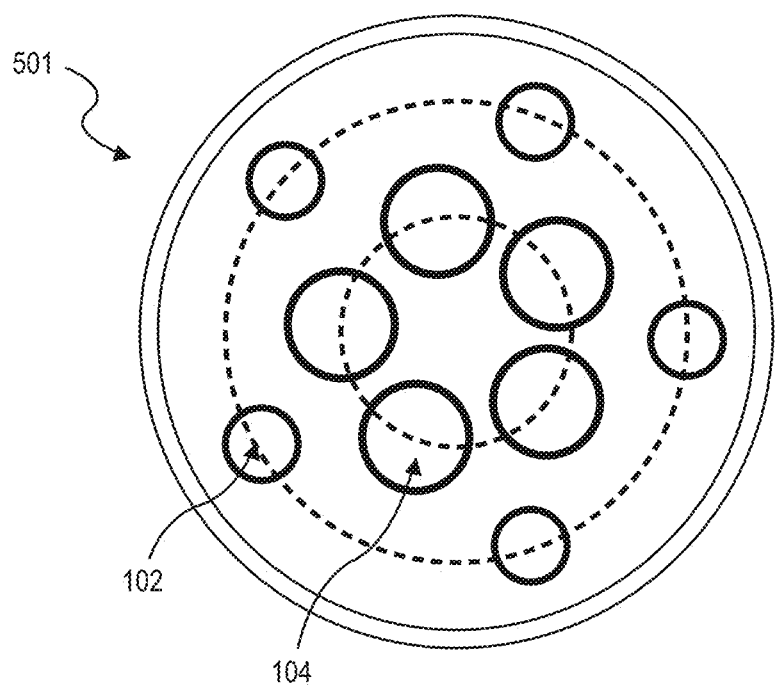

In another example, as illustrated in FIGS. 3A-3F, the auxiliary electrodes 102 and the working electrode zones 104 of a respective well 200 may be formed in a pattern where a number of the working electrode zones 104 that are adjacent to one another is no greater than two. For example, the working electrode zones 104 may be formed in a circular or semi-circular pattern adjacent to a parameter of a well (e.g., the sidewalls 212) such that at most two working electrode zones 104 are adjacent. In this example, the working electrode zones 104 form an incomplete circle such that two of the working electrode zones 104 have only one adjacent or neighboring working electrode zone 104. In another example, an auxiliary electrodes 102 and the working electrode zones 104 of a respective well 200 may be formed in a pattern where at least one of the working electrode zones 104 is adjacent to three or more other working electrode zones 104 among the total number of working electrode zones 104. For instance, as illustrated in FIGS. 5A-5C described in detail below, the auxiliary electrode 102 and the working electrode zones 104 may be formed in a star-shaped pattern where the number of adjacent the auxiliary electrodes 102 and/or the working electrode zones 104 is dependent on the number of points in the star-shaped pattern.

In an embodiment in accordance herewith, an auxiliary electrodes 102 and one or more working electrode zones 104 of a respective well 200 may be formed in a pattern where the pattern is configured to improve mass transport of a substance to each of the working electrode zones 104. For example, during orbital or rotational shaking or mixing, mass transport of substances to a zone at the center of the well 200 may be relatively slow compared to zone away from the center, and the pattern may be configured to improve mass transport by minimizing or eliminating the number of the working electrode zones 104 disposed at a center of a well 200. That is, during operations, the wells 200 may undergo orbital motion or "shaking" in order to mix or combine fluids contained within the wells 200. The orbital motion may cause a vortex to occur within the wells 200, e.g., leading to more liquid and faster liquid motion near the sidewalls 212 (perimeter) of the wells 200. For instance, as illustrated in FIGS. 2A-2F, 3A-3F, 5A-5F, 6A-6F, and 7A-7D describe in detail below, the working electrode zones 104 may be formed in a circular or semicircular shape and located near a perimeter of the well 200. Furthermore, due to the orbital shaking motion, any variations in substance concentration within the well may depend on a radial distance from the center of the well. In a concentric arrangement, the working electrode zones 104 are each approximately a same distance from a center of the well and may therefore have a similar substance concentration, even if the substance concentration is not uniform throughout the well.

In an embodiment in accordance herewith, auxiliary electrodes 102 and one or more working electrode zones 104 of respective wells 200 may be formed in a pattern where the pattern is configured to reduce meniscus effects caused by introducing liquid into one or more of the wells 200 of the multi-well plate 108. For example, as illustrated in FIG. 2C, the fluid 250 in the well 200 may form a curved upper surface or meniscus 152 within the well 200. The curved upper surface may be caused by several factors, such as surface tension, electrostatic effects, and fluid motion (e.g., due to orbital shaking), and the like. Due to the meniscus effects, photons (light) emitted during luminescence undergoes different optical effects (e.g., refraction, diffusion, scattering, etc.) based on the photons optical path through the liquid. That is, as light is emitted from the substances in the well 200, the different levels of the liquid may cause different optical effects (e.g., refraction, diffusion, scattering, etc.) in the emitted light that is dependent on where the light travels through and exits the liquid. The pattern may mitigate meniscus effects by disposing each of the working electrode zones 104 at an approximate equal distance from each sidewall 212 of the well 200. As such, photons emitted from the working electrode zones 104 travel a similar optical path through the liquid. In other words, the pattern ensures that all working electrode zones 104 are equally affected by meniscus effects, e.g., minimizes potential disparate effects of the meniscus. Thus, if the working electrode zones 104 are positioned at difference locations relative to the level of the liquid in the well 200, the emitted light may undergo differing optical distortions. For instance, as illustrated in FIGS. 3A-3F, 4A-4F, 6A-6F, 7A-7F, and 8A-8D describe in detail below, the working electrode zones 104 may be formed in a circular or semicircular shape and located near a perimeter of the well 200. As such, light emitted at the working electrode zones 104 may undergo the same optical distortion and be equally addressed.

In an embodiment in accordance herewith, an auxiliary electrode 102 and one or more working electrode zones 104 of respective wells 200 may be formed in a pattern configured to minimize the mass transport differences (e.g., provide more uniform mass transport) to working electrode zones during mixing of liquids (e.g., vortices formed in cylindrical wells using an orbital shaker) in one or more of the wells 200 of the multi-well plate 208. For example, the pattern may be configured to reduce vortex effects by minimizing or eliminating the number of working electrode zones 104 disposed at or near the center of a respective well 200. For instance, as illustrated in FIGS. 2A-2F, 3A-3F, 5A-5F, 6A-6F, 7A-7D, and 8A describe in detail below, the working electrode zones 104 may be formed in a circular or semicircular shape and located near a perimeter of the well 200.

In an embodiment in accordance herewith, an auxiliary electrode 102 and one or more working electrode zones 104 of a respective well 200 may be formed in a geometric pattern. For example, the geometric pattern may include a circular or semi-circular pattern of working electrode zones 104, wherein each of the working electrode zones 104 may be disposed at an approximately equal distance from a sidewall of the well 200, and an auxiliary electrodes 102 that may be disposed within a perimeter (either the entire perimeter or just a portion of it) defined by the circular or the semi-circular pattern of the working electrode zones 104, although other shapes and/or patterns are contemplated as well. For example, when well 200 is embodied as a square-shaped well, the working electrode zones 104 may be arranged in a square- or rectangular-shaped ring pattern around the entire or just a portion of the perimeter of the well 200.

In another embodiment, for example, a geometric pattern may include a pattern where the working electrode zones 104 define a star-shaped pattern, wherein an auxiliary electrode 102 may be disposed between two adjacent working electrode zones 104 that define two adjacent points of the star-shaped pattern. For example, the star-shaped pattern may be formed with the auxiliary electrodes 102 forming the "points" of the star-shaped pattern and the working electrode zones 104 forming the inner structure of the star-shaped pattern. For instance, in a five point star pattern, the auxiliary electrodes 102 may form the five "points" of the star-shaped pattern and the working electrode zones 104 may form the inner "pentagon" structure, as illustrated in FIG. 5A-5C described below in further detail. In some embodiment, the star pattern may also be defined as one or more concentric circles, where the one or more working electrodes 104 and/or the one or more auxiliary electrodes may be placed in a circular pattern around the one or more concentric circles, as illustrated in FIG. 5A-5C described below in further detail.

Figure 3A:
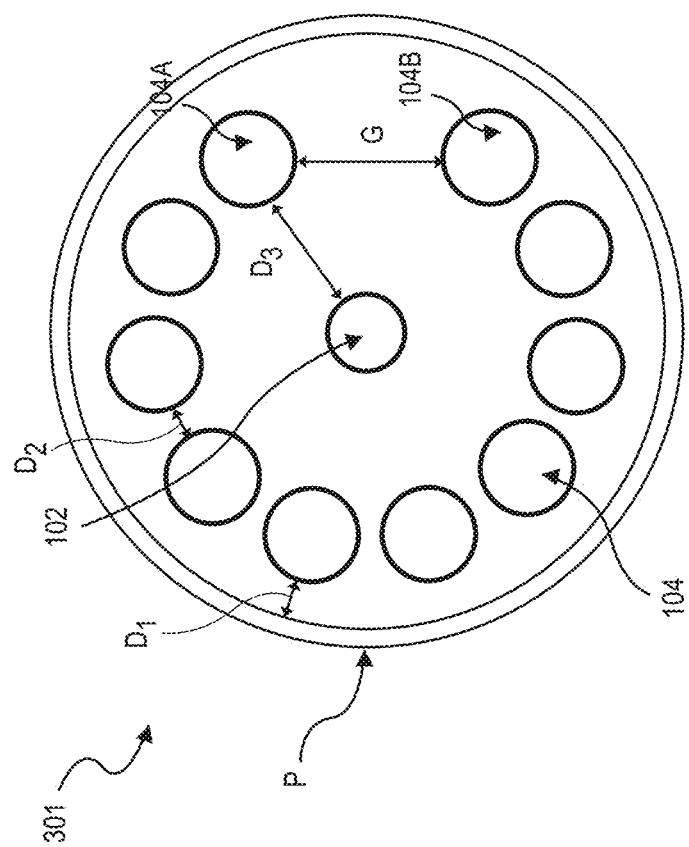
Figure 3B:
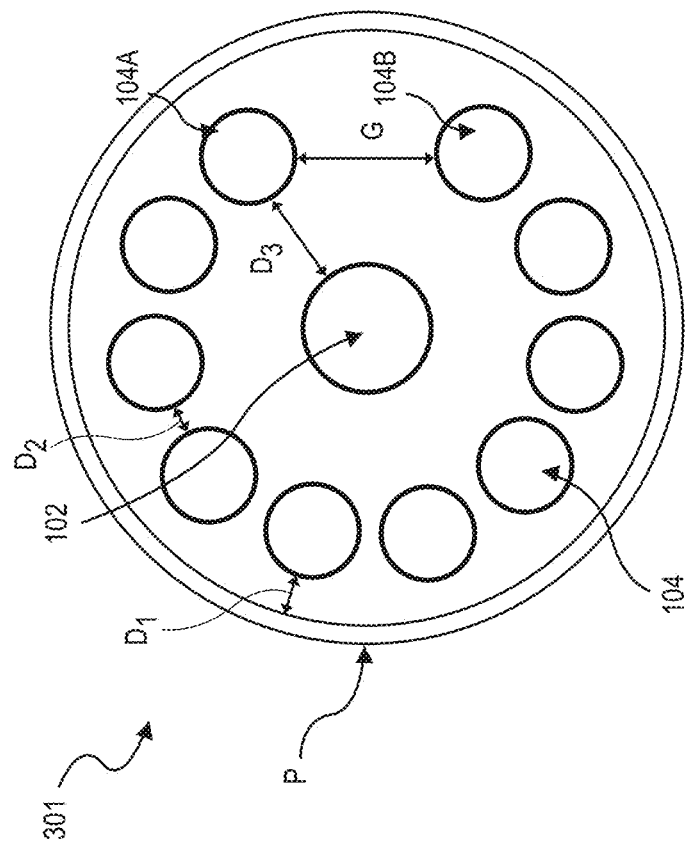

FIGS. 3A and 3B illustrate embodiments of an electrode design 301 of a well 200 that has circular-shaped working electrode zones 104 disposed in an open ring pattern. According to the exemplary, non-limiting embodiment illustrated in FIG. 3A, a bottom 207 of the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may include ten (10) working electrode zones 104. In other embodiments, fewer or more than ten working electrode zones 104 may be included in well 200 (e.g., 1, 2, 3, 4, etc.) In embodiments, the working electrode zones 104 may be formed to have an approximate circular shape. In other embodiments, the working electrode zones 104 may be formed to have other shapes (e.g., rectangles, squares, ovals, clovers, or any other regular or irregular geometric shape).

The working electrode zones 104 may be positioned with respect to each other in a semi-circular or substantially "C-shaped" pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter, P, of the well 200 and each of the working electrode zones 104 is equally spaced from another by a distance, "$D_2$," (also referred to as working electrode (WE-WE) pitch). In some embodiments, the distance, $D_2$, may be a minimum distance between a boundary of two adjacent working electrode zones 104. In some embodiments, two working electrode zones 104A, 104B may be spaced apart from each other a sufficient distance so as to form a gap "G." The gap "G" may provide a greater pitch distance between two working electrode zones than the remainder of the pitch distance between the remainder of the working electrode zones. In certain embodiments, the gap, G, may allow electrical traces or contacts to be electrically coupled to the auxiliary electrode 102 without electrically interfering with the working electrode zones 104, thereby maintaining electrical isolation of the auxiliary electrode 102 and the working electrode zones 104. For example, the gap, G, may be formed with a sufficient distance to allow an electrical trace to be formed between adjacent working electrode zones 104 while remaining electrically isolated. The size of the gap G, therefore, may be determined at least partially by a selection of manufacturing methods in building the electrochemical cell. Accordingly, in embodiments, the greater pitch distance of gap "G" may be at least 10%, at least 30%, at least 50%, or at least 100% larger than the pitch distance $D_2$ between a remainder of the working electrode zones 104.

In certain embodiments, distance $D_1$ may not be equal between one or more working electrode zones 104 and perimeter P of well 200. In further embodiments, distance, $D_2$, may not be equal between two or more of the working electrode zones 104. The auxiliary electrode 102 may be positioned in a center of the C-shaped pattern at an equal distance, "$D_3$," (also referred to as WE-AUXILIARY pitch) from each of the working electrode zones 104, although in other embodiments, distance $D_3$ may vary for one or more of the working electrode zones 104 as measured to the auxiliary electrode 102. In certain embodiments, as illustrated, the distance, $D_1$, the distance, $D_2$, the distance, $D_3$, and the distance, G, may be measured from a closest relative point on a perimeter of the respective feature (e.g., working electrode zone 104, auxiliary electrode 102, or perimeter P). In some embodiments, the distance, $D_3$, may be a minimum distance between a boundary of a working electrode zones 104 and a boundary of an auxiliary electrode. One skilled in the art will realize that the distances may be measured from any relative point on a feature in order to produce a repeatable pattern, for example, a geometric pattern.

Figure 3C:
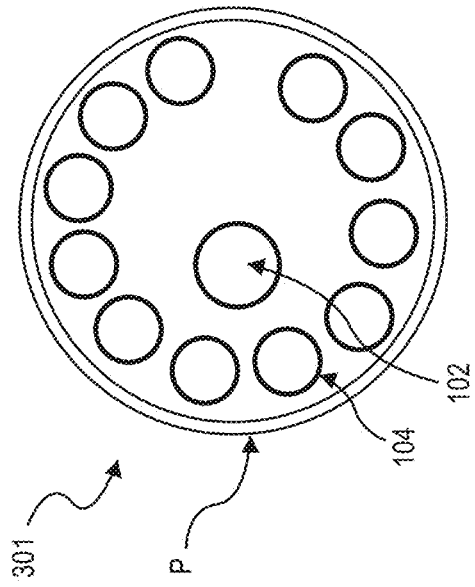
Figure 3D:
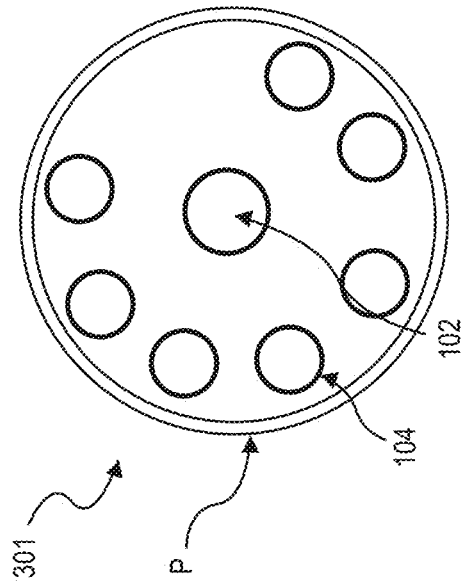
Figure 3E:
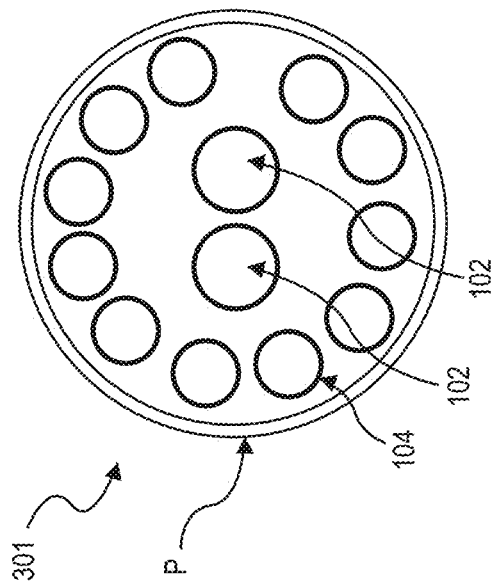
Figure 3F:
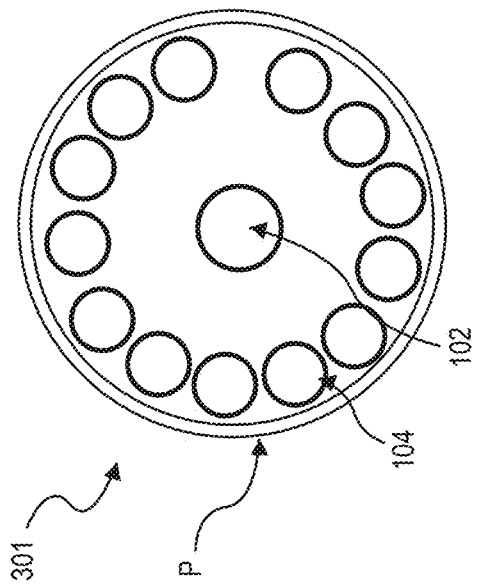

Although these figures depict a single auxiliary electrode 102, more than one may be included as well, as illustrated in FIG. 3C. Further, although auxiliary electrode 102 is depicted in these figures as being disposed at an approximate (or true) center of well 200, auxiliary electrode 102 may be disposed at other locations of the well 200 as well, as illustrated in FIG. 3D. Additionally, while these figures illustrate ten (10) working electrode zones 104, greater or fewer number of working electrode zones 104 may be included, as illustrated in FIGS. 3E and 3F.

The electrochemical cells illustrated in FIGS. 3A-3F may include electrodes of Ag, Ag/AgCl, carbon, carbon composites and/or other carbon-based materials, and/or of any other electrode material as discussed herein.

In embodiments, the size of the auxiliary electrode 102 and/or the working electrode zones 104 may be varied. For example, the size of each of the working electrode zones 104 may be equal, and the size of the auxiliary electrode 102 may be varied such as by varying a diameter thereof, as shown in Table 2A. One skilled in the art will realize that the dimensions included in Table 2A are approximate values and may vary by, for example, +/−5.0% based on conditions such as manufacturing tolerances.

TABLE 2A

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| 0.037 | 0.00106 | 0.0106 | 0.048 | 0.00181 | 5.85 | 0.0200 | 0.0120 |
| 0.037 | 0.00106 | 0.0106 | 0.044 | 0.00152 | 6.96 | 0.0200 | 0.0120 |
| 0.037 | 0.00106 | 0.0106 | 0.040 | 0.00126 | 8.42 | 0.0200 | 0.0120 |

TABLE 2A-continued

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| 0.037 | 0.00106 | 0.0106 | 0.036 | 0.00102 | 10.39 | 0.0200 | 0.0120 |
| 0.037 | 0.00106 | 0.0106 | 0.032 | 0.00080 | 13.16 | 0.0200 | 0.0120 |
| 0.037 | 0.00106 | 0.0106 | 0.028 | 0.00062 | 17.18 | 0.0200 | 0.0120 |
| 0.020 | 0.00031 | 0.0031 | 0.040 | 0.00126 | 2.50 | 0.0280 | 0.0290 |
| 0.020 | 0.00031 | 0.0031 | 0.060 | 0.00283 | 1.11 | 0.0280 | 0.0290 |
| 0.020 | 0.00031 | 0.0031 | 0.080 | 0.00503 | 0.62 | 0.0280 | 0.0290 |
| 0.020 | 0.00031 | 0.0031 | 0.100 | 0.00785 | 0.40 | 0.0280 | 0.0290 |
| 0.020 | 0.00031 | 0.0031 | 0.120 | 0.01131 | 0.28 | 0.0280 | 0.0290 |
| 0.020 | 0.00031 | 0.0031 | 0.140 | 0.01539 | 0.20 | 0.0280 | 0.0290 |
| 0.028 | 0.00062 | 0.0074 | 0.125 | 0.01227 | 0.60 | 0.0200 | 0.0150 |
| 0.028 | 0.00062 | 0.0074 | 0.100 | 0.00785 | 0.94 | 0.0200 | 0.0150 |
| 0.028 | 0.00062 | 0.0074 | 0.060 | 0.00283 | 2.61 | 0.0200 | 0.0150 |
| 0.028 | 0.00062 | 0.0074 | 0.040 | 0.00126 | 5.88 | 0.0200 | 0.0150 |
| 0.028 | 0.00062 | 0.0074 | 0.030 | 0.00071 | 10.46 | 0.0200 | 0.0150 |
| 0.028 | 0.00062 | 0.0074 | 0.025 | 0.00049 | 15.05 | 0.0200 | 0.0150 |

Table 2A above provides example values for well geometry. As discussed above, Ag/AgCl electrodes consistent with embodiments hereof may include approximately $3.07 \times 10^{-7}$ moles to $3.97 \times 10^{-7}$ moles of oxidizing agent contained therein. In addition to the geometry presented above, electrodes, both working and auxiliary, may be approximately 10 microns ($3.937 \times 10^{-4}$ inches) thick. Table 2B provides approximate values and ranges for moles of oxidizing agent in the auxiliary electrode per auxiliary electrode area and volume. Table 2C provides approximate values and ranges for moles of oxidizing agent in the auxiliary electrode per working electrode area and volume. The values and ranges presented in Tables 2B and 2C are provided using inches as units. A person of skill in the art will recognize that these values may be converted to mm.

TABLE 2B

Exemplary concentrations of oxidizing agent for auxiliary electrodes according to certain embodiments with ten (10) working electrode zones

| Aux Electrode Diameter (in) | Auxiliary Electrode Exposed Surface Area (in^2) | Moles/in^2 of Auxiliary Electrode, Range | | Moles/in^3 of Auxiliary Electrode, Range | |
|---|---|---|---|---|---|
| 0.048 | 0.00181 | 1.697E−04 | 2.194E−04 | 4.309 | 5.573 |
| 0.044 | 0.001521 | 2.019E−04 | 2.611E−04 | 5.128 | 6.632 |
| 0.04 | 0.001257 | 2.443E−04 | 3.159E−04 | 6.205 | 8.024 |
| 0.036 | 0.001018 | 3.016E−04 | 3.900E−04 | 7.661 | 9.907 |
| 0.032 | 0.000804 | 3.817E−04 | 4.936E−04 | 9.696 | 12.538 |
| 0.028 | 0.000616 | 4.986E−04 | 6.447E−04 | 12.664 | 16.376 |
| 0.06 | 0.002827 | 1.086E−04 | 1.404E−04 | 2.758 | 3.566 |
| 0.08 | 0.005027 | 6.108E−05 | 7.898E−05 | 1.551 | 2.006 |
| 0.1 | 0.007854 | 3.909E−05 | 5.055E−05 | 0.993 | 1.284 |
| 0.12 | 0.01131 | 2.714E−05 | 3.510E−05 | 0.689 | 0.892 |
| 0.14 | 0.015394 | 1.994E−05 | 2.579E−05 | 0.507 | 0.655 |
| 0.125 | 0.012272 | 2.502E−05 | 3.235E−05 | 0.635 | 0.822 |
| 0.03 | 0.000707 | 4.343E−04 | 5.616E−04 | 11.032 | 14.266 |
| 0.025 | 0.000491 | 6.254E−04 | 8.088E−04 | 15.886 | 20.543 |

TABLE 2C

Exemplary concentrations of oxidizing agent for working electrodes according to certain embodiments with ten (10) working electrode zones

| WE Zone Diameter (in) | Total WE Spot Area (10 spots-in^2) | Moles/in^2 of aggregate working electrode area, range | | Moles/in^3 of aggregate working electrode volume, range | |
|---|---|---|---|---|---|
| 0.037 | 0.0106 | 2.896E−05 | 3.745E−05 | 0.736 | 0.951 |
| 0.020 | 0.0031 | 9.903E−05 | 1.281E−04 | 2.515 | 3.253 |
| 0.028 | 0.0074 | 4.149E−05 | 5.365E−05 | 1.054 | 1.363 |

Figure 4B:
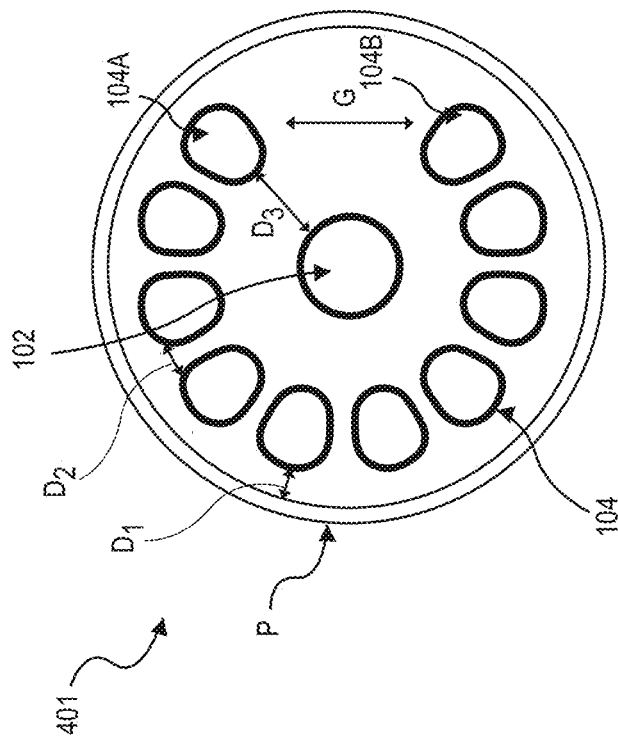
Figure 4A:
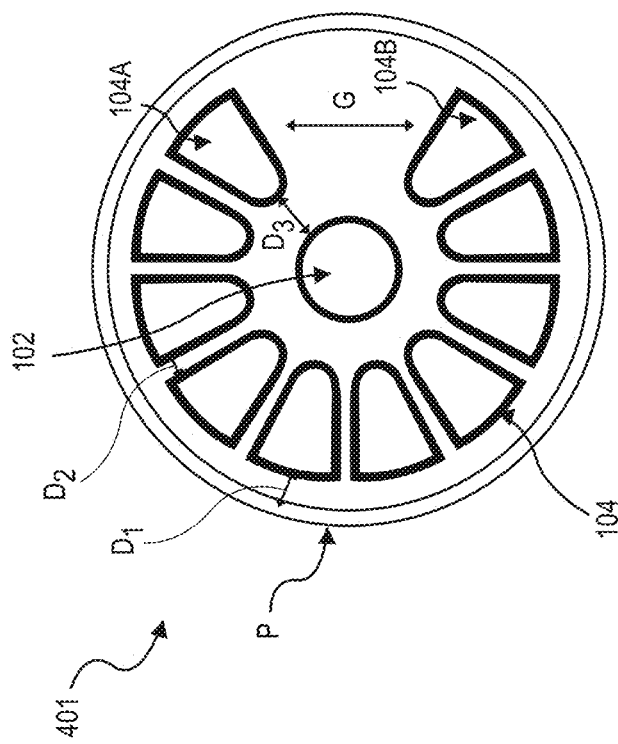

FIGS. 4A and 4B illustrate non-limiting, exemplary embodiments of an electrode design 401 of a well 200 that has noncircular-shaped working electrode zones 104 disposed in the well in an open ring pattern, as similarly described above with reference to FIGS. 3A and 3B. The noncircular-shaped working electrode zones 104 illustrated in FIGS. 4A and 4B (and FIGS. 4C-4F) may be wedge shaped or trilobe shaped. In embodiments, the noncircular-shaped working electrode zones 104 may allow for improved usage of the area within the well 200. The use of the noncircular-shaped working electrode zones 104 may allow larger working electrode zones 104 to be formed within the well 200 and/or more working electrode zones 104 to be formed within the well 200. By forming these non-circular shapes, the working electrode zones 104 may be packed in more tightly within a well 200. As such, the ratios of the working electrode zones 104 to the auxiliary electrode 102 may be maximized. Additionally, because the working electrode zones 104 may be formed larger, the working electrode zones 104 may be more reliably manufactured, e.g., more reliably printed.

As illustrated in FIG. 4A, the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may include ten (10) working electrode zones 104. In other embodiments, fewer or more than ten working electrode zones 104 may be included in well 200 (e.g., 1, 2, 3, 4, etc.) Each of the working electrode zones 104 may be formed to have a non-circular shape, for example, a wedge shape or a triangular shape with one or more rounded or radiused corners, although in other embodiments, the corners are not rounded, thus forming polygon shapes, such as triangles.

The working electrode zones 104 may be positioned with respect to each other in a semi-circular or substantially "C-shaped" pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter P of the well 200 and each of the working electrode zones 104 is equally spaced from another by a distance, "$D_2$." In some embodiments, the distance, $D_2$, may be a minimum distance between a boundary of two adjacent working electrode zones 104. In some embodiments, two working electrode zones 104A, 104B may be spaced apart from each other a sufficient distance so as to form a gap "G." In certain embodiments, distance $D_1$ may not be equal between one or more working electrode zones 104 and perimeter P of well 200. In further embodiments, distance, $D_2$, may not be equal between two or more of the working electrode zones 104. The auxiliary electrode 102 may be positioned in a center of the C-shaped pattern at an equal distance, "$D_3$," from each of the working electrode zones 104, although in other embodiments, distance $D_3$ may vary for one or more of the working electrode zones 104 as measured to the auxiliary electrode 102. In certain embodiments, as illustrated, the distance, $D_1$, the distance, $D_2$, the distance, $D_3$, and the distance, G, may be measured from a closest point on a perimeter of the respective feature (e.g., working electrode zone 104, auxiliary electrode 102, or perimeter P). In some embodiments, the distance, $D_3$, may be a minimum distance between a boundary of a working electrode zones 104 and a boundary of an auxiliary electrode One skilled in the art will realize that the distances may be measured from any relative point on a feature in order to produce a repeatable pattern, for example, a geometric pattern.

Figure 4C:
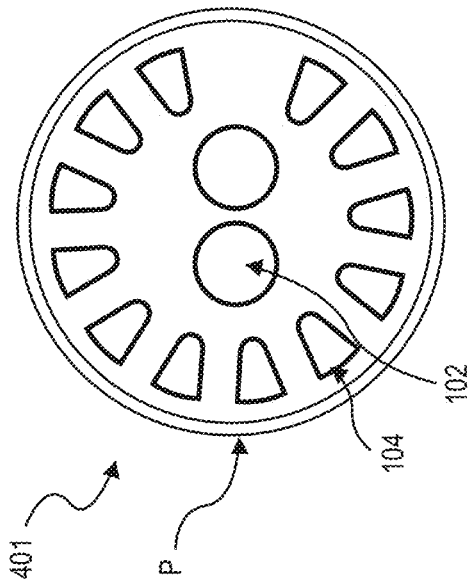
Figure 4D:
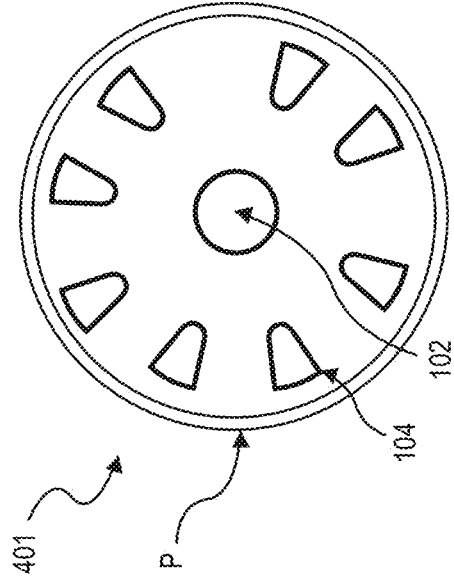
Figure 4E:
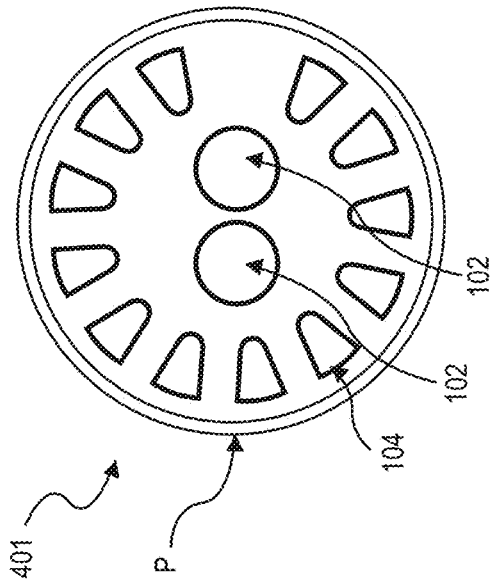
Figure 4F:
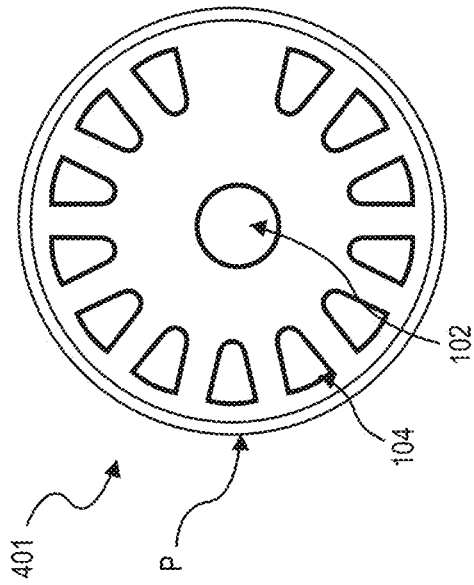

Although these figures depict a single auxiliary electrode 102, more than one may be included as well, as illustrated in FIGS. 4C and 4D. Further, although auxiliary electrode 102 is depicted in these figures as being disposed at an approximate (or true) center of well 200, auxiliary electrode 102 may be disposed at other locations of the well 200 as well, as illustrated in FIG. 4D. Additionally, while these figures illustrate ten (10) working electrode zones 104, greater or fewer number of working electrode zones 104 may be included, as illustrated in FIGS. 4E and 4F.

In certain embodiments, the size of the auxiliary electrode 102 and/or the working electrode zones 104 may be equal. In other embodiments, the size of the auxiliary electrode 102 and/or the working electrode zones 104 may be varied. In one example, the size of the auxiliary electrode 102 may be constant, and the size of the working electrode zones 104 may be varied such as by varying the radius of the auxiliary electrode 102. Table 3A includes examples of dimensions for the working electrode zones 104 and the auxiliary electrodes 102 for the embodiments including wedge shaped or trilobe shaped working electrode zones 104 illustrated in FIGS. 4A-4F. One skilled in the art will realize that the dimensions included in Table 3 are approximate values and may vary by, for example, +/−5.0% based on conditions such as manufacturing tolerances.

The electrochemical cells illustrated in FIGS. 4A-4F may include electrodes of Ag, Ag/AgCl, carbon, carbon composites and/or other carbon-based materials, and/or of any other electrode material as discussed herein.

TABLE 3A

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| — | 0.00158 | 0.0158 | 0.048 | 0.00181 | 8.73 | 0.0200 | 0.0120 |
| — | 0.00156 | 0.0156 | 0.048 | 0.00181 | 8.63 | 0.0200 | 0.0120 |
| — | 0.00154 | 0.0154 | 0.048 | 0.00181 | 8.49 | 0.0200 | 0.0120 |
| — | 0.00139 | 0.0139 | 0.048 | 0.00181 | 7.68 | 0.0200 | 0.0120 |

TABLE 3A-continued

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots- sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| — | 0.00114 | 0.0114 | 0.048 | 0.00181 | 6.29 | 0.0200 | 0.0120 |
| — | 0.00114 | 0.0114 | 0.100 | 0.00785 | 1.45 | 0.0200 | 0.0120 |
| — | 0.00114 | 0.0114 | 0.080 | 0.00503 | 2.27 | 0.0200 | 0.0120 |
| — | 0.00114 | 0.0114 | 0.060 | 0.00283 | 4.03 | 0.0200 | 0.0120 |
| — | 0.00114 | 0.0114 | 0.050 | 0.00196 | 5.80 | 0.0200 | 0.0120 |
| — | 0.00114 | 0.0114 | 0.040 | 0.00126 | 9.06 | 0.0200 | 0.0120 |
| — | 0.00114 | 0.0114 | 0.035 | 0.00096 | 11.84 | 0.0200 | 0.0120 |
| — | 0.00114 | 0.0114 | 0.030 | 0.00071 | 16.11 | 0.0200 | 0.0120 |

Table 3A above provides example values for trilobe electrode well geometry. As discussed above, Ag/AgCl electrodes consistent with embodiments hereof may include approximately $3.07 \times 10^{-7}$ moles to $3.97 \times 10^{-7}$ moles of oxidizing agent contained therein. In addition to the geometry presented above, electrodes, both working and auxiliary, may be approximately 10 microns ($3.937 \times 10^{-4}$ inches) thick. Table 3B provides approximate values and ranges for moles of oxidizing agent in the auxiliary electrode per auxiliary electrode area and volume. Table 3C provides approximate values and ranges for moles of oxidizing agent in the auxiliary electrode per working electrode area and volume. The values and ranges presented in Tables 3B and 3C are provided using inches as units. A person of skill in the art will recognize that these values may be converted to mm.

TABLE 3B

Exemplary concentrations of oxidizing agent for auxiliary electrodes according to certain embodiments with ten (10) working electrode zones

| Aux Electrode Diameter (in) | Auxiliary Electrode Exposed Surface Area (in^2) | Moles/in^2 of Auxiliary Electrode, Range | | Moles/in^3 of Auxiliary Electrode, Range | |
|---|---|---|---|---|---|
| 0.048 | 0.00181 | 1.697E−04 | 2.194E−04 | 4.309 | 5.573 |
| 0.1 | 0.007854 | 3.909E−05 | 5.055E−05 | 0.993 | 1.284 |
| 0.08 | 0.005027 | 6.108E−05 | 7.898E−05 | 1.551 | 2.006 |
| 0.06 | 0.002827 | 1.086E−04 | 1.404E−04 | 2.758 | 3.566 |
| 0.05 | 0.001963 | 1.564E−04 | 2.022E−04 | 3.971 | 5.136 |
| 0.04 | 0.001257 | 2.443E−04 | 3.159E−04 | 6.205 | 8.024 |
| 0.035 | 0.000962 | 3.191E−04 | 4.126E−04 | 8.105 | 10.481 |
| 0.03 | 0.000707 | 4.343E−04 | 5.616E−04 | 11.032 | 14.266 |

TABLE 3C

Exemplary concentrations of oxidizing agent for working electrodes according to certain embodiments with ten (10) working electrode zones

| WE Zone Diameter (in) | Total WE Spot Area (10 spots- in^2) | Moles/in^2 of aggregate working electrode area, range | | Moles/in^3 of aggregate working electrode volume, range | |
|---|---|---|---|---|---|
| 0.0158 | 1.943E−05 | 2.513E−05 | 0.494 | 0.638 | |
| 0.0156 | 1.968E−05 | 2.545E−05 | 0.500 | 0.646 | |
| 0.0154 | 1.994E−05 | 2.578E−05 | 0.506 | 0.655 | |

TABLE 3C-continued

Exemplary concentrations of oxidizing agent for working electrodes according to certain embodiments with ten (10) working electrode zones

| WE Zone Diameter (in) | Total WE Spot Area (10 spots- in^2) | Moles/in^2 of aggregate working electrode area, range | | Moles/in^3 of aggregate working electrode volume, range | |
|---|---|---|---|---|---|
| 0.0139 | 2.209E−05 | 2.856E−05 | 0.561 | 0.725 | |
| 0.0114 | 2.693E−05 | 3.482E−05 | 0.684 | 0.885 | |

FIGS. 5A and 5B illustrate non-limiting, exemplary embodiments of an electrode design 401 of a well 200 that has working electrode zones 104 disposed in a star-shaped pattern (also referred to herein as a penta pattern) with the working electrode zones 104 being circular-shaped. As illustrated in FIG. 5A, the well 200 may include five (5) auxiliary electrodes 102, and each of the auxiliary electrodes 102 may be formed in an approximate circular shape (although other numbers of auxiliary electrodes, different shapes, etc. are contemplated as well). In this example, the well 200 may also include ten (10) working electrode zones 104, and each of the working electrode zones 104 may be formed in an approximate circular shape. The star-shaped pattern may be created by a plurality of working electrode zones 104 being positioned in one of an inner circle and an outer circle relative to each other, wherein each working electrode zone 110 positioned in the outer circle is disposed at an angular midpoint relative to two adjacent working electrode zones 104 positioned in the inner circle. Each of the working electrode zones 104 in the inner circle may be spaced a distance, "$R_1$," from the center of the well 200. Each of the working electrode zones 104 in the outer circle may be spaced a distance, "$R_2$," from the center of the well 200. In the star-shaped pattern, each auxiliary electrode 102 may be positioned at an equal distance, "$D_4$," relative to two of the working electrode zones 104 positioned in the outer circle.

In certain embodiments, as illustrated, the distance, $R_1$, the distance, $R_2$, and the distance, $D_4$, may be measured from a closest point on a perimeter of the respective feature (e.g., working electrode zone 104, auxiliary electrode 102, or perimeter P). One skilled in the art will realize that the distances may be measured from any relative point on a feature in order to produce a repeatable geometric pattern.

While these figures illustrate ten (10) working electrode zones 104, greater or fewer number of working electrodes zones 104 may be included, as illustrated in FIG. 5C. Additionally, while FIGS. 5A-5C illustrate circular shaped working electrode zones 104, the working electrode zones 104 may be formed to have other shapes (e.g., rectangles, squares, ovals, clovers, or any other regular or irregular geometric shape). Other embodiments can include hybrid designs of electrode configurations, such as, for example, a star shape pattern that includes wedge-shaped working electrode zones and/or auxiliary electrodes, etc.

The electrochemical cells illustrated in FIGS. 5A-5F may include electrodes of Ag, Ag/AgCl, carbon, carbon composites and/or other carbon-based materials, and/or of any other electrode material as discussed herein.

In certain embodiments, the size of the auxiliary electrode 102 and/or the working electrode zones 104 may be equal. In other embodiments, a size of the auxiliary electrode 102 and/or the working electrode zones 104 may be varied. In one example, the size of the working electrode zones 104 may be constant, and the size of the auxiliary electrode 102 may be varied such as varying the diameter, as shown in Table 4A. One skilled in the art will realize that the dimensions included in Table 4A are approximate values and may vary by, for example, +/−5.0% based on conditions such as manufacturing tolerances.

TABLE 4A

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| 0.0420 | 0.00139 | 0.01385 | 0.030 | 0.000707 | 1.960 | 0.0200 | 0.0125 |
| 0.0420 | 0.00139 | 0.01385 | 0.027 | 0.000573 | 2.420 | 0.0200 | 0.0125 |
| 0.0420 | 0.00139 | 0.01385 | 0.024 | 0.000452 | 3.063 | 0.0200 | 0.0125 |
| 0.0420 | 0.00139 | 0.01385 | 0.021 | 0.000346 | 4.000 | 0.0200 | 0.0125 |
| 0.0420 | 0.00139 | 0.01385 | 0.018 | 0.000254 | 5.444 | 0.0200 | 0.0125 |
| 0.0420 | 0.00139 | 0.01385 | 0.015 | 0.000177 | 7.840 | 0.0200 | 0.0125 |

Table 4A above provides example values for a 10 spot penta electrode well geometry. As discussed above, Ag/AgCl electrodes consistent with embodiments hereof may include approximately $3.07 \times 10^{-7}$ moles to $3.97 \times 10^{-7}$ moles of oxidizing agent contained therein. In addition to the geometry presented above, electrodes, both working and auxiliary, may be approximately 10 microns ($3.937 \times 10^{-4}$ inches) thick. Table 4B provides approximate values and ranges for moles of oxidizing agent in the auxiliary electrode per auxiliary electrode area and volume. Table 4C provides approximate values and ranges for moles of oxidizing agent in the auxiliary electrode per working electrode area and volume. The values and ranges presented in Tables 4B and 4C are provided using inches as units. A person of skill in the art will recognize that these values may be converted to mm.

TABLE 4B

Exemplary concentrations of oxidizing agent for auxiliary electrodes according to certain embodiments with ten (10) working electrode zones

| Aux Electrode Diameter (in) | Auxiliary Electrode Exposed Surface Area (in^2) | Moles/in^2 of Auxiliary Electrode, Range | | Moles/in^3 of Auxiliary Electrode, Range | |
|---|---|---|---|---|---|
| 0.03 | 0.000707 | 4.343E−04 | 5.616E−04 | 11.032 | 14.266 |
| 0.027 | 0.000573 | 5.362E−04 | 6.934E−04 | 13.619 | 17.612 |
| 0.024 | 0.000452 | 6.786E−04 | 8.776E−04 | 17.237 | 22.290 |
| 0.021 | 0.000346 | 8.864E−04 | 1.146E−03 | 22.514 | 29.114 |
| 0.018 | 0.000254 | 1.206E−03 | 1.560E−03 | 30.643 | 39.627 |
| 0.015 | 0.000177 | 1.737E−03 | 2.247E−03 | 44.127 | 57.063 |

TABLE 4C

Exemplary concentrations of oxidizing agent for working electrodes according to certain embodiments with ten (10) working electrode zones

| WE Zone Diameter (in) | Total WE Spot Area (10 spots-in^2) | Moles/in^2 of aggregate working electrode area, range | | Moles/in^3 of aggregate working electrode volume, range | |
|---|---|---|---|---|---|
| 0.042 | 0.01385 | 2.217E−05 | 2.866E−05 | 0.563 | 0.728 |

Figure 6B:
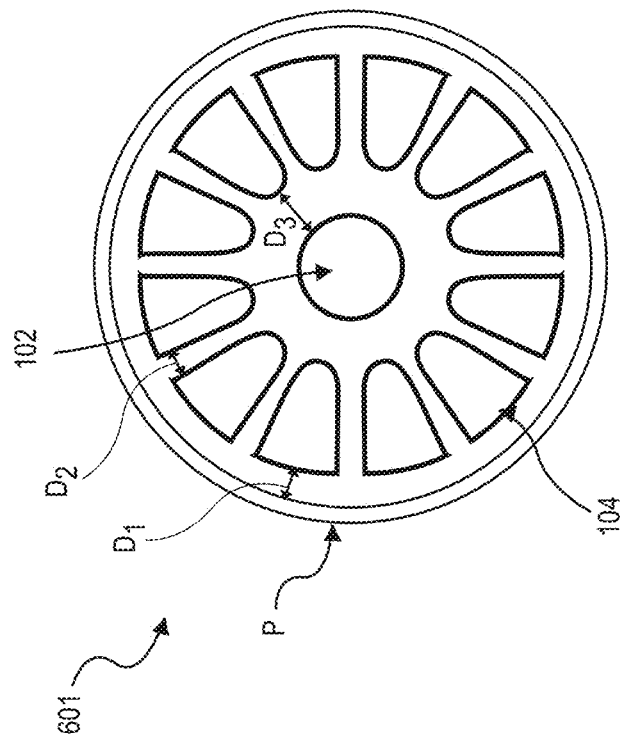
Figure 6A:
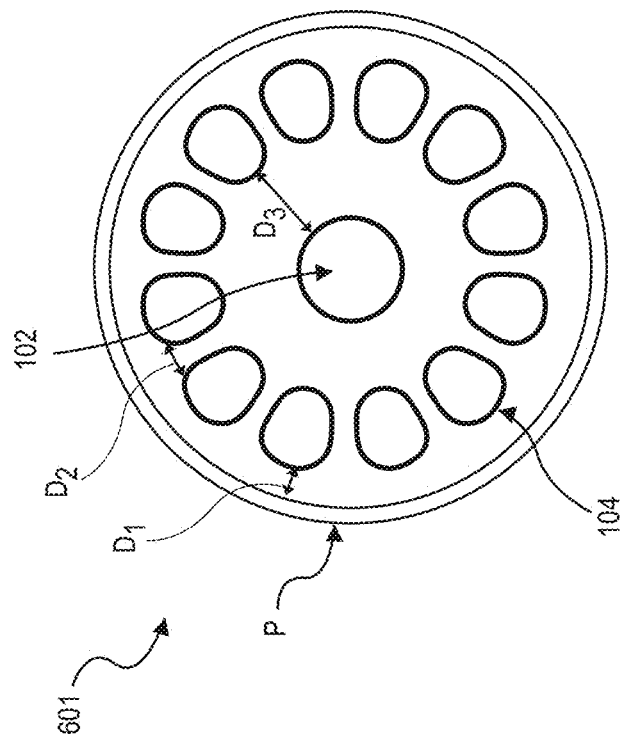

FIGS. 6A and 6B illustrate exemplary, non-limiting embodiments of an electrode design 601 of a well 200 that has noncircular-shaped (e.g., trilobe or wedge shaped) working electrode zones 104 disposed in a closed ring pattern. As illustrated in FIG. 6A, the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

Figure 6C:
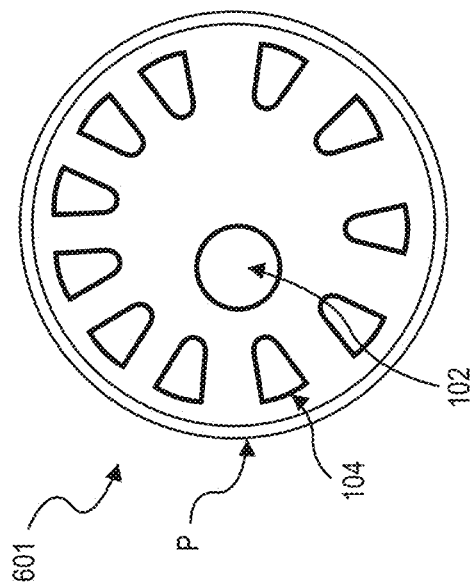
Figure 6D:
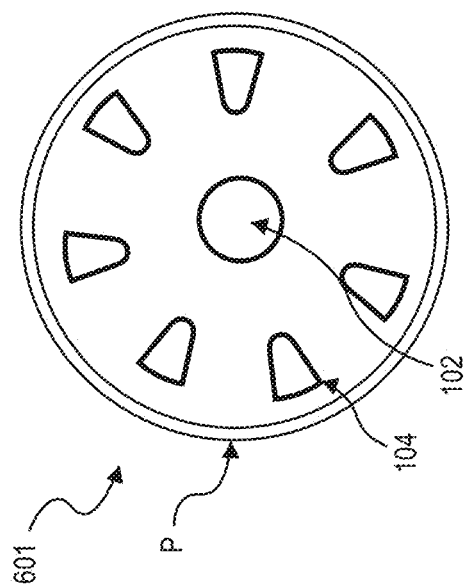
Figure 6E:
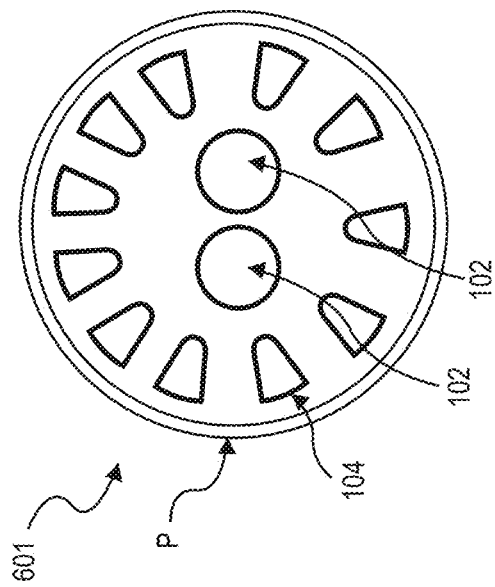
Figure 6F:
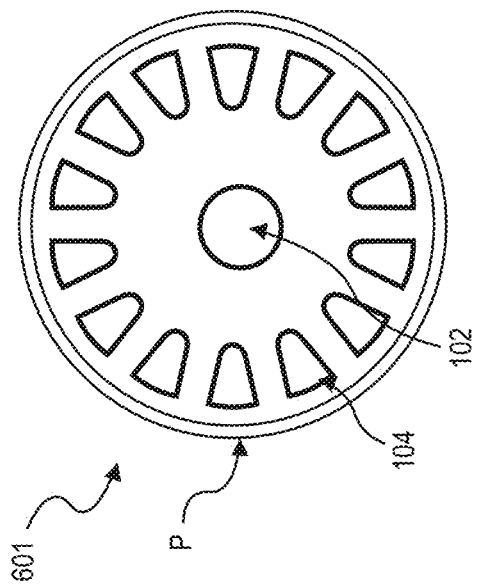

In embodiments, the well 200 may also include ten (10) working electrode zones 104, or more, or fewer. For example, FIGS. 6A and 6B illustrate embodiments having 12 working electrode zones 104, FIGS. 6C and 6D illustrate embodiments having 11 working electrode zones 104, FIG. 6E illustrates an embodiment having 14 working electrode zones 104, and FIG. 6F illustrates an embodiment having 7 working electrode zones 104 The working electrode zones 104 may be formed to have a noncircular shape, for example, a wedge shape or a triangular shape with one or more rounded or radiused corners also referred to as a trilobe shape. In the closed ring pattern, the working electrode zones 104 may be positioned in a circular shape around the perimeter of the well 200 such that each is at pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter P of the well 200 and each of the working electrode zones 104 may be equally spaced from another by a distance, "$D_2$." In some embodiments, the distance, $D_2$, may be a minimum distance between a boundary of two adjacent working electrode zones 104. In certain embodiments, distance $D_1$ may not be equal between one or more working electrode zones 104 and perimeter P of well 200. The auxiliary electrode 102 may be positioned in a center of the C-shaped pattern at an equal distance, "$D_3$," from each of the working electrode zones 104, although in other embodiments, distance $D_3$ may vary for one or more of the working electrode zones 104 as measured to the auxiliary electrode 102. In some embodiments, the distance, $D_3$, may be a minimum distance between a boundary of a working electrode zones 104 and a boundary of an auxiliary electrode. In certain embodiments, as illustrated, the distance, $D_1$, the distance, $D_2$, and the distance, $D_3$, may be measured from a closest point on a perimeter of the respective feature (e.g., working electrode zone 104, auxiliary electrode 102, or perimeter P). One skilled in the art will realize that the distances may be measured from any relative point on a feature in order to produce a repeatable pattern, for example, a geometric pattern.

Although these figures depict a single auxiliary electrode 102, more than one may be included as well, as illustrated in FIG. 6C. Further, although auxiliary electrode 102 is depicted in these figures as being disposed at an approximate (or true) center of well 200, auxiliary electrode 102 may be disposed at other locations of the well 200 as well, as illustrated in FIG. 6D. Additionally, while these figures illustrate ten (10) working electrode zones 104, greater or fewer number of working electrodes zones 104 may be included, as illustrated in FIGS. 6E and 6F.

The electrochemical cells illustrated in FIGS. 6A-6F may include electrodes of Ag, Ag/AgCl, carbon, carbon composites and/or other carbon-based materials, and/or of any other electrode material as discussed herein.

In certain embodiments, the size of the auxiliary electrode 102 and/or the working electrode zones 104 may be equal. In other embodiments, the size of the auxiliary electrode 102 and/or the working electrode zones 104 may be varied. In one example, the size of the auxiliary electrode 102 may be constant, and the size of the working electrode zones 104 may be varied such as varying the radius of the auxiliary electrode 102. Table 5A includes examples of dimensions for the working electrode zones 104 and the auxiliary electrodes 102 for the embodiments illustrated in FIGS. 6A-6F. One skilled in the art will realize that the dimensions included in Table 5A are approximate values and may vary by, for example, +/−5.0% based on conditions such as manufacturing tolerances.

TABLE 5A

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/Auxiliary Electrode Area Ratio | Spot Edge to Plate Wall (in) | $D_2$ (in) |
|---|---|---|---|---|---|---|---|
| — | 0.00219 | 0.0219 | 0.048 | 0.00181 | 12.08 | 0.0200 | 0.0120 |
| — | 0.00218 | 0.0218 | 0.048 | 0.00181 | 12.06 | 0.0200 | 0.0120 |
| — | 0.00217 | 0.0217 | 0.048 | 0.00181 | 11.98 | 0.0200 | 0.0120 |

TABLE 5A-continued

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/Auxiliary Electrode Area Ratio | Spot Edge to Plate Wall (in) | $D_2$ (in) |
|---|---|---|---|---|---|---|---|
| — | 0.00214 | 0.0214 | 0.048 | 0.00181 | 11.83 | 0.0200 | 0.0120 |
| — | 0.00202 | 0.0202 | 0.048 | 0.00181 | 11.17 | 0.0200 | 0.0120 |
| — | 0.00182 | 0.0182 | 0.048 | 0.00181 | 10.04 | 0.0200 | 0.0120 |
| — | 0.00182 | 0.0182 | 0.082 | 0.00528 | 3.44 | 0.0200 | 0.0120 |
| — | 0.00182 | 0.0182 | 0.075 | 0.00442 | 4.11 | 0.0200 | 0.0120 |
| — | 0.00182 | 0.0182 | 0.068 | 0.00363 | 5.00 | 0.0200 | 0.0120 |
| — | 0.00182 | 0.0182 | 0.055 | 0.00238 | 7.65 | 0.0200 | 0.0120 |
| — | 0.00182 | 0.0182 | 0.040 | 0.00126 | 14.46 | 0.0200 | 0.0120 |
| — | 0.00182 | 0.0182 | 0.030 | 0.00071 | 25.70 | 0.0200 | 0.0120 |

Table 5A above provides example values for a closed trilobe electrode well geometry. As discussed above, Ag/AgCl electrodes consistent with embodiments hereof may include approximately $3.07 \times 10^{-7}$ moles to $3.97 \times 10^{-7}$ moles of oxidizing agent contained therein. In addition to the geometry presented above, electrodes, both working and auxiliary, may be approximately 10 microns ($3.937 \times 10^{-4}$ inches) thick. Table 5B provides approximate values and ranges for moles of oxidizing agent in the auxiliary electrode per auxiliary electrode area and volume. Table 5C provides approximate values and ranges for moles of oxidizing agent in the auxiliary electrode per working electrode area and volume. The values and ranges presented in Tables 5B and 5C are provided using inches as units. A person of skill in the art will recognize that these values may be converted to mm.

TABLE 5B

Exemplary concentrations of oxidizing agent for auxiliary electrodes according to certain embodiments with ten (10) working electrode zones

| Aux Electrode Diameter (in) | Auxiliary Electrode Exposed Surface Area (in^2) | Moles/in^2 of Auxiliary Electrode, Range | | Moles/in^3 of Auxiliary Electrode, Range | |
|---|---|---|---|---|---|
| 0.048 | 0.00181 | 1.697E−04 | 2.194E−04 | 4.309 | 5.573 |
| 0.082 | 0.005281 | 5.813E−05 | 7.517E−05 | 1.477 | 1.909 |
| 0.075 | 0.004418 | 6.949E−05 | 8.986E−05 | 1.765 | 2.283 |
| 0.068 | 0.003632 | 8.453E−05 | 1.093E−04 | 2.147 | 2.777 |
| 0.055 | 0.002376 | 1.292E−04 | 1.671E−04 | 3.282 | 4.244 |
| 0.04 | 0.001257 | 2.443E−04 | 3.159E−04 | 6.205 | 8.024 |
| 0.03 | 0.000707 | 4.343E−04 | 5.616E−04 | 11.032 | 14.266 |

TABLE 5C

Exemplary concentrations of oxidizing agent for working electrodes according to certain embodiments with ten (10) working electrode zones

| WE Zone Diameter (in) | Total WE Spot Area (10 spots-in^2) | Moles/in^2 of aggregate working electrode area, range | | Moles/in^3 of aggregate working electrode volume, range | |
|---|---|---|---|---|---|
| | 0.0219 | 1.402E−05 | 1.813E−05 | 0.356 | 0.460 |
| | 0.0218 | 1.408E−05 | 1.821E−05 | 0.358 | 0.463 |
| | 0.0217 | 1.415E−05 | 1.829E−05 | 0.359 | 0.465 |
| | 0.0214 | 1.435E−05 | 1.855E−05 | 0.364 | 0.471 |
| | 0.0202 | 1.520E−05 | 1.965E−05 | 0.386 | 0.499 |
| | 0.0182 | 1.687E−05 | 2.181E−05 | 0.428 | 0.554 |

In embodiments, it may be beneficial to eliminate sharp corners in the trilobe electrode design. For example, FIG. 6A illustrates a trilobe design having sharp corners while FIG. 6B illustrates a trilobe design having rounded corners. The rounded corners may reduce the area of the working electrode zones 104, e.g., by 1-5%, but may provide further benefits. For example, the sharp corners may prevent uniform distribution of solution. Sharp corners may also provide small features that are more difficult to obtain accurate imagery of. Accordingly, a reduction of sharp corners, although resulting in smaller working electrode zones 104, may be beneficial.

Figure 7B:
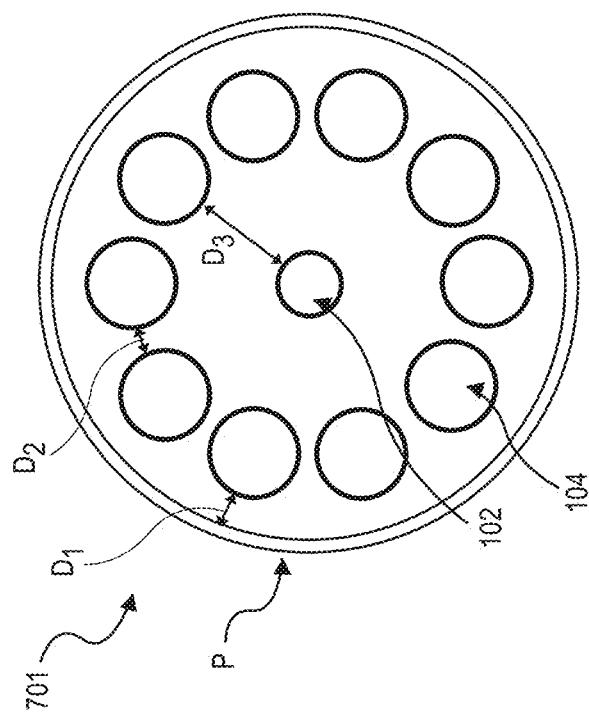
Figure 7A:
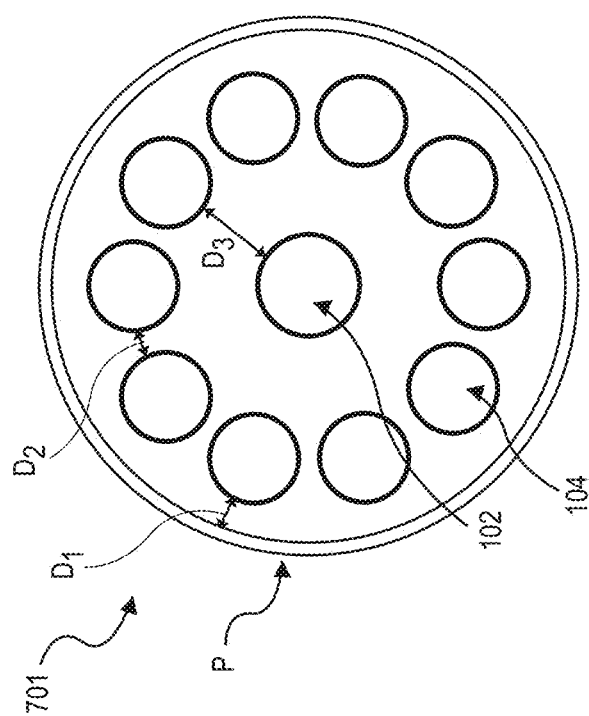

FIGS. 7A and 7B illustrate exemplary, non-limiting embodiments of an electrode design 701 of a well 200 that has a closed ring design with circular-shaped electrodes. As illustrated in FIG. 7A, the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may include ten (10) working electrode zones 104. In other embodiments, fewer or more than ten working electrode zones 104 may be included in well 200 (e.g., 1, 2, 3, 4, etc.) In embodiments, the working electrode zones 104 may be formed to have an approximate circular shape. In other embodiments, the working electrode zones 104 may be formed to have other shapes (e.g., rectangles, squares, ovals, clovers, or any other regular or irregular geometric shape).

In the closed ring pattern, the working electrode zones 104 may be positioned in a circular shape around the perimeter of the well 200 such that each is at pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter P of the well 200 and each of the working electrode zones 104 is equally spaced from another by a distance, "$D_2$," (also referred to as working electrode (WE-WE) pitch). In some embodiments, the distance, $D_2$, may be a minimum distance between a boundary of two adjacent working electrode zones 104. In certain embodiments, distance $D_1$ may not be equal between one or more working electrode zones 104 and perimeter P of well 200. In further embodiments, distance, $D_2$, may not be equal between two or more of the working electrode zones 104.

The auxiliary electrode 102 may be positioned in a center of the ring pattern at an equal distance, "$D_3$," (as referred to as WE-AUXILIARY pitch) from each of the working electrode zones 104, although in other embodiments, distance $D_3$ may vary for one or more of the working electrode zones 104 as measured to the auxiliary electrode 102. In some embodiments, the distance, $D_3$, may be a minimum distance between a boundary of a working electrode zones 104 and a boundary of an auxiliary electrode. In certain embodiments, as illustrated, the distance, $D_1$, the distance, $D_2$, and the distance, $D_3$, may be measured from a closest relative point on a perimeter of the respective feature (e.g., working electrode zone 104, auxiliary electrode 102, or perimeter P). One skilled in the art will realize that the distances may be measured from any relative point on a feature in order to produce a repeatable pattern, for example, a geometric pattern.

In further examples, working electrode zone to auxiliary electrode distance (WE-Auxiliary distance) may be measured from a center of a working electrode zone 104 to a center of an auxiliary electrode 102. Examples of WE-Auxiliary distances include 0.088" for a 10 spot open concentric design, 0.083" for a 10 trilobe open concentric design with sharp corners, 0.087" for a 10 trilobe open concentric design with rounded corners, 0.080" for a 10 trilobe closed concentric design with sharp corners, 0.082" for a 10 trilobe closed concentric design with rounded corners, and 0.086" for a 10 spot closed concentric design. In a penta design, WE-Auxiliary distances may be 0.062" between an inner working electrode zone 104 and an auxiliary electrode 102 and 0.064" between an outer working electrode zone 104 and an auxiliary electrode 102. The WE-Auxiliary distance values provided herein may vary by 5%, by 10%, by 15%, and by 25% or more without departing from the scope of this disclosure. In embodiments, WE-Auxiliary distance values may be varied according to a size and configuration of the working electrode zones 104 and the auxiliary zones 102.

Figure 7C:
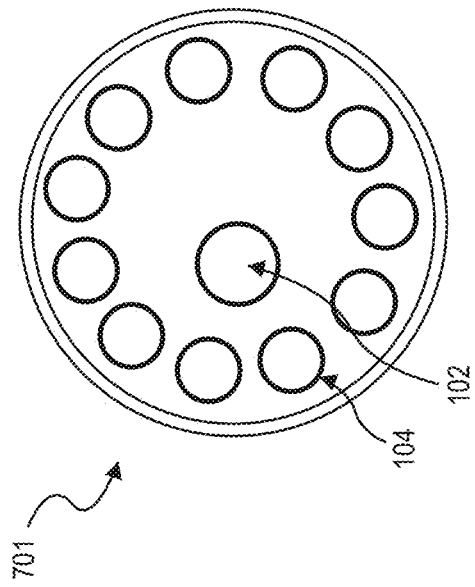
Figure 7D:
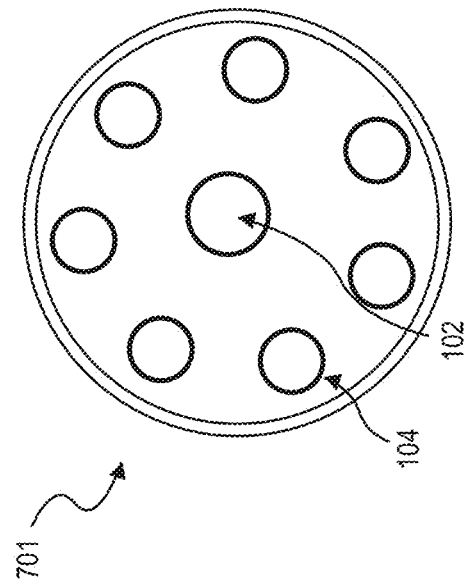
Figure 7E:
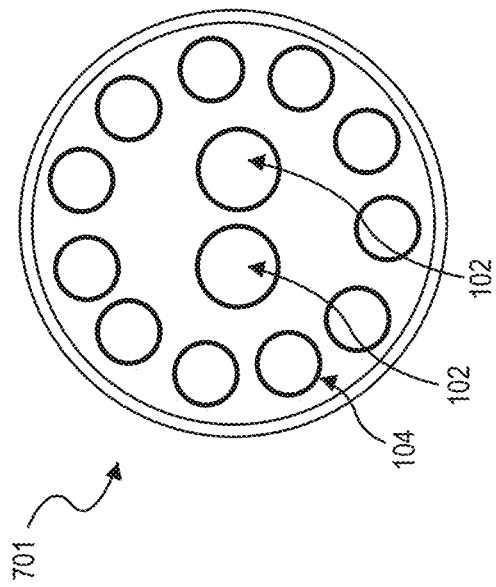
Figure 7F:
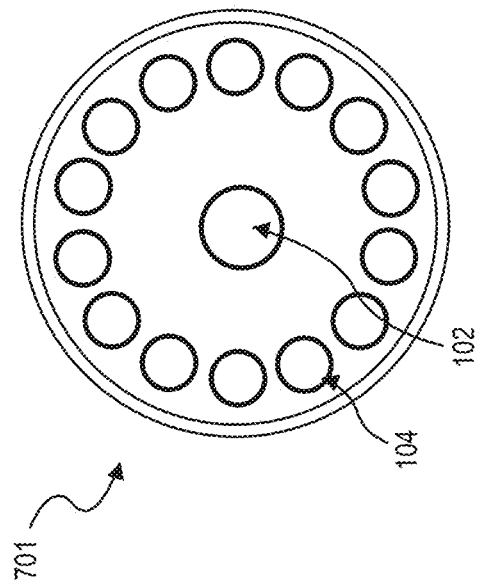

Although these figures depict a single auxiliary electrode 102, more than one may be included as well, as illustrated in FIG. 7C. Further, although auxiliary electrode 102 is depicted in these figures as being disposed at an approximate (or true) center of well 200, auxiliary electrode 102 may be disposed at other locations of the well 200 as well, as illustrated in FIG. 7D. Additionally, while these figures illustrate ten (10) working electrode zones 104, greater or fewer number of working electrode zones 104 may be included, as illustrated in FIGS. 7E and 7F.

The electrochemical cells illustrated in FIGS. 7A-7F may include electrodes of Ag, Ag/AgCl, carbon, carbon composites and/or other carbon-based materials, and/or of any other electrode material as discussed herein.

In certain embodiments, the size of the auxiliary electrode 102 and/or the working electrode zones 104 may be equal. In other embodiments, the size of the auxiliary electrode 102 and/or the working electrode zones 104 may be varied. In one example, the size of the working electrode zones 104 may be constant, and the size of the auxiliary electrode 102 may be varied such as varying the diameter, as shown in Table 6A. One skilled in the art will realize that the dimensions included in Table 6A are approximate values and may vary by, for example, +/−5.0% based on conditions such as manufacturing tolerances.

TABLE 6A

Exemplary dimensions for working electrode zones 104 and auxiliary electrode 102 according to certain embodiments with ten (10) working electrode zones

| WE Zone Diameter (in) | WE Zone Exposed Surface Area (sq in) | Total WE Spot Area (10 spots-sq in) | Auxiliary Electrode Diameter (in) | Auxiliary Electrode Exposed Surface Area (sq in) | WE/Auxiliary Electrode Area Ratio | Spot Edge to Plate Wall (in) | $D_2$ (in) |
|---|---|---|---|---|---|---|---|
| 0.041 | 0.00131 | 0.0131 | 0.048 | 0.00181 | 7.25 | 0.0200 | 0.0120 |
| 0.041 | 0.00131 | 0.0131 | 0.044 | 0.00152 | 8.63 | 0.0200 | 0.0120 |
| 0.041 | 0.00131 | 0.0131 | 0.040 | 0.00126 | 10.44 | 0.0200 | 0.0120 |
| 0.041 | 0.00131 | 0.0131 | 0.036 | 0.00102 | 12.89 | 0.0200 | 0.0120 |
| 0.041 | 0.00131 | 0.0131 | 0.032 | 0.00080 | 16.32 | 0.0200 | 0.0120 |
| 0.041 | 0.00131 | 0.0131 | 0.028 | 0.00062 | 21.30 | 0.0200 | 0.0120 |
| 0.040 | 0.00130 | 0.0130 | 0.048 | 0.00181 | 7.18 | 0.0200 | 0.0120 |
| 0.036 | 0.00100 | 0.0100 | 0.048 | 0.00181 | 5.52 | 0.0200 | 0.0120 |
| 0.032 | 0.00080 | 0.0080 | 0.048 | 0.00181 | 4.42 | 0.0200 | 0.0120 |
| 0.028 | 0.00060 | 0.0060 | 0.048 | 0.00181 | 3.31 | 0.0200 | 0.0120 |
| 0.024 | 0.00050 | 0.0050 | 0.048 | 0.00181 | 2.76 | 0.0200 | 0.0120 |

Table 6A above provides example values for closed spot electrode well geometry. As discussed above, Ag/AgCl electrodes consistent with embodiments hereof may include approximately $3.07 \times 10^{-7}$ moles to $3.97 \times 10^{-7}$ moles of oxidizing agent contained therein. In addition to the geometry presented above, electrodes, both working and auxiliary, may be approximately 10 microns ($3.937 \times 10^{-4}$ inches) thick. Table 6B provides approximate values and ranges for moles of oxidizing agent in the auxiliary electrode per auxiliary electrode area and volume. Table 6C provides approximate values and ranges for moles of oxidizing agent in the auxiliary electrode per working electrode area and volume. The values and ranges presented in Tables 6B and 6C are provided using inches as units. A person of skill in the art will recognize that these values may be converted to mm.

TABLE 6B

Exemplary concentrations of oxidizing agent for auxiliary electrodes according to

| Aux Electrode Diameter (in) | Auxiliary Electrode Exposed Surface Area (in^2) | Moles/in^2 of Auxiliary Electrode, Range | | Moles/in^3 of Auxiliary Electrode, Range | |
|---|---|---|---|---|---|
| 0.048 | 0.00181 | 1.697E−04 | 2.194E−04 | 4.309 | 5.573 |
| 0.044 | 0.001521 | 2.019E−04 | 2.611E−04 | 5.128 | 6.632 |
| 0.04 | 0.001257 | 2.443E−04 | 3.159E−04 | 6.205 | 8.024 |
| 0.036 | 0.001018 | 3.016E−04 | 3.900E−04 | 7.661 | 9.907 |
| 0.032 | 0.000804 | 3.817E−04 | 4.936E−04 | 9.696 | 12.538 |
| 0.028 | 0.000616 | 4.986E−04 | 6.447E−04 | 12.664 | 16.376 |

TABLE 6C

Exemplary concentrations of oxidizing agent for working electrodes according to certain embodiments with ten (10) working electrode zones

| WE Zone Diameter (in) | Total WE Spot Area (10 spots-in^2) | Moles/in^2 of aggregate working electrode area, range | | Moles/in^3 of aggregate working electrode volume, range | |
|---|---|---|---|---|---|
| 0.041 | 0.0131 | 2.344E−05 | 3.031E−05 | 0.595 | 0.770 |
| 0.04 | 0.013 | 2.362E−05 | 3.054E−05 | 0.600 | 0.776 |
| 0.036 | 0.01 | 3.070E−05 | 3.970E−05 | 0.780 | 1.008 |
| 0.032 | 0.008 | 3.838E−05 | 4.963E−05 | 0.975 | 1.260 |
| 0.028 | 0.006 | 5.117E−05 | 6.617E−05 | 1.300 | 1.681 |
| 0.024 | 0.005 | 6.140E−05 | 7.940E−05 | 1.560 | 2.017 |

Tables 2A-6C provide example dimensions for spot sizes of working electrode zones 104 and of auxiliary electrodes 102. Selection of spot sizes of the working electrode zones 104 and the auxiliary electrodes 102 may be important for optimizing results of ECL processes. For example, maintaining appropriate ratios between working electrode zone 104 areas and auxiliary electrode 102 areas may be important to ensure that the auxiliary electrode 102 has enough reductive capacity to complete ECL generation for selected voltage waveforms without saturation. In another example, larger working electrode zones 104 may provide for greater binding capacity and increase ECL signal. Larger working electrode zones 104 may also facilitate manufacturing, as they avoid small features and any manufacturing tolerances are a smaller percentage of the overall size. In embodiments, working electrode zone 104 areas may be maximized to increase ECL signal, binding capacity, and facilitate manufacturing while being limited by the need to maintain a sufficient insulated dielectric barrier between the working electrode zones 104 and the auxiliary electrodes 102.

Figure 8A:
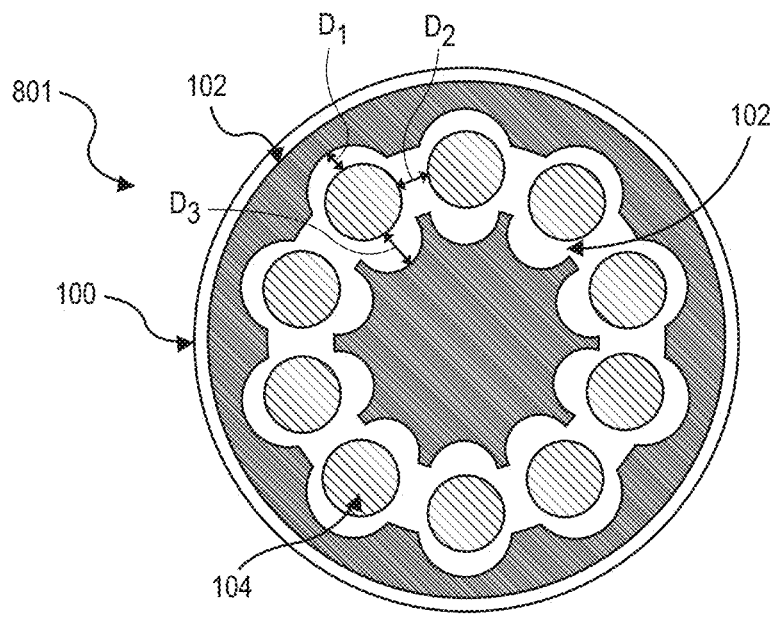
Figure 8B:
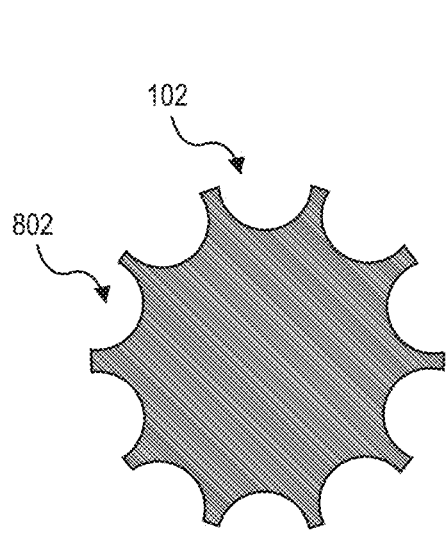
Figure 8C:
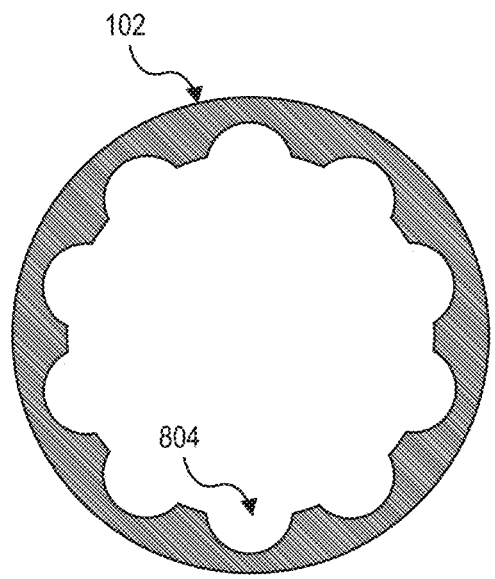
Figure 8D:
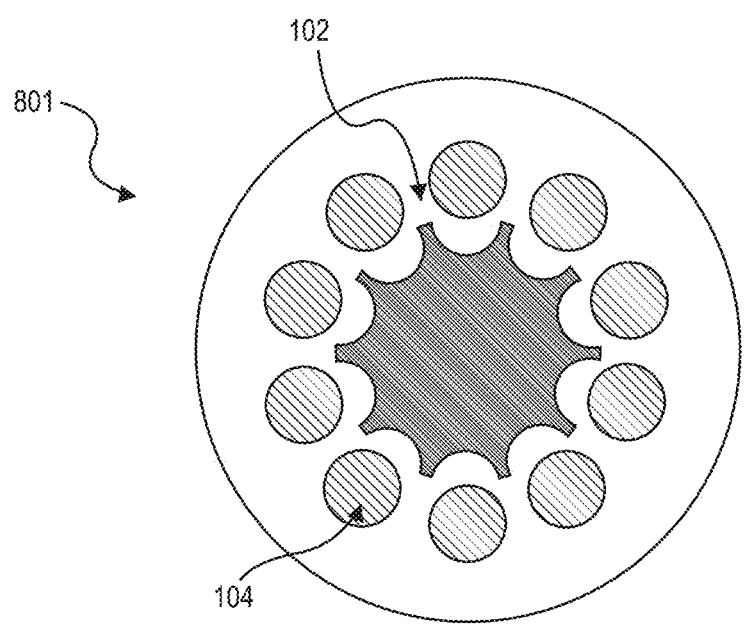

FIGS. 8A-8D illustrate exemplary, non-limiting embodiments of an electrode design 801 of a well 200 that has a closed ring design with circular-shaped working electrode zones and complex-shaped auxiliary electrodes 102. As illustrated in FIG. 8A, the well 200 may include two complex-shaped auxiliary electrodes 102. In other embodiments, fewer (or greater) than two auxiliary electrodes 102 may be included in well 200, as illustrated in FIG. 8D. In embodiments, the auxiliary electrodes 102 may be formed to have a complex shape, such as a "gear," "cog," "annulus," "washer" shape, "oblong" shape, "wedge" shape, etc., as described above. For example, as illustrated in FIG. 8B, the inner of the auxiliary electrodes 102 may be formed in a circular shape having exterior semicircular spaces 802 (e.g., "gear" or "cog" shaped) that correspond to the working electrode zones 104. Likewise, for example, as illustrated in FIG. 8C, the outer of the auxiliary electrodes 102 may be formed in a hollow ring shape having interior semicircular spaces 804 (e.g., "washer" shaped) that correspond to the working electrode zones 104.

In embodiments, the well 200 may include ten (10) working electrode zones 104. In other embodiments, fewer or more than ten working electrode zones 104 may be included in well 200 (e.g., 1, 2, 3, 4, etc.) In embodiments, the working electrode zones 104 may be formed to have an approximate circular shape. In other embodiments, the working electrode zones 104 may be formed to have other shapes (e.g., rectangles, squares, ovals, clovers, or any other regular or irregular geometric shape).

In embodiments, the working electrode zones 104 may be positioned in a circular shape between the two (2) auxiliary electrodes 102. In this configuration exterior semicircular spaces 802 and the interior semicircular spaces 704 allow the two (2) auxiliary electrodes 102 to partially surround the working electrode zones. The outer of the two (2) auxiliary electrodes 102 may be spaced at a distance "$D_1$," from the working electrode zones 104, where $D_1$ is measured from the midpoint of the interior semicircular spaces to a boundary of the working electrode zones 104. In some embodiments, the distance, $D_1$, may be a minimum distance between the outer of the two auxiliary electrodes 102 and the working electrode zones 104. In certain embodiments, distance $D_1$ may not be equal between one or more working electrode zones 104 and the outer of the two (2) auxiliary electrodes 102. Each of the working electrode zones 104 may be equally spaced from another by a distance, "$D_2$." In some embodiments, the distance, $D_2$, may be a minimum distance between a boundary of two adjacent working electrode zones 104. In further embodiments, distance, $D_2$, may not be equal between two or more of the working electrode zones 104. The inner of the two (2) auxiliary electrodes 102 may be spaced at a distance "$D_3$," from the working electrode zones 104, where $D_3$ is measured from the midpoint of the exterior semicircular spaces to an edge of the working electrode zones 104. In some embodiments, the distance, $D_3$, may be a minimum distance between a boundary of a working electrode zones 104 and a boundary of an auxiliary electrode. In certain embodiments, distance $D_1$ may not be equal between the one or more working electrode zones 104 and the inner of the two (2) auxiliary electrodes 102.

In certain embodiments, as illustrated, the distance, $D_1$, the distance, $D_2$, and the distance, $D_3$, may be measured from a closest relative point on a perimeter of the respective feature (e.g., working electrode zone 104 or auxiliary electrode 102). One skilled in the art will realize that the distances may be measured from any relative point on a feature in order to produce a repeatable geometric pattern.

The electrochemical cells illustrated in FIGS. 8A-8D may include auxiliary electrodes of Ag/AgCl, of carbon, and/or of any other auxiliary electrode material as discussed herein.

Figure 9A:
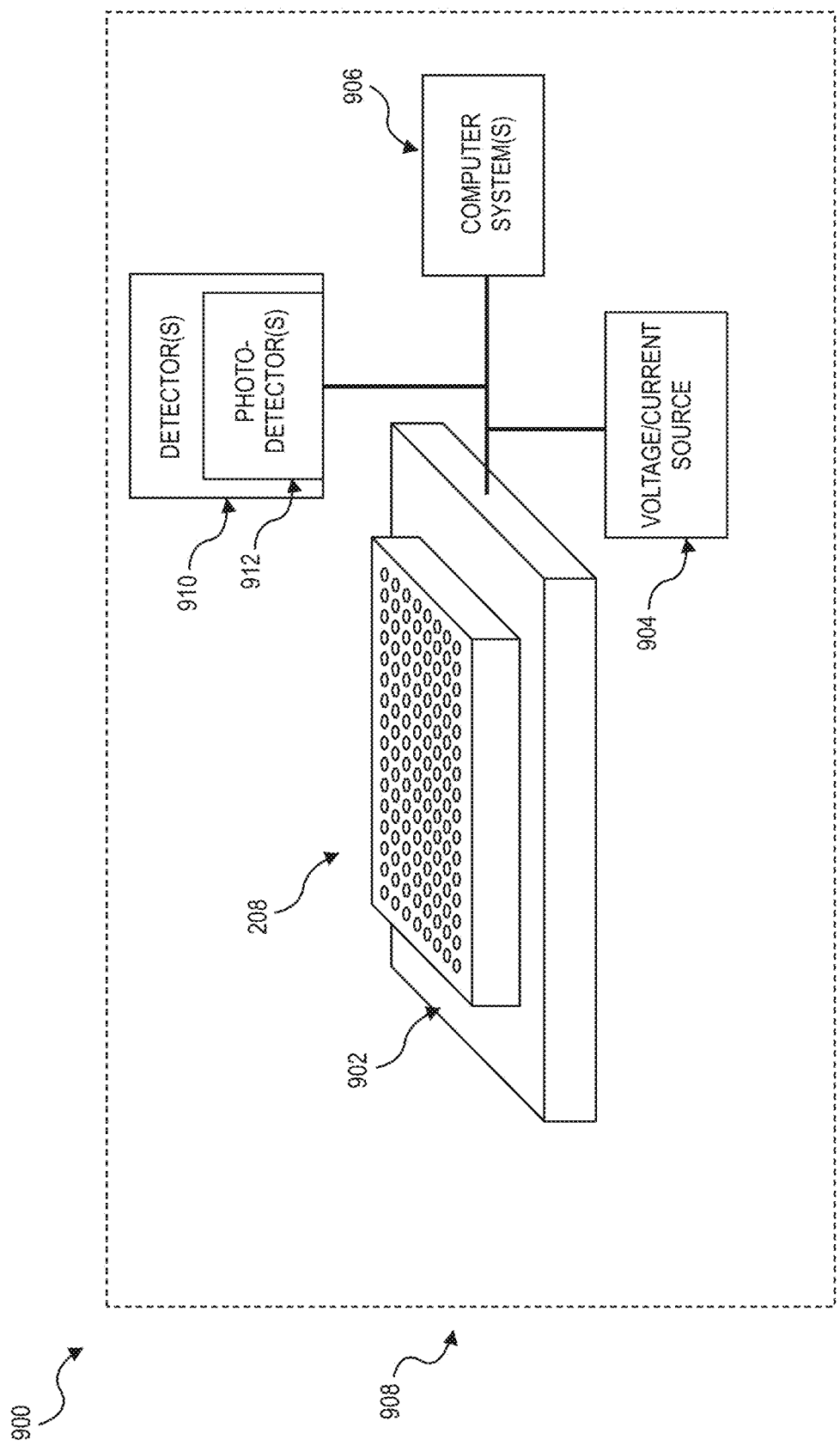
FIGS. 9A and 9B illustrate an example of an assay apparatus, according to embodiments disclosed herewith.

As discussed above, the electrochemical cell 100 may be utilized in devices and apparatus for performing electrochemical analysis. For example, the multi-well plate 208 including wells 200 described above, may be used in any type of apparatus that assists with the performance of biological, chemical, and/or biochemical assays and/or analysis, e.g., an apparatus that performs ECL analysis. FIG. 9A illustrates a generalized assay apparatus 900 in which the multi-well plate 208 including wells 200 may be used for electrochemical analysis and procedures in accordance with an embodiment hereof. One skilled in the art will realize that FIG. 9A illustrates one example of an assay apparatus and that existing components illustrated in FIG. 9A may be removed and/or additional components may be added to the assay apparatus 900 without departing from the scope of embodiments described herein.

As illustrated in FIG. 9A, the multi-well plate 208 may be electrically coupled to a plate electrical connector 902. The plate electrical connector 902 may be coupled to a voltage/current source 904. The voltage/current source 904 may be configured to selectively supply a controlled voltage and/or current to the wells 200 of the multi-well plate 208 (e.g., the electrochemical cells 100), through the plate electrical connector 902. For example, the plate electrical connector 1502 may be configured to match and/or mate with electrical contacts of the multi-well plate 208, which are coupled to the one or more auxiliary electrodes 102 and/or the one or more working electrode zones 102, to allow voltage and/or current to be supplied to the wells 200 of the multi-well plate 208.

Figure 9B:
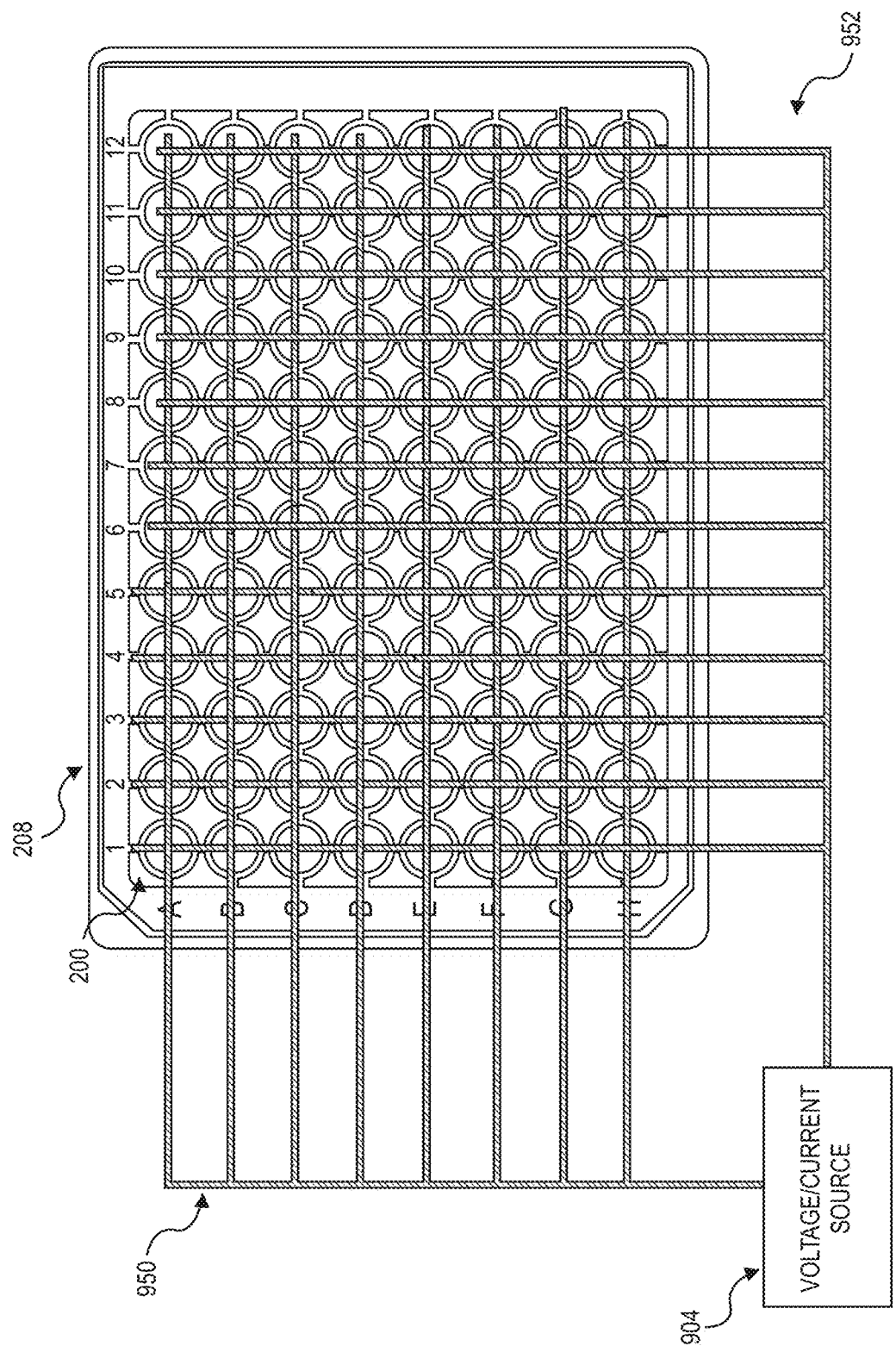

In some embodiments, the plate electrical connector 902 may be configured to allow the one or more wells 200 to be activated simultaneously (including one or more of working electrode zones and the auxiliary electrode), or two or more of the working electrode zones and/or auxiliary electrode can be activated individually. In certain embodiments, a device, such as one used to carry out scientific analysis, could be electrically coupled to one or more apparatuses (such as, for example, plates, flow cells, etc.). The coupling between the device the one or more apparatuses could include the entire surface of the apparatus (e.g., entire bottom of a plate) or a portion of the apparatus. In some embodiments, the plate electrical connector 902 may be configured to allow one or more of the wells 200 to be selectively addressable, e.g., voltage and/or current selectively applied to ones of the wells 200 and signals read from the detectors 910. For example, as illustrated in FIG. 9B, the multi-well plate 208 may include 96 of the wells 200 that are arranged in Rows labeled "A"-"H" and Columns labeled "1"-"12". In some embodiments, the plate electrical connector 902 may include a single electrical strip that connects all of the wells 200 in one of Rows A-H or one of the columns 1-12. As such, all of the wells 200 in one of Rows A-H or one of the columns 1-12 may be activated simultaneously, e.g., a voltage and/or current to be supplied by the voltage/current source 904. Likewise, all of the wells 200 in one of Rows A-H or one of the columns 1-12 may be read simultaneously, e.g., a signal read by the detectors 910.

In some embodiments, the plate electrical connector 902 may include a matrix of individual electrical connections, vertical electrical lines 952 and horizontal electrical lines 950, that connect individual wells 200 in the Rows A-H and the columns 1-12. The plate electrical connector 902 (or voltage/current supply 904) may include a switch or other electrical connection device that selectively establishes an electrical connection to the vertical electrical lines 952 and horizontal electrical lines 950. As such, one or more wells 200 in one of Rows A-H or one of the columns 1-12 may be individually activated, e.g., a voltage and/or current to be supplied by the voltage/current source 904, as illustrated in FIG. 9B. Likewise, one or more wells 200 in one of Rows A-H or one of the columns 1-12 may be individually read simultaneously, e.g., by a signal read by the detectors 910. In this example, the one or more wells 200 individually activated by be selected based on the index of the one or more wells 200, e.g., well A1, well A2, etc.

In some embodiments, the plate electrical connector 902 may be configured to allow the one or more working electrode zones 104 and/or the one or more auxiliary electrodes 102 to be activated simultaneously. In some embodiments, the plate electrical connector 902 may be configured to allow one or more of the auxiliary electrodes 102 and/or working electrode zones 104 of each of the wells 200 to be selectively addressable, e.g., voltage and/or current selectively applied to individual ones of the auxiliary electrodes 102 and/or working electrode zones 104 and signals read from the detectors 910. Similar to the wells 200 as described above, for each well 200, the one or more working electrode zones 104 may include a separate electrical contact that allows the plate electrical connector 902 to be electrically to each of the one or more working electrode zones 104 of a well 200. Likewise, for each well 200, the one or more auxiliary electrodes 102 may include a separate electrical contact that allows the plate electrical connector 902 to be electrically to each of the one or more auxiliary electrodes 102 of a well 200.

While not illustrated, the plate electrical connector 902 (or other components of the assay apparatus 900) may include any number of electrical components, e.g., electrical lines, switches, multiplexers, transistors, etc., to allow particular wells 200, auxiliary electrodes 102, and/or working electrode zones 104 to be selectively, electrically coupled to the voltage/current source 904 to allow the voltage and/or current to be selectively applied. Likewise, while not illustrated, the plate electrical connector 902 (or other components of the assay apparatus 900) may include any number of electrical components, e.g., electrical lines, switches, multiplexers, transistors, etc., to allow particular wells 200, auxiliary electrodes 102, and/or working electrode zones 104 to allow signals to be selectively read from the detectors 910.

To control the voltage and/or current supplied, in certain embodiments, a computer system or systems 906 may be coupled to the voltage/current source 904. In other embodiments, the voltage/current source 904 may supply potential and/or current without the aid of a computer system, e.g., manually. The computer system 906 may be configured to control the voltage and/or current supplied to the wells 200. Likewise, in embodiments, the computer systems 906 may be utilized to store, analyze, display, transmit, etc. the data measured during the electrochemical processes and procedures.

The multi-well plate 208 may be housed within a housing 908. The housing 908 may be configured to support and contain the components of assay apparatus 900. In some embodiments, the housing 908 may be configured to maintain experimental conditions (e.g., air tight, light tight, etc.) to accommodate the operations of the assay apparatus 900.

In embodiments, the assay apparatus 900 may include one or more detectors 910 that measure, capture, store, analyze, etc. data associated with the electrochemical processes and procedures of the assay apparatus 900. For example, the detectors 910 may include photo-detectors 912 (e.g., cameras, photodiodes, etc.), voltmeters, ammeters, potentiometers, temperature sensors, etc. In some embodiments, one or more of the detectors 910 may be incorporated into other components of the assay apparatus 900, for example, the plate electrical connector 902, the voltage current source 904, the computer systems 906, the housing 908, etc. In some embodiments, one or more of the detectors 910 may be incorporated into the multi-well plate 208. For example, one or more heaters, temperature controllers, and/or temperature sensors may be incorporated into electrode design of each of the wells 200, as described below.

In embodiments, the one or more photo-detectors 912 may be, for example, film, a photomultiplier tube, photodiode, avalanche photo diode, charge coupled device ("CCD"), or other light detector or camera. The one or more photo-detectors 912 may be a single detector to detect sequential emissions or may include multiple detectors and/or sensors to detect and spatially resolve simultaneous emissions at single or multiple wavelengths of emitted light. The light emitted and detected may be visible light or may be emitted as non-visible radiation such as infrared or ultraviolet radiation. The one or more photo-detectors 912 may be stationary or movable. The emitted light or other radiation may be steered or modified in transit to the one or more photo-detectors 912 using, for example, lenses, mirrors and fiberoptic light guides or light conduits (single, multiple, fixed, or moveable) positioned on or adjacent to any component of the multi-well plate 208. In some embodiments, surfaces of the working electrode zones 104 and/or the auxiliary electrodes 102, themselves, may be utilized to guide or allow transmission of light.

As discussed above, in embodiments, multiple detectors can be employed to detect and resolve simultaneous emissions of various light signals. In addition to the examples already provided herein, detectors can include one or more beam splitters, mirrored lens (e.g., 50% silvered mirror), and/or other devices for sending optical signals to two or more different detectors (e.g., multiple cameras, etc.). These multiple-detector embodiments may include, for example, setting one detector (e.g., camera) to a high gain configuration to capture and quantify low output signals while setting the other to a low gain configuration to capture and quantify high output signals. In embodiments, high output signals may be 2×, 5×, 10×, 100×, 1000×, or larger relative to low output signals. Other examples are contemplated as well.

Turning to the beam splitter examples described above, beam splitters of particular ratios may be employed (e.g., 90:10 ratio with two sensors, although other ratios and/or numbers of sensors are contemplated as well) to detect and resolve emitted light. In this 90:10 example, 90% of the incident light may be directed to a first sensor using a high gain configuration for low light levels and the remaining 10% directed to a second sensor for using a low gain configuration for high light levels. In embodiments, the loss of the 10% of light to the first sensor may be compensated (at least partially) based on various factors, e.g., the sensors/sensor technology selected, binning techniques, etc.) to reduce noise.

In embodiments, each sensor could be the same type (e.g., CCD/CMOS) and in other embodiments they may employ different types (e.g., the first sensor could be a high sensitivity, high performance CCD/CMOS sensor and the second sensor could include a lower cost CCD/CMOS sensor). In other examples, (e.g., for sensors of larger size) the light may be split (e.g., 90/10 as described above, although other ratios are contemplated as well) so that 90% of the signal could be imaged on half the sensor and the remaining 10% imaged on the other half of the sensor. Dynamic range may further be extended by optimizing the optics of this technique, for example, by applying a 99:1 ratio with multiple sensors, where one sensor (e.g., camera) is highly sensitive within a first dynamic range and a second sensor, where its lowest sensitivity starts higher than the first sensor's. When properly optimized, the amount of light each receives can be maximized, thus improving the overall sensitivity. In these examples, techniques may be employed to minimize and/or eliminate cross talk, e.g., by energizing working electrode zones in a sequential fashion. The advantages provided by these examples include simultaneous detection of low and high light levels, which can eliminate the need for dual excitations (e.g., multi-pulse methods), and, thus, ECL read times can be decreased and/or otherwise improved.

In embodiments, the one or more photo-detectors 912 may include one or more cameras (e.g., charge coupled devices (CCDs), complementary metal-oxide-semiconductor (CMOS) image sensors, etc.) that capture images of the wells 200 to capture photons emitted during operations of the assay apparatus 900. In some embodiments, the one or more photo-detectors 912 may include a single camera that captures images of all the wells 200 of the multi-well plate 208, a single camera that captures images of a sub-set of the wells 200, multiple cameras that capture images of all of the wells 200, or multiple cameras that capture images of a sub-set of the wells 200. In some embodiments, each well 200 of the multi-well plate 200 may include a camera that captures images of the well 200. In some embodiments, each well 200 of the multi-well plate 200 may include multiple cameras that capture images of a single working electrode zone 104 or a sub-set of the working electrodes zones 104 in each well 200. In any embodiment, the computer system 906 may include hardware, software, and combination thereof that includes logic to analyze images captured by the one or more photo-detectors 912 and extract luminance data for performing the ECL analysis. In some embodiments, the computer system 906 may include hardware, software, and combinations thereof that include logic for segmenting and enhancing images, for example, to focus on a portion of an image containing one or more of the wells 200, one or more of the working electrode zones 104, and the like, when an image contains data for multiple wells 200, multiple working electrode zones 104, etc. Accordingly, the assay apparatus 900 may provide flexibility because the photo-detectors 912 may capture all the light from multiple working electrode zones 104, and the computer system 906 may use imaging processing to resolve the luminescence data for each working electrode zone 104. As such, the assay apparatus 900 may operate in various modes, for example, in a singleplex mode (e.g., 1 working electrode zone), 10-plex mode (e.g., all working electrodes zones 104 for a 10-working electrode zone well 200), or multiplex mode in general (e.g., a subset of all working electrode zones, including within a single well 200 or among multiple wells 200 at the same time, such as 5 working electrode zones 104 for multiple 10 working electrode zone wells at simultaneously.)

In some embodiments, the one or more photo-detectors 912 may include one or more photodiodes for detecting and measuring photons emitted during chemical luminance. In some embodiments, each well 200 of the multi-well plate 200 may include a photodiode for detecting and measuring photons emitted in the well 200. In some embodiments, each well 200 of the multi-well plate 200 may include multiple photodiodes for detecting and measuring photons emitted from a single working electrode zone 104 or a sub-set of the working electrode zones 104 in each well 200. As such, the assay apparatus 900 may operate in various modes. For example, in a sequential or "time-resolve" mode, the assay apparatus 900 may apply a voltage and/or current to 5 working electrode zones 104 individually. The photodiodes may then sequentially detect/measure the light coming from each of the 5 working electrode zones 104. For instance, a voltage and/or current may be applied to a first of the 5 working electrode zones 104 and the emitted photons may be detected and measured by a corresponding photodiode. This may be repeated sequentially for each of the 5 working electrode zones 104. Likewise, in this example, sequential mode of operation may be performed for working electrode zones 104 within the same well 200, may be performed for working electrode zones 104 located in different wells 200, may be performed for working electrode zones 104 located within sub-sets or "sectors" of multiple wells 200, and combinations thereof. Likewise, in some embodiments, the assay apparatus 900 may operate in a multiplex mode in which one or more working electrode zones 104 are activated simultaneously by the application of a voltage and/or current, and the emitted photons are detected and measured by multiple photodiodes to multiplex. The multiplex mode of operation may be performed for working electrode zones 104 within the same well 200, may be performed for working electrode zones 104 located in different wells 200, may be performed for working electrode zones 104 located with sub-sets or "sectors" of wells 200 from the multi-well plate 208, combinations thereof.

Figure 10A:
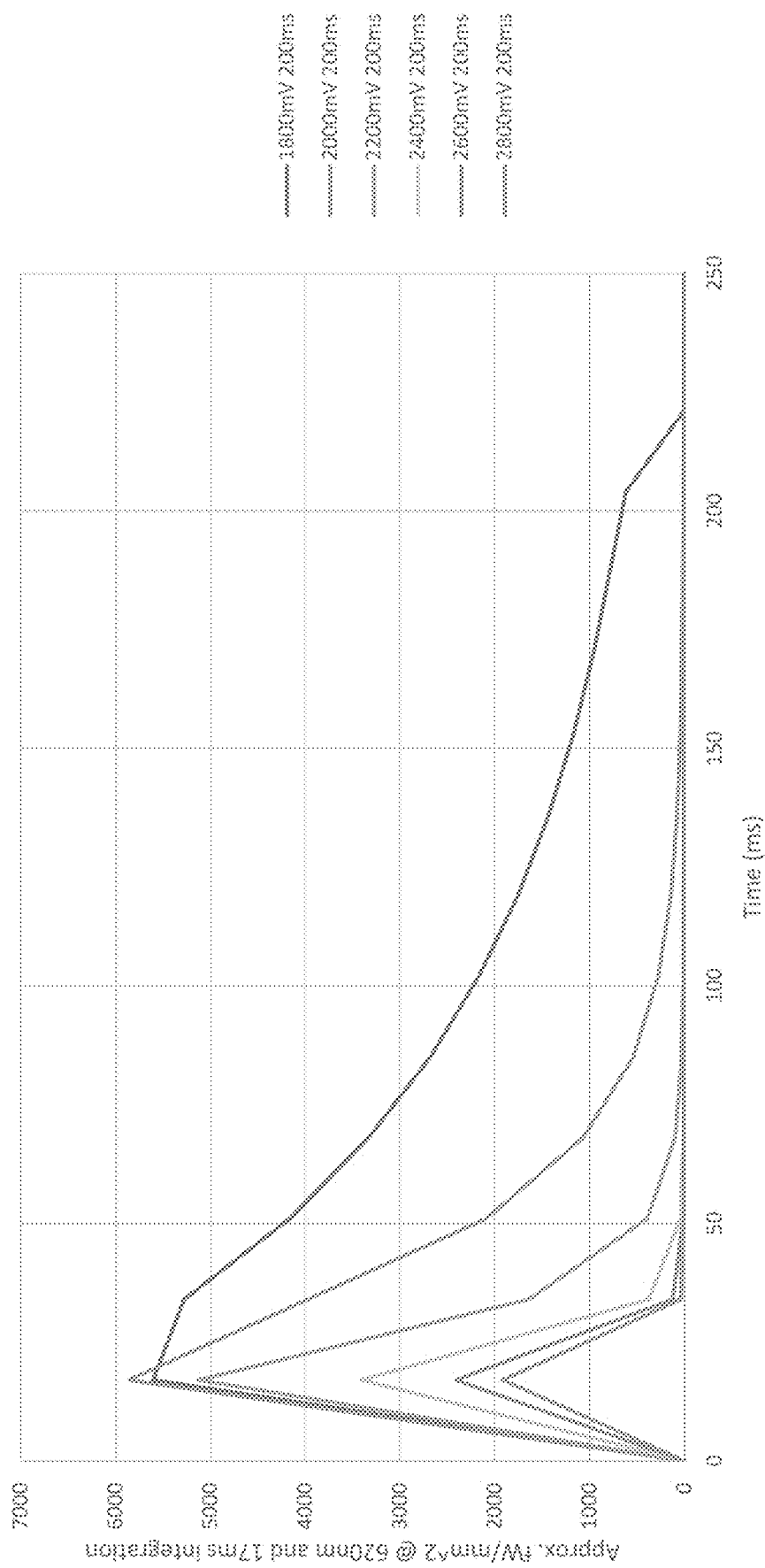
FIGS. 10A and 10B illustrate decay times for an auxiliary electrode, according to embodiments.
Figure 10B:
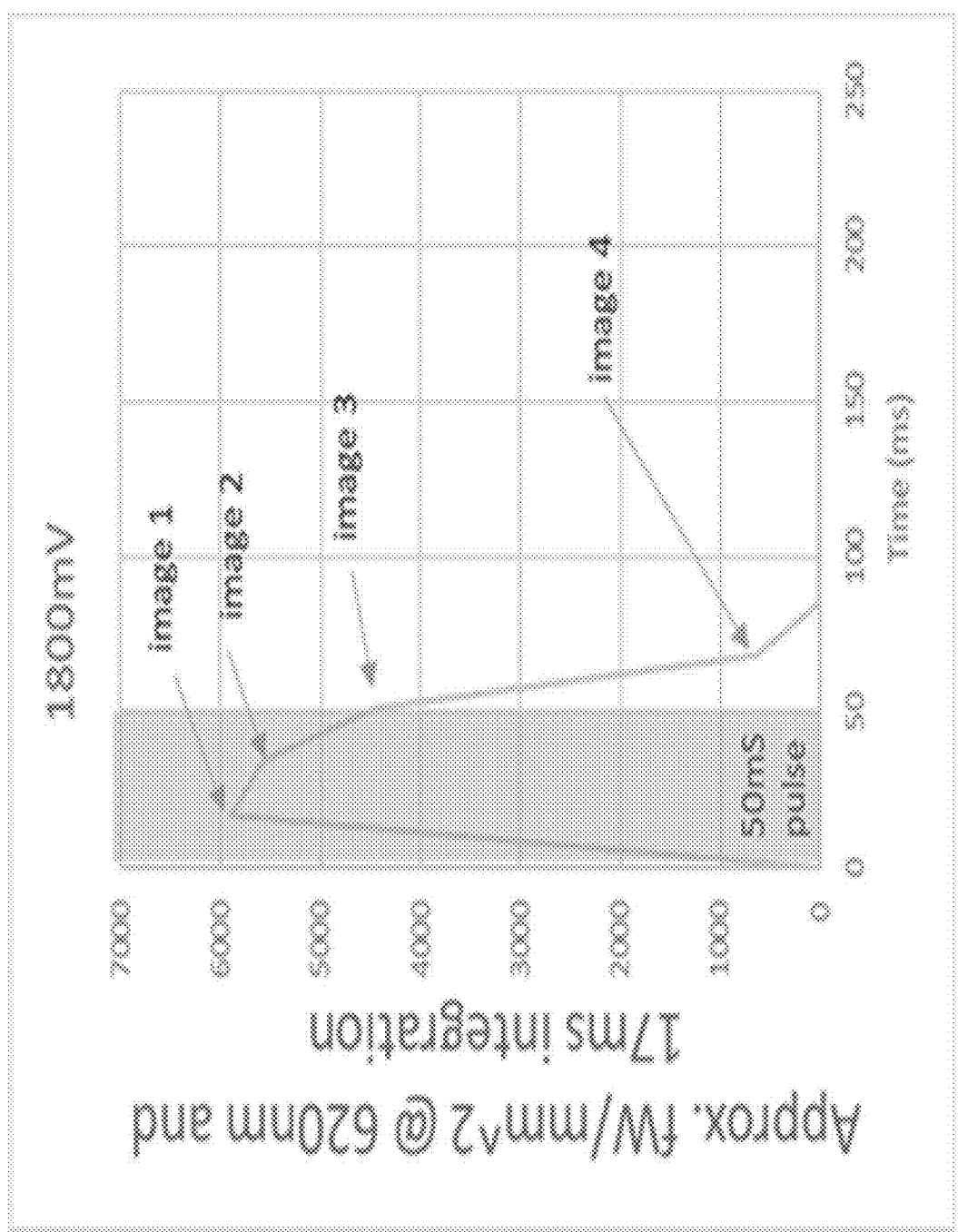

In the embodiments described above, the working electrode zones 104 experience a natural decay in intensity of the emitted photons after the voltage supplied to the working electrode zones 104 is removed. That is, when a voltage is applied to the working electrode zones 104, a redox reaction occurs and photons are emitted at an intensity determined by the voltage applied and the substances undergoing the redox reaction. When the applied voltage is removed, the substance that underwent the redox reaction continues to emit photons, at a decaying intensity, for a period of time based on the chemical properties of the substances. As such, when the working electrode zones 104 are activated in sequence, the assay apparatus 900 (e.g., the computer system 906) may be configured to implement a delay in activating sequential working electrode zones 104. The assay apparatus 900 (e.g., the computer system 906) may determine and implement a delay in activating sequential working electrode zones 104 in order to prevent photons from the previously fired working electrode zones 104 from interfering with photons emitted from a currently activated working electrode zone 104. For example, FIG. 10A shows the decay of ECL during various voltage pulses, and FIG. 10B illustrates the ECL decay time using a pulse of 50 ms. In the example of FIG. 10B, intensity data was determined by taking multiple images during and after the end of a 50 ms long voltage pulse at 1800 mV. To improve the temporal resolution, image frames were taken (or photons detected) every 17 ms. The 50 ms voltage pulse, as illustrated in FIG. 10B, was imaged with 3 frames (e.g., Image 1-3; 3 times 17 ms=51 ms). Any emitted photons, e.g., ECL signal, after image 3 would be due to the decay of an intensity of photons (e.g., ECL) after the working electrode zone 104 was turned off. In FIG. 10B, image 4 captured additional ECL signal after the working electrode zone 104 was turned off, suggesting that there may be some small continuing light generating chemistry after the driving force for this chemistry (e.g., applied voltage potential) is deactivated. That is, because the working electrode zone 104 switches to 0 mV for 1 ms after the end of the 1800 mV voltage pulse, the effects of polarization likely have no effect on the delay. In embodiments, the assay apparatus 900 (e.g., the computer system 906) may be configured to utilize such data for different voltage pulses to delay the activation of sequential working electrode zones 104. As such, an implementation of a delay allows the assay apparatus 900 to minimize cross-talk between working electrode zones 104 and/or wells 200, have high throughput in performing ECL operations, etc.

In any embodiment, the utilization of the one or more auxiliary electrodes 102 improves the operation of the assay apparatus 900. In some embodiments, the utilization of the one or more auxiliary electrodes 102 improves read times for the detectors 910. For example, the use of Ag/AgCl in the one or more auxiliary electrodes 102 improves read times of ECL for several reasons. For example, the use of an electrode (e.g., an auxiliary electrode 102) having a redox couple (in this particular embodiment, Ag/AgCl) can provide a stable interfacial potential to allow electrochemical analysis processes to utilize voltage pulses, rather than voltage ramps. The use of voltage pulses improves the read times because the entire pulsed waveform can be applied at a voltage potential that generates the ECL throughout the entire duration of the waveform. Tables 7 and 8 below include improved read times (in seconds) for various configuration of the assay apparatus 900 utilizing the one or more auxiliary electrodes 102. The examples in these tables are the total read times of all well of a 96-well plate (each well containing either a single working electrode (or single working electrode zone) or 10 working electrodes (or 10 working electrode zones)). For these read times, analysis was performed on all working electrode (or working electrode zones) (either 1 or 10 depending on the experiment) from all 96 wells. In Table 7 below, "spatial" refers to an operating mode in which all working electrode zones 104 are activated concurrently, and images are captured and processed to resolve them. "Time-resolve," refers to a sequential mode as described above. Time-resolve has the added benefit of permitting adjustments to the ECL image collection (e.g., adjusting binning to adjust dynamic range, etc.). The "Current Plate RT" column includes read times for non-auxiliary electrodes (e.g., carbon electrodes). The last three columns of the table include the difference in read times between the non-auxiliary electrode read times and the auxiliary electrode (e.g., Ag/AgCl) read times. For time-resolved measurements (using these examples with 10 working electrode zones per well in both Table 7 and Table 8), the read time for subplexes will be in between 1 working electrode zone (WE) and 10 WE read times. For the "B" experiments, read time improvement was not calculated because the non-auxiliary electrode plates cannot operate in a time resolved mode. the Table 8 includes similar data in which the assay apparatus 900 includes photodiodes, as discussed above. One skilled in the art will realize that the values included in Tables 7 and 8 are approximate values and may vary by, for example, +/−5.0% based on conditions such as operating conditions and parameters of the assay apparatus.

TABLE 7

| | | | | | Read times (seconds) for imaging-based devices | | | | | |
|---|---|---|---|---|---|---|---|---|---|---|
| Experiment (Exp.) | Working electrode design/operating mode (number of WE/WE mode) | 50 ms pulse | 100 ms pulse | 200 ms pulse | Current Plate RT (non-auxiliary electrodes) | Current Exposure | Overhead | 50 ms Read time improvement of auxiliary electrode | 100 ms Read time improvement of auxiliary electrode | 200 ms Read time improvement of auxiliary electrode |
| Exp. 1A | 1-WE/ 10-WE spatial | 66 | 71 | 81 | 157 | 96 | 61 | 91 | 86 | 76 |
| Exp. 1B | 10-WE time-resolved | 114 | 162 | 258 | | | | n/a | n/a | n/a |
| Exp. 2A | 1-WE/ 10-WE spatial | 45 | 47 | 49 | 92 | 48 | 44 | 47 | 45 | 43 |
| Exp. 2B | 10-WE time-resolved | 57 | 69 | 93 | | | | n/a | n/a | n/a |
| Exp. 3A | 1-WE/ 10-WE spatial | 51 | 52 | 52 | 69 | 18 | 51 | 18 | 17 | 17 |

TABLE 7-continued

Read times (seconds) for imaging-based devices

| Experiment (Exp.) | Working electrode design/operating mode (number of WE/WE mode) | 50 ms pulse | 100 ms pulse | 200 ms pulse | Current Plate RT (non-auxiliary electrodes) | Current Exposure | Overhead | 50 ms Read time improvement of auxiliary electrode | 100 ms Read time improvement of auxiliary electrode | 200 ms Read time improvement of auxiliary electrode |
|---|---|---|---|---|---|---|---|---|---|---|
| Exp. 3B | 10-WE time-resolved | 54 | 57 | 63 | | | | n/a | n/a | n/a |

TABLE 8

Read times (seconds) for non-imaging-based devices

| Detector Type | Working electrode design (number of WE) | 50 ms pulse | 50 ms pulse | 50 ms pulse |
|---|---|---|---|---|
| Photodiode | 11-WE | 66 | 71 | 81 |
| Photodiode | 10-WE (time-resolved) | 114 | 162 | 258 |

For Tables 7 and 8, "WE" can refer to either working electrodes or working electrode zones.

Figures 29, 30:
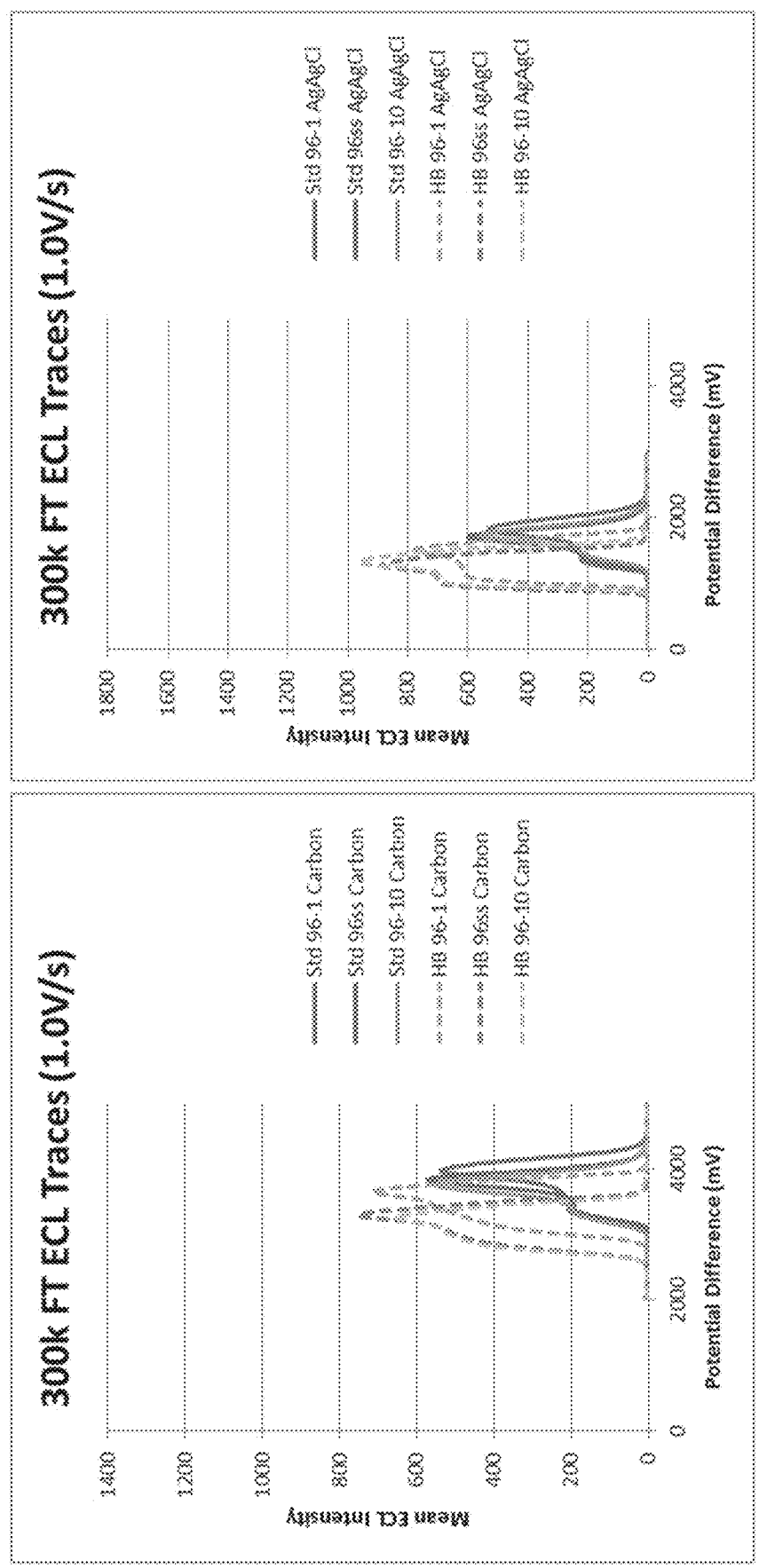
FIGS. 29, 30, 31A, 31B, 32A, 32B, 33A, 33B, 34A, 34B, 35, 36A-36D illustrate tests performed to optimize waveforms for coating of plasma-treated electrodes versus standard electrodes, according to embodiments disclosed herewith.
Figures 31A, 31B:
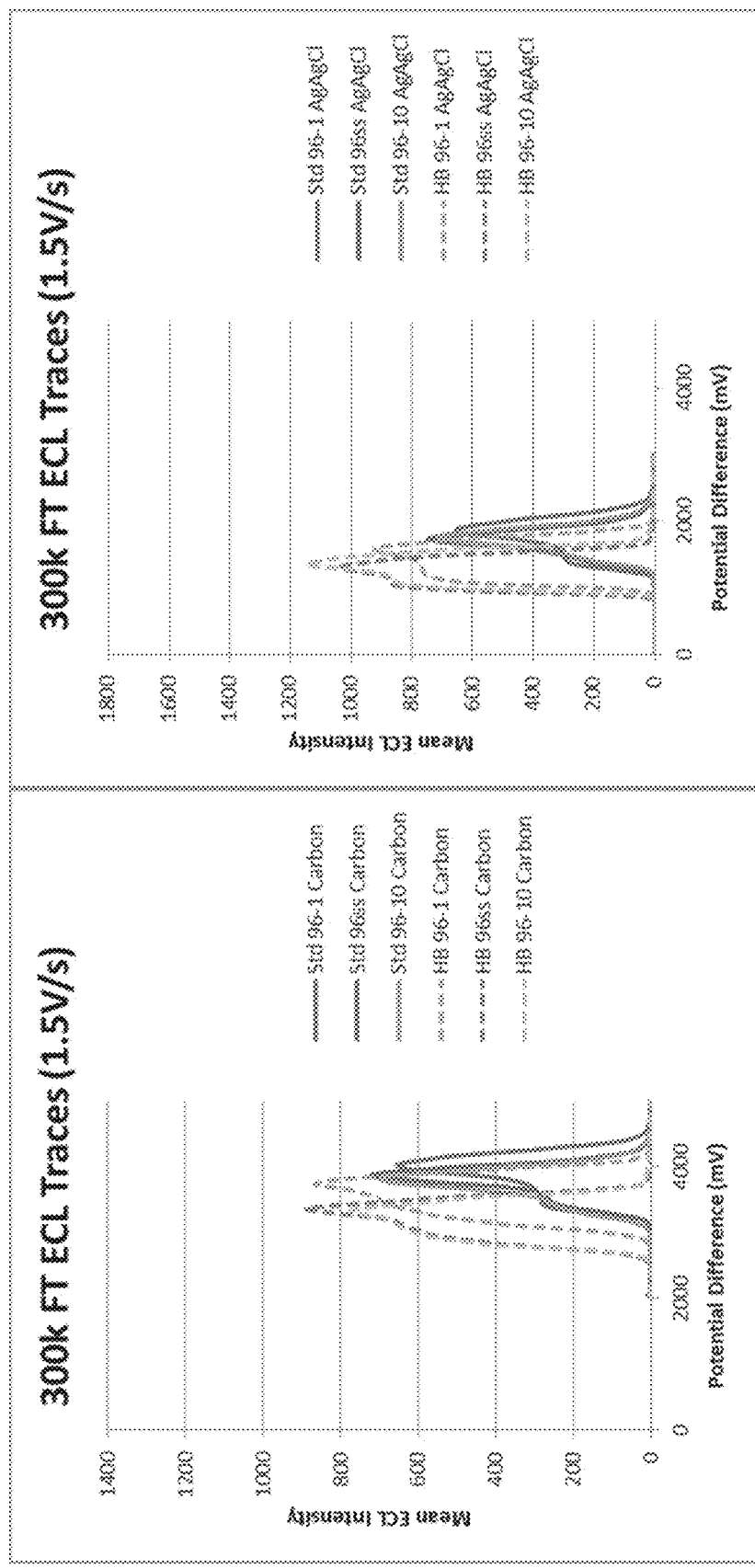
Figures 32A, 32B:
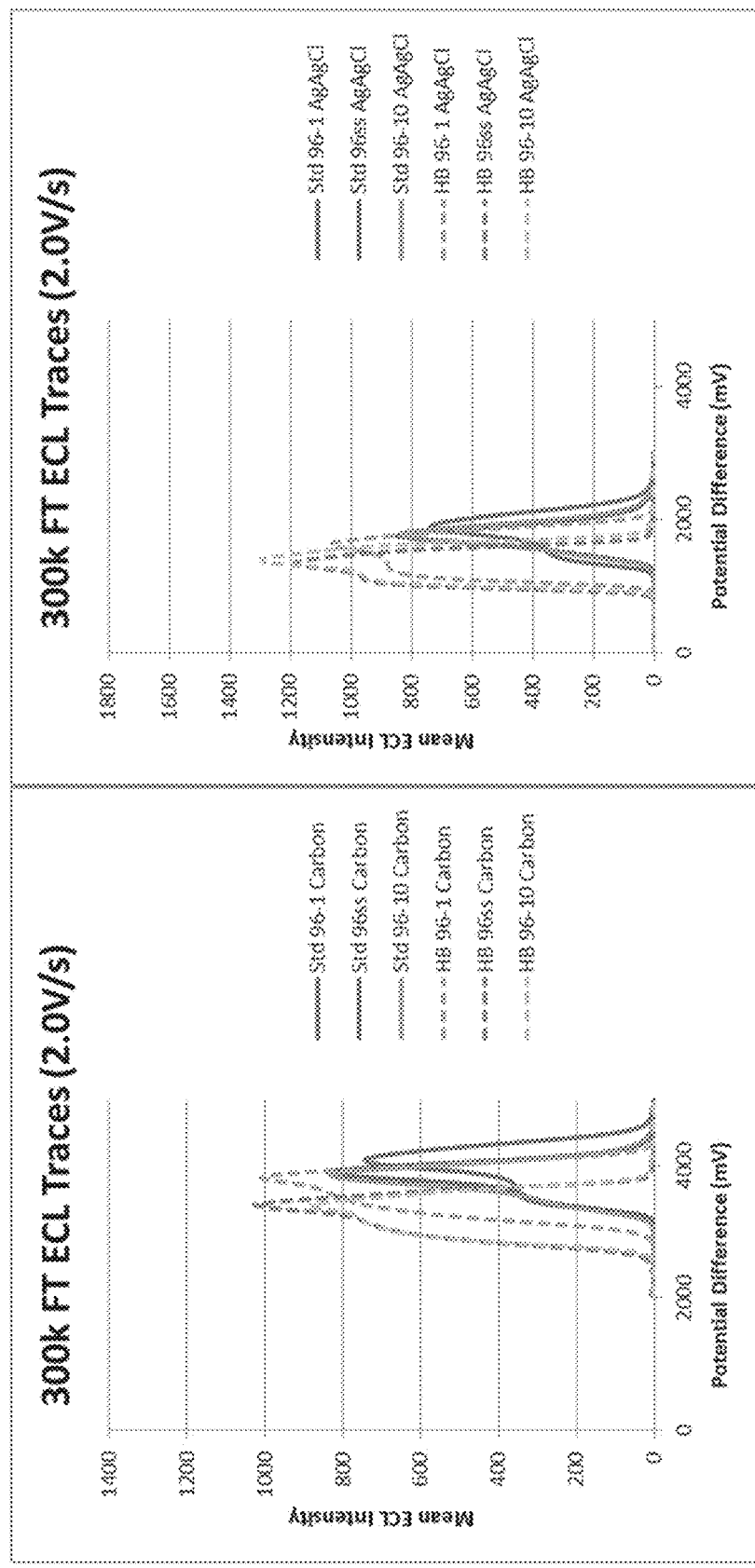
Figures 33A, 33B:
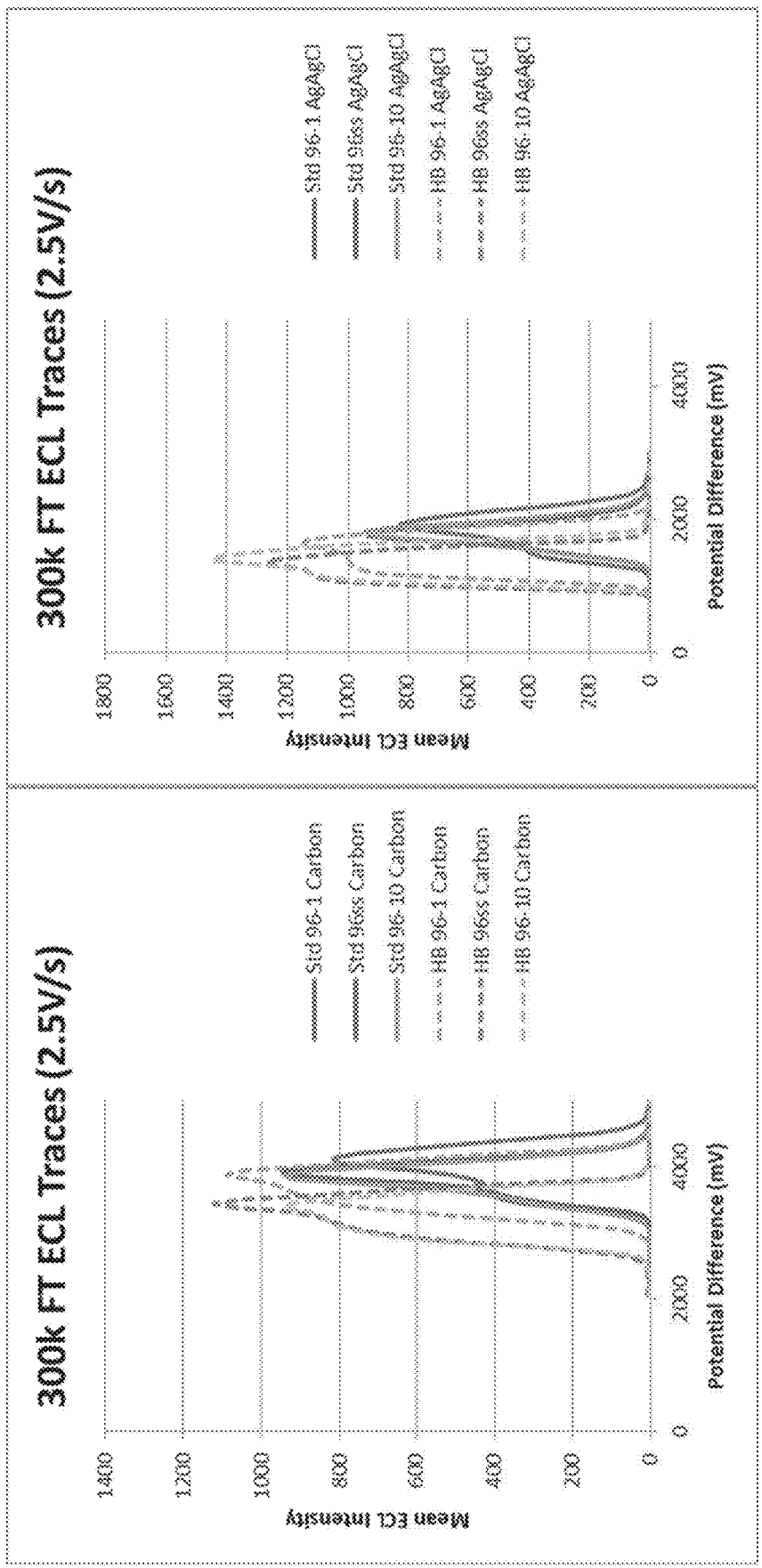
Figures 34A, 34B:
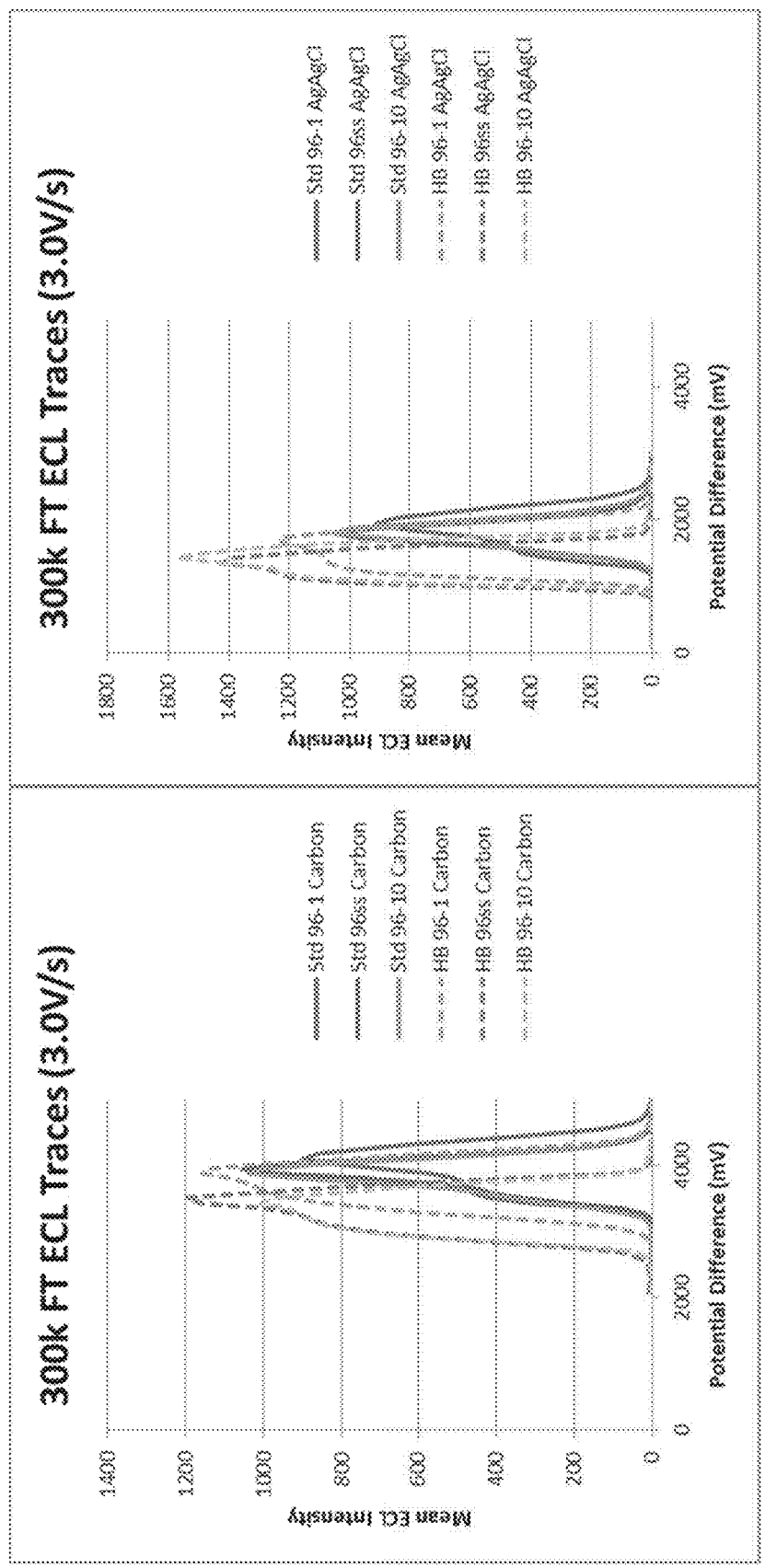

In contrast, with a voltage ramp in ECL applications, there are periods of time when voltage is applied but ECL is not generated (e.g., a portion of the beginning of the ramp and/or a portion at the end of the ramp). For example, as described below in further detail, FIGS. 29 and 30 (using carbon-based and Ag/AgCl-based electrodes, respectively) illustrate a 3 second ramp time (1.0 V/s) applied to the electrodes. With this waveform, there are periods of time in which ECL is not being generated despite a potential being applied. Put another way, when applying a ramp waveform, there are percentages of the overall waveform duration (e.g., 5%, 10%, 15%, etc.) for which ECL is not generated for which a potential is being applied. Those percentages may vary based on several factors, including types of materials used to form the electrodes, relative and absolute sizes of electrodes, etc. FIGS. 29 and 30 illustrate non-limiting, exemplary examples of specific percentages for which ECL was not generated for this particular ramp waveform.

In any of the embodiments described above, the utilization of working electrode zones 104 with different sizes and configuration provides various advantages for the assay apparatus 900. For ECL applications, the optimal working electrode sizes and locations may depend on the exact nature of the application and they type of light detector used for detecting ECL. In binding assays employing binding reagents immobilized on the working electrodes, binding capacity and binding efficiency and speed will generally increase with increasing size for the working electrode zones. For ECL instruments employing imaging detectors (e.g., CCD or CMOS devices), the benefits of larger working electrode zones on binding capacity and efficiency may be balanced by improved sensitivity of these devices in terms of total number of photons, when the light is generated at smaller working electrode zones, and is imaged on a smaller number of imaging device pixels. The position of the working electrode zones 104 may have an impact on the performance of the assay apparatus 900. In some embodiments, spot location, size, and geometry may affect the amount of reflection, scatter or loss of photons on the well sidewalls and influence both the amount of the desired light that is detected, as well as the amount of undesired light (e.g., stray light from adjacent working electrode zones or wells) that is detected as having come from a working electrode zone of interest. In some embodiments, the performance of the assay apparatus 900 may be improved by having a design with no working electrode zone 104 located in the center of a well 200 as well as having the working electrode zones 104 located a uniform distance from the center of the well 200. In some embodiments, the one or more working electrode zones 104 being positioned at radially symmetric positions within the well 200 may improve operation of the assay apparatus 900 because optical light collection and meniscus interaction is the same for all of the one or more working electrode zones 104 in the well 200, as discussed above. The one or more working electrode zones 104 being arranged in at a fixed distance (e.g., circle pattern) allows the assay apparatus to utilize shortened pulsed waveforms, e.g., reduced pulse width. In embodiments, a design in which the one or more working electrode zones 104 have a nearest neighbor as the one or more auxiliary electrodes 102 (e.g., no working electrode zone interposed between) improves the performance of the assay apparatus 900.

In embodiments, as briefly described above, the assay apparatus 900 (e.g., the computer system 906 may be configured to control the voltage/current source 904 to supply voltage and/or current in a pulsed waveform, e.g., direct current, alternating current, DC emulating AC, etc., although other waveforms of varying period, frequency, and amplitude are contemplated as well (e.g., negative ramp sawtooth waveforms, square waveforms, rectangular waveforms, etc. . . . . These waveforms may include various duty cycles as well, e.g., 10%, 20%, 50%, 65%, 90%, or any other percentage between 0 and 100. The computer system 906 may selectively control a magnitude of the pulsed waveform and a duration of the pulsed waveform, as further described below. In an embodiment, as discussed above, the computer system 906 may be configured to selectively provide the pulsed waveform to one or more of the wells 200. For example, the voltage and/or current may be supplied to all of the wells 200. Likewise, for example, a pulsed waveform may be supplied to selected wells 200 (e.g., on an individual or sector basis, such as a grouping of a subset of well—e.g., 4, 16, etc.). For example, as discussed above, the wells 200 may be individually addressable, or addressable in groups or subsets of two or more wells. In an embodiment, the computer system 906 may also be configured to selectively provide the pulsed waveform to one or more of the working electrode zones 104 and/or the auxiliary electrodes 102 in as the manner described above (e.g., individually addressable or addressable in groups of two or more auxiliary electrodes). For example, the pulsed waveform may be supplied to all the working electrode zones 104 within a well 200 and/or addressed to one or more selected working electrode zones 104 within a well 200. Likewise, for example, the pulsed waveform may be supplied to all the auxiliary electrodes 102 and/or addressed to one or more selected auxiliary electrodes 102.

Figure 11:
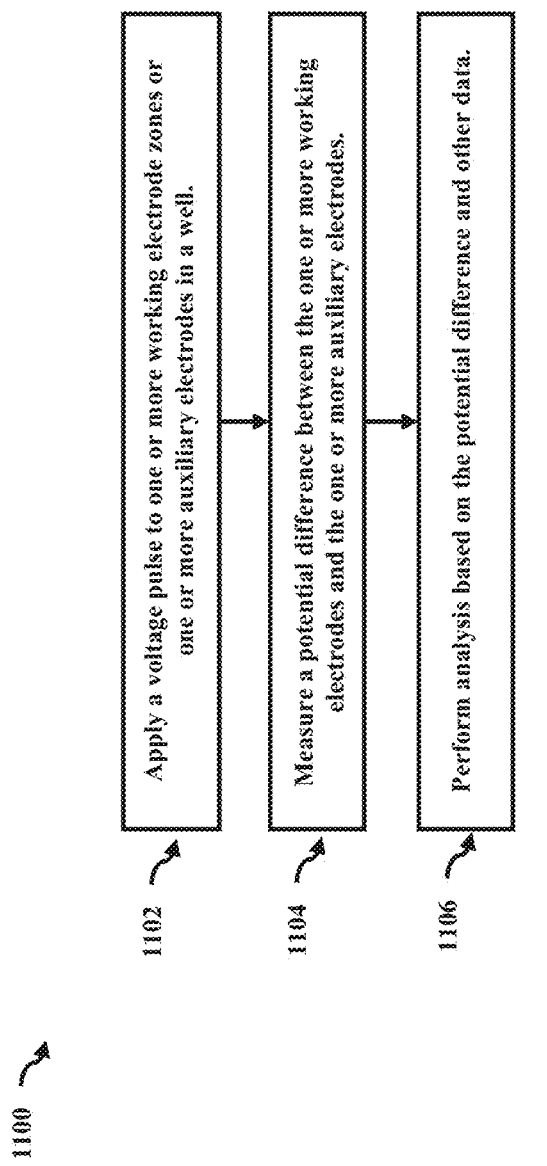
FIG. 11 illustrates a process of performing an electrochemical analysis and procedures using pulsed waveforms, according to embodiments disclosed herewith.

In embodiments, a pulsed waveform supplied by a voltage/current source 904 may be designed to improve electrochemical analysis and procedures of the assay apparatus 900. FIG. 11 depicts a flow chart showing a process 1100 for operating an assay apparatus using pulsed waveforms, in accordance with an embodiment hereof.

In an operation 1102, the process 1100 includes applying a voltage pulse to one or more working electrode zones 104 or one or more auxiliary electrodes 102 in a well. For example, the computer system 906 may control the voltage/current source 904 to supply a voltage pulse to one or more working electrode zones 104 or one or more auxiliary electrodes 102.

Figure 12:
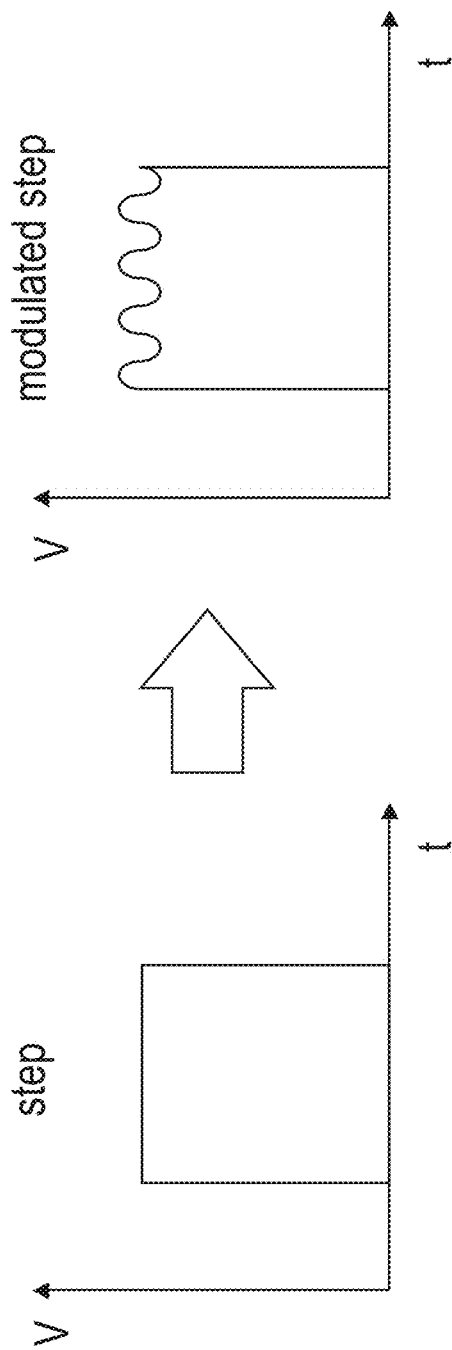
FIGS. 12A and 12B illustrate examples of a pulsed waveform, according to embodiments disclosed herewith.
Figure 16:
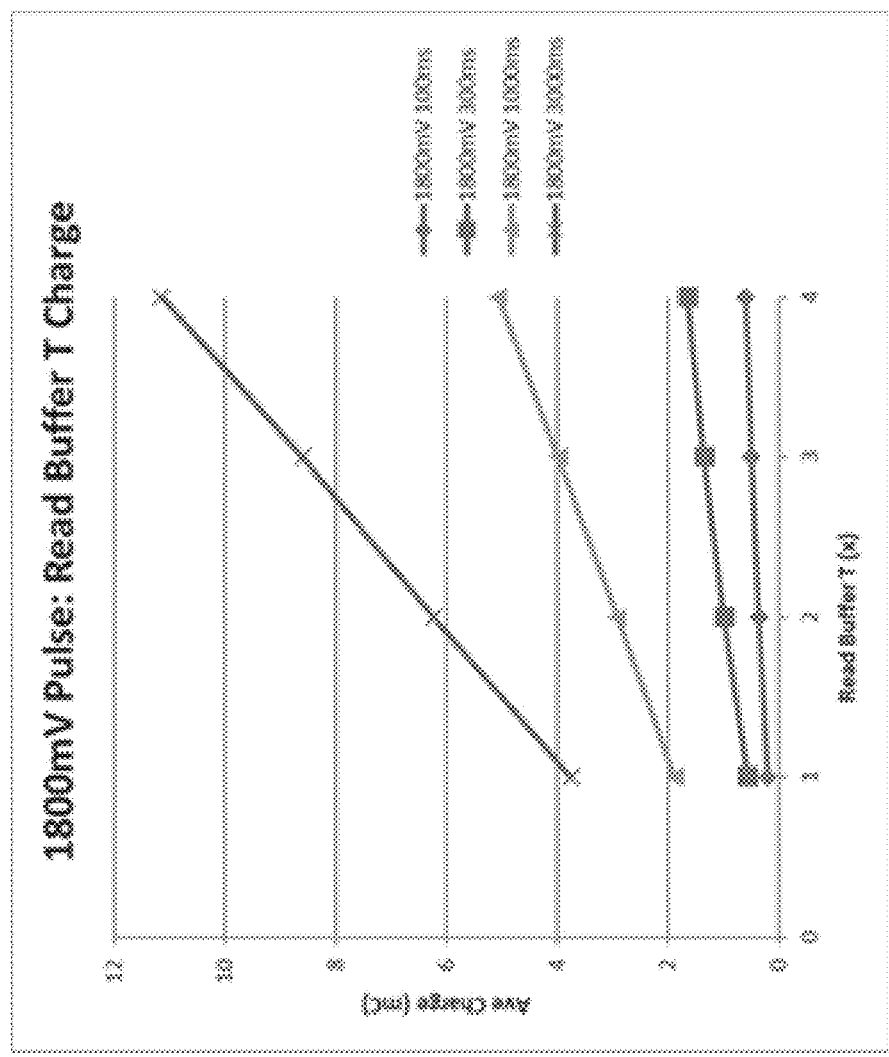
Figure 17:
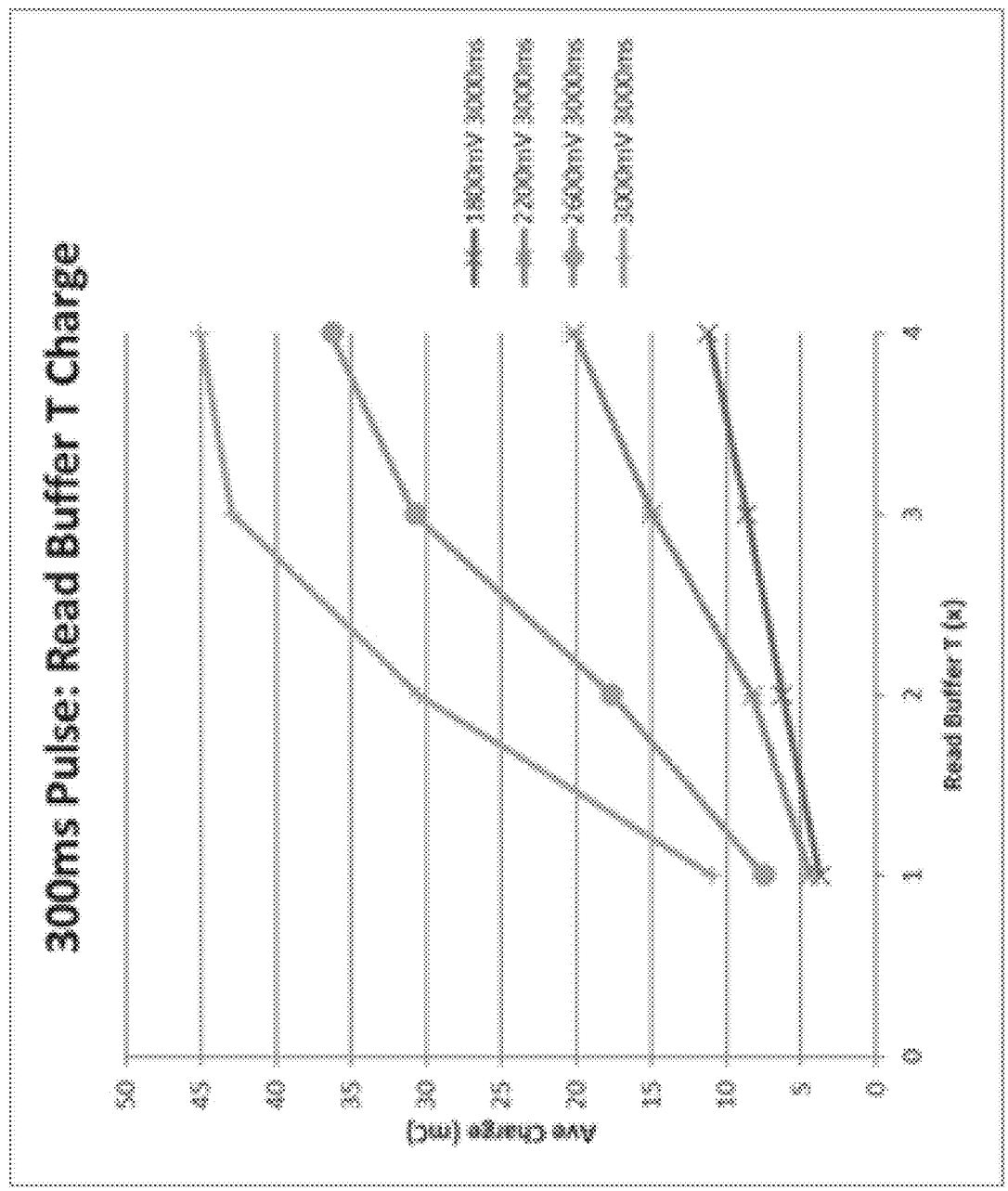

In embodiments, the pulsed waveform may include various waveform types, such as direct current, alternating current, DC emulating AC, etc., although other waveforms of varying period, frequency, and amplitude are contemplated as well (e.g., negative ramp sawtooth waveforms, square waveforms, rectangular waveforms, etc. . . . . These waveforms may include various duty cycles as well, e.g., 10%, 20%, 50%, 65%, 90%, or any other percentage between 0 and 100. FIGS. 12A and 12B illustrate two examples of a pulsed waveform. As illustrated in FIG. 12A, the pulsed waveform may be a square wave having a voltage, V, for a time, T. Examples of voltage pulses are also described in reference to FIGS. 14A, 14B, 15A-15L, 16 and 17, e.g., 1800 mV at 500 ms, 2000 mV at 500 ms, 2200 mV at 500 ms, 2400 mV at 500 ms, 1800 mV at 100 ms, 2000 mV at 100 ms, 2200 mV at 100 ms, 2400 mV at 100 ms, 1800 mV at 50 ms, 2000 mV at 50 ms, 2200 mV at 50 ms, 2400 mV at 50 ms, etc. As illustrated in FIG. 17, the pulsed waveform may be a combination of two types of waveforms, e.g., a square wave modulated by a sine wave. The resulting ECL signal also modulates with the frequency of the sine wave, thus the assay apparatus 900 may include a filter or lock-in circuitry to focus on the ECL signal that exhibit the frequency of the sine wave and filter out electronic noise or stray light that does not exhibit the frequency of the sine wave. While FIGS. 12A and 12B illustrate examples of a pulsed waveform, one skilled in the art will realize that the pulsed waveform may have any structure in which potential is raised to a defined voltage (or range of voltages) for a predefined period of time. One skilled in the art will realize that parameters for the voltage pulses and pulsed waveforms (e.g., durations, duty cycle, and pulse height in volts) described herein are approximate values and may vary by, for example, +/−5.0% based on conditions such as operating parameters of the voltage/current source.

In an operation 1104, the process 1100 includes measuring a potential difference between the one or more working electrode zones 104 and the one or more auxiliary electrodes 102. For example, the detectors 910 may measure the potential difference between the working electrodes zones 104 and the auxiliary electrodes 102 in the wells 200. In some embodiments, the detectors 910 may supply the measured data to the computer systems 1506.

In an operation 1106, the process 1100 includes performing an analysis based on the measured potential differences and other data. For example, the computer systems 906 may perform the analysis on the potential difference and other data. The analysis may be any process or procedure such as potentiometry, coulometry, voltammetry, optical analysis (explained further below), etc. In embodiments, the use of the pulsed waveform allows specific types of analysis to be performed. For example, many different redox reactions may occur in a sample that is activated when the applied potential exceeds a specific level. By using a pulsed waveform of a specified voltage, the assay apparatus 900 may selectively activate some of these redox reactions and not others.

In one embodiment, the disclosure provided herein may be applied to a method for conducting ECL assays. Certain examples of methods for conducting ECL assays are provided in U.S. Pat. Nos. 5,591,581; 5,641,623; 5,643,713; 5,705,402; 6,066,448; 6,165,708; 6,207,369; 6,214,552; and 7,842,246; and Published PCT Applications WO87/06706 and WO98/12539, which are hereby incorporated by reference.

Figure 13:
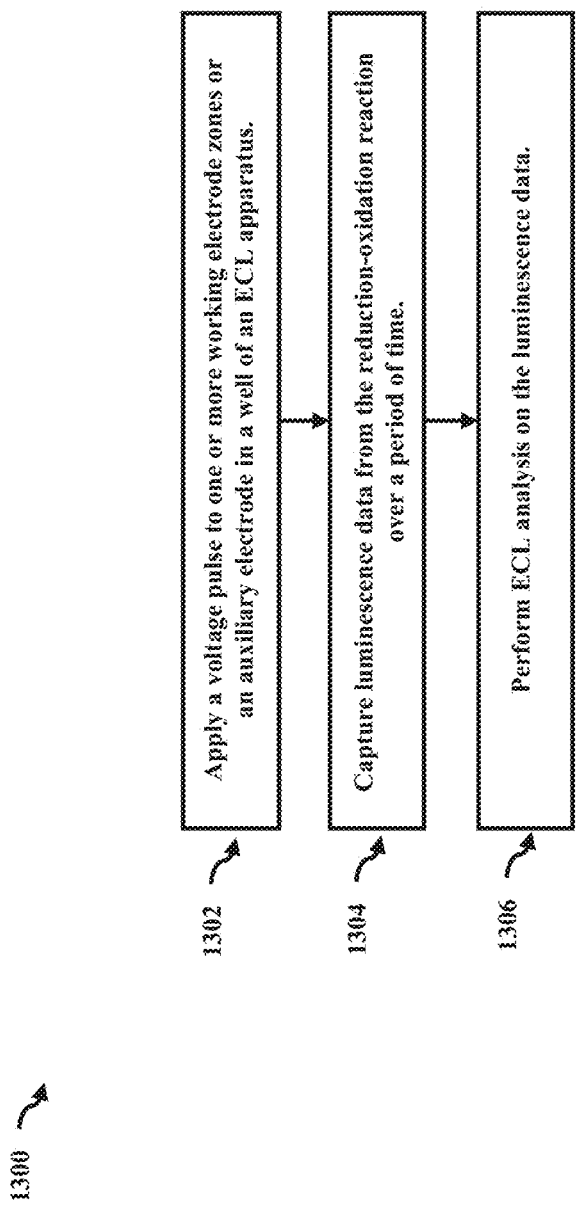
FIG. 13 illustrates a process of performing an ECL analysis and procedures using pulsed waveforms, according to embodiments disclosed herewith.

In embodiments, a pulsed waveform supplied by a voltage/current source 904 may be designed to improve the ECL emitted during ECL analysis. For example, the pulsed waveform may improve the ECL emitted during ECL analysis by providing a stable and constant voltage potential thereby producing a stable and predictable ECL emission. FIG. 13 depicts a flow chart showing a process 1300 for operating an ECL apparatus using pulsed waveforms, in accordance with an embodiment hereof.

In an operation 1302, the process 1300 includes applying a voltage pulse to one or more working electrode zones 104 or an auxiliary electrode 102 in a well of an ECL apparatus. For example, the computer system 906 may control the voltage/current source 904 to supply a voltage pulse to one or more working electrode zones 104 or the one or more auxiliary electrodes 102. In embodiments, the one or more auxiliary electrodes 102 may include a redox couple where, when a voltage or potential is applied, a reaction of a species in the redox couple is a predominant redox reaction occurring at the one or more auxiliary electrodes 102. In some embodiments, the applied potential is less than a defined potential required to reduce water or perform electrolysis of water. In some embodiments, less than 1 percent of current is associated with the reduction of water. In some embodiments, less than 1 of current per unit area (exposed surface area) of the one or more auxiliary electrodes 102 is associated with the reduction of water.

In embodiments, the pulsed waveform may include various waveform types, such as direct current, alternating current, DC emulating AC, etc., although other waveforms of varying period, frequency, and amplitude are contemplated as well (e.g., negative ramp sawtooth waveforms, square waveforms, rectangular waveforms, etc. FIGS. 12A and 12B discussed above illustrate two examples of pulsed waveforms. The pulsed waveform may be a square wave having a voltage, V, for a time, T. Examples of voltage pulses are also described in reference to FIGS. 14A, 14B, 15A-15L, 16 and 17, e.g., 1800 mV at 500 ms, 2000 mV at 500 ms, 2200 mV at 500 ms, 2400 mV at 500 ms, 1800 mV at 100 ms, 2000 mV at 100 ms, 2200 mV at 100 ms, 2400 mV at 100 ms, 1800 mV at 50 ms, 2000 mV at 50 ms, 2200 mV at 50 ms, 2400 mV at 50 ms, etc. These waveforms may include various duty cycles as well, e.g., 10%, 20%, 50%, 65%, 90%, or any other percentage between 0 and 100.

In an operation 1304, the process 1300 includes capturing luminescence data from the electrochemical cell over a period of time. For example, the one or more photo-detectors 912 may capture luminescence data emitted from the wells 200 and communicate the luminescence data to the computer system 906. In an embodiment, the period of time may be selected to allow the photo-detectors collect the ECL data. In some embodiments, the one or more photo-detectors 912 may include a single camera that captures images of all the wells 200 of the multi-well plate 208 or multiple cameras that capture image of a sub-set of the wells 200. In some embodiments, each well 200 of the multi-well plate 200 may include a camera that captures images of the well 200. In some embodiments, each well 200 of the multi-well plate 200 may include multiple cameras that capture images of a single working electrode zone 104 or a sub-set of the working electrodes zones 104 in each well 200. Accordingly, the assay apparatus 900 may provide flexibility because the camera may capture all the light from multiple working electrode zones 104, and the computer system 906 may use imaging processing to resolve the luminesce data for each working electrode zone 104. As such, the assay apparatus 900 may operate in various modes, for example, in a singleplex mode (e.g., 1 working electrode zone), 10-plex mode (e.g., all working electrodes zones 104 for a 10-working electrode zone well 200), or multiplex mode in general (e.g., a subset of all working electrode zones, including within a single well 200 or among multiple wells 200 at the same time, such as 5 working electrode zones 104 for multiple 10 working electrode zone wells at simultaneously.)

In some embodiments, an assay apparatus 900 may include a photodiode corresponding to each well 200 of the multi-well plate 200 for detecting and measuring photons emitted in the well 200. In some embodiments, an assay apparatus 900 may include multiple photodiodes corresponding to each well 200 of the multi-well plate 200 for detecting and measuring photons emitted from a single working electrode zone 104 or a sub-set of the working electrode zones 104 in each well 200. As such, the assay apparatus 900 may operate in various modes. For example, the assay apparatus 900 may apply a voltage and/or current to one or more of the working electrode zones 104 from the multi-well plate 208, for example 5 working electrode zones 104, individually. The working electrode zones 104 may be located within a single well 200, located in different wells 200, and combination thereof. The photodiodes may then sequentially detect/measure the light coming from each of the 5 working electrode zones 104. For instance, a voltage and/or current may be applied to a first of the 5 working electrode zones 104 and the emitted photons may be detected and measured by a corresponding photodiode. This may be repeated sequentially for each of the 5 working electrode zones 104. Likewise, in this example, sequential mode of operation may be performed for working electrode zones 104 within the same well 200, may be performed for working electrode zones 104 located in different wells 200, may be performed for working electrode zones 104 located with sub-sets or "sectors" of wells 200, and combinations thereof. Likewise, in some embodiments, the assay apparatus 900 may operate in a multiplex mode in which one or more working electrode zones 104 are activated simultaneously by the application of a voltage and/or current, and the emitted photons may be detected and measured by multiple photodiodes to multiplex. The multiplex mode of operation may be performed for working electrode zones 104 within the same well 200, may be performed for working electrode zones 104 located in different wells 200, may be performed for working electrode zones 104 located with sub-sets or "sectors" of wells 200 from the multi-well plate 208, combinations thereof. FIGS. 14A, 14B, 15A-15L, 16 and 17 below show tests of several waveforms utilized in ECL analysis.

In embodiments, by applying a pulsed waveform to generate ECL, read time and/or exposure time may be improved by more quickly and efficiently generating, collecting, observing, and analyzing ECL data. Further, various exposure approaches may be employed (e.g., single exposure, dual exposure, triple exposure (or greater)) that can utilize disparate exposure times (or equal exposure times) to improve ECL collection, collecting, observing, and analysis by improving, for example, the dynamic range extension (DRE), binning, etc. For example, as discussed above, the utilization of the one or more auxiliary electrodes 102 improves the operation of the assay apparatus 900. In some embodiments, the utilization of the one or more auxiliary electrodes 102 improves read times for the detectors 910. For example, the use of Ag/AgCl in the one or more auxiliary electrodes 102 improves read times of ECL for several reasons For example, the use of an electrode (e.g., an auxiliary electrode 102) having a redox couple (in this particular embodiment, Ag/AgCl) can provide a stable interfacial potential to allow electrochemical analysis processes to utilize voltage pulses, rather than voltage ramps. The use of voltage pulses improves the read times because the entire pulsed waveform can be applied at a voltage potential that generates the ECL throughout the entire duration of the waveform. Moreover, "Time-resolve," or sequential mode has the added benefit of permitting adjustments to the ECL image collection (e.g., adjusting binning to adjust dynamic range, etc.) Further, as discussed above, the assay apparatus 900 (e.g., the computer system 906) may be configured to utilize such data for different voltage pulses to delay the activation of sequential working electrode zones 104. As such, an implementation of a delay allows the assay apparatus 900 to minimize cross-talk between working electrode zones 104 and/or wells 200, have high throughput in performing ECL operations, etc.

In an operation 1306, the process 1300 includes performing ECL analysis on the luminescence data. For example, the computer systems 906 may perform the ECL analysis on the luminescence data. In some embodiments, luminescence data, e.g., signals, arising from a given target entity on a binding surface of the working electrode zones 104 and/or auxiliary electrode 102, e.g., binding domain, may have a range of values. These values may correlate with quantitative measurements (e.g., ECL intensity) to provide an analog signal. In other embodiments, a digital signal (yes or no signal) may be obtained from each working electrode zone 104 to indicate that an analyte is either present or not present. Statistical analysis may be used for both techniques and may be used for translating a plurality of digital signals so as to provide a quantitative result. Some analytes may require a digital present/not present signal indicative of a threshold concentration. Analog and/or digital formats may be utilized separately or in combination. Other statistical methods may be utilized, for example, technique to determine concentrations through statistical analysis of binding over the concentration gradient. Multiple linear arrays of data with concentration gradients may be produced with a multiplicity of different specific binding reagents being used in different wells 200 and/or with different working electrode zones 104. The concentration gradients may consist of discrete binding domains presenting different concentrations of the binding reagents.

In embodiments, control assay solutions or reagents, e.g., read buffers, may be utilized on the working electrode zones of the wells 200. The control assay solutions or reagents may provide uniformity to each analysis to control for signal variation (e.g., variations due to degradations, fluctuations, aging of the multi-well plate 208, thermal shifts, noise in electronic circuitry and noise in the photodetection device, etc.) For example, multiple redundant working electrode zones 104 (containing identical binding reagents or different binding reagents that are specific for the same analyte) for the same analyte may be utilized. In another example, analytes of known concentration may be utilized or control assay solutions or reagents may be covalently linked to a known quantity of an ECL label or a known quantity of ECL label in solution is used.

In embodiments, the data collected and produced in the process 1300 may be utilized in a variety of applications. The data collected and produced may be stored, e.g., in the form of a database consisting of a collection of clinical or research information. The data collected and produced may also be used for rapid forensic or personal identification. For example, the use of a plurality of nucleic acid probes when exposed to a human DNA sample may be used for a signature DNA fingerprint that may readily be used to identify clinical or research samples. The data collected and produced may be used to identify the presence of conditions (e.g., diseases, radiation level, etc.), organisms (e.g., bacteria, viruses, etc.), and the like.

The above describes an illustrative flow of an example process 1300. The process as illustrated in FIG. 13 is exemplary only, and variations exist without departing from the scope of the embodiments disclosed herein. The steps may be performed in a different order than that described, additional steps may be performed, and/or fewer steps may be performed, as described above. In embodiments, the use of the pulsed waveform in combination with auxiliary electrodes produces various advantages to ECL assays. The auxiliary electrodes allows luminescence to be generated quicker without the use of a ramp.

Figures 14A, 14B:
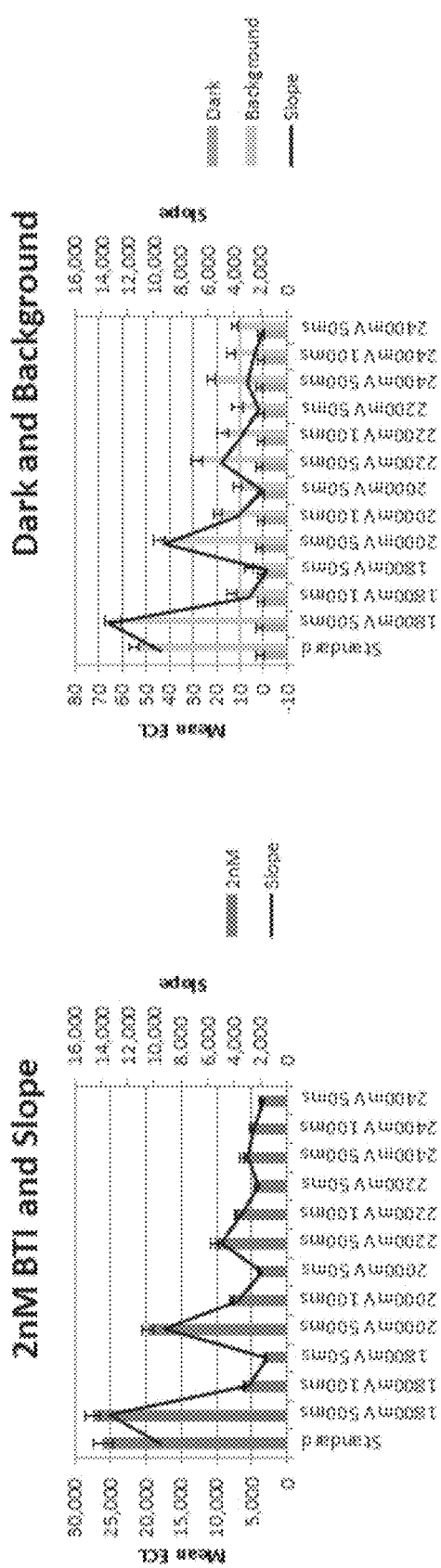
FIGS. 14A-14C 15A-15L, 16 and 17 illustrate ECL test results performed using pulsed waveforms, according to embodiments disclosed herewith.
Figure 14C:
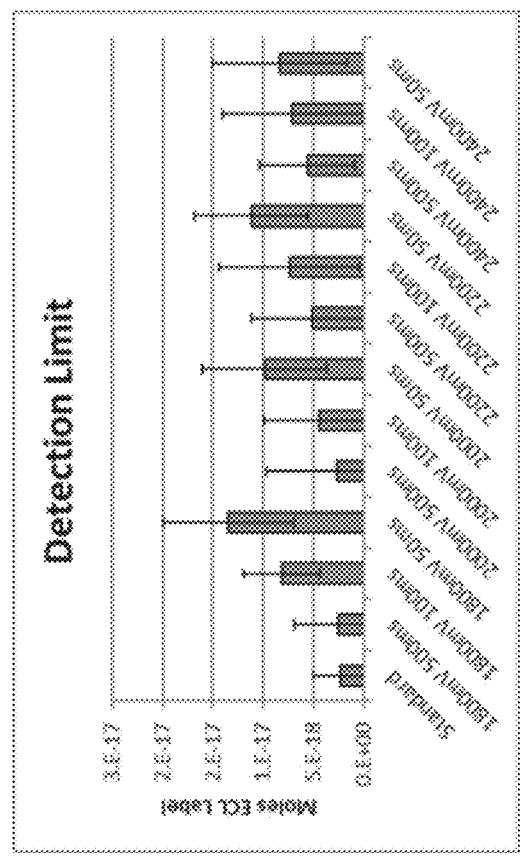
Figure 15B:
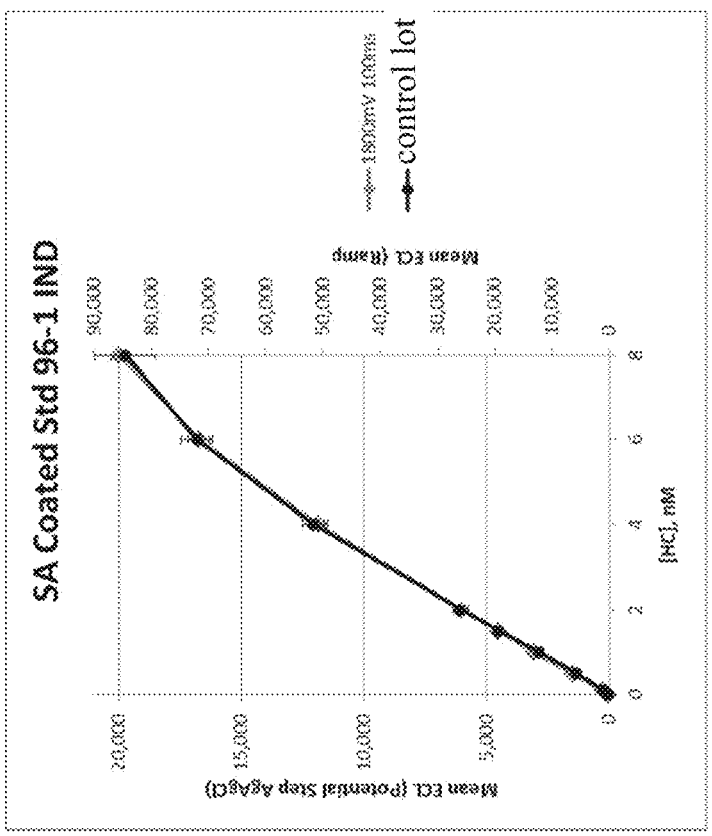
Figure 15A:
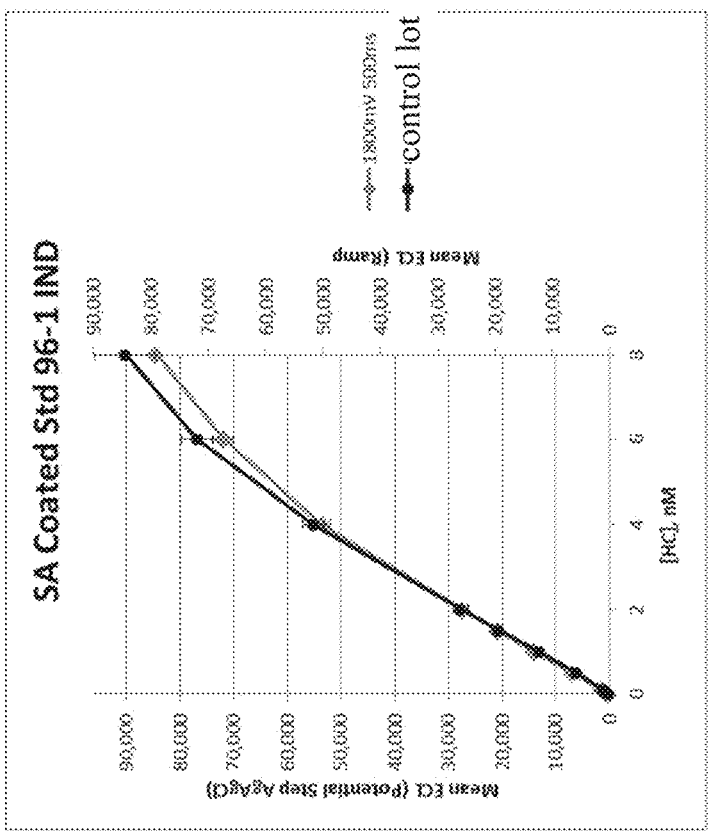
Figure 15D:
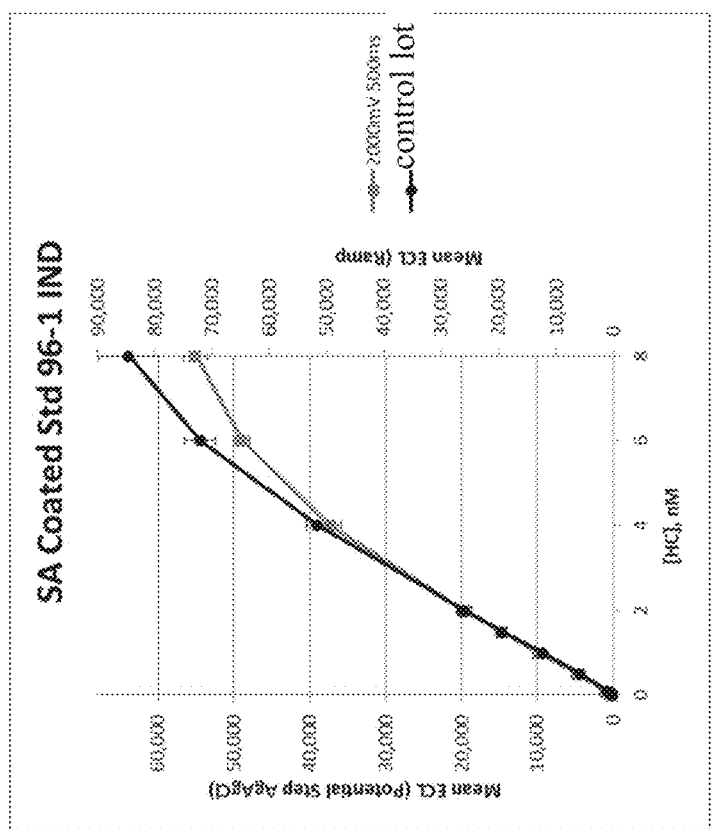
Figure 15C:
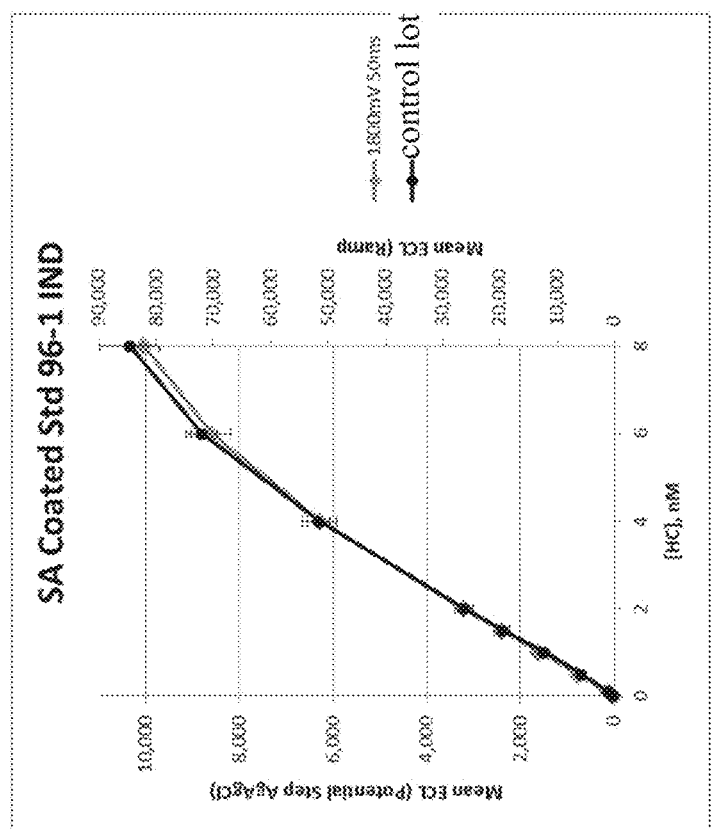
Figure 15F:
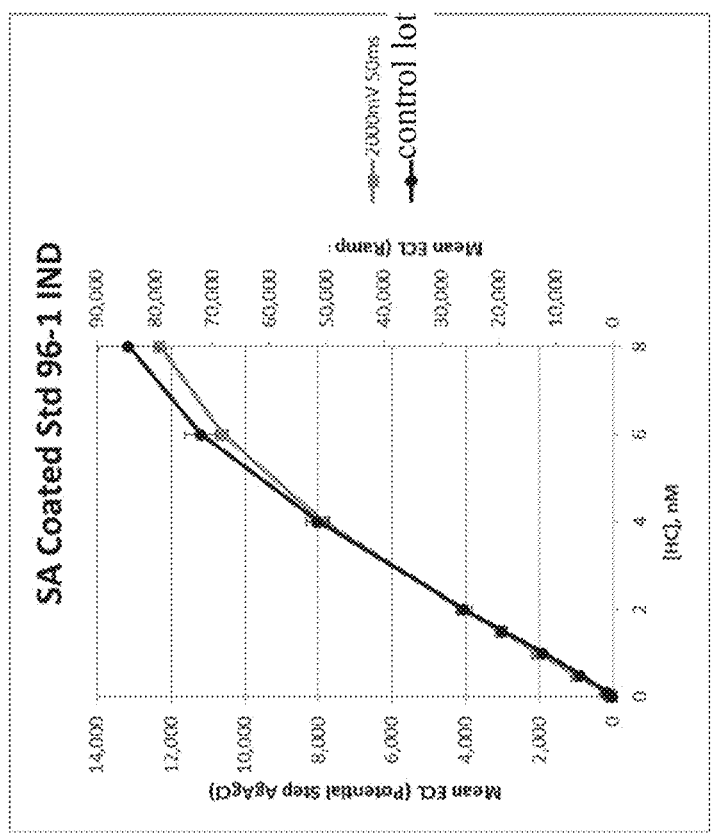
Figure 15E:
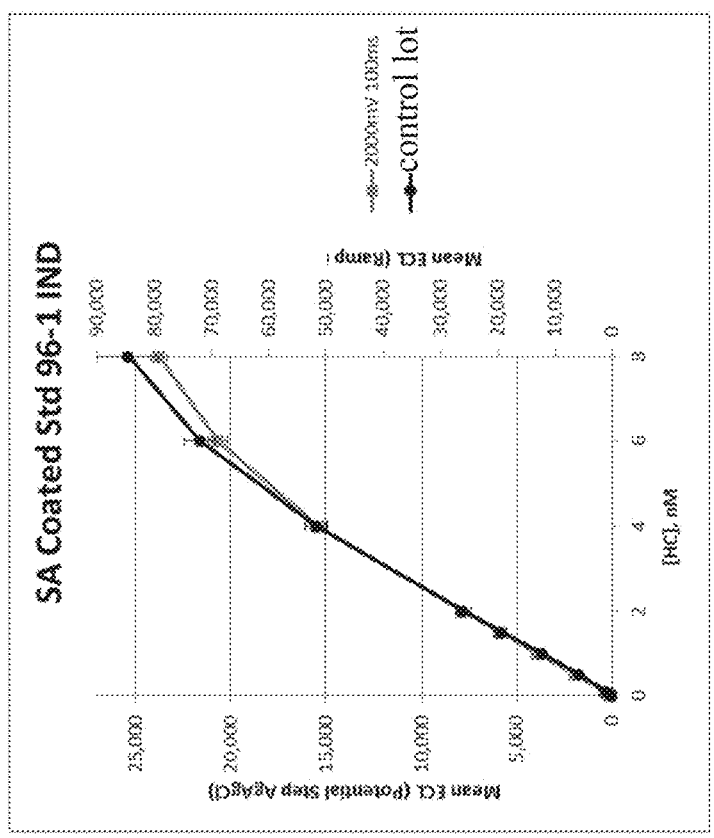
Figure 15H:
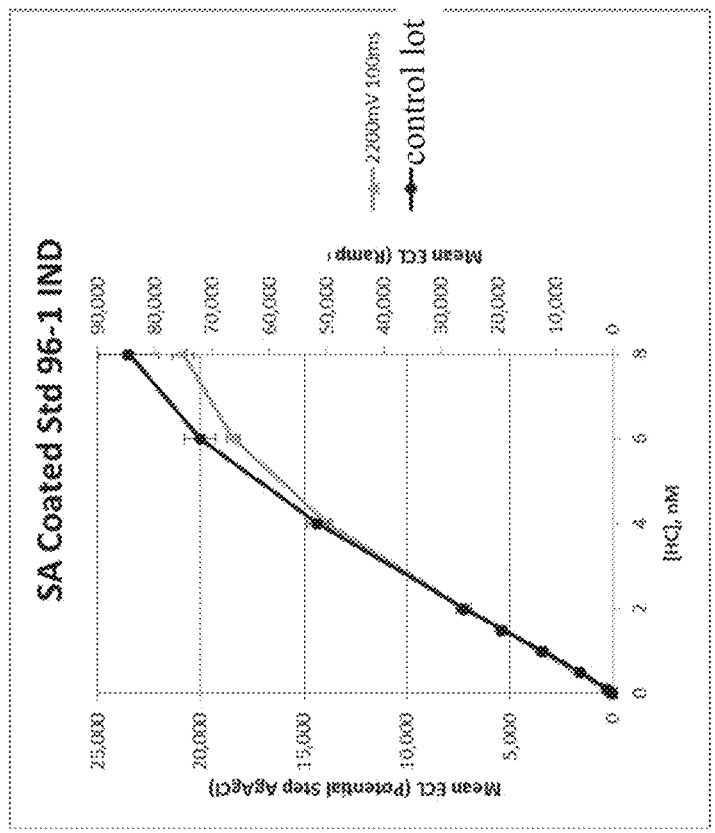
Figure 15G:
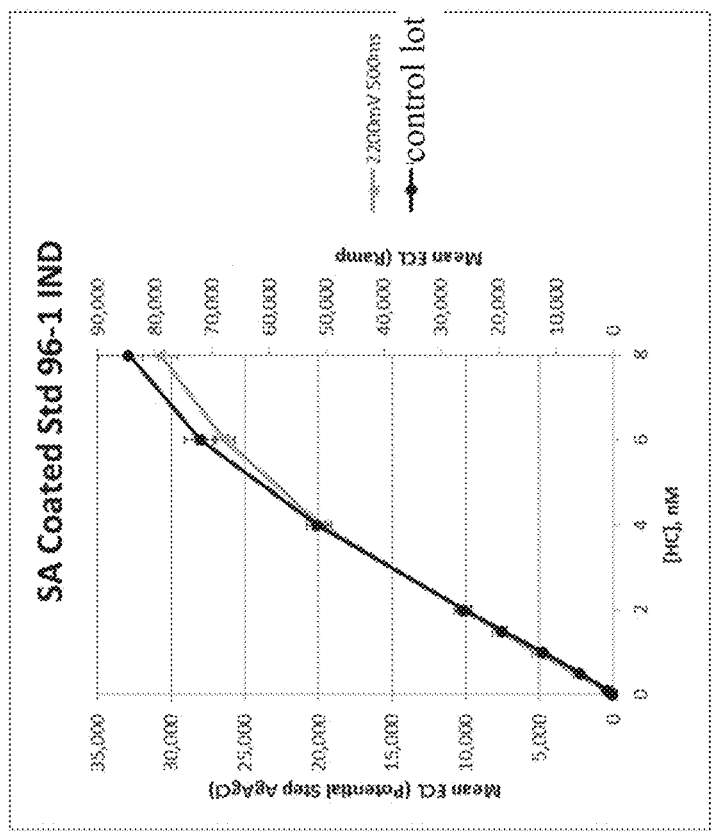
Figure 15J:
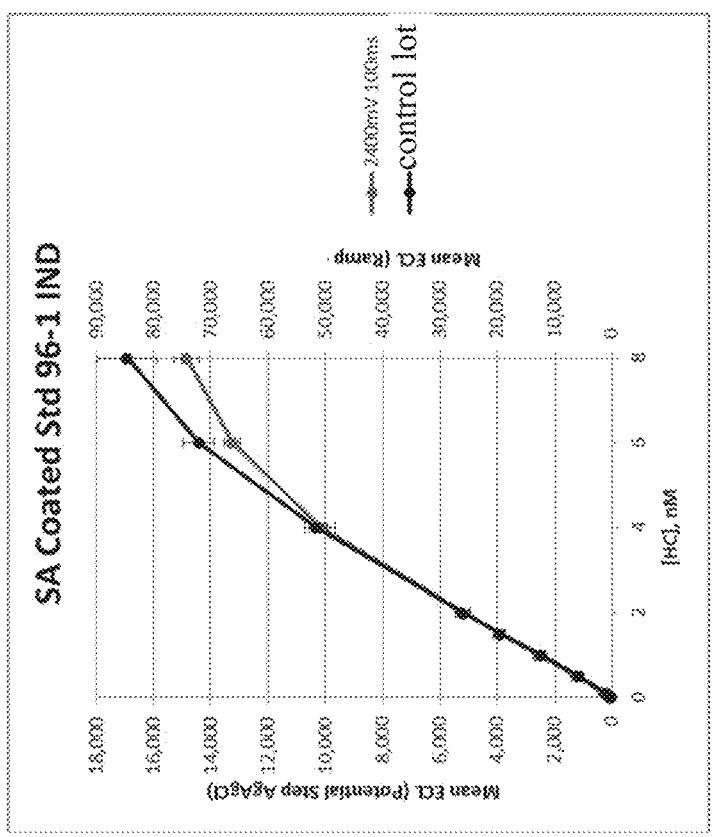
Figure 15I:
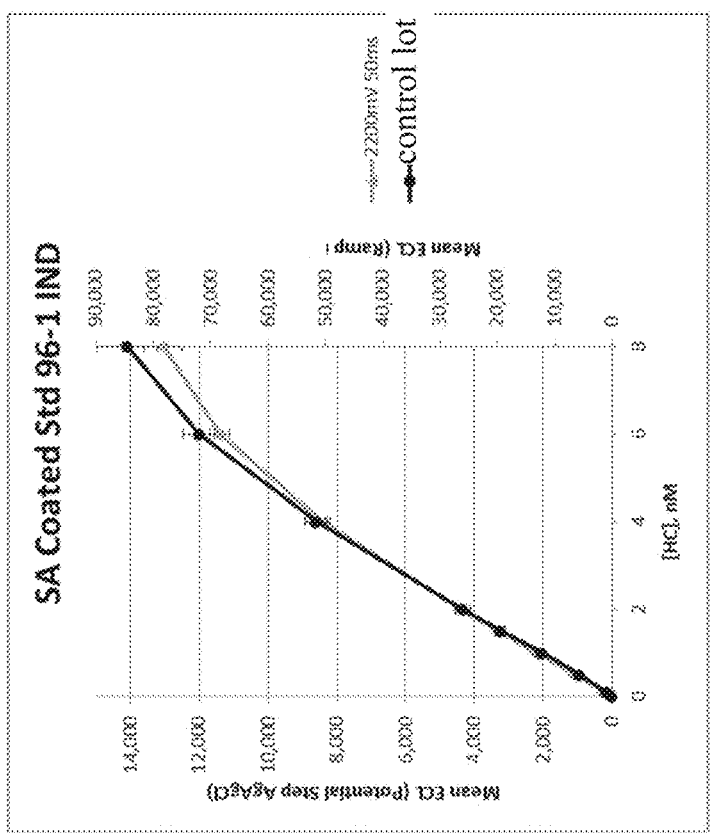
Figure 15K:
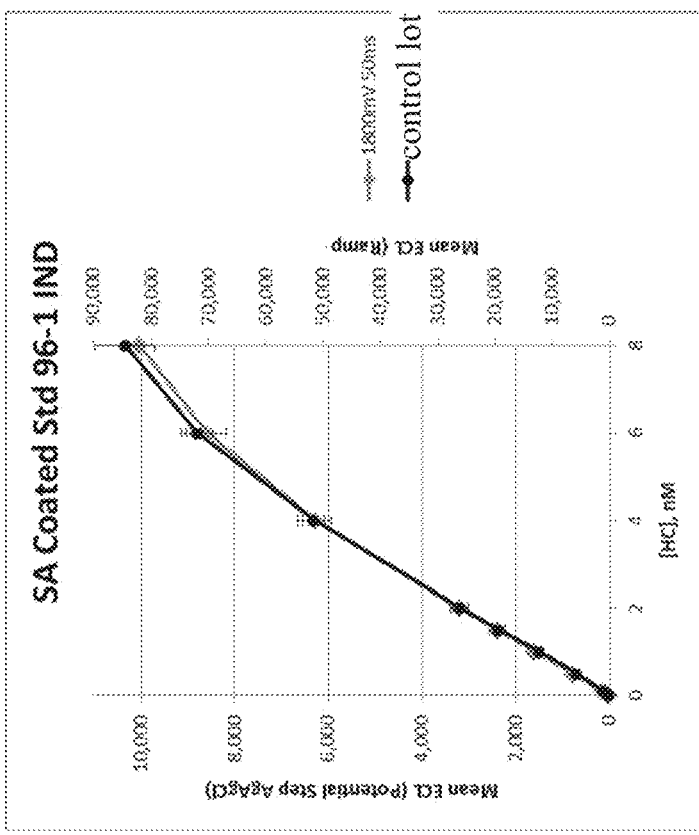
Figure 15L:
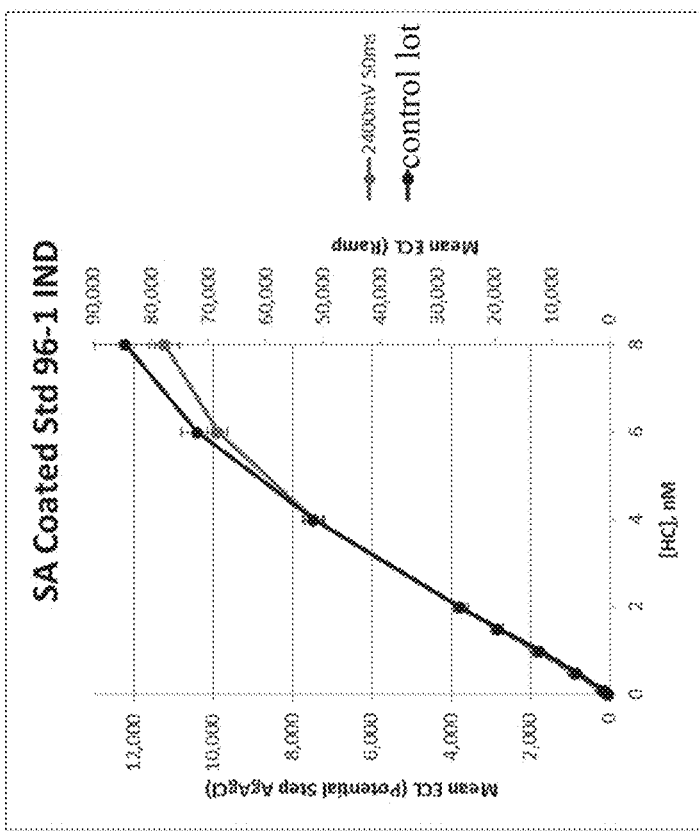

FIGS. 14A-14C, 15A-15L, 16 and 17 are graphs that show the results of ECL analysis using various pulsed waveforms. FIGS. 15A-15L show raw data plotted vs. BTI concentrations for a model binding assay using the various pulsed waveforms. FIGS. 15A-15L show a comparison between the use of a pulsed waveform applied to wells using Ag/AgCl auxiliary electrodes (labeled according to the pulse parameters) and the use of a ramped waveform (1 s at 1.4 V/s) as applied to wells using carbon electrodes as a control (labeled as control lot). FIGS. 14A-14C summarize the performance of the model binding assay according to the various pulsed waveforms as shown in FIGS. 15A-15L. FIGS. 16 and 17 are discussed in greater detail below. In these tests, a model binding assay was used to measure the effects of ECL-generation conditions on the amount of ECL generated from a controlled amount of ECL-labeled binding reagent, bound through a specific binding interaction to a working electrode zone. In this model system, the ECL-labeled binding reagent was an IgG antibody that was labeled with both biotin and an ECL label (SULFO-TAG, Meso Scale Diagnostics, LLC.). Varying concentrations of this binding reagent (referred to as "BTI" or "BTI HC" for BTI high control) were added to wells of 96-well plates having an integrated screen printed carbon ink working electrode with an immobilized layer of streptavidin in each well. Two types of plates were used, the control plate was an MSD Gold 96-well Streptavidin QuickPlex plate with a screen printed carbon ink counter electrode (Meso Scale Diagnostics, LLC.); the test plate was analogous in design but had a screen printed Ag/AgCl auxiliary electrode in the place of the counter electrode. The plates were incubated to allow the BTI in the wells to bind to the working electrodes through a biotin-streptavidin interaction. After completing the incubation, the plates were washed to remove free BTI and an ECL read buffer (MSD Read Buffer Gold, Meso Scale Diagnostics, LLC.) was added and the plate was analyzed by applying a defined voltage wave form between the working and auxiliary electrodes and measuring the emitted ECL. The Ag:AgCl ratio in the auxiliary electrode ink for the test plate was approximately 50:50. Twelve waveforms were employed using 4 different potentials (1800 mV, 2000 mV, 2200 mV, and 2400 mV) at 3 different times or pulse widths (500 ms, 100 ms, and 50 ms). One test plate was tested for each waveform. A control plate was tested using a standard ramp waveform.

Assay performance data was determined and calculated for the plates tested with each waveform. The mean, standard deviation, and % CV were calculated for each sample and are plotted as data points with error bars. The signals measured for BTI solutions ranging from 0 (a blank sample to measure assay background) to 2 nM were fitted linearly (slope, Y-intercept, and $R^2$ were calculated.) A detection limit was calculated based upon the mean background+/−3*standard deviations ("stdev") and the linear fit of the titration curve (shown in FIG. 14C). Signals were also measured for 4, 6, and 8 nM BTI solutions. These signals were divided by the extrapolated signals from the linear fit of the titration curve (this ratio can be used to estimate the binding capacity of the streptavidin layer on the working electrode; ratios significantly less than one indicate that the amount of BTI added is near to or greater than the binding capacity). The ratio of the slope from the production control lot to the slope from each test plate was calculated. FIG. 14A shows the results of these calculations for each pulsed waveform. Each of the graphs in FIGS. 15A-15L illustrates mean ECL data collected for a ramped voltage applied to a multi-well plate with carbon counter electrodes from a control lot and a different voltage pulse applied to an multi-well plate using Ag/AgCl auxiliary electrodes. FIGS. 14A-14C provide summaries of the data shown in FIG. 15A-15L.

Additionally, signal, slope, background, and dark analysis (e.g., signal produced with no ECL) was performed. A plot of the 2 nM signals (with 1stdev error bars) and slope was prepared. A bar graph of the background and dark (with 1stdev error bars) and slope was prepared. FIG. 14B shows these results. As illustrated in FIGS. 14A and 14B, a pulsed voltage of 1800 mV for 500 ms proceeds the highest mean ECL reading. As shown in FIGS. 14A and 14B, the magnitude and/or the duration of the pulsed waveform affects the ECL signal measured. The change in 2 nM signal with waveform mirrors the change in slope. The change in the background also mirrors the change in slope. The signal, background, and slope decreased with decreasing pulse duration. The signal, background, and slope decreased with increasing pulse potential. The change in signal, background, and slope with decreasing time diminished with increasing pulse potential. The concurrent changes in signal, background, and slope with the various pulse potentials and durations resulted in little to no change in assay sensitivity. The signal, background, and slope decreased with decreasing pulse duration. The signal, background, and slope decreased with increasing pulse potential. The change in signal, background, and slope with decreasing time diminished with increasing pulse potential. The concurrent changes in signal, background, and slope with the various pulse potentials and durations resulted in little to no change in assay sensitivity.

Also, titration curves were analyzed for each of the pulsed waveforms. Plots of the mean ECL signals vs. BTI concentration were prepared. Error bars based upon 1 stdev were included. The titration curve from the test plate is plotted on the primary y-axis. The titration curve was plotted on the secondary y-axis. The scale for the secondary y-axes was 0-90,000 counts ("cts") of number of detected photons. The scale for the primary y-axes was set to 90,000 divided by the ratio of the slopes. The ratio of the slope to the slope from each test plate was calculated. FIGS. 15A-15L show the results of these calculations for each pulsed waveform.

For the background, dark, and dark noise; the dark (1 & 2cts) and dark noise (2cts) were essentially unchanged for all waveform times tested. Background decreased with decreasing pulse duration. Background decreased with increasing applied pulse potential. The change in background with decreasing time diminished with increasing pulse potential. The background from 1800 mV for 50 ms was 6±2cts, just above the dark+dark noise.

As shown in FIGS. 15A-15L, the % CVs were comparable for all test plates and a reference signal for all signals (8 replicates) except for background. The CVs for the backgrounds increased as the background signal approached the dark and dark noise. Backgrounds (16 replicates) above 40cts had good CVs: 55 (3.9%), 64 (5.1%), and 44 (5.4%). Below 40cts and the CVs increased above 7%. All titrations from background to 2 nM HC were linearly fitted with $R_2$ values ≥0.999. Decreasing the highest concentration of the fitted range yielded decreasing slopes and increasing y-intercepts. This suggests a non-linearity at the low end of the titration curve (likely caused by the different dilutions in the test samples). The y-intercepts for the other assays were essentially between zero and the measured background. All assays yielded lower signals than linear for 6 and 8 nM HC; these decreased binding capacities were similar for all assays. All assays yielded 4 nM signals within 2 stdevs of the extrapolated 4 nM signal. The assay signals after correction with the ratio of production control lot slope and test plate slope were within 3 stdevs of those from the production control lot for 1 nM to 4 nM HC. Below 1 nM HC the corrected signals were higher than those from the production control lot. Between 0.0125 and 0.5 nM HC, the corrected signals from the test plates were within 3 stdevs of each other. The corrected signal for the assays run, with the same BTI solutions, were within 3 stdevs of each other between 0.0125 nM and 4 nM HC. As shown in the plots, the performance of the assays measured with different pulse potentials and durations was within this variability of the performance of the control assay measured with a ramp.

As may be seen by a comparison of FIGS. 15A-15L and 14A and 14B, the signal and slope decreased with decreasing pulse duration (500 ms, 100 ms, and 50 ms). The signal and slope decreased with increasing pulse potential (1800 mV, 2000 mV, 2200 mV, and 2400 mV). The change in signal and slope with decreasing pulse duration diminished with increasing pulse potential. A correction factor (ratio of slopes) may correct the change in signal with the change in waveform. The calculated detection limits were similar for 11 of these waveforms (0.005 nM to 0.009 nM). The calculated detection limit for 1800 mV, 500 ms pulsed waveform was lower (0.0004 nM); likely due to subtle differences in the fits and measured background (and CV).

Example 1—ECL Measurement Instrumentation

Referring now to FIGS. 14A-14C in detail, ECL measurements were carried out in 96-well plates specially configured for ECL assay applications by inclusion of integrated screen-printed electrodes. The basic structure of the plates is similar to the plates described in U.S. Pat. No. 7,842,246 (see, for example, the description of Plate B, Plate C, Plate D and Plate E in Example 6.1), although the designs were modified to incorporate novel elements of the present disclosure. As with the earlier designs, the bottom of the wells are defined by a sheet of mylar with screen printed electrodes on the top surface which provide integrated working and counter electrode surfaces in each well (or, in some embodiments of the present invention, the novel working and auxiliary electrodes). A patterned screen-printed dielectric ink layer printed over the working electrodes defines one or more exposed working electrode zones within each well. Conductive through-holes through the mylar to screen-printed electrical contacts on the bottom surface of the mylar sheet provide the electrical contacts needed to connect an external source of electrical energy to the electrodes.

ECL measurements in the specially configured plates were carried out using specialized ECL plate readers designed to accept the plates, contact the electrical contacts on the plates, apply electrical energy to the contacts and image ECL generated in the wells. For some measurements, modified software was employed to allow for customization of the timing and shape of the applied voltage waveforms.

Exemplary plate readers include the MESO SECTOR S 600 (www.mesoscale.com/en/products_and_services/instrumentation/sector_s_600) and the MESO QUICKPLEX SQ 120 (www.mesoscale.com/en/products_and_services/instrumentation/quickplex_sq_120), both available from Meso Scale Diagnostics, LLC., and the plate readers described in U.S. Pat. No. 6,977,722, issued Dec. 20, 2005, and International Patent Application PCT/US2020/042104, filed Jul. 15, 2020, Titled: "Assay Apparatuses, Methods and Reagents" by Krivoy et al., each of which is incorporated by reference herein in its entirety. Other exemplary devices are described in U.S. patent application Ser. No. 16/513,526, Titled "Graphical User Interface System" by Wohlstadter et al., filed Jul. 16, 2019, and U.S. patent application Ser. No. 16/929,757, Titled "Assay Apparatuses, Methods, and Reagents" by Krivoy et al., filed Jul. 15, 2020, each of which is incorporated by reference herein in its entirety.

Example 2—Rapid Pulsed ECL Measurements

A model binding assay was used to demonstrate the use of rapid pulsed voltage waveforms in combination with Ag/AgCl auxiliary electrodes to generate ECL signals, and to compare the performance with that observed with the conventional combination of slow voltage ramps and carbon counter electrodes. The model binding assay was performed in 96-well plates in which each well had an integrated screen printed carbon ink working electrode region supporting an immobilized layer of streptavidin. These screen printed plates had either screen-printed carbon ink counter electrodes (MSD Gold 96-Well Streptavidin Plate, Meso Scale Diagnostics, LLC.) or plates with an analogous electrode design except for the use of screen-printed Ag/AgCl ink auxiliary electrodes. In this model system, the ECL-labeled binding reagent was an IgG antibody that was labeled with both biotin and an ECL label (SULFO-TAG, Meso Scale Diagnostics, LLC.). Varying concentrations of this binding reagent (referred to as "BTI" or "BTI HC" for BTI high control) in 50 µL aliquots were added to wells of the 96-well plates. The binding reagent was incubated in the well with shaking for sufficient time to be depleted from the assay solution by binding the immobilized streptavidin on the working electrode. The plates were washed to remove the assay solution and then filled with an ECL read buffer (MSD Read Buffer T 2X, Meso Scale Diagnostics, LLC.). The standard waveform (a 1000 ms ramp from 3200 mV to 4600 mV) was applied to a plate with counter electrodes. Twelve constant voltage pulsed waveforms were evaluated on plates with Ag/AgCl auxiliary electrodes; 4 different potentials (1800 mV, 2000 mV, 2200 mV, and 2400 mV) at 3 different times or pulse widths (500 ms, 100 ms, and 50 ms). One plate was tested for each waveform. FIGS. 14A, 14B, and 15A-15L are graphs that show the results of ECL analysis from this study.

Assay performance data was determined and calculated for the plates tested with each waveform. The mean, standard deviation, and % CV were calculated for each sample. FIGS. 15A-15L show plots of the mean signals vs. the concentration of the binding reagent with the signals from the standard waveform plotted on a different y-axis than the signals from the potential pulse. The data points in the lower linear regions of the plots—BTI concentrations ranging from 0 (a blank sample to measure assay background) to 0.1 nM—were fit to a line and the slope, standard error in the slope, Y-intercept, standard error in the Y-intercept, and $R^2$ value were calculated. All linear fits had $R^2$ values $\geq 0.999$. FIGS. 14A and 14B show the 2 nM mean signal, the 0 nM (assay background) mean signal, and the mean dark signal (empty well) for each tested condition with 1 stdev error bars. Both figures also show the calculated slope for each condition. A detection limit provided in terms of concentration of BTI was calculated based upon the mean Y-intercept+3*standard deviations ("stdev") of the background and the linear fit of the titration curve. The standard errors in the slope and Y-intercept and the standard deviation of the background were propagated to an error in the detection limit. Based on the volume of BTI per well and the number of ECL labels per BTI molecule (~0.071), the detection limits could be represented in terms of the moles of ECL label needed to generate a detectable signal (plotted in FIG. 14E).

FIGS. 14C and 14D shows that the ECL signal from BTI on an electrode generated by a 500 ms pulse waveform at a potential of 1800 mV is comparable to the signal generated by a conventional 1000 ms ramp waveform, in half the time. While FIG. 14C shows that for a specific pulse potential, the ECL decreases as the pulse time decreases below 500 ms, comparison with FIG. 14D shows that there is a corresponding decrease in the assay background signal which remains significantly above the camera signal for dark image of empty wells (i.e., an image in the absence of ECL excitation). This result suggests that very short pulses can be used to substantially decrease the time needed to conduct an ECL measurement, while maintaining overall sensitivity.

The calculated detection limit for with the standard waveform (1000 ms ramp) using carbon counter electrodes was 2.4±2.6 attomoles ($10^{-18}$ moles) of ECL label. FIG. 14E shows that the estimated detection limits for the different excitation conditions tended to increase with decreasing pulse time, but considerably less than would be expected from a linear relationship. For example, the estimated detection limit for a 100 ms pulse at 2000 mV was less than two times higher than the detection limit for the 1000 ms ramp, but in one tenth of the time. In addition, the increases in detection limit with decreased pulse time were not always statistically significant. The detection limits for the "1800 mV 500 ms", "2000 mV 500 ms", "2000 mV 100 ms", and "2200 mV 500 ms" pulses with the Ag/AgCl auxiliary electrodes were within the error of the detection limit with the standard waveform (1000 ms ramp) using carbon counter electrodes.

FIG. 16 depicts graphs that show the results of ECL analysis on read buffer solution, for example, a read buffer T using a pulsed waveform. In the test, Ag/AgCl Std 96-1 IND plates printed with a 50:50 ink were used. For the test, aliquots of MSD T4x (Y0140365) were diluted with molecular grade water to make T3x, T2x, and T1x. Ag/AgCl Std 96-1 IND plates were filled with 150 μL aliquots of these solutions: T4x in two adjacent rows of the wells 200, for example, as illustrated in FIG. 9B, T3x in two adjacent rows of the wells 200, T2x two adjacent rows of the wells 200, T1x in two adjacent rows of the wells 200. These solutions were allowed to soak covered on the bench for 15 min±0.5 min. One plate was measured with each of the following waveforms: 1800 mV for 100 ms, 1800 mV for 300 ms, 1800 mV for 1000 ms, 1800 mV for 3000 ms. The mean ECL signal and mean integrated current were calculated for the 24 replicates per condition and plots of the means vs. MSD T concentration (4, 3, 2, & 1) were prepared.

As shown in FIG. 16, the ECL signals and integrated current increased with increasing concentration of Read Buffer T. The ECL signals and integrated current increased with increasing pulse duration. Read Buffer ECL signals increased linearly between T1x and T3x, but not between 3x and 4x. Integrated current increased linearly between T1x and T4x.

FIG. 17 depict graphs that show the results of another ECL analysis using a pulsed waveform. In the test, Ag/AgCl Std 96-1 IND plates printed with 50:50 ink were used. The test method described above for FIGS. 14A and 14B was utilized with different, longer, pulsed waveforms. One plate was measured with each of the following waveforms: 1800 mV for 3000 ms, 2200 mV for 3000 ms, 2600 mV for 3000 ms, and 3000 mV for 3000 ms. The mean ECL signal and mean integrated current were calculated for the 24 replicates per condition, and plots of the means vs. Read Buffer T concentration (4, 3, 2, & 1) were prepared.

As shown in FIG. 17, the ECL signals increased with increasing concentration of Read Buffer T for pulse potentials of 1800 mV, 2200 mV, and 2600 mV. With a pulse of 3000 mV, the ECL signal decreased between T1x and T2x followed by increasing ECL through T4x. The integrated currents increased with increasing concentration of T for all pulse potentials. The integrated currents with 2600 mV and 3000 mV pulses were somewhat linear between T1x and T3x; however, with T4x the increase in current was less than linear with concentration of Read Buffer T.

Example 3—Reductive Capacity of Ag/AgCl Auxiliary Electrodes

Assay plates with integrated screen-printed carbon ink working electrodes and screen-printed Ag/AgCl auxiliary electrodes (as described in Example 2) were used to determine the reductive capacity of the auxiliary electrodes, i.e., the amount of reductive charge that can be passed through the electrode while maintaining a controlled potential. To evaluate the capacity in the context of the requirements for an ECL experiment using pulsed ECL measurements, the total charge passing through the auxiliary electrode in the presence of an ECL read-buffer containing TPA was measured while applying a pulsed voltage waveform between the working and auxiliary electrode. Two types of experiments were conducted. In the first (shown in FIG. 16), a voltage pulse near the optimal potential for ECL generation (1800 mV) was applied and held for different amounts of time (100 to 3000 ms). In the second (FIG. 17), different pulse potentials (2200 to 3000 mV) were held for a constant amount of time (3000 ms). In both experiments, the tolerance for changes in the concentrations or coreactant and electrolyte in the read buffer composition was evaluated by testing each voltage and time condition in the presence of the components of MSD Read Buffer T at between 1×0 to 4× of the nominal working concentrations of TPA. Each point in the graphs represents the average of 24 replicate measurements.

The Ag/AgCl auxiliary electrodes will support oxidation of TPA at the working electrode, under the potentials applied in the experiment, until the charge passed through the auxiliary electrode consumes all the accessible oxidizing agent (AgCl) in the auxiliary electrode. FIG. 16 shows that the charge passed through the auxiliary electrode using a 1800 mV pulse increases roughly linearly with pulse duration and TPA concentration, demonstrating that the electrode capacity is sufficient to support pulses as long as 3000 ms at 1800 mV, even in the presence of higher than typical concentrations of TPA. FIG. 17 shows an experiment designed to determine the capacity of the auxiliary electrode by using the longest pulse from FIG. 16 (3000 ms), but increasing the potential until the charge passed through the electrode achieves its maximum value. The data points collected using a 3000 mV potential show that the charge increased linearly with the concentration of ECL read buffer up to about 30 mC of total charge. Near 45 mC the total charge appeared to plateau indicating depletion of the oxidizing agent in the Ag/AgCl auxiliary electrode. A charge of 30 mC equates to $3.1 \times 10^{-7}$ moles of oxidizing agent in the Ag/AgCl auxiliary electrodes and a charge of 45 mC equates to $4.7 \times 10^{-7}$ moles of oxidizing agent in the Ag/AgCl auxiliary electrodes.

Reductive capacity tests were also performed to determine differences in reductive capacity according to spot pattern and auxiliary electrode size. Four different spot patterns were tested using a 2600 mV 4000 ms reductive capacity waveform and a standardized testing solution. Four spot patterns were tested, a 10 spot penta pattern (FIG. 5A), a 10 spot open pattern (FIG. 1C), a 10 spot closed pattern (FIG. 7A), and a 10 spot open trilobe pattern (FIG. 4A). The results are reproduced in Tables A, B, C, and D, below, respectively for the penta, open, closed, and open trilobe patterns. As shown in in Tables A-C, increasing the auxiliary electrode (labeled CE) area in three different patterns increases the total measured charge (e.g., reductive capacity). As shown in Table D, multiple tests with the same auxiliary electrode area results in approximately similar measured charge. Accordingly, maximizing the auxiliary electrode area may serve to increase total reductive capacity of Ag/AgCl electrodes in multiple different spot patterns.

TABLE A

| Group | CE Dia (in) | CE area (in^2) | Ave Intg Crnt (µA) | StDev (µA) | Ave Charge (mC) | StDev (mC) | Charge/Area (mC/sq in) |
|---|---|---|---|---|---|---|---|
| 1 | 0.03 | 0.00071 | 441,300 | 13,884 | 22.07 | 0.69 | 31223 |
| 2 | 0.027 | 0.00057 | 439,748 | 22,396 | 21.99 | 1.12 | 38407 |
| 3 | 0.024 | 0.00045 | 365,348 | 4,821 | 18.27 | 0.24 | 40386 |
| 4 | 0.021 | 0.00035 | 249,364 | 5,149 | 12.47 | 0.26 | 36003 |
| 5 | 0.018 | 0.00025 | 239,138 | 8,350 | 11.96 | 0.42 | 47000 |
| 6 | 0.015 | 0.00018 | 174,889 | 7,960 | 8.74 | 0.4 | 49458 |

TABLE B

| Group | CE Dia (in) | CE area (in^2) | Ave Intg Crnt (µA) | StDev (µA) | Ave Charge (mC) | StDev (mC) | Charge/Area (mC/sq in) |
|---|---|---|---|---|---|---|---|
| 1 | 0.048 | 0.00181 | 324,380 | 23,129 | 16.22 | 1.16 | 8964 |
| 2 | 0.044 | 0.00152 | 258,775 | 15,557 | 12.94 | 0.78 | 8510 |
| 3 | 0.04 | 0.00126 | 208,423 | 10,267 | 10.42 | 0.51 | 8292 |
| 4 | 0.036 | 0.00102 | 193,015 | 8,392 | 9.65 | 0.42 | 9481 |
| 5 | 0.032 | 0.00080 | 137,755 | 4,717 | 6.89 | 0.24 | 8567 |
| 6 | 0.028 | 0.00062 | 104,355 | 2,461 | 5.22 | 0.12 | 8477 |

TABLE C

| Group | CE Dia (in) | CE area (in^2) | Ave Intg Crnt (µA) | StDev (µA) | Ave Charge (mC) | StDev (mC) | Charge/Area (mC/sq in) |
|---|---|---|---|---|---|---|---|
| 1 | 0.048 | 0.00181 | 754,555 | 43,877 | 37.73 | 2.19 | 20850 |
| 2 | 0.044 | 0.00152 | 670,500 | 27,385 | 33.53 | 1.37 | 22052 |
| 3 | 0.04 | 0.00126 | 588,035 | 26,996 | 29.4 | 1.35 | 23396 |
| 4 | 0.036 | 0.00102 | 457,428 | 27,944 | 22.87 | 1.4 | 22468 |
| 5 | 0.032 | 0.00080 | 393,368 | 10,887 | 19.67 | 0.54 | 24458 |
| 6 | 0.028 | 0.00062 | 306,840 | 14,759 | 15.34 | 0.74 | 24913 |

TABLE D

| Group | CE Dia (in) | CE area (in^2) | Ave Intg Crnt (μA) | StDev (μA) | Ave Charge (mC) | StDev (mC) | Charge/Area (mC/sq in) |
|---|---|---|---|---|---|---|---|
| 1 | 0.048 | 0.00181 | 226,413 | 14,022 | 11.32 | 0.7 | 6256 |
| 2 | 0.048 | 0.00181 | 226,235 | 18,827 | 11.31 | 0.94 | 6250 |
| 3 | 0.048 | 0.00181 | 220,868 | 17,292 | 11.04 | 0.86 | 6101 |
| 4 | 0.048 | 0.00181 | 229,960 | 9,879 | 11.5 | 0.49 | 6355 |
| 5 | 0.048 | 0.00181 | 225,635 | 15,199 | 11.28 | 0.76 | 6234 |
| 6 | 0.048 | 0.00181 | 224,308 | 6,190 | 11.22 | 0.31 | 6200 |

Further, experiments were conducted to determine an amount of AgCl accessible to a redox reaction under various experimental conditions. In an experiment, electrodes printed with Ag/AgCl ink films at approximately 10 microns thickness were used. Different portions of the electrodes ranging from 0% to 100% were exposed to solution and an amount of charge passed was measured. Experimental results show that an amount of charge passed increases approximately linearly with increasing percentage of the electrodes being in contact with a solution. This indicates that reduction occurs less strongly or not at all in electrode portions that are not in direct contact with the test solution. Further, the total amount of charge passed (2.03E+18 e−) by the experimental electrodes corresponds approximately to a total amount of electrons available in the experimental electrodes, based on the total volume of Ag/AgCl in the printed electrodes. This indicates that, at 10 microns thickness and 100% solution contact, all or nearly all of the available AgCl may be accessible in the redox reaction. Accordingly, for films at 10 microns thickness or less, all or nearly all available AgCl may be accessed during a reduction reaction.

Figure 18:
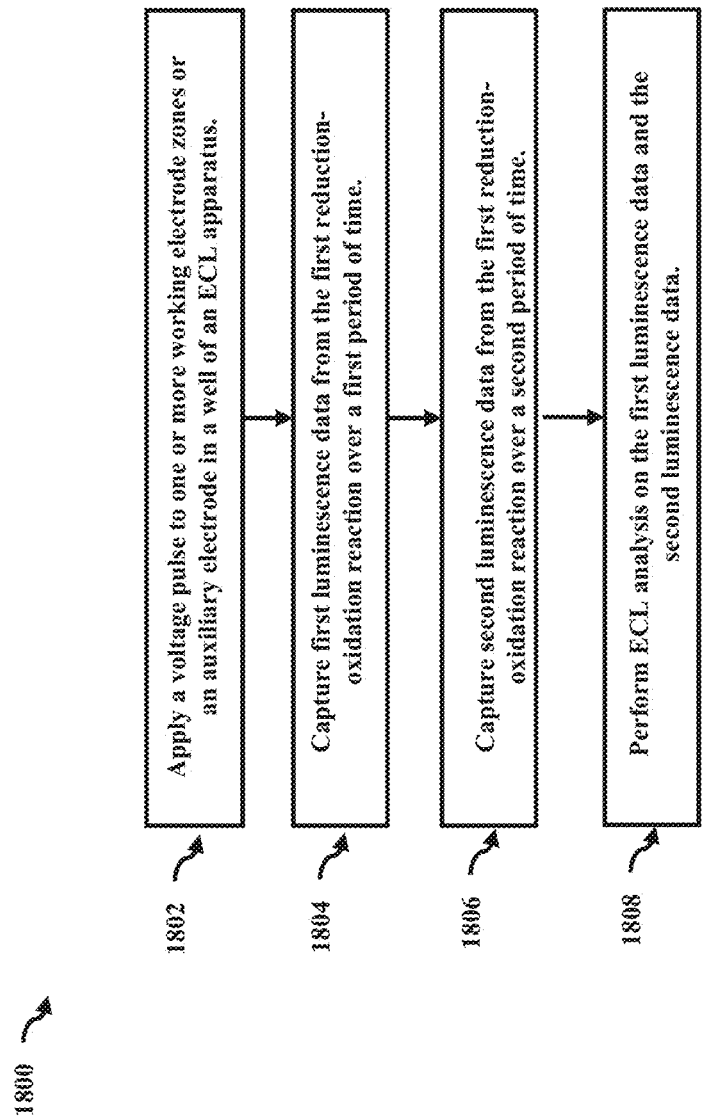
FIG. 18 illustrates a process of performing an ECL analysis using pulsed waveforms, according to embodiments disclosed herewith.

In embodiments, a pulsed waveform supplied by a voltage/current source 904 may be designed to allow the ECL apparatus to capture different luminescence data over time to improve the ECL analysis. FIG. 18 depicts a flow chart showing another process 1800 for operating an ECL apparatus using pulsed waveforms, in accordance with an embodiment hereof.

In an operation 1802, the process 1800 includes applying a voltage pulse to one or more working electrode zones 104 or an auxiliary electrode 102 in a well of an ECL apparatus, the voltage pulse causing a reduction-oxidation reaction to occur in the well. For example, the computer system 906 may control the voltage/current source 904 to supply one or more voltage pulses to one or more working electrode zones 104 or the auxiliary electrode 102.

In embodiments, the voltage pulse may be configured to cause a reduction-oxidation reaction between the one or more working electrode zones 104 and the one or more auxiliary electrodes 102. As discussed above, based on a predefined chemical composition (e.g., mixture of Ag:AgCl) of the one or more auxiliary electrodes 102, the one or more auxiliary electrodes 102 may operate as reference electrodes for determining the potential difference with the one or more working electrode zones 104 and as counter electrodes for the working electrode zones 104. For example, the predefined chemical mixture (e.g., the ratios of elements and alloys in the chemical composition) may provide a interfacial potential during a reduction of the chemical mixture, such that a quantifiable amount of charge is generated throughout the reduction-oxidation reactions occurring in the well 200. That is, the amount of charge passed during a redox reaction is quantifiable by measuring the current, for example, at the working electrode zones 104. In some embodiments, the one or more auxiliary electrode 102 may dictate the total amount of charge that may be passed at the applied potential difference because, when the AgCl has been consumed, the interfacial potential at the auxiliary electrode 102 will shift more negative to the potential of water reduction. This causes the working electrode zone 104 potential to shift to a lower potential (maintaining the applied potential difference) turning off the oxidation reactions that occurred during the AgCl reduction.

In embodiments, the pulsed waveform may include various waveform types, such as direct current, alternating current, DC emulating AC, etc., although other waveforms of varying period, frequency, and amplitude are contemplated as well (e.g., negative ramp sawtooth waveforms, square waveforms, rectangular waveforms, etc. FIGS. 12A and 12B discussed above illustrate two examples of pulsed waveforms. The pulsed waveform may be a square wave having a voltage, V, for a time, T. Examples of voltage pulses are also described in reference to FIGS. 14A, 14B, 15A-15L, 16 and 17, e.g., 1800 mV at 500 ms, 2000 mV at 500 ms, 2200 mV at 500 ms, 2400 mV at 500 ms, 1800 mV at 100 ms, 2000 mV at 100 ms, 2200 mV at 100 ms, 2400 mV at 100 ms, 1800 mV at 50 ms, 2000 mV at 50 ms, 2200 mV at 50 ms, 2400 mV at 50 ms, etc. These waveforms may include various duty cycles as well, e.g., 10%, 20%, 50%, 65%, 90%, or any other percentage between 0 and 100.

In an operation 1804, the process 1800 includes capturing first luminescence data from the first reduction-oxidation reaction over a first period of time. In an operation 1806, the process 1800 includes capturing second luminescence data from the second reduction-oxidation reaction over a second period of time, wherein the first period time is not of equal duration to the second period of time. For example, the one or more photo-detectors 910 may capture first and second luminescence data emitted from the wells 200 and communicate the first and second luminescence data to the computer system 906. For example, in an embodiment, the wells 200 may include substances of interest that require different time periods for the photo-detectors 912 to capture the luminescence data. Thus, the photo-detectors 912 may capture the ECL data over two different periods of time. For instance, one of the time periods may be a short time period (e.g., short camera exposure time of the light generated from ECL), and one of the time periods may be a longer time period. These periods of time could be affected by, for example, light saturation throughout ECL generation. From there, depending on the captured photons, the assay apparatus 900 may either use the long exposure, the short exposure, or a combination of the two. In some embodiments, the assay apparatus 900 may use the long exposure, or the sum of the long and short. In some embodiments, if the captured photons are above a dynamic range of the photo-detectors 912, the assay apparatus 900 may use the short exposure. By adjusting/optimizing these the dynamic range may be potentially increased by an order of magnitude or two. In certain embodiments, the dynamic range could be improved but implementing various multi-pulse and/or multi-exposure schemes. For example, a short exposure could be taken followed by a longer exposure (e.g., exposure of a single working electrode, single working electrode zone, two or more single working electrodes or working electrode zones (either within a single well or across multiple wells), exposure of a single well, of two or more wells, or a sector, or two or more sectors, etc.). In these examples, it may be beneficial to use the longer exposure unless the exposure has become saturated. In that case, for example, the shorter exposure could be utilized. By making these adjustments (either manually or through the aid of hardware, firmware, software, an algorithm, computer readable medium, a computing device, etc.), the dynamic range can be improved. In other examples, a first, short pulse (e.g., 50 ms, although other durations are contemplated as well) can be applied to an electrode or collection of two or more electrodes followed by a second, longer pulse (e.g., 200 ms, although other durations are contemplated as well) for each electrode or collection of electrodes. Other approaches could include reading an entire plate (e.g., 96 wells) using one or more first, short pulses (e.g., 50 ms, although other durations are contemplated as well) followed by reading the entire plate a second time with a second, longer pulse (e.g., 200 ms, although other durations are contemplated as well). In other examples, a long pulse can be applied first, followed by a short pulse; multiple short- and/or long pulses can be applied and/or alternated, etc. In addition to one or more discrete pulses, composite or hybrid functions could be employing using these, or other, durations to, for example, determine and/or model responses in transition regions (e.g., while transitioning between pulses). Moreover, in the above examples, the longer pulse can be use first before a shorter pulse. Moreover, waveforms and/or capture windows can be adjusted to improve the dynamic range as well.

Moreover, if additional information is known about the one or more individual working electrodes and/or working electrode zones (e.g., a particular working electrode zone is known to contain a high abundance analyte), exposure times can be optimized to prevent camera saturation by utilizing this information before taking a reading and/or sample. Using the high abundance analyte example above, because the signals would be expected to be high in dynamic range, a shorter exposure time can be employed (and vice versa for electrodes for which a low signal is expected), thus exposure times, pulse durations, and/or pulse intensity can be customized and/or optimized for individual wells, electrodes, etc., to improve overall read times. Moreover, pixels from one or more ROIs could be continuously sampled to obtain an ECL curve over time, which can be further employed to determine a manner in which to truncate exposure time and extrapolate an ECL generation curve above saturation. In other examples, first, the camera can be set to take a short exposure, after which the intensity of the signal from the short exposure can be examined. This information can be subsequently used to adjust the binning for the final exposure. In other examples, rather than adjusting the binning, other parameters can be adjusted as well, such as, for example, waveforms, capture windows, other current based techniques, etc.

Additional techniques could be employed as well for which the waveform and/or exposure remain constant. For example, the intensity of pixels within one or more ROIs could be measured, and if pixel saturation is observed, other aspects of ECL generation and/or measuring can be utilized to optimize reading and/or read times (e.g., current-ECL correlation, dark mask schemes that obverse dark mask regions around the ROI, which can be used to update the estimated ECL for the saturated electrode and/or portion of an electrode, etc.). These solutions obviate the need for fast analysis and/or reaction times to adjust waveforms and/or durations of exposure over relatively short periods of time (e.g., milliseconds). This is, for example, because ECL generation and/or captures can be performed the same and/or a similar way and analysis can be performed at the end.

Other techniques could be employed to improve dynamic range as well. For example, if applied to an electrochemiluminescence (ECL) application, because ECL labels fluoresce, a pre-flash and/or pre-exposure could be performed to obtain information related to how much label is present in one or more wells, working electrodes, working electrode zones, etc. The information obtained from the pre-flash and/or pre-exposure can be used to optimize the exposure and/or pulse durations to realize additional improvements in dynamic range and/or read times. In other embodiments, in particular as it relates to ECL, because a correlation can exist between current and one or more of the electrodes and the ECL signal, the signature of the signal could inform camera exposure times and/or the applied waveforms (e.g., stop the waveform, decrease the waveform, increase the waveform, etc.). This can be further optimized by improving the precision and update rate of current measurements and optimization of current paths to provide better correlation between current and ECL signal.

Additional improvements in dynamic range can be realized for certain imaging devices according to certain embodiments. Using CMOS-based imaging device in an ECL application, for example, particular regions of interest (ROIs) could be sampled and read out at different points in time within one or more exposures to optimize exposure times. For example, a ROI (e.g., a part of or the entire working electrode and/or a working electrode zone) could comprise a fixed or variable number of pixels or a certain sample percentage of the electrodes area (e.g., 1%, 5%, 10%, etc., although other percentages are contemplated as well). In this example, the pixels and/or sample percentage could be read out early during the exposure. Depending on the signals read from the ROIs, exposure times could be adjusted and/or optimized for particular working electrodes, working electrode zones, wells, etc. In a non-limiting illustrative example, a subset of pixels can be sampled over a sample period of time. If the signal from that subset is trending high, the exposure time can be reduced (e.g., from 3 seconds to 1 seconds, although other durations greater or less than these are contemplated as well). Similarly, if the signal is trending low, longer exposure times can be employed (e.g., 3 seconds, although other durations are contemplated as well). These adjustments can be made either manually or through the aid of hardware, firmware, software, an algorithm, computer readable medium, a computing device, etc. In other embodiments, ROIs could be selected to be distributed in a manner so as to avoid any potential ring effects. This can occur, for example, due to non-uniformity of light around the working electrode zone (e.g., brighter ring will form on the outer perimeter of the working electrode zone, with a darker spot in the center. To combat this, ROIs can be selected that sample both the brighter and darker areas (e.g., a row of pixels from edge to edge, random sampling of pixels from both areas, etc.) Moreover, pixels could be continuously sampled for one or more working electrode zones to determine an ECL generation curve over time. This sampled data can then be used to extrapolate ECL generation curves for points above saturation.

In embodiments, different pulsed waveforms may also be used for the first and the second periods of time. In embodiments, the pulsed waveforms may differ in amplitude (e.g., voltage), duration (e.g., time period), and/or waveform type (e.g., square, sawtooth, etc.) Using different pulsed waveform may be beneficial if multiple types of electro-active species are used as ECL labels which may require different activation potentials and may emit light at different wavelengths. For example, such ECL labels may be complexes based on ruthenium, osmium, hassium, iridium, etc.

In an operation 1808, the process 1800 includes performing ECL analysis on the first luminescence data and the second luminescence data. For example, the computer systems 906 may perform the ECL analysis on the luminescence data. These values may correlate with quantitative measurements (e.g., ECL intensity) to provide an analog signal. In other embodiments, a digital signal (yes or no signal) may be obtained from each working electrode zone 104 to indicate that an analyte is either present or not present. Statistical analysis may be used for both techniques and may be used for translating a plurality of digital signals so as to provide a quantitative result. Some analytes may require a digital present/not present signal indicative of a threshold concentration. Analog and/or digital formats may be utilized separately or in combination. Other statistical methods may be utilized, for example, technique to determine concentrations through statistical analysis of binding over the concentration gradient. Multiple linear arrays of data with concentration gradients may be produced with a multiplicity of different specific binding reagents being used in different wells 200 and/or with different working electrode zones 104. The concentration gradients may consist of discrete binding domains presenting different concentrations of the binding reagents.

In embodiments, control assay solutions or reagents, e.g., read buffers, may be utilized on the working electrode zones of the wells 200. The control assay solutions or reagents may provide uniformity to each analysis to control for signal variation (e.g., variations due to degradations, fluctuations, aging of the multi-well plate 208, thermal shifts, noise in electronic circuitry and noise in the photodetection device, etc.) For example, multiple redundant working electrode zones 104 (containing identical binding reagents or different binding reagents that are specific for the same analyte) for the same analyte may be utilized. In another example, analytes of known concentration may be utilized or control assay solutions or reagents may be covalently linked to a known quantity of an ECL label or a known quantity of ECL label in solution is used.

In embodiments, the data collected and produced in the process 1800 may be utilized in a variety of applications. The data collected and produced may be stored, e.g., in the form of a database consisting of a collection of clinical or research information. The data collected and produced may also be used for rapid forensic or personal identification. For example, the use of a plurality of nucleic acid probes when exposed to a human DNA sample may be used for a signature DNA fingerprint that may readily be used to identify clinical or research samples. The data collected and produced may be used to identify the presence of conditions (e.g., diseases, radiation level, etc.), organisms (e.g., bacteria, viruses, etc.), and the like.

In embodiments, while the above process 1800 includes capturing luminescence data during two time periods, the process 1800 may be utilized to capture luminescence data during any number of time periods, e.g., 3 time period, 4 time period, 5 period, etc. In this embodiment, different pulsed waveforms may also be used for some of the time periods or all of the time periods. In embodiments, the pulsed waveforms may differ in amplitude (e.g., voltage), duration (e.g., time period), and/or waveform type (e.g., square, sawtooth, etc.)

The above describes an illustrative flow of an example process 1800. The process as illustrated in FIG. 18 is exemplary only, and variations exist without departing from the scope of the embodiments disclosed herein. The steps may be performed in a different order than that described, additional steps may be performed, and/or fewer steps may be performed.

Figure 19:
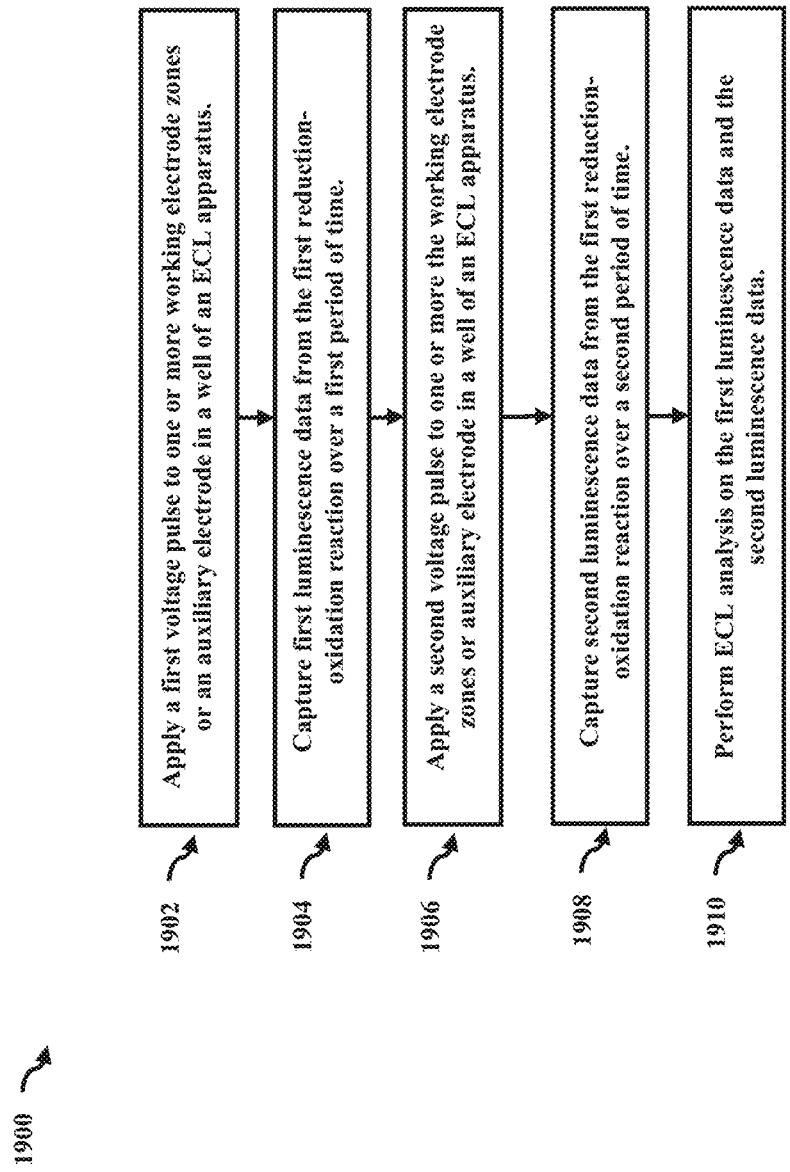
FIG. 19 illustrates a process of performing an ECL analysis using pulsed waveforms, according to embodiments disclosed herewith.

In embodiments, different configurations of pulsed waveforms supplied by a voltage/current source 904 may be utilized together to improve the ECL emitted during ECL analysis. FIG. 19 depicts a flow chart showing another process 1900 for operating an ECL apparatus using pulsed waveforms, in accordance with an embodiment hereof.

In an operation 1902, the process 1900 includes applying a first voltage pulse to one or more working electrode zones 104 or an auxiliary electrode 102 in a well of an ECL apparatus, the first voltage pulse causing a first reduction-oxidation reaction to occur in the well. In an operation 1904, the process 1900 includes capturing first luminescence data from the first reduction-oxidation reaction over a first period of time.

In an operation 1906, the process 1900 includes applying a second voltage pulse to the one or more working electrode zones or the auxiliary electrode in the well, the second voltage pulse causing a second reduction-oxidation reaction to occur in the well. In an operation 1908, the process 1900 includes capturing second luminescence data from the second reduction-oxidation reaction over a second period of time, wherein the first period time is not of equal duration to the second period of time.

In an embodiment, the voltage level (amplitude or magnitude) or pulse width (or duration) for the first voltage pulse and/or the second voltage pulse may be selected to cause a first reduction-oxidation reaction to occur, wherein the first luminescence data corresponds to the first reduction-oxidation reaction that occurs. In an embodiment, the voltage level (amplitude or magnitude) or pulse width (or duration) may be selected for the first voltage pulse and/or the second voltage pulse to cause the second reduction-oxidation reaction to occur, wherein the second luminescence data correspond to the second reduction-oxidation reaction that occurs. In an embodiment, a magnitude of at least one of the first voltage pulse and second voltage pulse may be selected based at least in part on a chemical composition of the counter electrode.

In an operation 1910, the process 1900 includes performing ECL analysis on the first luminescence data and the second luminescence data. For example, the computer systems 906 may perform the ECL analysis on the luminescence data. In some embodiments, luminescence data, e.g., signals, arising from a given target entity on a binding surface of the working electrode zones 104 and/or auxiliary electrode 102, e.g., binding domain, may have a range of values. These values may correlate with quantitative measurements (e.g., ECL intensity) to provide an analog signal. In other embodiments, a digital signal (yes or no signal) may be obtained from each working electrode zone 104 to indicate that an analyte is either present or not present. Statistical analysis may be used for both techniques and may be used for translating a plurality of digital signals so as to provide a quantitative result. Some analytes may require a digital present/not present signal indicative of a threshold concentration. Analog and/or digital formats may be utilized separately or in combination. Other statistical methods may be utilized, for example, technique to determine concentrations through statistical analysis of binding over the concentration gradient. Multiple linear arrays of data with concentration gradients may be produced with a multiplicity of different specific binding reagents being used in different wells 200 and/or with different working electrode zones 104. The concentration gradients may consist of discrete binding domains presenting different concentrations of the binding reagents.

In embodiments, control assay solutions or reagents, e.g., read buffers, may be utilized on the working electrode zones of the wells 200. The control assay solutions or reagents may provide uniformity to each analysis to control for signal variation (e.g., variations due to degradations, fluctuations, aging of the multi-well plate 208, thermal shifts, noise in electronic circuitry and noise in the photodetection device, etc.) For example, multiple redundant working electrode zones 104 (containing identical binding reagents or different binding reagents that are specific for the same analyte) for the same analyte may be utilized. In another example, analytes of known concentration may be utilized or control assay solutions or reagents may be covalently linked to a known quantity of an ECL label or a known quantity of ECL label in solution is used.

In embodiments, the data collected and produced in the process 1900 may be utilized in a variety of applications. The data collected and produced may be stored, e.g., in the form of a database consisting of a collection of clinical or research information. The data collected and produced may also be used for rapid forensic or personal identification. For example, the use of a plurality of nucleic acid probes when exposed to a human DNA sample may be used for a signature DNA fingerprint that may readily be used to identify clinical or research samples. The data collected and produced may be used to identify the presence of conditions (e.g., diseases, radiation level, etc.), organisms (e.g., bacteria, viruses, etc.), and the like.

The above describes an illustrative flow of an example process 1900. The process as illustrated in FIG. 19 is exemplary only, and variations exist without departing from the scope of the embodiments disclosed herein. The steps may be performed in a different order than that described, additional steps may be performed, and/or fewer steps may be performed.

In any of the processes 1300, 1800, and 1900 described above, the voltage pulses may be selective applied to the one or more working electrode zones 104 and/or one or more auxiliary electrodes 102. For example, the voltage pulses may be supplied to all the working electrode zones 104 and/or the auxiliary electrodes 102 in one or more wells 106 of the multi-well plate 108. Likewise, for example, the voltage pulses may be supplied to selected (or "addressable") sets of the working electrode zones 104 and/or the auxiliary electrodes 102 in one or more wells 106 of the multi-well plate 208 (e.g., on a zone-by-zone basis, well-by-well basis, sector-by-sector basis (e.g., groups of two or more wells), etc.)

The systems, devices, and methods described herein may be applied in various contexts. For example, the systems, devices, and methods may be applied to improve various aspects of ECL measurement and reader devices. Exemplary plate readers include those discussed above and throughout this application.

For instance, by applying one or more voltage pulses to generate ECL as described herein, read time and/or exposure time may be improved by more quickly and efficiently generating, collecting, observing, and analyzing ECL data. Further, the improved exposed times (e.g., single exposure, dual (or greater) exposures utilizing disparate exposure times (or equal exposure times)) will help improve ECL generation, collecting, observing, and its analysis by improving, for example, the dynamic range extension (DRE), binning, etc., for example, in an embodiment, substances of interest that require different time periods for capturing the luminescence data. Thus, emitted photons may be captured as the ECL data over multiple different periods of time, which could be affected by, for example, light saturation levels throughout ECL generation. The dynamic range could be improved but implementing various multi-pulse and/or multi-exposure schemes. For example, a short exposure could be taken followed by a longer exposure (e.g., exposure of a single working electrode, single working electrode zone, two or more single working electrodes or working electrode zones (either within a single well or across multiple wells), exposure of a single well, of two or more wells, or a sector, or two or more sectors, etc.). In these examples, it may be beneficial to use the longer exposure unless the exposure has become saturated. For example, when taking a short and long exposure, if saturation occurs during the longer exposure, that exposure can be discarded and the shorter exposure can be used. If neither saturates, the longer can be used, which can provide better sensitivity. In that case, for example, the shorter exposure could be utilized. By making these adjustments (either manually or through the aid of hardware, firmware, software, an algorithm, computer readable medium, a computing device, etc.), the dynamic range can be improved, as discussed above in greater detail.

Further, the systems, devices, and methods described herein may be leveraged in various manners to allow for the optimization of software, firmware, and/or control logic to the hardware instruments, such as the readers described above. For example, because the systems, devices, and methods described herein allow for the faster and more efficient generation, collection, observation, and/or analysis of ECL, instruments may be optimized through improved software, firmware, and/or control logic to lower the cost of hardware required to perform ECL analysis (e.g., cheaper lens, fewer and/or cheaper motors to drive the instruments, etc.) The examples provided herein are merely exemplary and additional improvements to these instruments are contemplated as well.

In embodiments as described above, the wells 200 of the multi-well plate 208 may include one or more fluids (e.g., reagents) for conducting ECL analysis. For example, the fluids may include ECL coreactants (e.g., TPA), read buffers, preservatives, additives, excipients, carbohydrates, proteins, detergents, polymers, salts, biomolecules, inorganic compounds, lipids, and the like. In some embodiments, the chemical properties of the fluids in the well 200 during ECL processes may alter the electrochemistry/ECL generation. For example, a relationship between ionic concentration of fluid and electrochemistry/ECL generation may be dependent on different liquid types, read buffers, etc. In embodiments, the one or more auxiliary electrodes may provide a constant interfacial potential regardless of the current being passed, as described above. That is, a plot of the current vs. potential would yield infinite current at a fixed potential.

In some embodiments, the fluids utilized (e.g., in the wells 200 of the multi-well plate 208) may include ionic compounds such as NaCl (e.g., salts). In some embodiments, for example, higher NaCl concentrations in the fluids contained in the wells 200 may improve control ECL generation throughout ECL processes. For example, current vs. potential plots of the auxiliary electrode 102 having a redox couple such as Ag/AgCl have defined slopes. In some embodiments, the slope is dependent upon the salt composition and concertation in the fluid contained in the wells 200. As the Ag+ is reduced, the charge balance within the redox couple of the auxiliary electrode 102 may need to be balanced, requiring ions from the fluid to diffuse to the electrode surface. In some embodiments, the composition of the salts may alter the slope of the current vs. potential curve which then impacts the reference potential at an interface of the auxiliary electrode 102, for example, containing Ag/AgCl for the current being passed. As such, in embodiments, the concentration of ions, such as salts, may be modified and controlled in order to maximize a current generated for an applied voltage.

In embodiments, a volume of the fluids in the well 200 during ECL processes may alter the electrochemistry/ECL generation. In some embodiments, relationship between a volume of the fluids in the well 200 may be dependent on the design of the electrochemical cell 100. For example, a working electrode zones 104 and an auxiliary electrode 102, which are separated by a relatively thick fluid layer, may have a more ideal electrochemical behavior, e.g., spatially consistent interfacial potentials). Conversely, a working electrode zones 104 and an auxiliary electrode 102, which are separated by a relatively thin fluid layer covering both, may have non-ideal electrochemical behavior due to spatial gradients in the interfacial potentials across both electrodes. In some embodiments, the design and the layout of the one or more working electrode zones 104 and the one or more auxiliary electrodes 102 may be to maximize a spatial distance between a working electrode zones 104 and an auxiliary electrode 102. For example, as illustrated in FIGS. 3A, the working electrode zones 104 and the auxiliary electrode 102 may be positioned to maximize the spatial distance, $D_1$. The spatial distance may be maximized by reducing the number of working electrode zones 104, reducing an exposed surface area of the working electrode zones 104, reducing an exposed surface area of the auxiliary electrode 102, etc. While not discussed, the spatial distance maximization of the spatial distance may be applied to the designs illustrated in FIGS. 3A-3F, 4A-4F, 5A-5C, 6A-6F, 7A-7F, and 8A-8D.

In embodiments, the multi-well plate 208 described above may form part of one or more kits for use in conducting assays, such as ECL assays, on the assay apparatus. A kit may include an assay module, e.g., the multi-well plate 208, and at least one assay component selected from the group consisting of binding reagents, enzymes, enzyme substrates and other reagents useful in carrying out an assay. Examples include, but are not limited to, whole cells, cell surface antigens, subcellular particles (e.g., organelles or membrane fragments), viruses, prions, dust mites or fragments thereof, viroids, antibodies, antigens, haptens, fatty acids, nucleic acids (and synthetic analogs), proteins (and synthetic analogs), lipoproteins, polysaccharides, lipopolysaccharides, glycoproteins, peptides, polypeptides, enzymes (e.g., phosphorylases, phosphatases, esterases, trans-glutaminases, transferases, oxidases, reductases, dehydrogenases, glycosidases, protein processing enzymes (e.g., proteases, kinases, protein phophatases, ubiquitin-protein ligases, etc.), nucleic acid processing enzymes (e.g., polymerases, nucleases, integrases, ligases, helicases, telomerases, etc.)), enzyme substrates (e.g., substrates of the enzymes listed above), second messengers, cellular metabolites, hormones, pharmacological agents, tranquilizers, barbiturates, alkaloids, steroids, vitamins, amino acids, sugars, lectins, recombinant or derived proteins, biotin, avidin, streptavidin, luminescent labels (preferably electrochemiluminescent labels), electrochemiluminescence coreactants, pH buffers, blocking agents, preservatives, stabilizing agents, detergents, dessimayts, hygroscopic agents, read buffers, etc. Such assay reagents may be unlabeled or labeled (preferably with a luminescent label, most preferably with an electrochemiluminescent label). In some embodiments, the kit may include an ECL assay module, e.g., the multi-well plate 208, and at least one assay component selected from the group consisting of: (a) at least one luminescent label (preferably electrochemiluminescent label); (b) at least one electrochemiluminescence coreactant; (c) one or more binding reagents; (d) a pH buffer; (e) one or more blocking reagents; (f) preservatives; (g) stabilizing agents; (h) enzymes; (i) detergents; (j) desicmayts and (k) hygroscopic agents.

Figure 20:
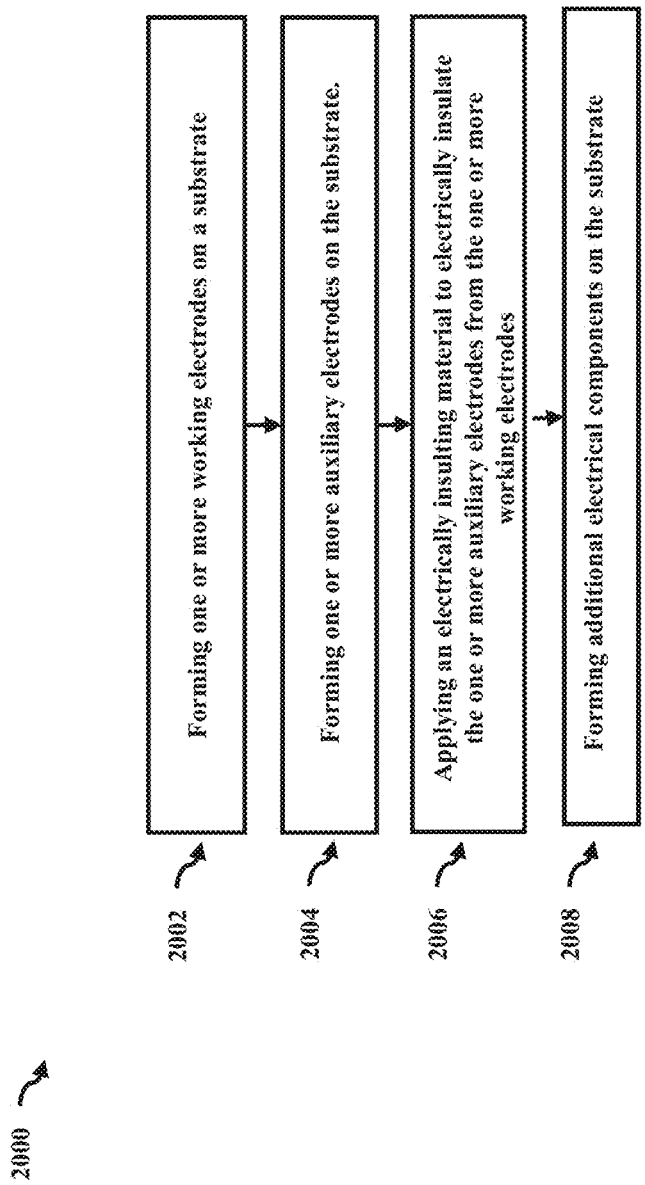
FIG. 20 illustrates a process of manufacturing a well, according to embodiments disclosed herewith.

FIG. 20 depicts a flow chart showing a process 2000 for manufacturing wells including working and auxiliary electrodes, in accordance with an embodiment hereof. For example, the process 2000 may be utilized to manufacture one or more of the wells 200 of the multi-well plate 208 that includes one or more working electrode zones 104 and one or more auxiliary electrodes 102.

In an operation 2002, the process 2000 includes forming one or more working electrode zones 104 on a substrate. In embodiments, the one or more working electrodes may be formed using any type of manufacturing process, e.g., screen-printing, three dimensional (3D) printing, deposition, lithography, etching, and combinations thereof. In embodiments, the one or more working electrode zones 104 may be formed as multi-layered structures that may be deposed and patterned.

In embodiments, the one or more working electrodes may be a continuous/contiguous area for which a reaction may occur, and an electrode "zone," may be a portion (or the whole) of the electrode for which a particular reaction of interest occurs. In certain embodiments, a working electrode zone may comprise an entire working electrode, and in other embodiments, more than one working electrode zone may be formed within and/or on a single working electrode. For example, the working electrode zones may be formed by individual working electrodes. In this example, the working electrode zones may be configured as a single working electrode formed of one or more conducting materials. In another example, the working electrode may be formed by isolating portions of a single working electrode. In this example, a single working electrode may be formed of one or more conducting materials, and the working electrode zones may be formed by electrically isolating areas ("zones") of the single working electrode using insulating materials such as a dielectric. In any embodiment, the working electrode may be formed of any type of conducting materials such as metals, metal alloys, carbon compounds, etc. and combinations of conducting and insulating materials.

In an operation 2004, the process 2000 includes forming one or more auxiliary electrodes 102 on the substrate. In embodiments, the one or more auxiliary electrodes may be formed using any type of manufacturing process, e.g., screen-printing, three dimensional (3D) printing, deposition, lithography, etching, and combinations thereof. In embodiments, the auxiliary electrodes 102 may be formed as multi-layered structures that may be deposed and patterned. In embodiments, the one or more auxiliary electrodes may be formed of a chemical mixture that provides a interfacial potential during a reduction of the chemical mixture, such that a quantifiable amount of charge is generated throughout the reduction-oxidation reactions occurring in the well. The one or more auxiliary electrodes includes an oxidizing agent that supports reduction-oxidation reaction, which may be used during biological, chemical, and/or biochemical assays and/or analysis, such as, for example, ECL generation and analysis. In an embodiment, an amount of an oxidizing agent in a chemical mixture of the one or more auxiliary electrodes is greater than or equal to an amount of oxidizing agent required for an entirety of a reduction-oxidation reaction ("redox") that is to occur in at least one well during one or more biological, chemical, and/or biochemical assays and/or analysis, such as ECL generation. In this regard, a sufficient amount of the chemical mixture in the one or more auxiliary electrodes will still remain after a redox reaction occurs for an initial biological, chemical, and/or biochemical assays and/or analysis, thus allowing one or more additional redox reactions to occur throughout subsequent biological, chemical, and/or biochemical assays and/or analysis. In another embodiment, an amount of an oxidizing agent in a chemical mixture of one or more auxiliary electrodes is at least based in part on a ratio of an exposed surface area of each of the plurality of working electrode zones to an exposed surface area of the auxiliary electrode.

For example, the one or more auxiliary electrodes may be formed of a chemical mixture that includes a mixture of silver (Ag) and silver chloride (AgCl), or other suitable metal/metal halide couples. Other examples of chemical mixtures may include metal oxides with multiple metal oxidation states, e.g., manganese oxide, or other metal/metal oxide couples, e.g., silver/silver oxide, nickel/nickel oxide, zinc/zinc oxide, gold/gold oxide, copper/copper oxide, platinum/platinum oxide, etc.)

In an operation 2006, the process includes forming an electrically insulating material to electrically insulate the one or more auxiliary electrodes form the one or more working electrodes. In embodiments, the electrically insulating material may be formed using any type of manufacturing process, e.g., screen-printing, 3D printing, deposition, lithography, etching, and combinations thereof. The electrically insulating materials may include dielectrics.

In an operation 2008, the process 2000 includes forming additional electrical components on the substrate. In embodiments, the one or more auxiliary electrodes may be formed using any type of manufacturing process, e.g., screen-printing, 3D printing, deposition, lithography, etching, and combinations thereof. The additional electrical components may include through holes, electrical traces, electrical contacts, etc. For example, the through holes are formed within the layers or materials forming the working electrode zones 104, the auxiliary electrodes 102, and the electrically insulating materials so that electrical contact may be made with the working electrode zones 104 and the auxiliary electrodes 102 without creating a short with other electrical components. For instance, one or more additional insulating layers may be formed on the substrate in order to support electrical traces that are coupled through while isolating the electrical traces.

In embodiments, the additional electrical components may include an electrical heater, a temperature controller, and/or a temperature sensor. The electrical heater, temperature controller, and/or temperature sensor may assist in the electrochemical reaction, e.g., ECL reaction, and electrode performance may be temperature dependent. For example, a screen-printed resistance heater may be integrated into the electrode design. The resistance heater may be powered and controlled by temperature controller, and/or temperature sensor, whether integrated or external. These are self-regulating and formulated to generate a certain temperature when a constant voltage is applied. The inks may assist in controlling temperature during an assay or during the plate read-out. The inks (and/or the heater) may also be useful in cases where elevated temperatures are desired during an assay (e.g., in assays with a PCR component). A temperature sensor may also be printed onto the electrode (working and/or auxiliary electrode) to provide actual temperature information.

Figure 21C:
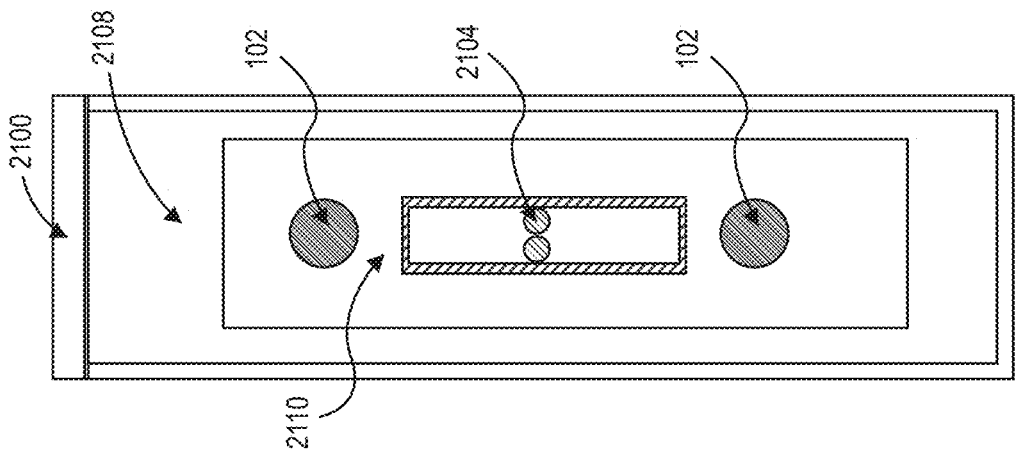
FIGS. 21A-21F and 22A illustrates exemplary stages in a process of manufacturing a well, according to embodiments disclosed herewith.
Figure 21B:
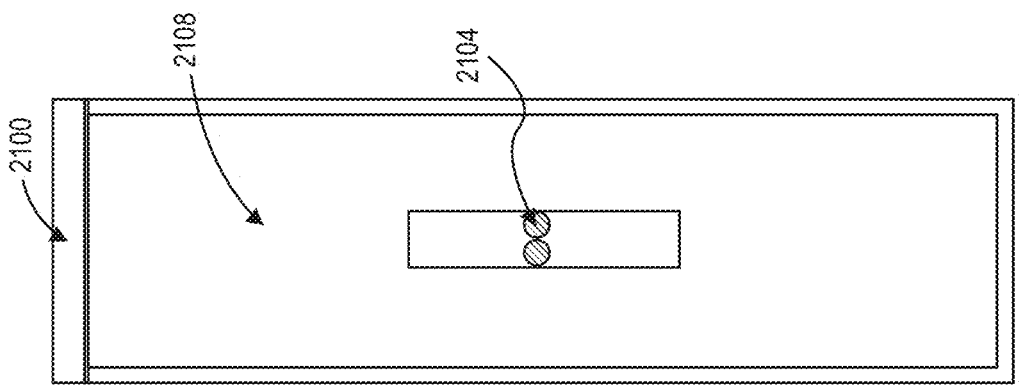

FIGS. 21A-21F illustrate non-limiting example of a process of forming working electrode zones 104 and auxiliary electrodes 102 in one or more wells 200, in accordance with an embodiment hereof. While FIGS. 21A-21F illustrate the formation of two (2) wells (as illustrated in FIG. 22A), one skilled in the art will realize that the process illustrated in FIGS. 21A-21F may be applied to any number of wells 200. Moreover, while FIGS. 21A-21F illustrate the formation of the auxiliary electrodes 102 and the working electrode zones 104 in an electrode design similar to the electrode design 701 illustrated in FIGS. 7A-7F, one skilled in the art will realize that the process illustrated in FIGS. 21A-21F may be utilized on an electrode design described herein.

The process for manufacturing the auxiliary electrodes 102, the working electrode zones 104, and other electrical components may be performed utilizing screen-printing processes as discussed below, where the different materials are formed using inks or paste. In embodiments, the auxiliary electrodes 102 and the working electrode zones 104 may be formed using any type of manufacturing process, e.g., 3D printing, deposition, lithography, etching, and combinations thereof.

Figure 21A:
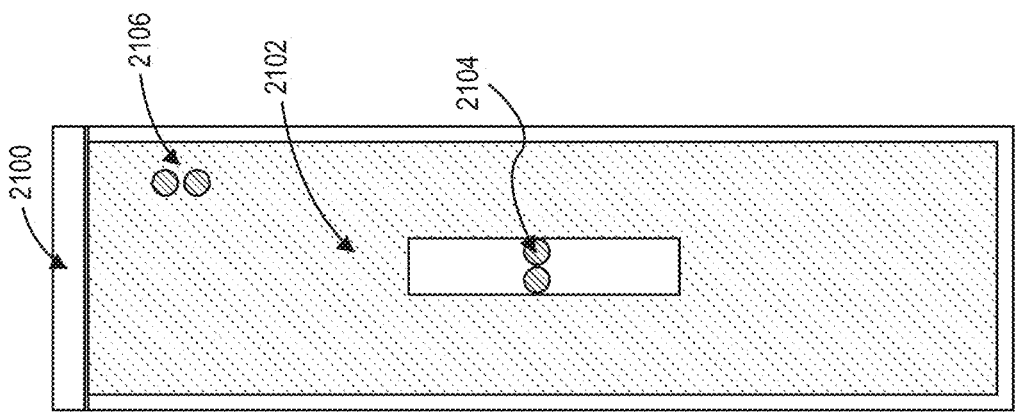
Figure 22A:
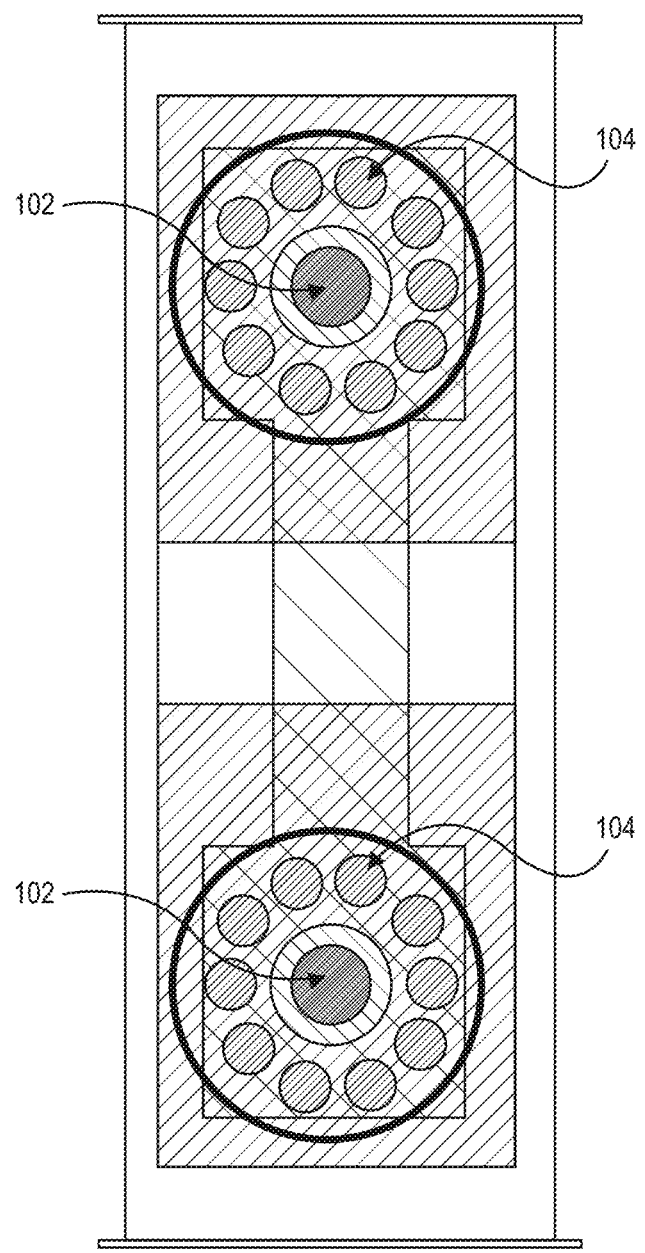

As illustrated in FIG. 21A, a first conductive layer 2102 may be printed on a substrate 2100. In embodiments, the substrate 2100 may be formed of any material (e.g., insulating materials) that provides a support to the components of the well 200. In some embodiments, the first conductive layer 2102 may be formed of a metal, for example, silver. Other examples of the first conductive layer 2102 may include metals such as gold, silver, platinum, nickel, steel, iridium, copper, aluminum, a conductive alloy, or the like. Other examples of the first conductive layer 2102 may include oxide coated metals (e.g., aluminum oxide coated aluminum). Other examples of the first conductive layer 2102 may include carbon-based materials such as carbon, carbon black, graphitic carbon, carbon nanotubes, carbon fibrils, graphite, carbon fibers and mixtures thereof. Other examples of the first conductive layer 2102 may include conducting carbon-polymer composites.

The substrate 2100 may also include one or more through holes or other type of electrical connections (e.g., traces, electrical contacts, etc.) for connecting the components of the substrate 2100 and providing locations where electrical connections may be made to the components. For example, as illustrated, the substrate 2100 may include first through holes 2104 and second through holes 2106. The first through holes 2104 may be electrically isolated from the first conductive layer 2102. The second through holes 2106 may be electrically coupled to the first conductive layer 2102. Fewer or greater numbers of holes are contemplated as well. For example, the through holes may be formed within the layers or materials forming the working electrode zones 104, the auxiliary electrodes 102, and the electrically insulating materials so that electrical contact may be made with the working electrode zones 104 and the auxiliary electrodes 102 without creating a short with other electrical components. For instance, one or more additional insulating layers may be formed on the substrate in order to support electrical traces that are coupled through while isolating the electrical traces.

As illustrated in FIG. 21B, a second conductive layer 2108 may be printed on the first conductive layer 2102. In embodiments, the second conductive layer 2108 may be formed of a chemical mixture that includes a mixture of silver (Ag) and silver chloride (AgCl), or other suitable metal/metal halide couples. Other examples of chemical mixtures may include metal oxides as discussed above. In some embodiments, the second conductive layer 2108 may be formed to be the approximate dimension of the first conductive layer 2102. In some embodiments, the second conductive layer 2108 may be formed to dimension that are larger or smaller than the first conductive layer 2102. The second conductive layer 2108 may be formed by printing second conductive layer 2108 using an Ag/AgCl chemical mixture (e.g., ink, paste, etc.) that has a defined ratio of Ag to AgCl. In an embodiment, an amount of oxidizing agent in a chemical mixture of an auxiliary electrode is at least based in part of a ratio of Ag to AgCl in the chemical mixture of the auxiliary electrode. In an embodiment, a chemical mixture of an auxiliary electrode having Ag and AgCl comprises approximately 50 percent or less AgCl, for example, 34 percent, 10 percent, etc. While not illustrated, one or more additional intervening layers (e.g., insulating layers, conductive layers, and combination thereof) may be formed in between the second conductive layer 2108 and the first conductive layer 2102.

As illustrated in FIG. 21C, a first insulating layer 2110 may be printed on the second conductive layer 2108. The first insulating layer 2110 may be formed of any type of insulating material, for example, a dielectric, polymers, glass, etc. The first insulating layer 2110 may be formed in a pattern to expose two portions ("spots") of the second conductive layer 2108, thereby forming two (2) auxiliary electrodes 102. The exposed portions may correspond to a desired shape and size of the auxiliary electrodes 102. In embodiments, the auxiliary electrodes 102 may be formed to any number, size, and shape, for example, as those described in the electrode designs described above with reference to FIGS. 3A-3F, 4A-4F, 5A-5C, 6A-6F, 7A-7F, 8A-8D, and 38A-39E.

Figure 21F:
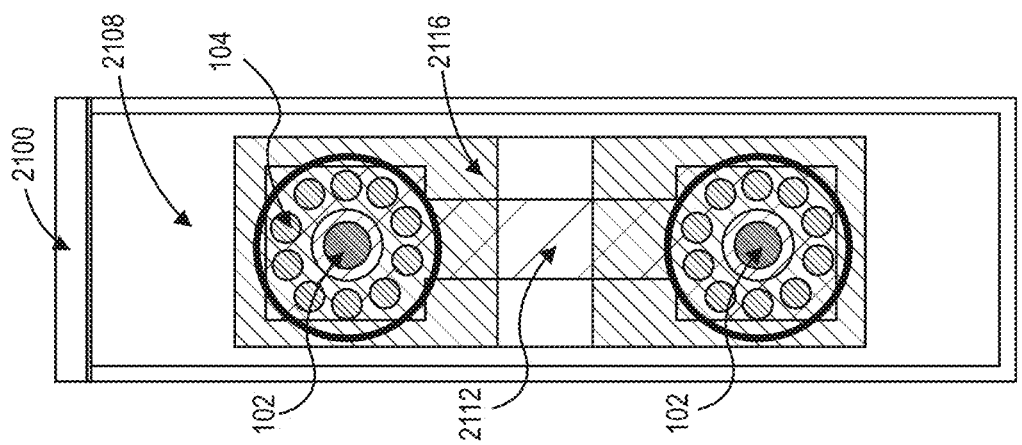
Figure 21E:
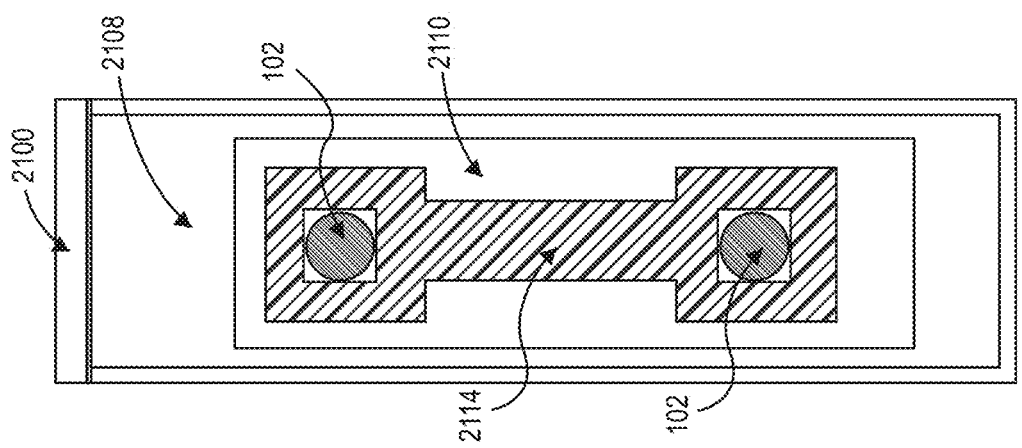
Figure 21D:
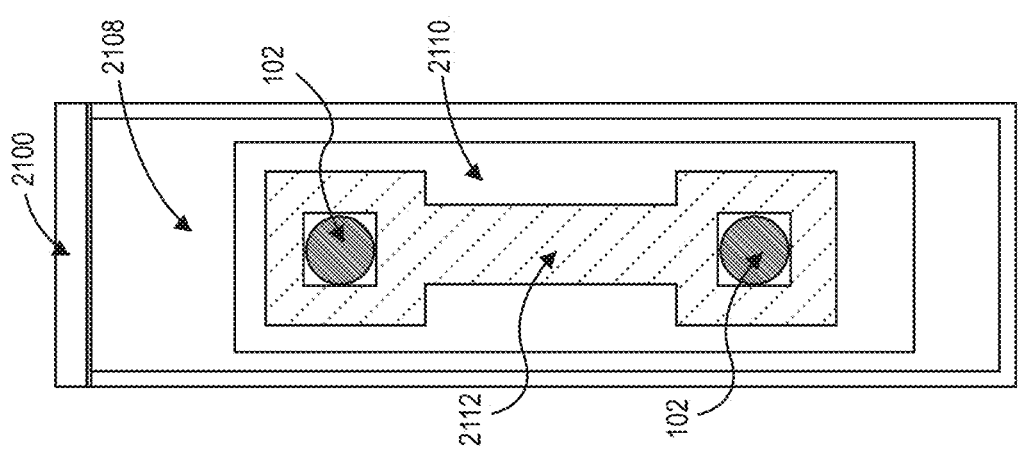

As illustrated in FIGS. 21D and 21E, a third conductive layer 2112 may be printed on the insulating layer 2110, and, subsequently, a fourth conductive layer 2114 may be printed on the third conductive layer 2112. In embodiments, the third conductive layer 2112 may be formed of a metal, for example, Ag. In embodiments, the fourth conductive layer 2114 may be formed of a composite material, for example, a carbon composite. Other examples of the first conductive layer 2102 may include metals such as gold, silver, platinum, nickel, steel, iridium, copper, aluminum, a conductive alloy, or the like. Other examples of the first conductive layer 2102 may include oxide coated metals (e.g., aluminum oxide coated aluminum). Other examples of the first conductive layer 2102 may include other carbon-based materials such as carbon, carbon black, graphitic carbon, carbon nanotubes, carbon fibrils, graphite, carbon fibers and mixtures thereof. Other examples of the first conductive layer 2102 may include conducting carbon-polymer composites. The third conductive layer 2112 and fourth conductive layer 2114 may be formed in a pattern to form a base of the working electrode zones and provide electrical coupling to the first through holes 2104. In embodiments, through holes may be formed to any number, size, and shape, for example, as those described in the electrode designs described above with reference to FIGS. 3A-3F, 4A-4F, 5A-5C, 6A-6F, 7A-7F, 8A-8D, and 38A-39E.

As illustrated in FIG. 21F, a second insulating layer 2116 may be printed on the fourth conductive layer 2114. The second insulating layer 2116 may be formed of any type of insulating material, for example, a dielectric. The second insulating layer 2116 may be formed in a pattern to expose twenty (20) portions ("spots") of the fourth conductive layer 2114, thereby forming ten (10) working electrode zones 104 for each well 200, as illustrated in FIG. 22A. The second insulating layer 2116 may also be formed to expose the auxiliary electrodes 102. Accordingly, printing or deposition of the second insulating layer 2116 may control the size and/or area of the working electrode zones 104 as well as the size and/or area of the auxiliary electrodes 102. The exposed portions may correspond to a desired shape and size of the working electrode zones 104 and the auxiliary electrodes 102. In embodiments, the working electrode zones 104 may be formed to any number, size, and shape, for example, as those described in the electrode designs described above with reference to FIGS. 3A-3F, 4A-4F, 5A-5C, 6A-6F, 7A-7F, 8A-8D, and 38A-39E. In certain embodiments, one of more of the described layers can be formed in particular order to minimize contamination, of layers (e.g., the carbon-based layers, etc.).

Figure 22B:
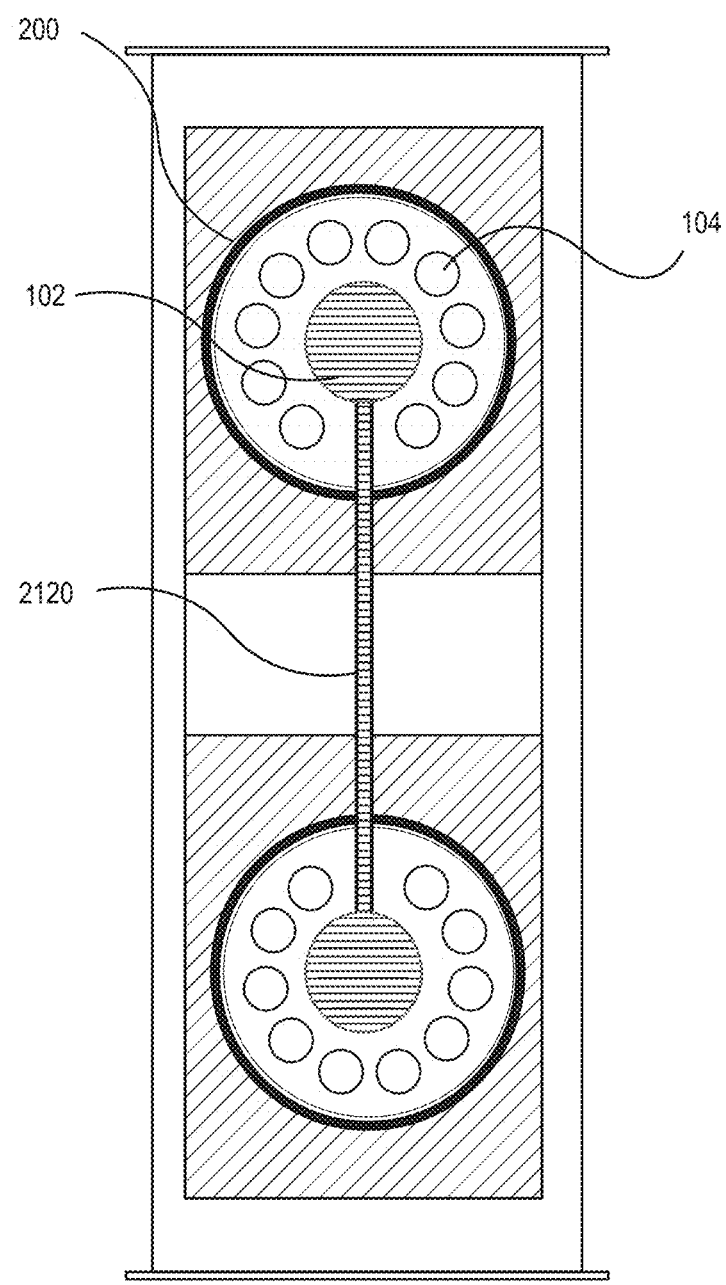
FIG. 22B illustrates embodiments of a well according to the present disclosure.

In the method described above, conductivity between the auxiliary electrodes 102 is maintained through the conductive layer 2108 which is then masked by the insulating layer 2110. This design permits the conductive connection between the auxiliary electrodes 102 to run underneath the working electrode zones 104. FIG. 22B illustrates a further embodiment of wells 200 as produced by a manufacturing method somewhat similar to that described above with respect to FIGS. 21A-F and 22A. As shown in FIG. 22B, the working electrode zones 104 may be arranged in a circular pattern having a gap, e.g., in a C-shape. Each well 200 may have, for example, ten working electrode zones. In further embodiments, any suitable number of working electrode zones may be included. The gap in the working electrode zone 104 pattern permits a conductive trace 2120 to run between the auxiliary electrodes 102 of the two wells 200. Because the conductive trace 2120 runs between the auxiliary electrodes 102 and does not cross over them, the auxiliary electrodes 102, working electrode zones 104, and conductive trace 2120 may be printed on a same layer during a manufacturing process. For example, in embodiments that include individually addressable working electrode zones 104, each of the auxiliary electrodes 102, working electrode zones 104, and conductive trace 2120 may be printed as individual features on a same layer of a substrate. The C-shape design of the electrodes depicted in FIG. 22B is not limited to use in a dual-well layout. Other layouts including different numbers of wells are consistent with embodiments hereof. For example, a single well layout may include the C-shaped electrode layout. In other examples, four or more wells 200 may be laid out with the C-shaped electrode layout and have multiple conductive traces 2120 connecting the auxiliary electrodes 102 of each well 200 in the layout.

Figure 23A:
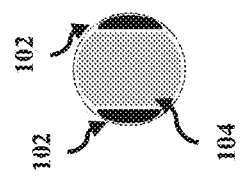
FIGS. 23A-23D illustrate several examples of electrode configuration in which tests were performed, according to embodiments disclosed herewith.
Figure 23B:
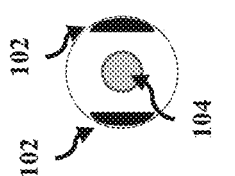
Figure 23C:
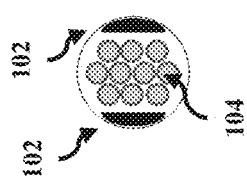
Figure 23D:
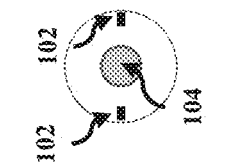

FIGS. 24A-24C, 25A-25C, 26A-26D, 27A-27C, 28, and 29 illustrate test results performed on various multi-well plates in accordance with embodiments hereof. The test included two different test lots. Each of the two different test lots included four (4) different configurations of the multi-well plates: Standard ("Std") 96-1 plates, Std 96ss plates (small spot plates), Std 96-10 plates, and Std 96ss "BAL." The Std 96-1 plates includes 96 wells 106 with 1 working electrode zone in each of the wells 106, as illustrated in FIG. 23A. The Std 96ss plates includes 96 wells 106 with 1 working electrode zone in each of the wells 106, as illustrated in FIG. 23B. The Std 96-10 plates includes 96 wells 106 with 10 working electrode zone in each of the wells 106, as illustrated in FIG. 23C. The Std 96ss "BAL" has two auxiliary electrodes and a single working electrode zone, as illustrated in FIG. 23D. In each test lot, three sets of each configuration of the multi-well plates was screen printed using different Ag/AgCl inks to produce different ratios of the chemical mixture of Ag/AgCl as shown in Table 8. Each of the plates described above were constructed with two auxiliary electrodes per well. The "BAL" configuration was constructed to have auxiliary electrodes with smaller dimension relative to the other configurations.

TABLE 9

| AgCl Ink | Ag:AgCl Molar Ratio |
|---|---|
| Ratio 1 | 90:10 |
| Ratio 2 | 66:34 |
| Ratio 3 | 50:50 |

The test also included a production control that included working electrode zones and counter electrodes formed of carbon labeled production control in the figures.

Tests were performed with test solution using electrodes designs as described above to generate voltammetry, ECL traces (ECL intensity vs. applied potential difference), integrated ECL signal measurements. The test solutions included three TAG solutions: 1 μM TAG (TAG refers to ECL labels or species that emit a photon when electrically excited) solution in T1x, 1 μM TAG solution in T2x, and MSD Free TAG 15,000 ECL (Y0260157). The 1 μM TAG solution in T1x included 5.0 mM Tris(2,2' bipyridine) ruthenium (II) chloride stock solution (Y0420016) and MSD T1x (Y0110066). The 1 μM TAG solution in T2x included 5.0 mM Tris(2,2' bipyridine) ruthenium (II) chloride stock solution (Y0420016) and MSD T2x (Y0200024). The test solutions also included a Read Buffer Solution that included MSD T1x (Y0110066). Measurements were performed for voltammetry, ECL Traces, and Free TAG 15,000 ECL tests and MSD T1x ECL signals under the following conditions.

For voltammetry using a standard three electrode configuration (working, reference, and counter electrode, using a one plate of each Ag/AgCl ink and one plate from inventory of Std 96-1, Std 96ss, and Std 96-10 were measured. Reductive voltammetry was measured on the counter electrodes. For reductive voltammetry, wells were filled with 150 μL of 1 μM TAG in T1x or 1 μM TAG in T2x and allowed to stand for at least 10 minutes. Waveforms were applied to the Ag/AgCl plates as follows: 0.1 V to −1.0 V and back to 0.1 V at 100 mV/s. Waveforms were applied to the production control as follows: 0 V to −3 V and back to 0 V at 100 mV/s. Three replicate wells of each solution were measured and averaged.

Oxidative voltammetry was measured on the working electrodes. For oxidative voltammetry, wells were filled with 150 μL of 1 μM TAG in T1x or 1 μM TAG in T2x and allowed to stand for at least 10 minutes. Waveforms were applied to the Ag/AgCl as follows: 0 V to 2 V and back to 0 V in 100 mV/s. Waveforms were applied to the production control as follows: 0 V to 2 V and back to 0 V in 100 mV/s. Three replicate wells of each solution were measured and averaged.

For ECL traces, one plate of each Ag/AgCl ink and one plate from inventory of Std 96-1, Std 96ss, and Std 96-10 were measured. Six wells were filled with 150 microliters (μL) of 1 micromolar (μM) TAG in T1x and six wells with 1 mM TAG in T2x. The plates were allowed to stand for at least 10 minutes. The ECL was measured on a proprietary video system using the following parameters: Ag/AgCl: 0 V to 3000 mV in 3000 ms imaged using with 120 sequential 25 ms frames (e.g., length of expose for an image) and production control: 2000 mV to 5000 mV in 3000 ms with 25 ms frames. The six replicate wells of each solution were averaged for ECL intensity vs. potential and Current vs. potential.

For the integrated ECL signals, six plates of each AgCl ink and six plates from inventory of Std 96-1, Std 96ss, and Std 96-10 were measured: two plates of MSD T1x and four plates of "Free TAG 15,000 ECL". The plates were filled with 150 μL of "Free TAG 15,000 ECL" or MSD T1x and allowed to stand for at least 10 min. The ECL was measured on an MESO QUICKPLEX SQ 120 instrument ("SQ 120") using the following waveforms for AgCl: 0 V to 3000 mV in 3000 ms. The ECL was measured on an SQ120 using the following waveforms for production control: 2000 mV to 5000 mV in 3000 ms. Intraplate and interplate values were calculated. The results of the test are discussed below.

Figure 24A:
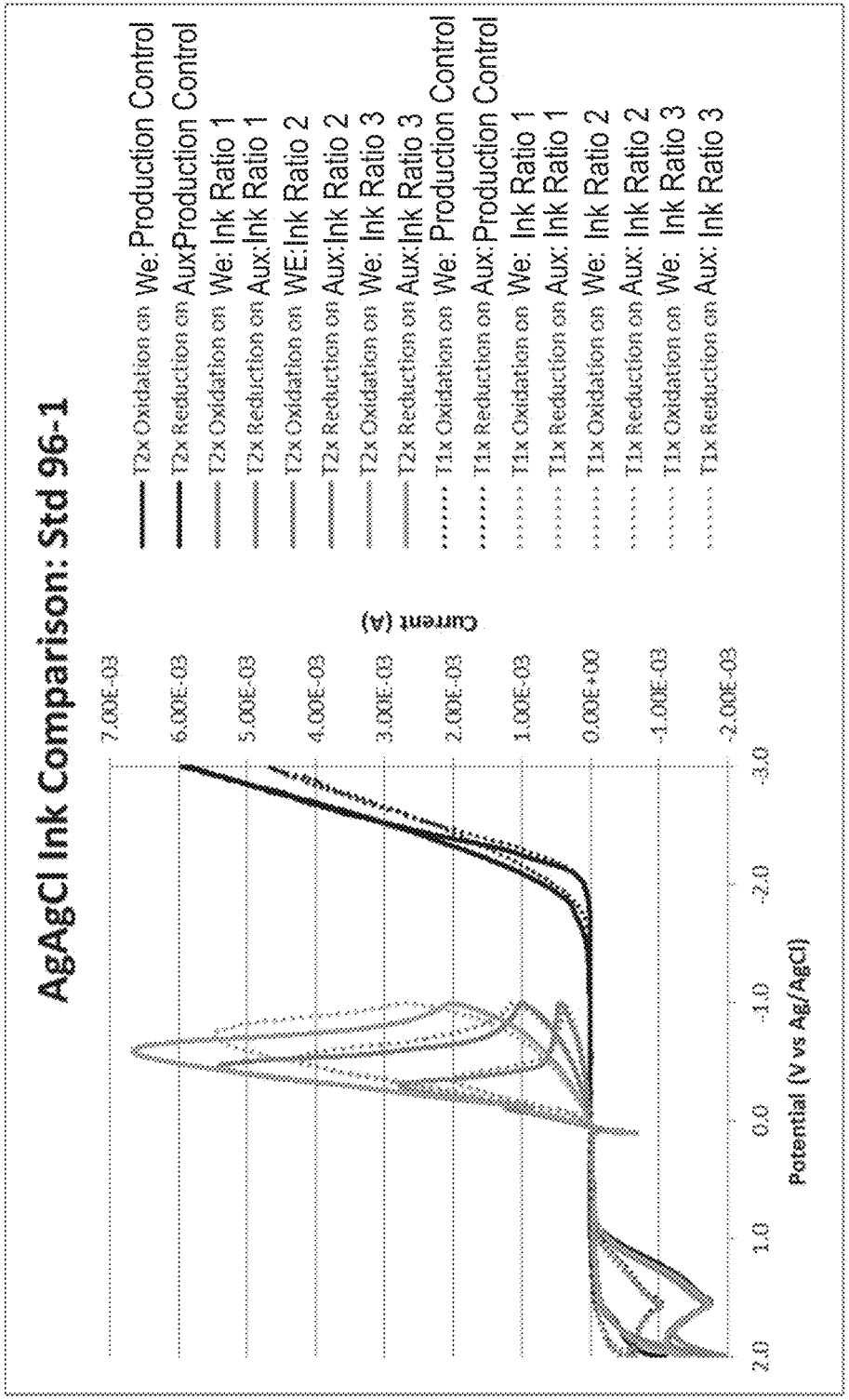
FIGS. 24A-24C, 25A-25C, 26A-26D, 27A-27C, and 28 illustrate test results performed on various multi-well plates, according to embodiments disclosed herewith.
Figure 24B:
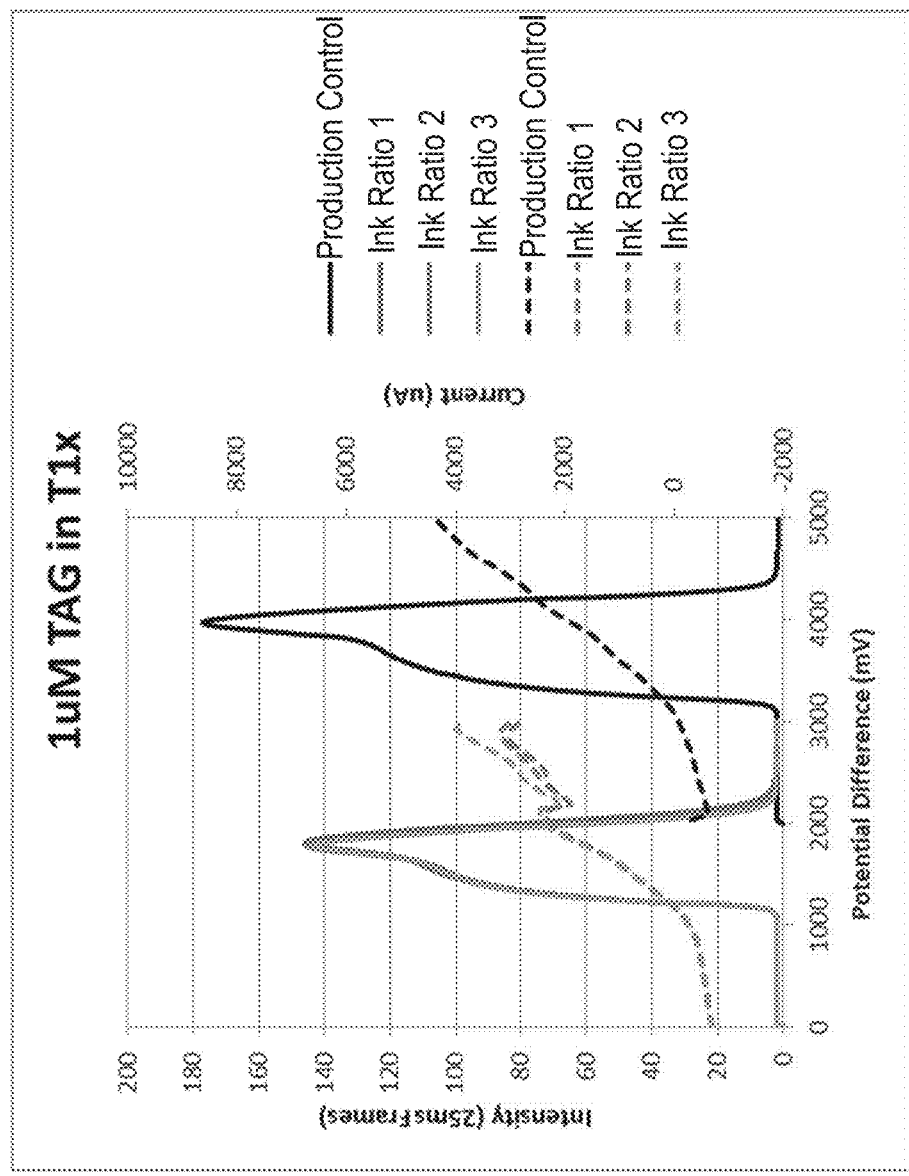
Figure 24C:
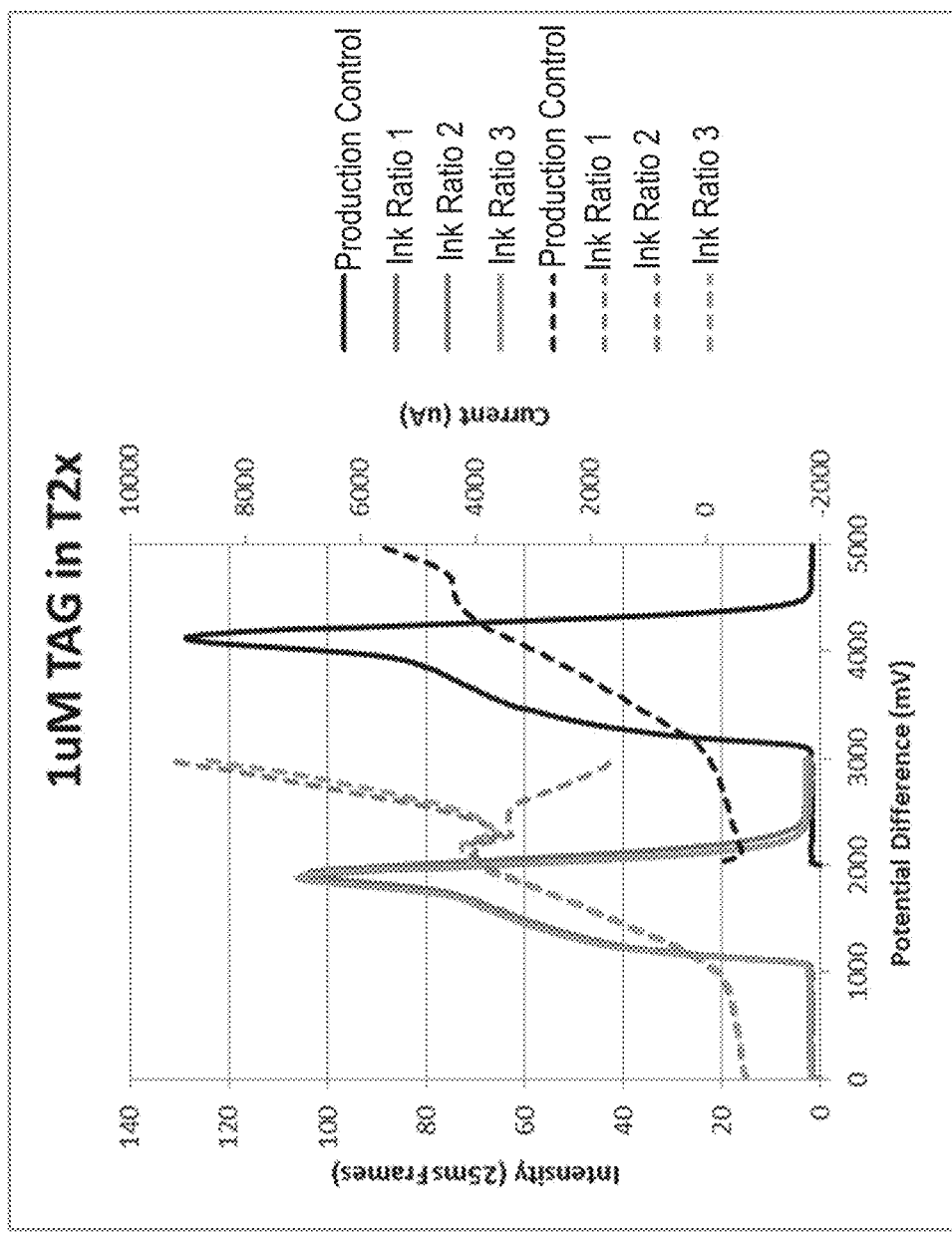

FIGS. 24A-24C illustrate the results from the ECL measure performed on Std 96-1 plates. FIG. 24A is graph showing voltammetry measurements for the Std 96-1 plates. In particular, FIG. 24A shows average voltammograms for the Std 96-1 plates. As illustrated in FIG. 24A, an increase in current occurred between T1x solution and T2x solution. The oxidative curves were similar for the three Ag/AgCl ink plates and the control plate. The onset of oxidation was at approximately 0.8 V vs. Ag/AgCl. The peak potential was at approximately 1.6 V vs. Ag/AgCl. A shift in the reduction occurred when the CE was changed from carbon to Ag/AgCl. The onset of water reduction on carbon was at ca. −1.8 V vs. Ag/AgCl. The onset of AgCl reduction was at ca. 0 V vs. Ag/AgCl. An increase in total AgCl reduction occurred with an increase in the AgCl content of the Ag/AgCl ink. A small shoulder occurred at −0.16 V in the reductive voltammetry on Ag/AgCl that increased in current between the T1x solution and T2x solution. These results show that increasing the concentration of read buffer from T1x to T2x increased the oxidative current. Incorporating AgCl into the auxiliary electrode shifted the onset of reduction to the expected 0 V vs. the carbon reference electrode. Increasing the AgCl in the ink increased the total AgCl reduction without impacting the slope of the current vs. potential curves.

FIG. 24B and FIG. 24C are graphs showing ECL measurements for the Std 96-1 plates. In particular, FIG. 24B and FIG. 24C show average ECL and current traces for the Std 96-1 plates having either the T1x solution or the T2x solution, as noted in FIG. 24A. As illustrated, the three Ag/AgCl ink plates yielded similar ECL traces. The onset of ECL occurred at ca. 1100 mV in T1x solution and T2x solution. The peak potentials occurred at 1800 mV for T1x solution and 1900 mV for T2x solution. The ECL intensity returned to baseline at ca. 2250 mV. The three Ag/AgCl ink plates yielded similar current traces except for lower current on Ink Ratio 1 (90/10 Ag:AgCl) with T2x at the end of the waveform. The ECL onset was shifted to ca. 3100 mV and the peak potential was shifted to ca. 4000 mV on the production plate. The relative shift in ECL on the production plate was comparable to the shift in the onset of reductive current measured in the referenced voltammetry. The full width at half max of the ECL trace on the production plate was wider than with the Ag/AgCl ink plates, which correlates with the lower slope of the reductive current in the reference voltammetry.

As shown in FIG. 24C, the total current passed during the waveform with the 90:10 ratio was less than with the other inks. This indicated the 90:10 ratio may limit the amount of oxidation that could occur at the working electrode. A ratio of 50:50 was selected to ensure sufficient reductive capacity for experiments where more current might be passed than with FT in T2x using this waveform. As shown by the tests, Ag/AgCl ink provides a controlled potential for the reduction on the auxiliary electrode 102. Using the Ag/AgCl, the auxiliary electrode 102 shifts the ECL reactions to the potentials where TPA oxidation occurs when measured using a true Ag/AgCl reference electrode.

For the auxiliary electrode 102, the amount of AgCl accessible in the auxiliary electrode 102 needs to be sufficient to not be fully consumed during the ECL measurement. For example, one mole of AgCl is required for every mole of electrons passed during oxidation at the working electrode. Less than this amount of AgCl will result in loss of control of the interfacial potential at the working electrode zones 104. A loss of control refers to a situation which interfacial potential is not maintained within a particular range throughout the chemical reaction. One goal of having a controlled interfacial potential is to ensure consistency and repeatability of readings well-to-well, plate-to-plate, screen lot-screen lot, etc.

Table 10 shows intraplate and interplate FT and T1x values of the Std 96-1 plates determined from the ECL measurement. As shown in Table 10, the three Ag/AgCl ink plates yielded equivalent values. The production plate yielded higher FT and T1x ECL signals. These higher signals may be attributed to a lower effected ramp rate due to the lower slope of the reductive voltammetry.

solution. The oxidative curves were similar for the three Ag/AgCl ink plates and the control plate. The onset of oxidation occurred at ca. 0.8 V vs. Ag/AgCl. The peak potential occurred at approximately 1.6 V vs. Ag/AgCl. A shift in the reduction occurred when the auxiliary electrode was changed from carbon to Ag/AgCl. The onset of water reduction on carbon occurred at approximately −1.8 V vs. Ag/AgCl. The onset of AgCl reduction occurred at approximately 0 V vs. Ag/AgCl. There was an increase in total AgCl reduction with an increase in the AgCl content of the Ag/AgCl ink. A small shoulder occurred at −0.16 V in the reductive voltammetry on Ag/AgCl that increased in current between the T1x solution and the T2x solution.

Figure 25A:
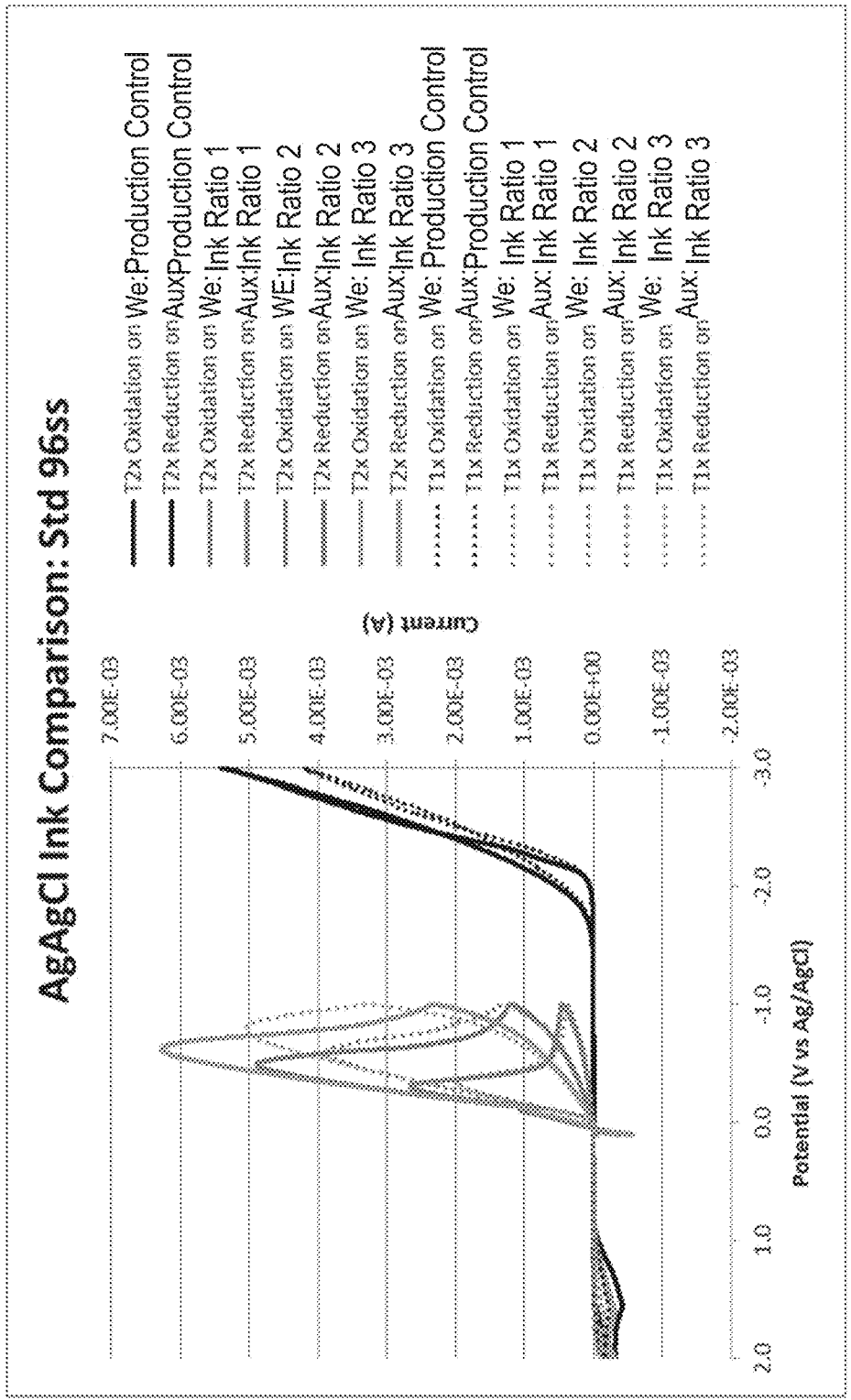
Figure 25B:
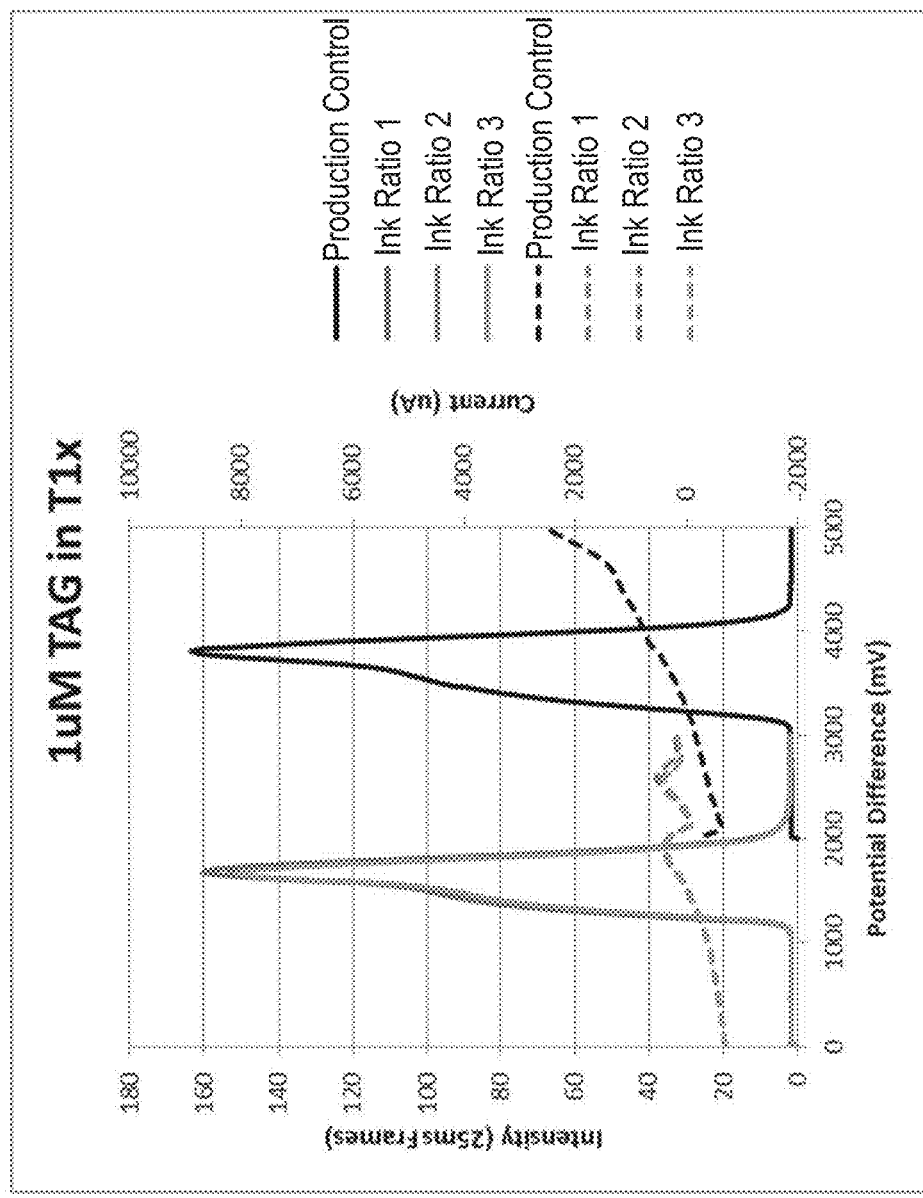
Figure 25C:
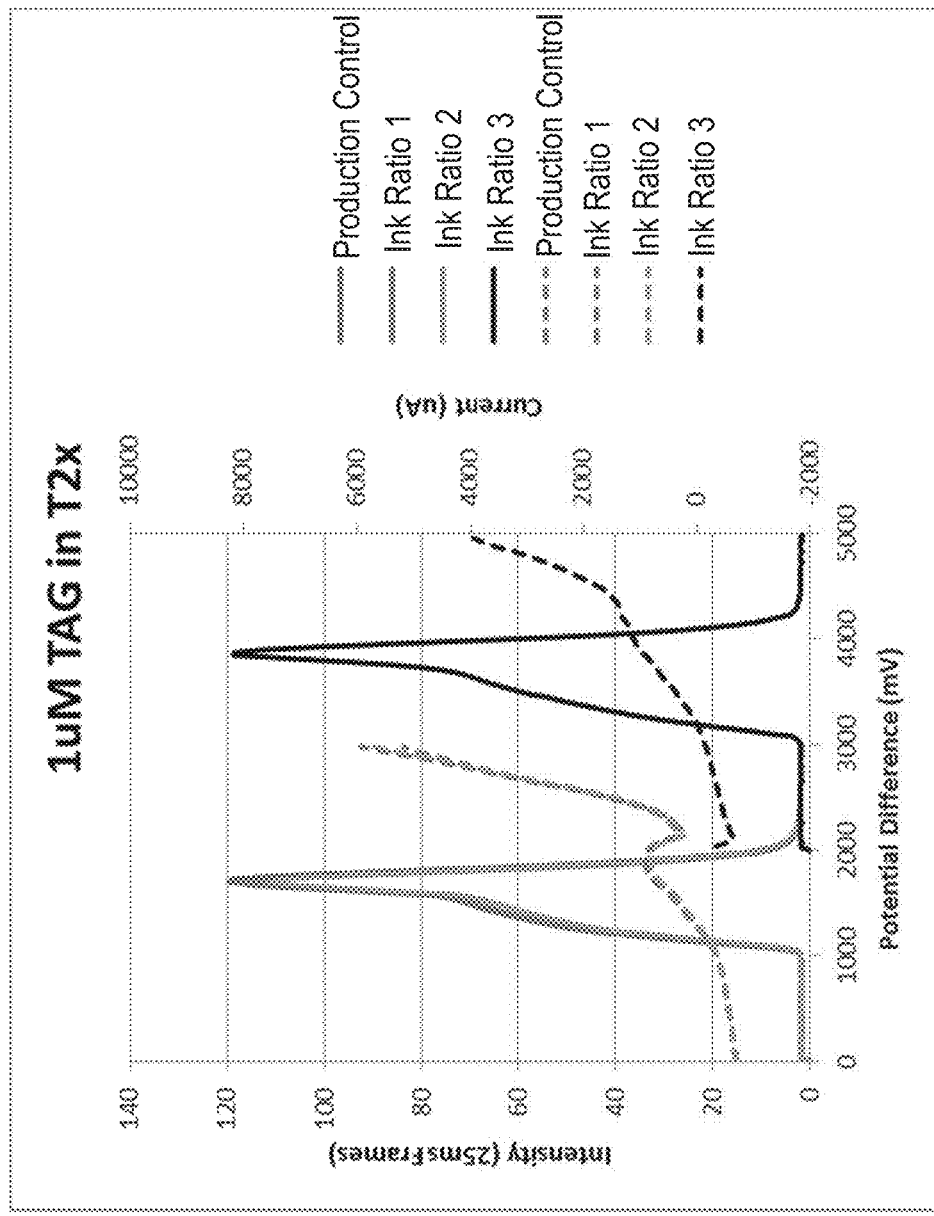

FIG. 25B and FIG. 25C are graphs showing ECL measurements for the Std 96ss plates. In particular, FIG. 125B and FIG. 25C show average ECL and current traces for the Std 96ss plates having either the T1x solution or the T2x solution, as noted in FIG. 10A. As illustrated, the three Ag/AgCl ink plates yielded very similar ECL traces. The onset of ECL occurred at approximately 1100 mV in the T1x solution and the T2x solution. The peak potentials occurred at 1675 mV for the T1x solution and 1700 mV for the T2x solution. The ECL intensity returned to baseline at approximately 2175 mV. The three Ag/AgCl ink plates yielded similar current traces. The ECL onset was shifted to approximately 3000 mV, and the peak potential was shifted to approximately 3800 mV on the production plate. The relative shift in ECL on the production plate was comparable to the shift in the onset of reductive current measured in the referenced voltammetry. The full width at half max of the ECL trace on the production plate was wider than with the Ag/AgCl ink plates, which correlates with the lower slope of the reductive current in the reference voltammetry. The results shown in FIGS. 25A-25C are consistent with those of FIGS. 24A-24C, indicating that the changes occurring due to use of the Ag/AgCl electrodes are robust across different electrode configurations.

Table 11 shows intraplate and interplate FT and T1x values for the Std 96ss plates determined from the ECL measurement. As shown in Table 11, the three Ag/AgCl ink plates yielded equivalent values. The production plate

TABLE 10

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 12,856 | 1.4% | 1.6% | 206 | 62 | 5.7% |
| 66/34 | 0 | 3000 | 3000 | 12,399 | 1.1% | 1.1% | 139 | 74 | 100.5% |
| 50/50 | 0 | 3000 | 3000 | 12,338 | 1.4% | 1.0% | 127 | 69 | 5.7% |
| n/a | 2000 | 3000 | 3000 | 14,484 | 1.4% | 1.9% | 277 | 95 | 4.1% |

FIGS. 25A-25C illustrate the results from the ECL measure performed on Std 96ss plates. FIG. 25A is graph showing voltammetry measurements for the Std 96ss plates. In particular, FIG. 25A shows average voltammograms of the Std 96ss plates. As illustrated in FIG. 25A, an increase in current occurred between the T1x solution and the T2x yielded higher FT and T1x ECL signals. These higher signals may be attributed to a lower effected ramp rate due to the lower slope of the reductive voltammetry. The higher background signal on the production plate may have been due to a non-standard waveform on the reader used for that experiment.

TABLE 11

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 13,634 | 3.4% | 8.2% | 1112 | 94 | 5.9% |
| 66/34 | 0 | 3000 | 3000 | 13,705 | 2.2% | 4.3% | 589 | 106 | 4.3% |

TABLE 11-continued

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 50/50 | 0 | 3000 | 3000 | 13,475 | 3.4% | 5.9% | 791 | 104 | 5.6% |
| n/a | 2000 | 3000 | 3000 | 15,443 | 3.4% | 2.4% | 366 | 122 | 3.1% |

Figure 26A:
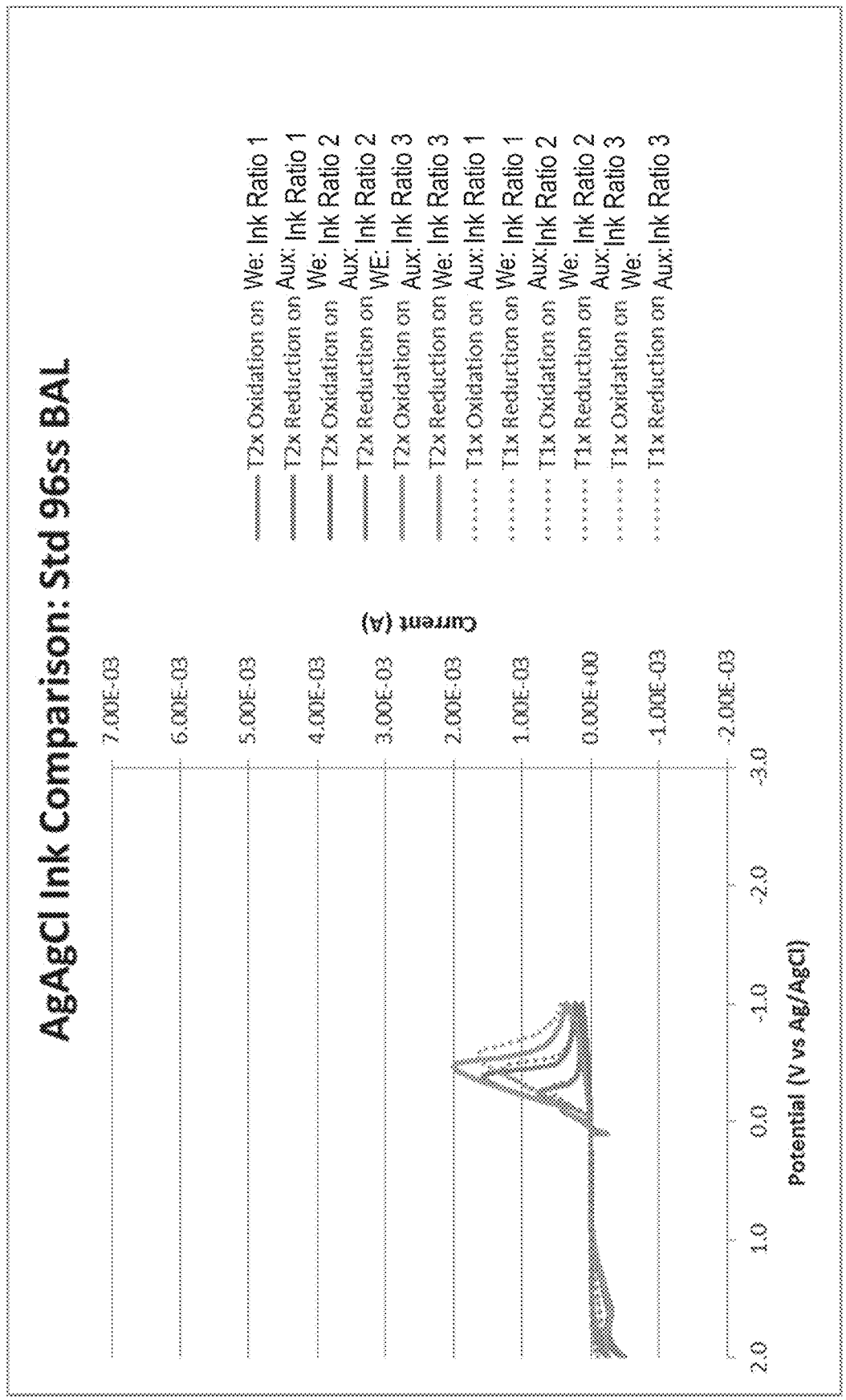

FIGS. 26A-26D illustrate the results from the ECL measure performed on Std 96ss BAL plates. FIG. 26A is a graph showing voltammetry measurements for the Std 96ss BAL plates. In particular, FIG. 26A shows average voltammograms for the Std 96ss BAL plates. As illustrated in FIG. 26A, an increase in current occurred between the T1x solution and the T2x solution. The oxidative curves were similar for the three Ag/AgCl ink plates and the production control. The onset of oxidation occurred at approximately 0.8V vs. Ag/AgCl. The peak potential occurred at ca. 1.6 V vs. Ag/AgCl. An increase in total AgCl reduction occurred with an increase in the AgCl content of the Ag/AgCl ink. A small shoulder at −0.16 V occurred in the reductive voltammetry on Ag/AgCl that increased in current between the T1x solution and the T2x solution. The overall auxiliary electrode current was reduced relative to the Std 96ss plate configuration due to the smaller electrode area. The slope of the current vs. potential plot was lower than in the Std 96ss plate configuration.

Figure 26B:
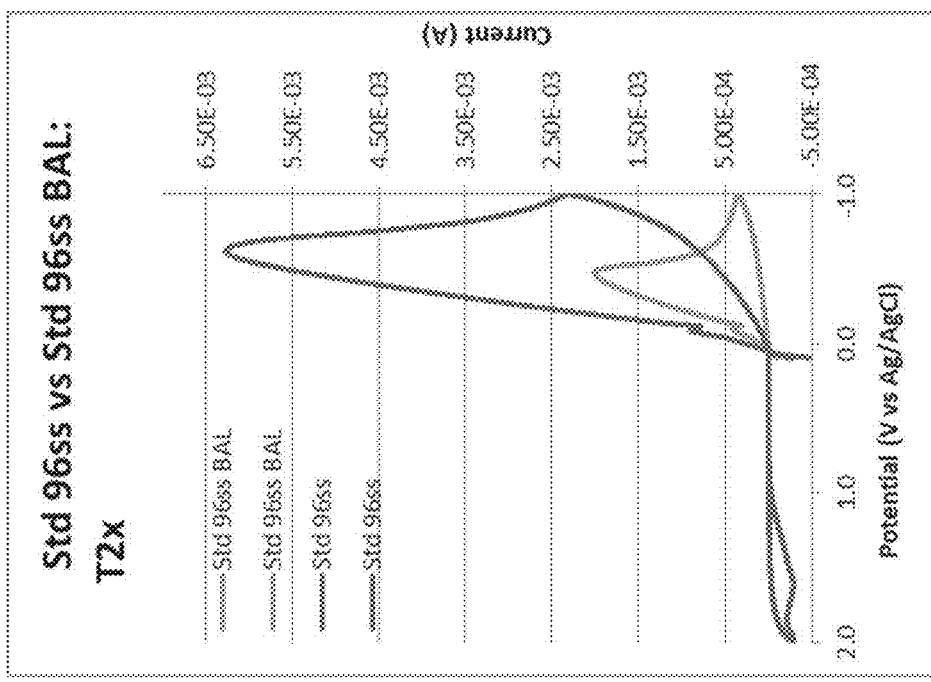

FIG. 26B is a graph showing Std 96ss vs. Std 96ss BAL with the T2x solution on Ink Ratio 3. As illustrated in FIG. 26B, the oxidative peak current (approximately −0.3 mA) was similar for both of these formats. At most reductive currents Std 96ss BAL was at a higher negative potential than Std 96ss.

Figure 26C:
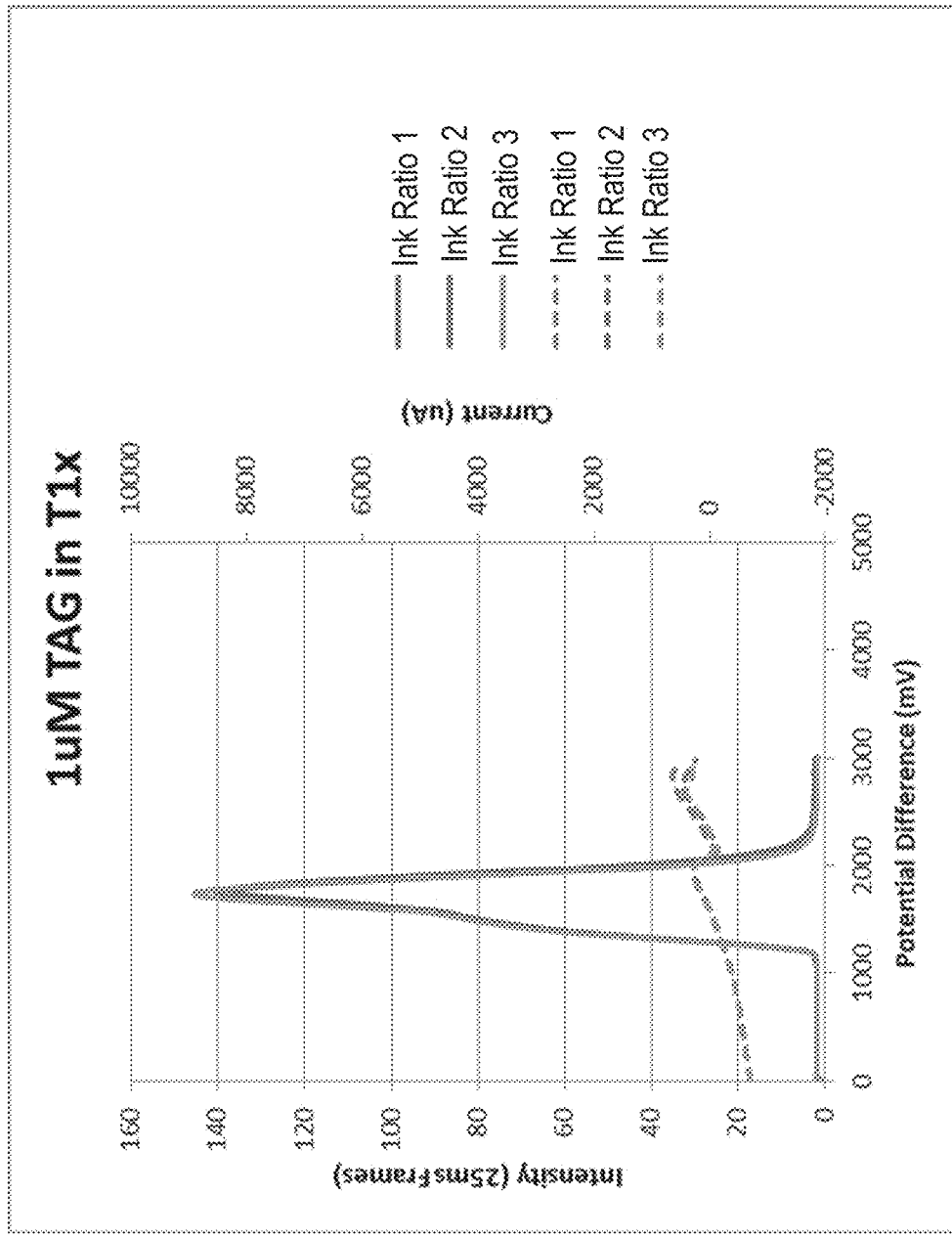
Figure 26D:
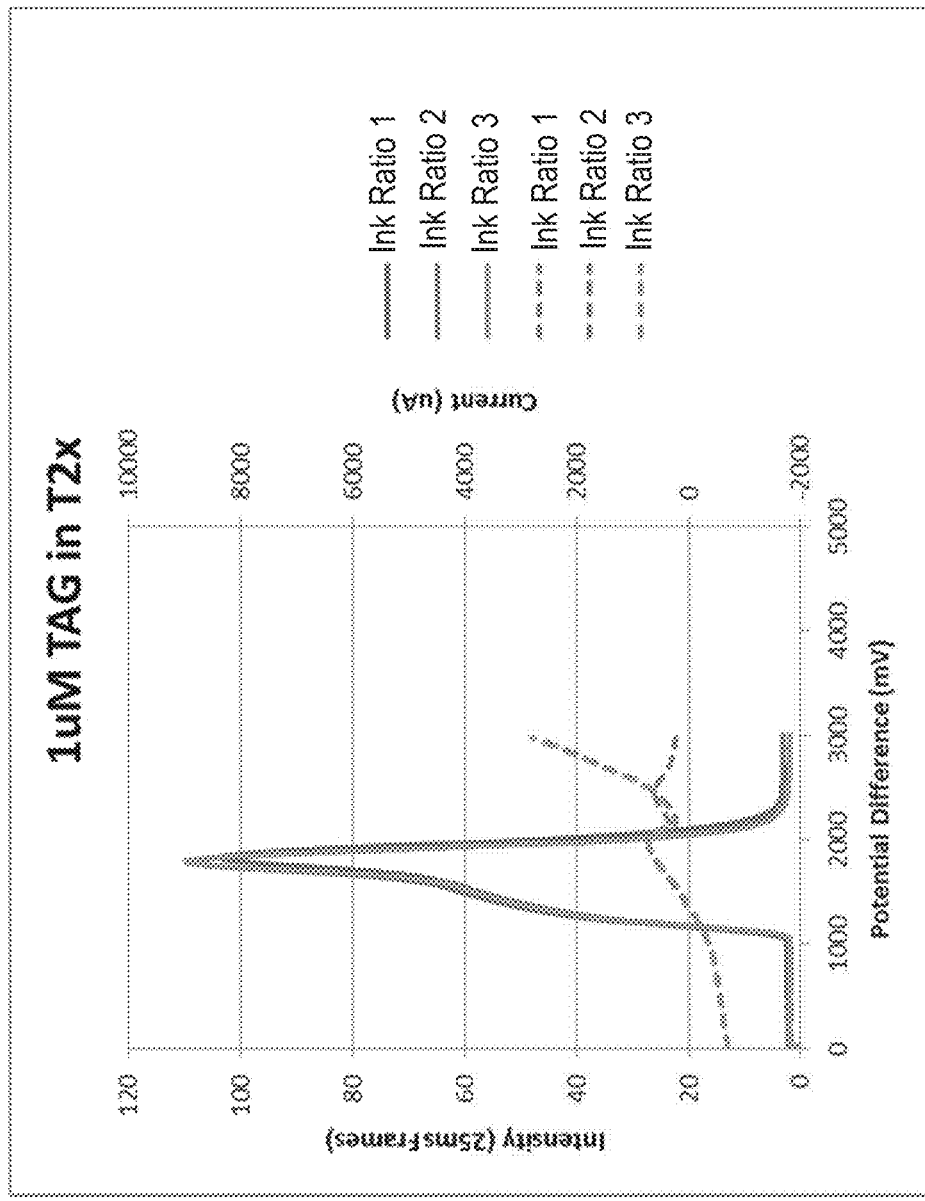

FIG. 26C and FIG. 26D are graphs showing ECL measurements for the Std 96ss BAL plates. In particular, FIG. 26C and FIG. 26D show average ECL and current traces for the Std 96ss BAL plates having either the T1x solution or the T2x solution. As illustrated, the three plates with Ag/AgCl counter electrodes yielded similar ECL traces. The onset of ECL occurred at ca. 1100 mV in the T1x solution and the T2x solution. The peak potentials occurred at 1750 mV for the T1x solution and 1800 mV for the T2x solution. The ECL intensity returned to baseline at ca. 2300 mV. The onset of ECL was similar to Std 96ss plates, but the peak potential and return to baseline was shifted later in potential than on Std 96ss plates. The differences between Std 96ss plates and the Std 96ss BAL plates may be attributed to a lower effected ramp rate due to the lower slope of the reductive voltammetry on the smaller counter electrode. The three plates with Ag/AgCl counter electrodes yielded similar current traces except for lower current on 90/10 Ag:AgCl with the T2x solution at the end of the waveform. The different behavior of Ink Ratio 1 with the T2x solution was also observed in the Std 96-1 plate format. The results shown in FIGS. 26A-26D are consistent with those of FIGS. 24A-24C and 25A-25C, indicating that the changes occurring due to use of the Ag/AgCl electrodes are robust across different electrode configurations.

Table 12 shows intraplate and interplate FT and T1x values for the Std 96ss BAL plates determined from the ECL measurement. As shown in Table 12, the ECL signals are higher than in the Std 96ss plate configuration. The higher signals may be attributed to a lower effective ramp rate due to the lower slope of the reductive voltammetry on the smaller counter electrode. There was decreasing FT signal with increasing AgCl content in the ink.

TABLE 12

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 16,061 | 2.8% | 4.4% | 710 | 94 | 7.2% |
| 66/34 | 0 | 3000 | 3000 | 15,330 | 2.2% | 4.4% | 679 | 106 | 4.4% |
| 50/50 | 0 | 3000 | 3000 | 14,635 | 2.8% | 9.6% | 1412 | 99 | 5.1% |

Figure 27A:
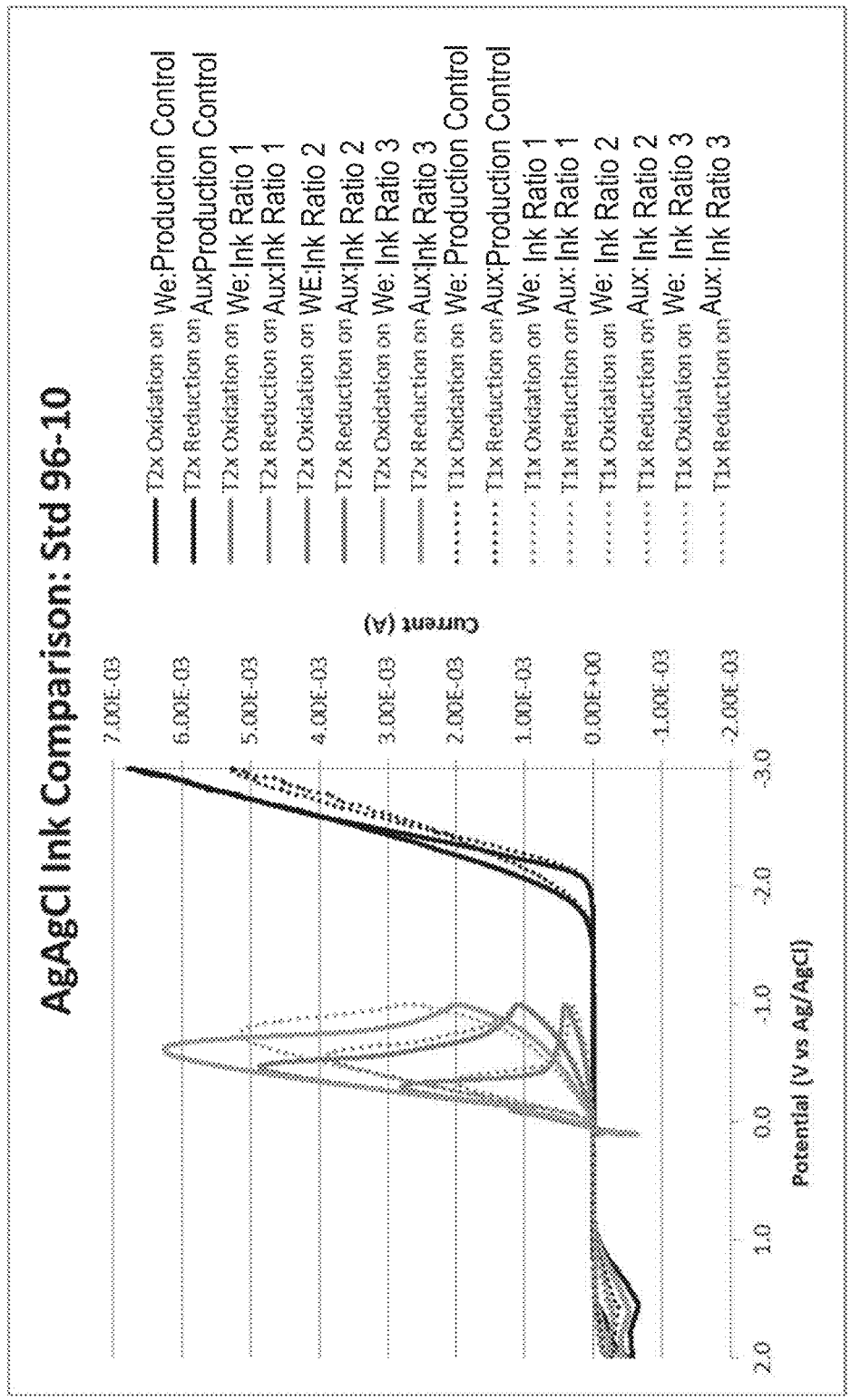
Figure 27B:
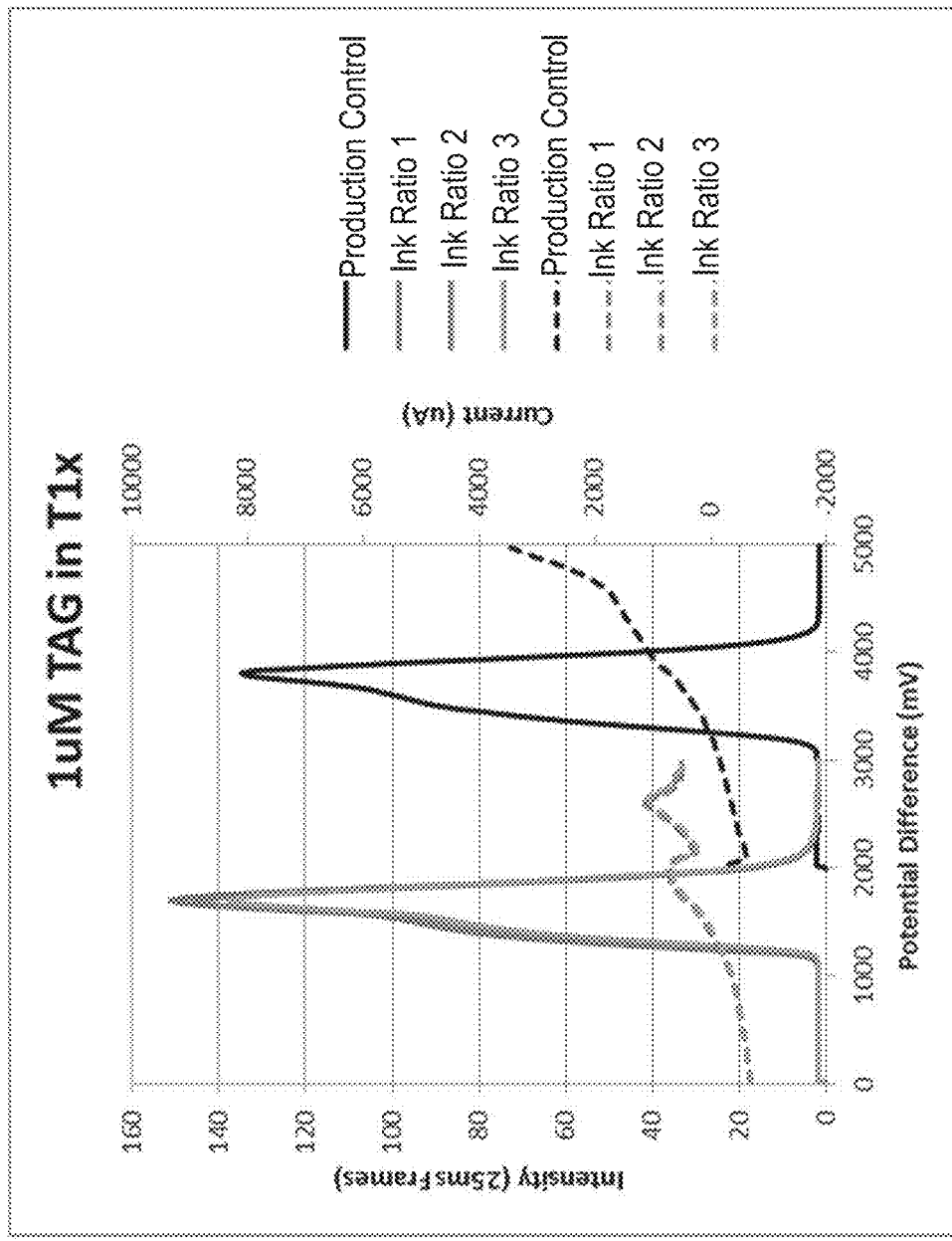
Figure 27C:
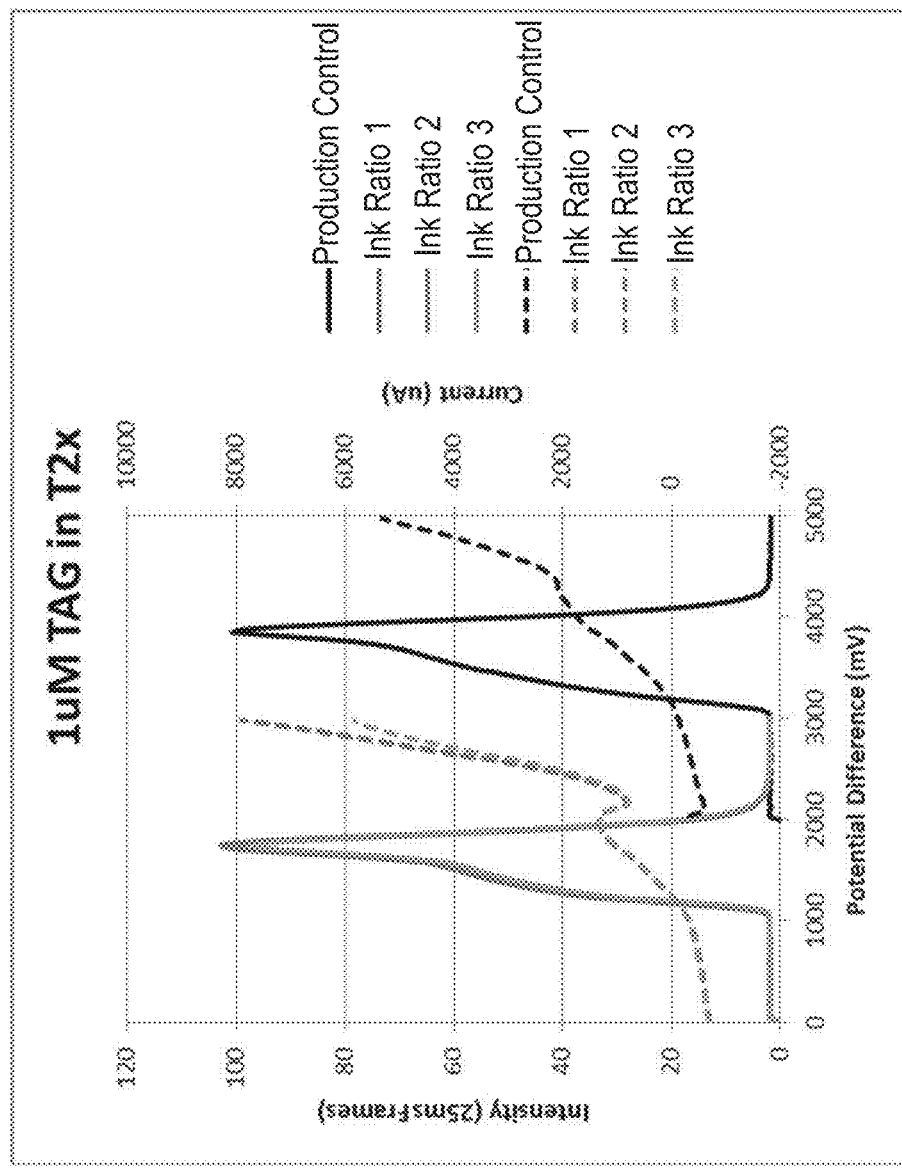
Figure 28:
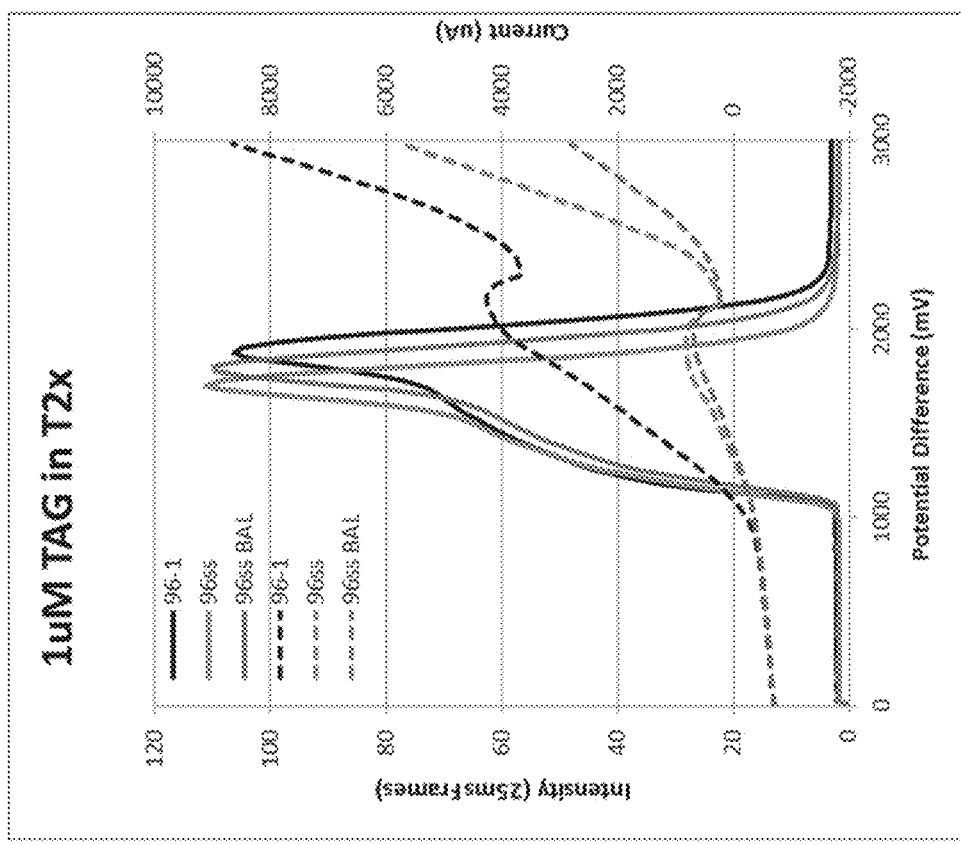

FIGS. 27A-27C illustrate the results from the ECL measure performed on Std 96-10 plates. FIG. 27A is graph showing voltammetry measurements for the Std 96-10 plates. In particular, FIG. 27A shows average voltammograms for the Std 96-10 plates. As illustrated in FIG. 27A, an increase in current occurred between the T1x solution and the T2x solution. The oxidative curves were similar for the three plates with Ag/AgCl counter electrode and the production control. The onset of oxidation occurred at approximately 0.8 V vs. Ag/AgCl. The peak potential occurred at approximately 1.6 V vs. Ag/AgCl. Higher oxidative current was present on the production control. A shift in the reduction occurred when the auxiliary counter electrode was changed from carbon to Ag/AgCl. The onset of water reduction on carbon occurred at approximately −1.8 V vs. Ag/AgCl. The onset of AgCl reduction occurred at approximately 0 V vs. Ag/AgCl. An increase in total AgCl reduction occurred with an increase in the AgCl content of the Ag/AgCl ink. A small shoulder at −0.16 V occurred in the reductive voltammetry on Ag/AgCl that increased in current between the T1x solution and the T2x solution.

FIG. 27B and FIG. 27C are graphs showing ECL measurements for the Std 96-10 plates. In particular, FIG. 27B and FIG. 27C show average ECL and current traces for the Std 96-10 plates having either the T1x solution or the T2x solution. As illustrated, the three plates with Ag/AgCl counter electrodes yielded similar ECL traces. The onset of ECL occurred at approximately 1100 mV in the T1x solution and the T2x solution. The peak potentials occurred at 1700 mV for the T1x solution and 1750 mV for the T2x solution. The ECL intensity returned to baseline at approximately 2250 mV. The three plates with Ag/AgCl counter electrodes yielded similar current traces. The ECL onset was shifted to approximately 3000 mV, and the peak potential was shifted to approximately 3800 mV on the production plate. The relative shift in ECL on the production plate was comparable to the shift in the onset of reductive current measured in the referenced voltammetry. The full width at half max of the ECL trace on the production plate was wider than with the Ag/AgCl inks, which correlates with the lower slope of the reductive current in the reference voltammetry. The results shown in FIGS. 27A-27C are consistent with those of FIGS. 24A-24C, 25A-25C, and 26A-26D, indicating that the changes occurring due to use of the Ag/AgCl electrodes are robust across different spot sizes.

Table 13 shows intraplate and interplate FT and T1x values the Std 96-10 plates determined from the ECL measurement. As shown in Table 13, the three plates with Ag/AgCl counter electrodes yielded equivalent values. The production plate yielded lower FT and T1x ECL signals. The source of the lower signals on the production plate is not known, but may be associated with the higher oxidative currents measured in the referenced voltammetry.

Example 4—Effect of the Ratio of Working Electrode to Auxiliary Electrode Area on the Performance of Ag/AgCl Auxiliary Electrodes Four different multi-well plate configurations were tested that differed in the ratio of working electrode to auxiliary electrode area within each well, as illustrated by the exposed working electrode areas 104 and auxiliary electrode areas 102 in the electrode patterns depicted in FIGS. 23A-D. The first—"Std 96-1 Plates" (FIG. 23A)—have wells with a large working electrode area (as defined by a dielectric ink patterned over the working electrode) bounded by two auxiliary electrode strips and have the same electrode configuration as the plates used in Examples 2 and 3. The second—"Std 96ss Plates" (FIG. 23B)—is similar to the first except that the dielectric ink over the working electrode area is patterned to only expose a smaller circular exposed

TABLE 13

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 15,777 | 2.8% | 5.2% | 817 | 110 | 12.9% |
| 66/34 | 0 | 3000 | 3000 | 15,173 | 4.6% | 5.2% | 782 | 114 | 13.5% |
| 50/50 | 0 | 3000 | 3000 | 15,100 | 4.6% | 5.3% | 793 | 112 | 13.3% |
| n/a | 2000 | 3000 | 3000 | 13,098 | 4.6% | 5.2% | 678 | 57 | 27.1% |

As shown in the test results discussed above and in FIG. 28, the auxiliary electrodes comprising Ag/AgCl shifted the ECL in the unreferenced system to potentials comparable to the oxidations measured in the referenced system, i.e., systems including separate reference electrode. For the auxiliary electrodes composed of Ag/AgCl, the ECL onset occurred at a potential difference of 1100 mV. The ECL peaks occurred at potential differences of (plate type average): Std 96-1 plate—1833 mV, Std 96ss plate—1688 mV, Std 96ss BAL plate—1775 mV, and Std 96-10 plate—1721 mV. Onset of oxidative current occurred at 0.8 V vs. Ag/AgCl. Peak oxidative current occurred at ca. 1.6 V vs. Ag/AgCl.

Additionally, as shown by the test results, three ink formulations were tested with a range of Ag to AgCl ratios, and the varying amount of AgCl was detectable in the referenced reductive voltammetry. All three formulations yielded comparable ECL traces. There were some differences in the current vs. potential plots when measuring ECL in the T2x solution. Current capacity appeared to be limited for Std 96-1 and Std 96ss BAL with Ag:AgCl ratio 90/10, and these plate types have the largest working to counter electrode area ratios. FT signals were comparable with the 3 formulations except in the 96ss BAL plate type.

In the preceding examples, the Std 96-1 plate working electrode area is 0.032171 in$^2$. The Std 96ss plate working electrode area is 0.007854 in$^2$. The Std 96-1 and Std 96sspr auxiliary electrode area was estimated to be 0.002646 in$^2$. The Std 96ss BAL plate auxiliary electrode area was designed to be 0.0006459 in$^2$. The area ratios may be: Std 96-1:12.16, Std 96ss:2.968, and Std 96ss BAL:12.16. The ratios of the peak reductive currents on Std 96ss plate and Std 96ss BAL plate indicate the auxiliary electrode area in Std 96ss BAL plate was reduced to 0.0007938 in$^2$. The ECL traces suggest that this reduction in counter electrode area is approaching what is needed to unify the ECL traces from Std 96-1 plate and Std 96ss BAL plate.

working electrode area (providing a small spot or "ss" area) in the center of the well. The third—"Std 96-10" (FIG. 23C)—is similar to the first except that the dielectric ink over the working electrode area is patterned to expose 10 small circles of exposed working electrode area providing a "10-spot" pattern of working electrode areas in each well. The fourth—"Std 96ss BAL" (FIG. 23D)—has the small exposed working electrode area of the Std 96ss pattern, but the area of the exposed auxiliary electrodes is significantly reduced so that the ratio of working electrode area to counter electrode area is similar to the Std 96-1 configuration maintaining a balance between these areas. The total area of exposed working electrode and the total area of exposed auxiliary electrode, and the ratio of the working electrode to counter electrode areas, for each of the configurations is provided in Table 14. To evaluate the effect of Ag/AgCl ink on auxiliary electrode performance, each of the electrode configurations was manufactured using auxiliary electrodes prepared with three different inks having different ratios of Ag to AgCl as described in Table 15. The Std 96-1, Std 96ss and Std 96-10 configurations were also compared to analogous plates—the "control" or "production control" plates—having conventional carbon ink counter electrodes instead of Ag/AgCl auxiliary electrodes (MSD 96 well, MSD 96 Well Small Spot and MSD 96 Well 10 Spot Plates, Meso Scale Diagnostics, LLC.).

TABLE 14

| Plate Type | Figure | Working Electrode Area (sq in) | Counter/Auxiliary Electrode Area (sq in) | WE:CE Area Ratio |
|---|---|---|---|---|
| 96-1 | 23A | 0.0322 | 0.00265 | 12.15 |
| 96ss | 23B | 0.00785 | 0.00265 | 2.96 |
| 96-10 | 23C | 0.00139 | 0.00265 | 5.25 |
| 96ss BAL | 23D | 0.00785 | 0.000646 | 12.15 |

TABLE 15

| Ag/AgCl Ink | Ag:AgCl Molar Ratio |
| --- | --- |
| Ratio 1 | 90:10 |
| Ratio 2 | 66:34 |
| Ratio 3 | 50:50 |

The different electrode configurations were evaluated by cyclic voltammetry in the presence of ECL read buffers (MSD Read Buffer T at 1× and 2× relative to the nominal working concentration), and by using them for ECL measurements of solutions of tris(2, 2' bipyridine) ruthenium (II) chloride ("TAG") in these read buffers. Voltammetry was measured using a standard three electrode configuration (working, reference, and counter electrode), using a 3M KCl Ag/AgCl reference electrode. Oxidation of the ECL read buffers on the working electrodes 104 was measured by cycling from 0 V to 2 V and back at a 100 mV/s scan rate using working electrodes 104 and auxiliary electrodes 102, respectively, as the working and counter electrodes for voltammetry. Reduction of the ECL read buffers on the auxiliary electrodes 102 was measured by cycling from −0.1 V to −1 V and back at a 100 mV/s scan rate using auxiliary electrodes 102 and working electrodes 104, respectively, as the working and counter electrodes for voltammetry. To measure reduction of the ECL read buffer on the carbon counter electrodes of the "control" plates, a wider voltage range was required and the voltage was cycled from 0 V to −3 V and back at a 100 mV/s scan rate. Wells were filled with 150 µL of ECL read buffer and allowed to stand for at least 10 minutes prior to measuring the voltammetry. Each solution was measured in triplicate wells and the voltammetric data was averaged.

Integrated ECL signals for TAG solutions were measured on an MESO QUICKPLEX SQ 120 instrument ("SQ 120") using the following waveforms: a 0 V to 3000 mV ramp over 3000 ms (for the test plates with Ag/AgCl auxiliary electrodes) and a 2000 mV to 5000 mV ramp over 3000 ms (for the controls plates with carbon ink counter electrodes). All wells were filled with 150 µL of MSD Free Tag ("FT", a solution of TAG in MSD Read Buffer T 1x designed to provide a signal of about 15,000 in the ECL signal units of the SQ 120 instrument) and the plates were allowed to stand for at least 10 minutes. Two replicate plates (96 wells per plate) of T1x were run to measure the background signal in the absence of TAG and 4 replicate plates for FT were measured to measure the ECL signal generated from the TAG. The instrument reports a value proportional to the integrated ECL intensity over the duration of applied waveform, after normalization for area of the exposed working electrode area. Intraplate and interplate averages and standard deviations were calculated across the wells run for each solution and electrode configuration.

To measure ECL intensity as a function of time during the ECL measurement, ECL measurements from TAG solutions were carried out on a modified MSD plate reader with a proprietary video system. The same waveforms and procedure were used as when measuring integrated signals; however, the ECL was imaged as a sequential series of 120×25 ms frames captured over the course of the 3000 ms waveforms and more concentrated solutions of TAG were used (1 µM TAG in MSD Read Buffer T 1x and 2x). Each frame was background corrected using an image captured prior to the start of the waveform. The ECL intensity for each exposed working electrode area (or "spot") in an image was calculated by summing up the intensity measured for each pixel in the region defined by the spot. For images with multiple spots within a well, the intensity value for the spots within the well were averaged. The instrument also measured electrical current passed through the well as a function of time during the ECL experiments. For each solution and electrode configuration, the average and standard deviation for the ECL intensity and current was calculated based on data from six replicate wells.

The voltammetry data for the Std 96-1, Std 96ss, Std 96 ss BAL and Std 96-10 plates are shown in FIGS. 24A, 25A, 26A and 27A, respectively. The oxidative current on the working electrodes 104 in this three-electrode setup is largely independent of the nature of the auxiliary or counter electrode with the onset of oxidation of the read buffers occurring at around 0.8 V and a peak in current at about 1.6 V, in all cases. The oxidative current increases from 1x to 2x read buffer as the concentration of the tripropylamine ECL coreactant increases, and the peak and integrated oxidative current increases roughly in scale with the exposed working electrode area (as provided in Table 14). The small differences that were observed in some cases between currents in the test and control plates were likely associated with differences in the carbon ink lots used to manufacture the working electrodes.

The reductive current measured at the auxiliary or counter electrodes 102 showed an onset of reduction at approximately 0 V for the Ag/AgCl auxiliary electrodes (associated with the reduction of AgCl to Ag) compared to about 3100 mV for the carbon ink counter electrodes (most likely associated with the reduction of water). An increase in the slope of the current onset and the overall integrated current was observed for Read Buffer T at 2x vs. 1x concentration, however, the increase was small and may be associated with the higher ionic strength at 2x. For a given combination of Ag/AgCl ink and read buffer formulations, the reductive currents measured at the auxiliary electrode for the Std 96-1, Std 96ss and Std 96-10 electrode configurations were largely independent of the electrode configuration, as the auxiliary electrode geometries in these configurations were identical. As the percentage of AgCl in the Ag/AgCl ink increased from 10% (Ratio 1) to 34% (Ratio 2) to 50% (Ratio 3), the reduction onset potential and the slope of the reduction onset current did not change significantly demonstrating a relative insensitivity of the electrode potential on percentage of the AgCl. However, with increasing AgCl the peak potential shifts more negative and the integrated current increases roughly in scale with the percentage of AgCl in the ink, demonstrating that an increase in AgCl is associated with an increase in reductive capacity. Comparing the reduction currents on the 96ss vs. 96ss BAL configurations (FIG. 26B), the shapes and peak potentials are roughly the same, however, the peak and integrated currents for the 96ssBAL are reduced roughly in scale with the lower auxiliary electrode area.

ECL intensity from 1 µM TAG in MSD Read Buffer T 1X, as a function of applied potential, is provided in FIGS. 24B, 25B, 26C, and 27B for the Std 96-1, Std 96ss, Std 96 ss BAL and Std 96-10 electrode configurations, respectively. Analogous plots for 1 µM TAG in MSD Read Buffer T 2X are provided in FIGS. 24C, 25C, 26D and 27C, respectively. All plots also provide plots of the associated electrical current through the electrodes as a function of potential. Within each of the test electrode configurations, the ECL traces generated using auxiliary electrodes with the three different Ag/AgCl ink formulations were roughly superimposable indicating that even the Ag/AgCl formulation with the lowest percentage of AgCl (10%) had sufficient reductive capacity to complete the generation of ECL. For the measurements of TAG in MSD Read Buffer T 1X using Ag/AgCl, the current traces were also largely superimposable. However, for the measurements of TAG in MSD Read Buffer T 2X, particularly for the configurations with the lowest ratios of Ag/AgCl auxiliary electrode area to working electrode area (the 96-1 and 96ss BAL configurations), the current measured using the ink with the lowest percentage of AgCl diverged at higher potentials and exhibited decreases in current with increasing potential. Because this divergence occurred at a potential that was near the end of the ECL peak, it did not significantly affect the ECL trace, but it indicates that the 10% AgCl ink may be near to the borderline for sufficient reductive capacity to complete the generation of ECL using the chosen waveforms, read buffers and electrode configurations.

Subtle changes in the shape of the peak in the ECL trace were observed with changes in electrode configuration. In all configurations, and with both read buffer concentrations, the onset of ECL generation occurred at roughly 3100 mV when using a carbon ink counter electrode and 1100 mV when using an Ag/AgCl auxiliary electrode. The onset potential using the Ag/AgCl auxiliary electrode is much closer to the roughly 800 mV onset potential that is observed in a three electrode system with an Ag/AgCl reference. While the onset potential is relatively independent of electrode configuration, small differences were observed in the potential at which the peak ECL intensity occurs. For the Std 96-1 configuration, the peak ECL using an Ag/AgCl auxiliary electrode occurs at roughly 1800 mV and 1900 mV for TAG in the 1× and 2× read buffer formulations, respectively. With the carbon counter electrode, the peaks are at 4000 and 4100 mV. As the ratio of working electrode area to auxiliary/counter electrode area decreases, the peak potential decreases. This effect occurs because the required current at the working electrode to achieve peak ECL can be achieved with a lower current density, and therefore a lower potential drop, at the auxiliary/counter electrode. For the Std 96-10 configuration, the peak ECL using an Ag/AgCl auxiliary electrode occurs at roughly 1700 mV and 1750 mV for TAG in the 1× and 2× read buffer formulations, respectively. For the Std 96ss configuration with the lowest ratio of electrode areas, the peak ECL using an Ag/AgCl auxiliary electrode occurs at roughly 1675 mV and 1700 mV for TAG in the 1× and 2× read buffer formulations, respectively. The shape of the ECL curve can be kept more consistent across configurations varying in working electrode area by balancing the auxiliary electrode area to maintain a fixed ratio. The Std 96ss BAL configuration has the working electrode area of the Std 96ss configuration, but the auxiliary electrode area was reduced so that the ratio of electrode areas matches that of the Std 96-1 configuration. For the Std 96ss BAL configuration, the peak ECL using an Ag/AgCl auxiliary electrode occurs at roughly 1750 mV and 1800 mV for TAG in the 1× and 2× read buffer formulations, respectively, and which are higher than the values observed with the Std 966 configuration and approaching the values observed with the Std 96-1 configuration. The difference in peak potential between the Std 96-1 and Std 96ss BAL configuration may just indicate that the actual area ratios achieved when printing the Std 96ss plates may be less than targeted in the screen print designs. The ECL traces and currents for 1 μM TAG in MSD Read Buffer T 2x for the three electrode configurations are compared in FIG. 28.

The integrated ECL signal results from the Std 96-1, Std 96ss, Std 96ss BAL and Std 96-10 electrode configurations are provided in Tables 16, 17, 18 and 19, respectively. Each table provides results for the three different Ag/AgCl auxiliary electrode compositions and the control carbon counter electrode conditions (Ag:AgCl="n/a"). The table provides the starting potential (Vi), ending potential (Vf) and duration (T) of the ramp waveform used for that condition, as well as the average integrated ECL signal measured for the TAG solution (FT) and the background signal measured for the base buffer used for the TAG solution (T1X) in the absence of TAG. The coefficients of variation (CV) are also provided for the variation within each plate and across plates. The tables (16-19) show that the integrated signals were largely independent of the electrode configuration and auxiliary/counter electrode ink composition. No obvious trend in CVs with electrode configuration or composition was observed; the conditions with the highest CVs were generally associated with a single outlier well or plate. Slightly higher signals were observed for the Std 96ss BAL configuration than for the Std 96ss configuration despite sharing identical working electrode geometries. The currents required at the working electrode during ECL generation created a higher current density on the smaller Std 96ss BAL auxiliary electrode, which put the auxiliary electrode in a region of the current vs. voltage curve (FIG. 26B) with a lower slope. The end result was to slow the effective voltage ramp rate at the working electrode and increase the time during which ECL was generated.

TABLE 16

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 12,856 | 1.4% | 1.6% | 206 | 62 | 5.7% |
| 66/34 | 0 | 3000 | 3000 | 12,399 | 1.1% | 1.1% | 139 | 74 | 100.5% |
| 50/50 | 0 | 3000 | 3000 | 12,338 | 1.4% | 1.0% | 127 | 69 | 5.7% |
| n/a | 2000 | 3000 | 3000 | 14,484 | 1.4% | 1.9% | 277 | 95 | 4.1% |

TABLE 17

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 13,634 | 3.4% | 8.2% | 1112 | 94 | 5.9% |
| 66/34 | 0 | 3000 | 3000 | 13,705 | 2.2% | 4.3% | 589 | 106 | 4.3% |
| 50/50 | 0 | 3000 | 3000 | 13,475 | 3.4% | 5.9% | 791 | 104 | 5.6% |
| n/a | 2000 | 3000 | 3000 | 15,443 | 3.4% | 2.4% | 366 | 122 | 3.1% |

TABLE 18

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 16,061 | 2.8% | 4.4% | 710 | 94 | 7.2% |
| 66/34 | 0 | 3000 | 3000 | 15,330 | 2.2% | 4.4% | 679 | 106 | 4.4% |
| 50/50 | 0 | 3000 | 3000 | 14,635 | 2.8% | 9.6% | 1412 | 99 | 5.1% |

TABLE 19

| Ag:AgCl | Vi | Vf | T | FT Ave Intraplate | FT Ave Intraplate % CV | FT Interplate % CV | FT Intraplate StDev | T1x Ave Intraplate | T1x Interplate % CV |
|---|---|---|---|---|---|---|---|---|---|
| 90/10 | 0 | 3000 | 3000 | 15,777 | 2.8% | 5.2% | 817 | 110 | 12.9% |
| 66/34 | 0 | 3000 | 3000 | 15,173 | 4.6% | 5.2% | 782 | 114 | 13.5% |
| 50/50 | 0 | 3000 | 3000 | 15,100 | 4.6% | 5.3% | 793 | 112 | 13.3% |
| n/a | 2000 | 3000 | 3000 | 13,098 | 4.6% | 5.2% | 678 | 57 | 27.1% |

Examples of voltage pulses are described above in reference to 12A, 12B, 14A, 14B, 15A-15L, 16 and 17. In embodiments, the magnitude and duration of a pulsed waveform may be tailored to the chemical mixture of the auxiliary electrodes 102 and/or the configuration of the working electrode zones 104. FIGS. 14A, 14B, 15A-15L, 16 and 17 are graphs that illustrate tests performed to optimize waveforms for high bind versus standard plates. The test were performed for various configuration for working electrode zones 104 formed with carbon, counter electrodes formed with carbon, and auxiliary electrodes 102 formed with Ag/AgCl at various ratios. In this test, the voltages were ramped to determine potential values that maximize ECL. The graphs show how the high bind versus standard electrode affects how and at what point in the curve ECL is generated by varying potentials. The results of the test may be utilized to determine an optimal magnitude and/or duration for a pulsed waveform.

More particularly, in the test, FT ECL Traces were performed on uncoated standard ("Std") and high bind ("HB") 96-1, 96ss, and 96-10 Plates, as illustrated in FIG. 8A-8D. 300 k FT was measured on 12 different SI plate types: Std & HB 96-1, 96ss, and 96-10 production control plates; Std & HB 96-1, 96ss, and 96-10 Ink Ratio 3 Ag/AgCl plates where the Ag:AgCl ratio was 50:50. Five waveforms were run on each plate type (4 replicate wells each). The waveforms for the production plates were as follows: 2000 mV to 5000 mV in 3000 ms (1.0 V/s), 2000 ms (1.5 V/s), 1500 ms (2.0 V/s), 1200 ms (2.5 V/s), and 1000 ms (3.0 V/s). The waveforms for the Ag/AgCl plates were as follows: 0 mV to 3000 mV in 3000 ms (1.0 V/s), 2000 ms (1.5 V/s), 1500 ms (2.0 V/s), 1200 ms (2.5 V/s), and 1000 ms (3.0 V/s). The production and Ag/AgCl plates were measured on the ECL system with a video system to capture luminescence data. To generate the graphs illustrated in FIGS. 14A, 14B, 15A-15L, 16 and 17, macros were used to determine the ECL intensity at each potential, and the 4 replicates were averaged. Mean ECL versus potential plots were prepared.

Based on the test performed, ECL peak voltages were determined for each of the production and test plates, as shown in Table 20. The ECL peak voltages may be utilized to set the magnitude of pulsed waveforms in ECL processes.

TABLE 20

| Surface | Carbon CE ECL Peak (mV) | AgAgCl Auxiliary Electrode ECL Peak (mV) |
|---|---|---|
| Std 96-1 | 3975 | 1825 |
| Std 96ss | 3825 | 1700 |
| Std 96-10 | 3750 | 1725 |
| HB 96-1 | 3650 | 1500 |
| HB 96ss | 3275 | 1275 |
| HB 96-10 | 3250 | 1325 |

As shown by FIGS. 26, 27, 28A, 28B, 29, 30, 31, 32A, and 32B, ramp rate caused changes in the measured ECL, further shown in Table 21. Increasing the ramp rate increased intensity and decreased signals. Increasing the ramp rate increased the width of the ECL peak. The baseline intensity was defined as the average intensity in the first 10 frames. The onset potential was defined as the potential at which the ECL intensity exceeded 2× the average baseline. The return to baseline was defined as the potential at which the ECL intensity was below 2× the baseline. The width was defined as the potential difference between the return and onset potentials.

For Ag/AgCl auxiliary electrodes 102, the widths increased from 175 mV to 525 mV between 1.0 V/s and 3.0 V/s with carbon counter electrode. The greatest change was with HB 96-1. The smallest change was with Std 96ss. The widths increased from 375 mV to 450 mV between 1.0 V/s and 3.0 V/s with Ag/AgCl counter electrode

TABLE 21

| | Carbon CE | | | | | Ag/AgCl Auxiliary Electrode | | | | |
|---|---|---|---|---|---|---|---|---|---|---|
| Surface | Width (1V/s) | Width (1.5V/s) | Width (2V/s) | Width (2.5V/s) | Width (3V/s) | Width (1V/s) | Width (1.5V/s) | Width (2V/s) | Width (2.5V/s) | Width (3V/s) |
| Std 96-1 | 1525 | 1650 | 1850 | 1875 | 1875 | 1425 | 1575 | 1700 | 1812.5 | 1800 |
| Std 96ss | 1400 | 1462.5 | 1500 | 1500 | 1575 | 1300 | 1425 | 1500 | 1625 | 1725 |
| Std 96-10 | 1525 | 1612.5 | 1750 | 1750 | 1800 | 1350 | 1425 | 1550 | 1625 | 1650 |
| HB 96-1 | 1425 | 1575 | 1700 | 1875 | 1950 | 1225 | 1350 | 1550 | 1562.5 | 1650 |
| HB 96ss | 1275 | 1350 | 1450 | 1500 | 1575 | 1225 | 1312.5 | 1400 | 1500 | 1575 |
| HB 96-10 | 1550 | 1612.5 | 1750 | 1687.5 | 1800 | 1350 | 1500 | 1650 | 1687.5 | 1800 |

For Ag/AgCl auxiliary electrodes 102, the widths increased from 175 mV to 525 mV between 1.0 V/s and 3.0 V/s with carbon counter electrode. The greatest change was with HB 96-1. The smallest change was with Std 96ss. The widths increased from 375 mV to 450 mV between 1.0 V/s and 3.0 V/s with Ag/AgCl counter electrode.

Example 5—Effect of Working Electrode Composition and Ramp Rate on ECL Generation Using Ag/AgCl Auxiliary Electrodes For this experiment, plates were prepared in the 96-1, 96ss and 96-10 configurations as described in Example 4. Test plates with Ag/AgCl auxiliary electrodes ("Ag/AgCl") used the 50% AgCl Ag/AgCl mixture shown in Example 4 to provide more than sufficient reduction capacity for ECL generation using the chosen electrode configurations. Control plates ("Carbon") were also prepared that had conventional carbon ink counter electrodes instead of Ag/AgCl auxiliary electrodes. For each combination of electrode configuration and auxiliary/counter electrode composition, plates were made with working electrodes with standard carbon ink electrodes as used in the previous examples (described as "Standard" or "Std") or with carbon electrodes that had been treated with an oxygen plasma after printing (described as "High Bind" or "HB").

These plates were used to generate ECL from TAG dissolved in MSD Read Buffer T 1X at a concentration that provides an ECL signal of roughly 300,000 ECL counts (a solution termed "300 k Free Tag" or "300 k FT") when analyzed in a Std 96-1 plate on an MSD SECTOR Imager plate reader. For this example, the analysis was conducted using a video capture system (as described in Example 4) to measure the ECL time course during the ECL experiments. ECL was generated using a 3 V ramp waveform from 0 V to 3 V for plates with Ag/AgCl auxiliary electrodes and 2 V to 5 V for plates with carbon counter electrodes. The effect of ramp speed was evaluating by testing each plate/electrode condition with 5 different ramp durations (ramp speeds): 3.0 s (1.0 V/s), 2.0 s (1.5 V/s), 1.5 s (2.0 V/s), 1.2 s (2.5 V/s) and 1.0 s (3.0 V/s). Plots of ECL intensity vs. applied potential for the control plates with carbon counter electrodes using the five different ramp speeds are provided in FIGS. 29, 31A, 32A, 33A and 34A, respectively. Analogous plots for the test plates with AgCl auxiliary electrodes are provided in FIGS. 30, 31B, 32B, 33B and 34B. The traces for the control and test plates are plotted together in FIG. 35 for the 1.0 V/s ramp rate.

Figures 36A, 36B:
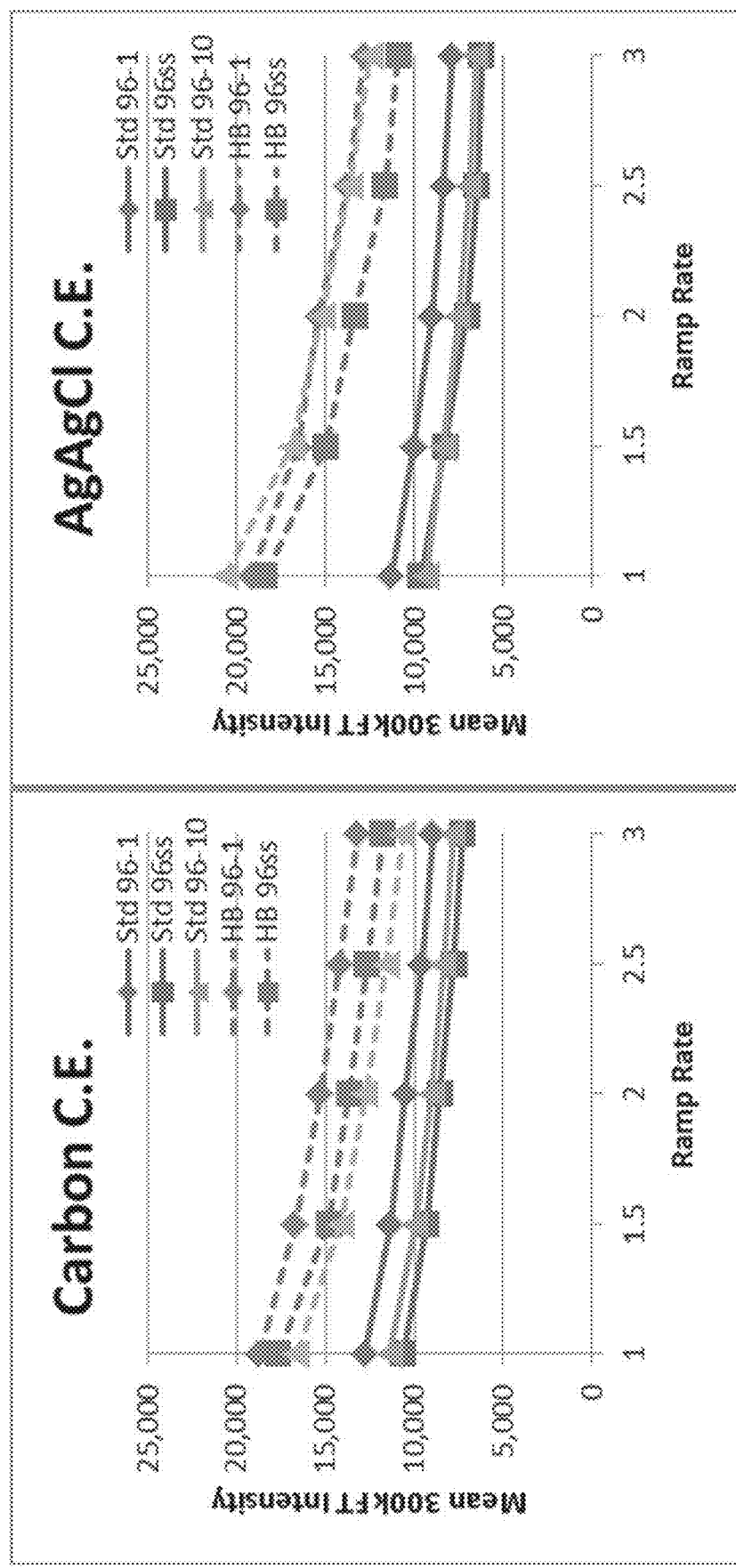
Figure 36D:
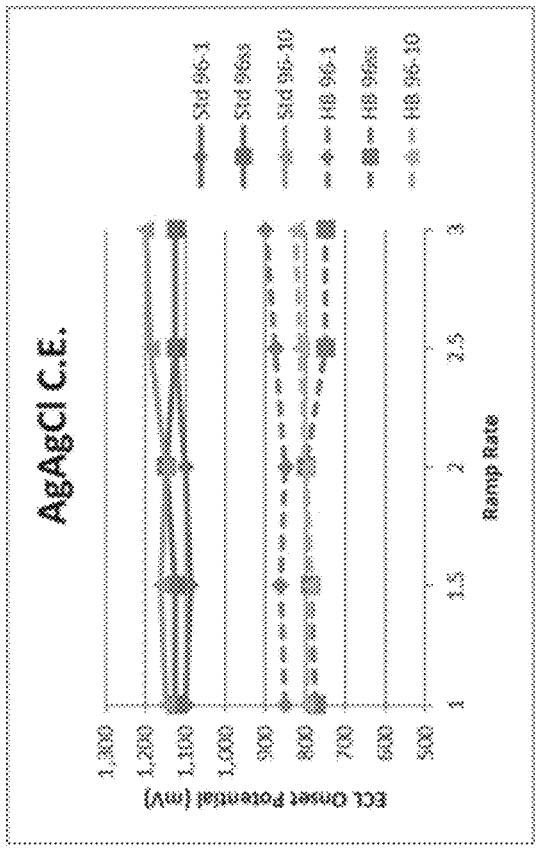
Figure 36C:
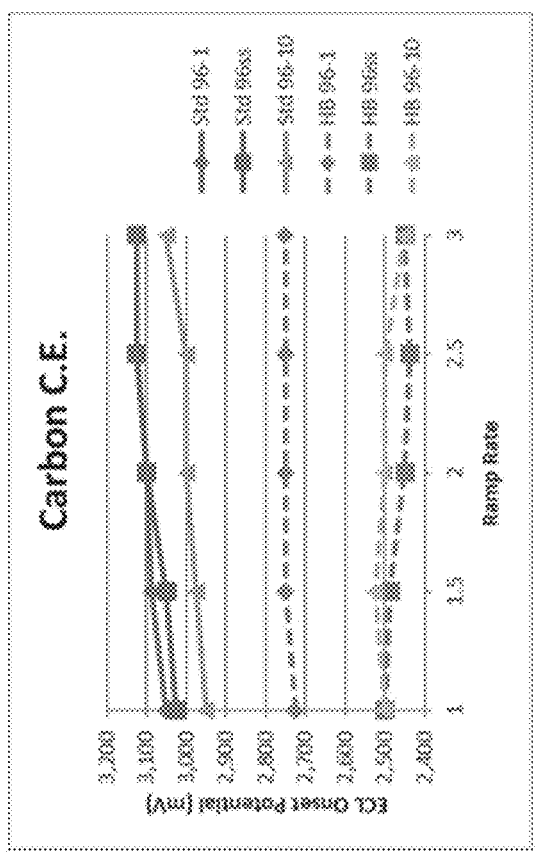

At all ramp rates and electrode configurations, the onset of ECL is at lower potential for the HB working electrodes than the Std working electrodes, due to its lower potential for the onset of TPA oxidation (~0.6 V for HB and ~0.8 V for Std, vs. Ag/AgCl ref). For the control plates with carbon counter electrodes, the onset for ECL for the HB 96-1 plates is at higher potential than the other HB electrode configurations, which is likely an effect of the higher reducing potential at the counter electrode needed to support the higher current required for the large-area working electrode of the 96-1 format. This large shift in onset potential was not observed when Ag/AgCl auxiliary electrodes were used, demonstrating that the potential at these electrodes were less sensitive to this change in current density. FIGS. 36A and 36B plot the integrated ECL intensity across the waveform as a function of ramp rate and show that the integrated ECL intensity decreases with ramp rate as less time is spent in the voltage region where ECL is produced. FIGS. 36D and 36E plot the ECL onset potential as a function of ramp rate and show that, relative to using carbon counter electrodes, the Ag/AgCl auxiliary electrodes provide an ECL onset potential that is less sensitive to electrode configuration and ramp rate.

Figure 35:
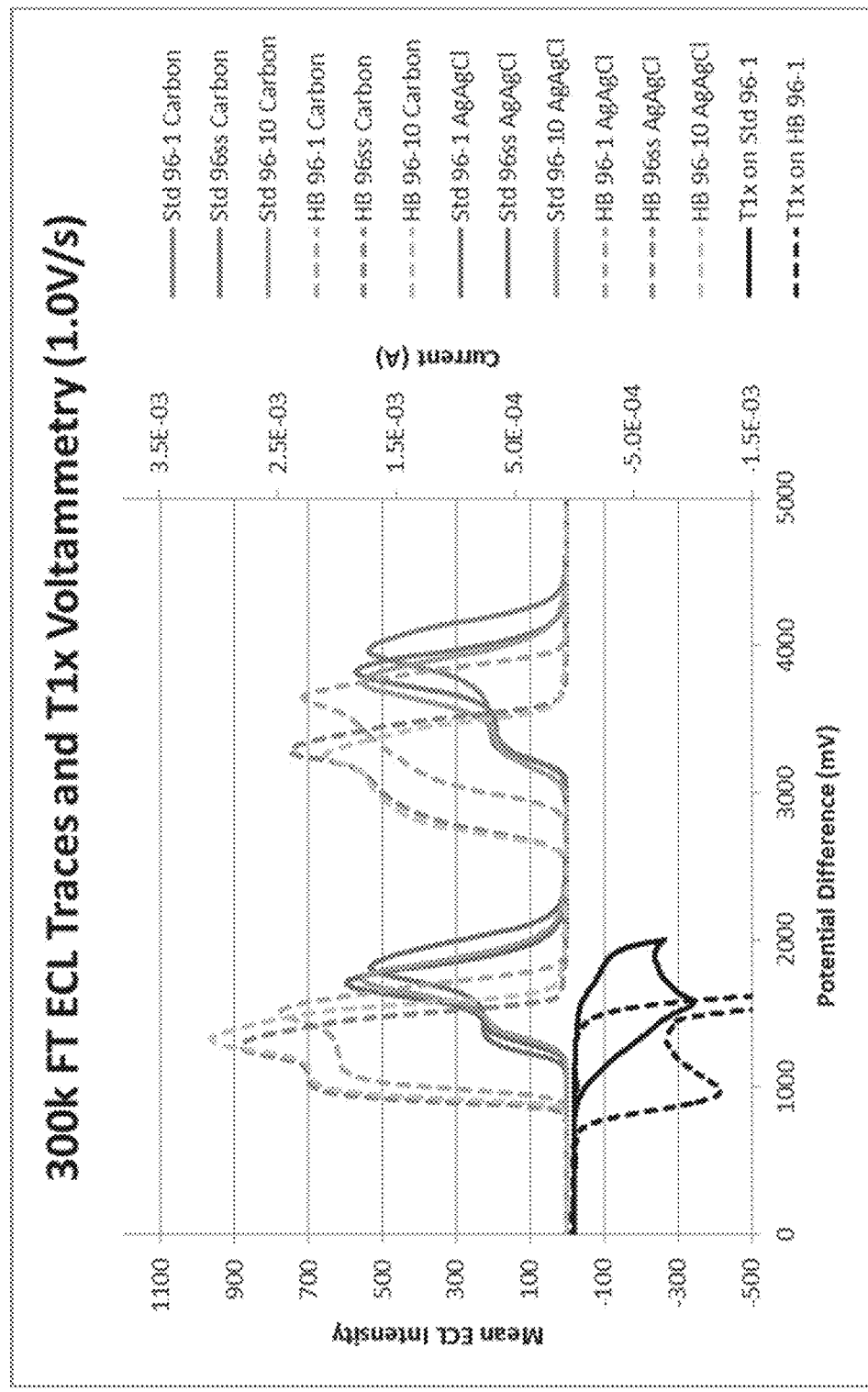

FIG. 35 plots the ECL traces for the test (Ag/AgCl) and control (Carbon) plates at the 1.0 V/s ramp rate (colored curves). The plot also shows (black curves) the cyclic voltammetry current vs. voltage traces for the oxidation of TPA in MSD Read Buffer T 1X on Std and HB carbon working electrodes. The plot shows that the higher ECL onset potential for Std vs. HB is associated with a higher onset potential for TPA oxidation. The higher sensitivity of HB vs. Std for the effect of electrode configuration on ECL onset potential is likely due to the much higher TPA oxidation currents observed with HB electrodes near the ECL onset potential. Table 22 provides the applied potential that provides the maximum ECL intensity for each of the pate types measured with the 1.0 V/s waveforms. With the Ag/AgCl auxiliary electrodes, the ECL peak potentials were correlated with the working-to-counter electrode area ratios: 96-1>96-10>96ss. As with the ECL onset potentials on HB plates, the Ag/AgCl auxiliary electrodes minimized the impact of the electrode area ratio on the shifts in the ECL peak potentials and HB plates.

TABLE 22

| Surface | Carbon CE ECL Peak (mV) | AgAgCl Auxiliary Electrode ECL Peak (mV) |
|---|---|---|
| Std 96-1 | 3975 | 1825 |
| Std 96ss | 3825 | 1700 |
| Std 96-10 | 3750 | 1725 |
| HB 96-1 | 3650 | 1500 |
| HB 96ss | 3275 | 1275 |
| HB 96-10 | 3250 | 1325 |

Various experiments were conducted to with assay plates employing Ag/AgCl auxiliary electrodes and working electrodes in various configurations. Results of some of these are discussed herein. Experiments to determine differences in ECL signal intensity with changes in working electrode to auxiliary electrode ratio at different BTI concentrations and electrode configurations were conducted. For all configurations tested—concentric open spot arrangement (e.g., as shown in FIGS. 3A and 3B), concentric closed spot arrangement (e.g., as shown in FIGS. 7A and 7B), concentric open trilobe arrangement (e.g., as shown in FIGS. 4A and 4B), and concentric penta arrangement (e.g., as shown in FIGS. 5A and 5B), an increasing ECL response intensity with increasing ratio was observed. This result was observed in situations where the increased ratio is due to a change in auxiliary electrode size or due to a change in working electrode size.

In another experiment, differences in ECL signal intensity with changes in incubation time at different BTI concentrations and electrode configurations were observed. For all configurations tested—concentric open spot arrangement (e.g., as shown in FIGS. 3A and 3B), concentric open trilobe arrangement (e.g., as shown in FIGS. 4A and 4B), and concentric penta arrangement (e.g., as shown in FIGS. 5A and 5B), increasing ECL signal was observed with incubation times of two or three hours, relative to a one hour incubation time. An increase in ECL signal intensity at 3 hour incubation times, relative to a 2 hour incubation time, was also observed. In a further experiment, differences in % CV with incubation time across different electrode arrangements at different BTI concentrations were observed. The tested configurations were a concentric open spot arrangement (e.g., as shown in FIGS. 3A and 3B), a concentric open trilobe arrangement (e.g., as shown in FIGS. 4A and 4B), and a concentric penta arrangement (e.g., as shown in FIGS. 5A and 5B), In the concentric open spot arrangement, a reduction in % CV with increasing incubation time was observed. In the concentric open trilobe arrangement an increase in % CV with increasing incubation time from 1 to 2 hours was observed. In the concentric penta arrangement, an increase in % CV with increasing incubation time from 1 to 2 and from 2 to 3 hours was observed.

In another experiment, differences in gain at different working electrode zone to auxiliary electrode zone ratios across the different spots of an electrochemical cell in different electrode configurations were observed. The tested configurations were a non-concentric 10-spot arrangement, a concentric open spot arrangement (e.g., as shown in FIGS. 3A and 3B), and a concentric open trilobe arrangement (e.g., as shown in FIGS. 4A and 4B). The results, summarized in Table 23 below, indicate that the spread between the minimum and maximum gains are reduced in the concentric open arrangements relative to the non-concentric layout. Accordingly, concentric arrangement of working electrode zones may provide an advantage in maintaining a consistent gain across all spots or locations in a well.

TABLE 23

| | Non-Concentric | Concentric Open Spot | Concentric Open Trilobe |
|---|---|---|---|
| Max Gain | 1.157 | 1.05 | 1.079 |
| Min Gain | 0.879 | 0.944 | 0.934 |
| Spread | 0.278 | 0.106 | 0.145 |

In embodiments, the concentric approximately equidistant electrode configurations may provide specific advantages to ECL procedures, as discussed above and throughout. Due to the symmetry of these designs (see e.g., FIGS. 1C, 3A-3F, 6A-7F), each of the spots or working electrode zones is affected similarly by the overall geometry of the well. For example, as discussed with respect to FIG. 2C, a meniscus effect in the fluid filling the well will be approximately equal for each of the concentrically arranged working electrode zones. This occurs because the meniscus is a radial effect, and the concentrically arranged working electrode zones are located approximately equidistant from a center of the well. Additionally, as discussed above, mass transport effects may be equalized among the different working electrode zones. During orbital or rotational shaking, due to mass transport effects over time, a distribution of materials within the well may be dependent on a distance from the center of the well. Accordingly, a concentric arrangement of working electrode zones serves to reduce or minimize variations that may occur due to uneven material distribution throughout a well. Additionally, because each of the working electrode zones is located approximately equidistant from an auxiliary electrode, any voltammetry effects that may otherwise occur due to unequal distances may be reduced or minimized.

The preceding and the following disclosure provides electrochemical cells involving working electrode zones and auxiliary electrodes. Various designs are presented and discussed. In some examples, electrode arrangements (e.g., concentric, isolated, and equidistant arrangements) and advantages provided by these are discussed. In further examples, electrode composition (e.g., Ag, Ag/AgCl, and/or any other materials disclosed throughout (e.g., metal oxides, metal/metal oxide couples, etc.)) and advantages provided by these are discussed. It is understood that the scope of embodiments discussed herein includes the various electrode arrangement and pattern examples (e.g., as shown in FIGS. 3A-8D and FIGS. 37-43D) used with electrodes of other materials as well (e.g., carbon, carbon composites and/or other carbon-based materials, etc.). Advantages generated by electrochemical cell electrode arrangements and geometry discussed herein may be realized in embodiments that include electrodes of any of the materials described herein. Further, advantages generated by electrochemical cells forming electrodes using Ag, Ag/AgCl, and/or any other materials disclosed throughout (e.g., metal oxides, metal/metal oxide couples, etc.) as discussed herein may be realized in embodiments that include other working electrode zone arrangements (for examples, see FIGS. 3A-4E of U.S. Pat. No. 7,842,246, Issued Nov. 30, 2010, the entirety of which is incorporated herein).

In embodiments, electrochemical cells as described herein may be provided with individually addressable electrodes. As discussed throughout, electrochemical cells consistent with the present disclosure include working electrodes and auxiliary electrodes arranged according to specific positioning and patterning. As discussed above, with respect to FIG. 9, e.g., in embodiments, the electrochemical cells of individual wells may be selectively addressable (e.g., electrically excited). In further embodiments, as discussed below with respect to FIGS. 37, 38A-38C, 39A-39L, 40A-40N, 41A-41M, 42A-42I and 43A-43D individual electrodes within individual electrochemical cells (e.g., within individual wells) may be selectively addressable. This design permits any electrode (and any combination of electrodes) in a substrate of electrochemical cells to be electrically addressed independently of each other electrode in the substrate.

Figure 37:
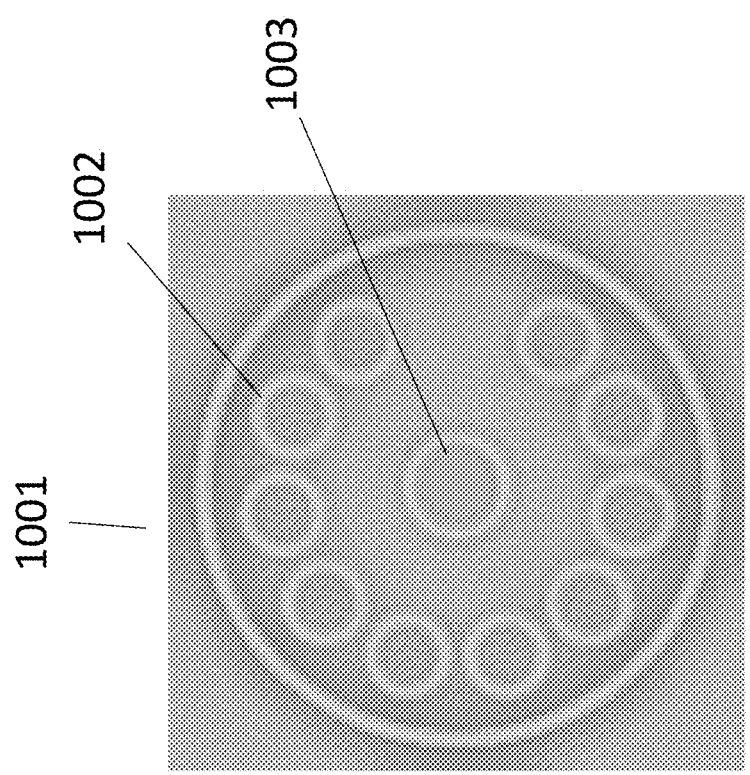
FIG. 37 illustrates an electrochemical cell having individually addressable electrodes according to embodiments disclosed herein.

FIG. 37 illustrates an electrochemical cell having individually addressable electrodes according to embodiments disclosed herein. The electrochemical cell 1001 includes a plurality of working electrode zones 1002 and at least one auxiliary electrode 1003. In the embodiment illustrated by this figure, the electrochemical cell 1001 may include ten working electrode zones 1002 and one auxiliary electrode 1003. In other embodiments, fewer or greater working electrode zones 1002 can be alternatively provided (e.g., 6, 7, 8, 12, etc.) and/or a plurality of auxiliary electrodes can be provided (e.g., 2, 4, 5, etc.). The following discussion of individually addressable electrode electrochemical cells refers to the ten working electrode zone design (also referred to throughout as a ten spot design) illustrated in FIG. 37. In the ten spot design, the working electrodes may be referred to by their positions within the well, e.g., at the 1-spot, the 2-spot, 3-spot, etc. However, the devices, systems, and methods disclosed herein related to the individually addressable electrode electrochemical cells are understood not to be limited to the specific ten spot design and may be applied, as appropriate, to other patterns and positioning of electrode zones including at least those disclosed herein (e.g., such as, those depicted in FIGS. 3A-8C).

As discussed above, a working electrode zone may comprise an entire electrode, and in other embodiments, more than one working electrode zone may be formed within and/or on a single electrode. For example, as is the case with electrochemical cell 1001 formed by the well electrode structure 3101 discussed below, the working electrode zones may be formed by individual working electrodes that are electrically isolated from one another. In other examples, working electrode zones may be configured as a single electrode formed of one or more conducting materials. In another example, the working electrode zones as discussed above, e.g., with respect to FIGS. 21A-21F, may be formed by isolating portions of a single working electrode. In this example, a single working electrode may be formed of one or more conducting materials, and the working electrode zones may be formed by electrically isolating areas ("zones") of the single working electrode using insulating materials such as a dielectric. Although the electrochemical cell 1001, as discussed herein, is formed from the well electrode structure 3101 having individually electrically isolated working electrodes, it is understood that features, elements, and aspects of the well electrode structures 3101 may be modified or altered to achieve working electrode zones according to other aspects discussed herein, e.g., working electrode zones formed by isolating zones of a single electrode.

Figure 38A:
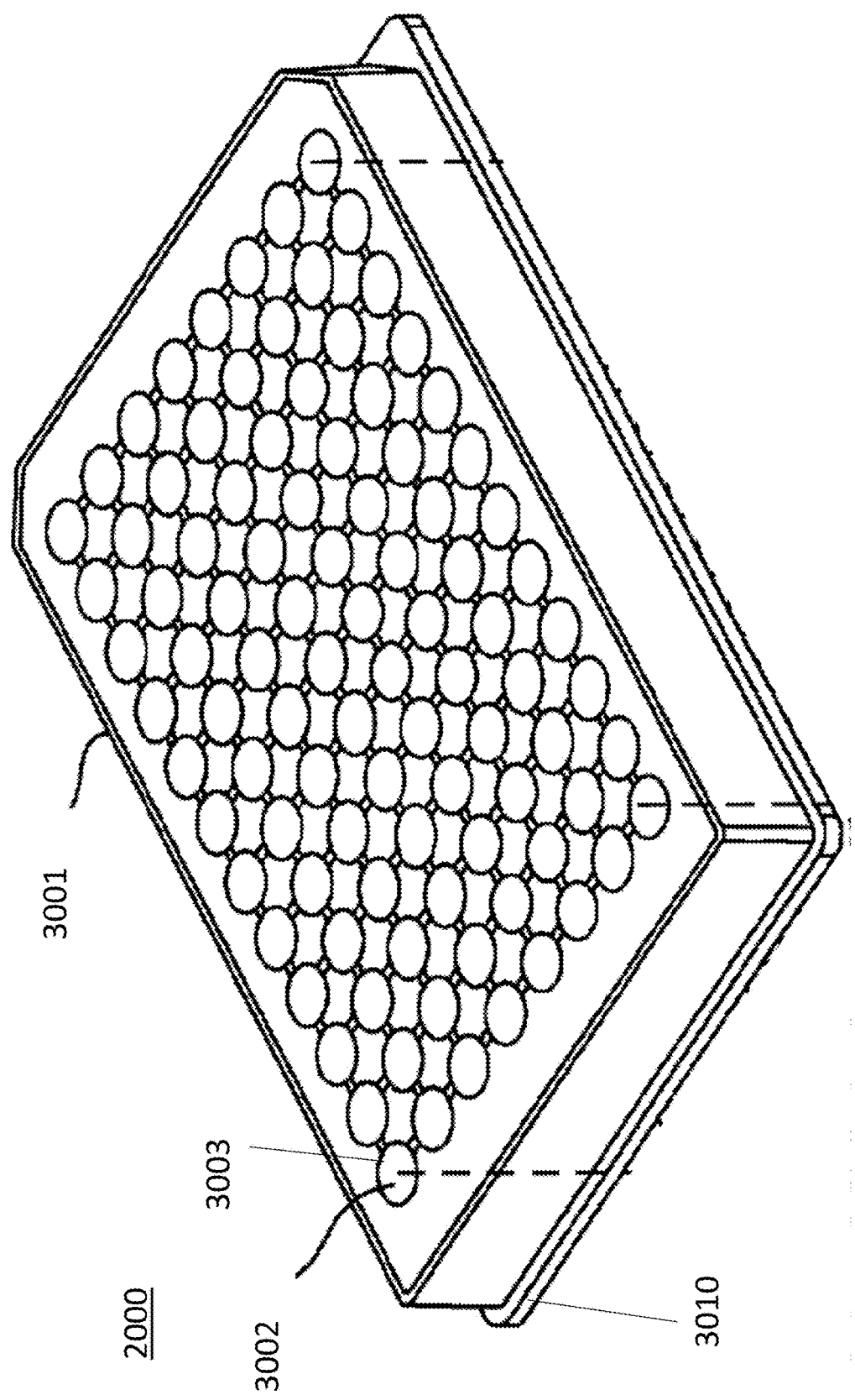
FIGS. 38A-38C illustrate portions of a multi-well plate having wells including individually addressable electrode electrochemical cells according to embodiments disclosed herein.
Figure 38B:
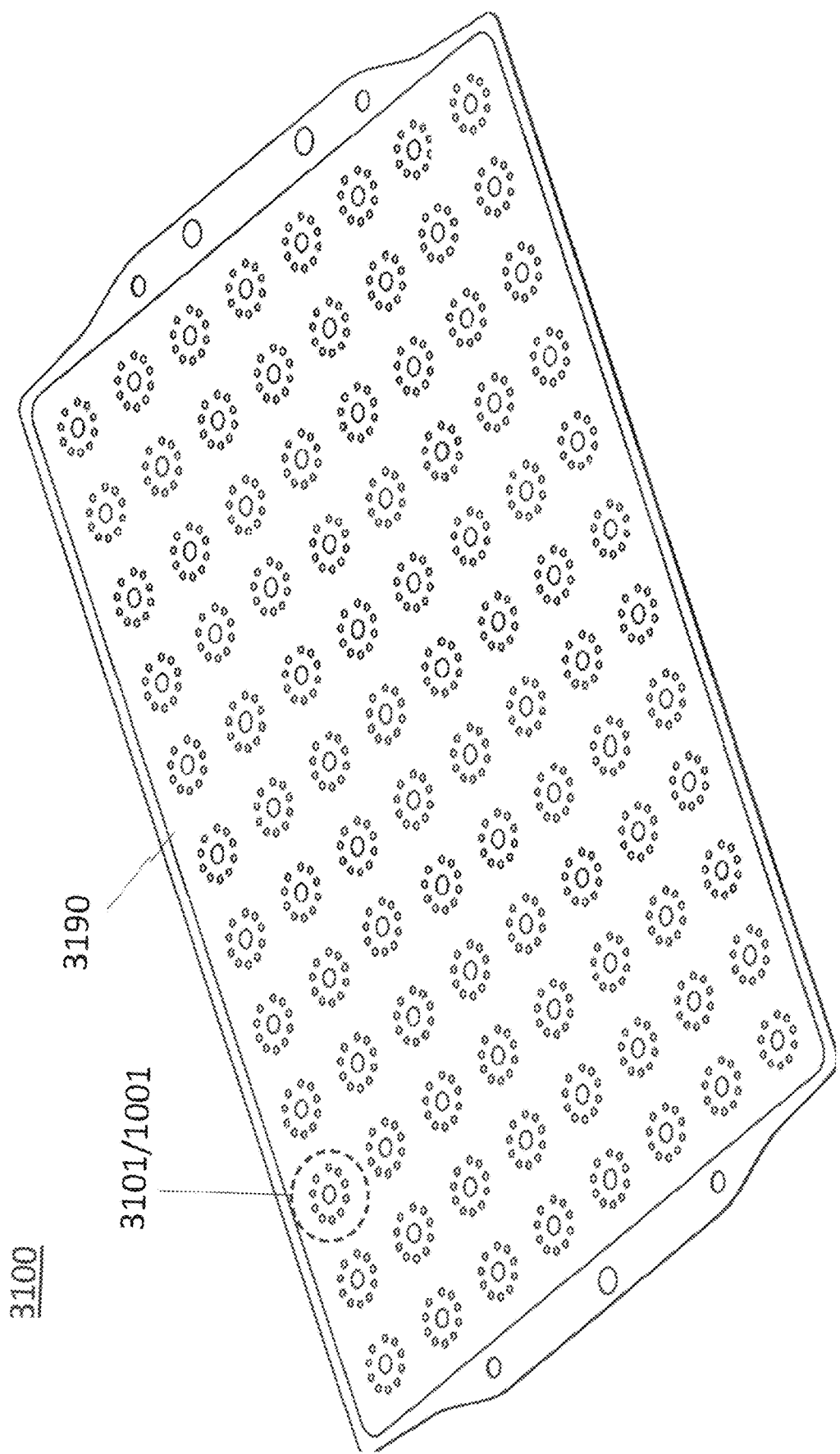

FIGS. 38A and 38B illustrate portions of a multi-well plate having wells including individually addressable electrode electrochemical cells according to embodiments disclosed herein. FIG. 38A is a perspective top view of a multi-well assay plate 2000. FIG. 38A illustrates a top plate 3001 having top plate openings 3002 defining wells 3003 of the multi-well assay plate 2000 arranged in a well pattern, each well being defined by a well area, as discussed further below. FIG. 38A also illustrates a base plate 3010, which includes a substrate 3100, as shown in FIG. 38B.

FIG. 38B illustrates a substrate 3100 and its top surface 3190. In the exemplary multi-well assay plate 2000 illustrated in FIG. 38A, the top surface 3190 is mated to the top plate 3001. FIG. 38B illustrates various elements visible in the top surface 3190 of the substrate 3100 that help form a plurality of well electrode structures 3101. Further elements of the well electrode structures 3101 and additional description is provided below. The well electrode structures 3101 help define the electrochemical cells 1001 (FIG. 37), which comprise a plurality of working electrode zones 1002 and at least one auxiliary electrode 1003.

Figure 38C:
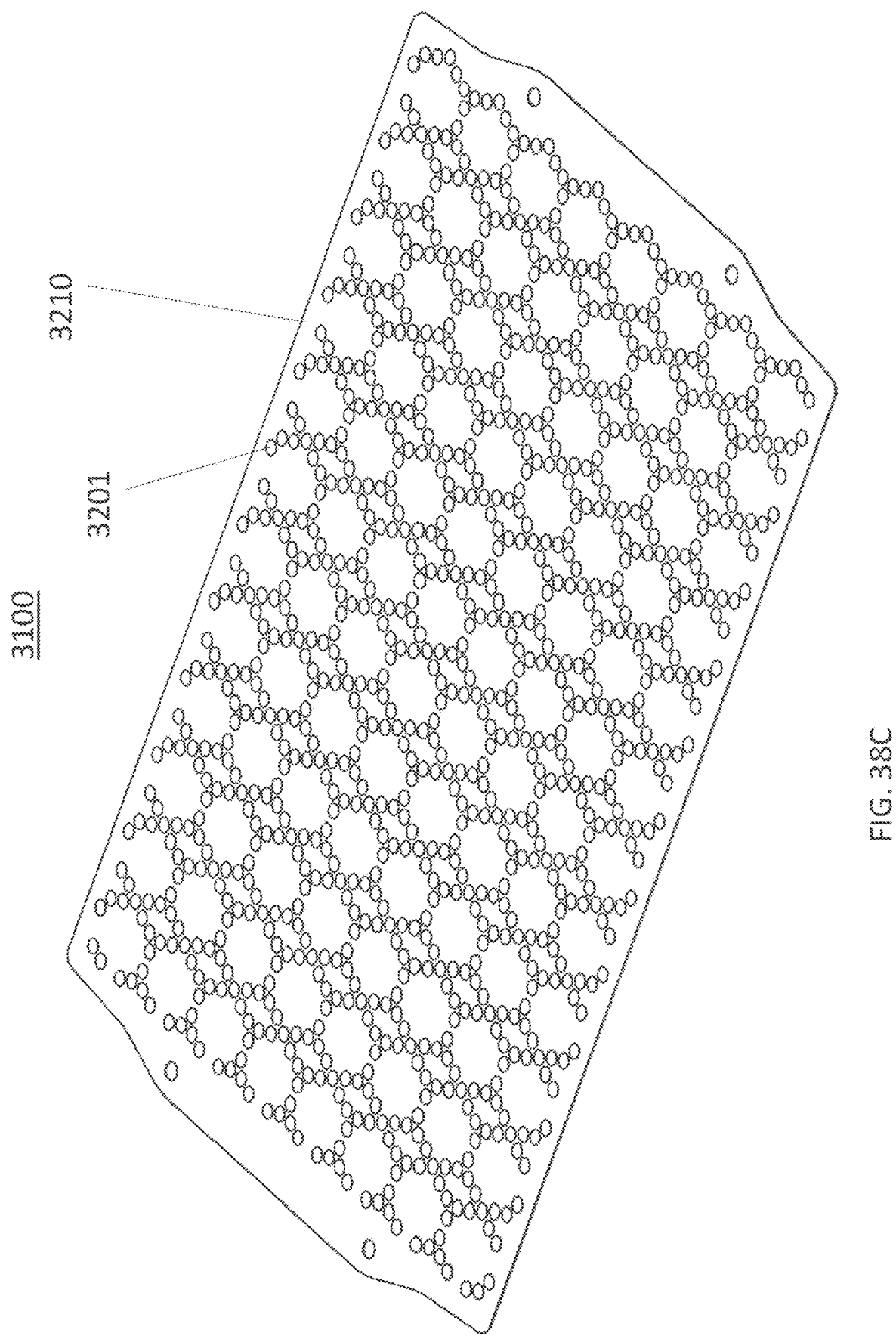

FIG. 38C illustrates a substrate 3100 and its bottom surface 3210. The bottom surface 3210 of the substrate 3100 features a plurality of electrode contacts 3201, which are arranged in electrode contact groupings and form part of the well electrode structures 3101, as discussed below.

FIGS. 38A-38C illustrate a multi-well assay plate 2000 having a 12×8 arrangement of 96 wells 3003. Each well 3003 corresponds to a well electrode structure 3101. In further embodiments, any suitable number of wells 3003 and well electrode structures 3101 may be provided. Additionally, the multi-well assay plate 2000 presented in FIGS. 38A-38C is an example only of one use of the well electrode structures 3101 described herein. The well electrode structures 3101 described herein may be used to form electrochemical cells 1001 for various applications, including, for example, cartridge readers, plate-based analyzers, lateral flow-based test devices, etc.

In embodiments, the well electrode structures 3101 may be formed on the substrate 3100 in various ways, e.g., via a sequential screen printing process, etching, deposition, lithography, and/or other methodologies for forming electrodes. In these examples, the well electrode structures 3101 may be printed down layer by layer on the substrate 3100, although other methodologies are contemplated as well. In embodiments, the electrodes described throughout can be implemented on one or more circuits, such as, for example printed circuit boards (PCBs) as well as thin flexible PCBS, e.g., flex circuits. FIGS. 39A-39L illustrate the well electrode structures 3101 and aspects of the layering process.

FIGS. 39A-42D describe designs and layouts for a substrate 3100 of a multi-well assay plate 2000 having isolated and individually addressable working electrodes 3102 and auxiliary electrodes 3103. Further, during the discussion below, various manufacturing processes are described for achieving the designs and layouts as discussed. The screen printing techniques provide one example of manufacturing substrates 3100 having the layouts and designs disclosed herein. Alternative manufacturing methods, including various types of printing, deposition, lithography, etching, ink jet printing, flexo, gravure, and others may be employed to manufacture the structures described herein without departing from the scope of the embodiments discussed herein. Additionally, the layouts and designs described herein may be applied to substrates 3100 of different materials as may be appropriate for specific manufacturing techniques, e.g., printed circuit boards or flexible printed circuit boards (flex circuits). In embodiments, alternative manufacturing methods may include, use, or require alternative dimensions for manufacturing purposes.

In the following discussion of the layering process used to create the substrate 3100 various dimensions are discussed. As discussed below with respect to FIGS. 39A-39L nominal dimensions are discussed. It is understood that the description of these dimensions (whether or not the term nominal is used) includes variations based on manufacturing tolerances and limits. Further, the term approximate is also used to describe dimensions. As used below, approximate refers to variations in dimensions beyond those of manufacturing tolerances that do not interfere with the described functionality of the various structures.

The dimensions described below with respect to FIGS. 39A-39L are selected to permit the arrangement of all the required features in the space permitted without interference between features. Interference may refer to physical interference, e.g., two features that intersect in an unintended fashion, as well as electrical interference, e.g., two features that electrically influence one another in an unintended fashion. Dimensions described below are selected to account for manufacturing tolerances and limits. Such concern is related to both manufacturing tolerances within the production of a single layer, e.g., the tolerances involved in manufacturing the various screens and templates for printing as well as the tolerances involved in printing one or more features with a screen or template. The tolerances of concern are also related to the manufacturing tolerances spanning multiple layers, e.g., print-to-print registration tolerances involved in the alignment of one layer and a subsequent layer. Due to these types of manufacturing error, the potential for tolerance or error stack-up must be considered. For example, to meet a requirement that two features remain a specific distance apart in a final product, it may be necessary for a nominal distance between the two features to be larger than that specific distance to account for variance in the manufacturing process within a single layer. Further, if those features are located on different layers on the substrate, the nominal distance must be selected to also account for potential print-to-print registration errors.

Figure 39A:
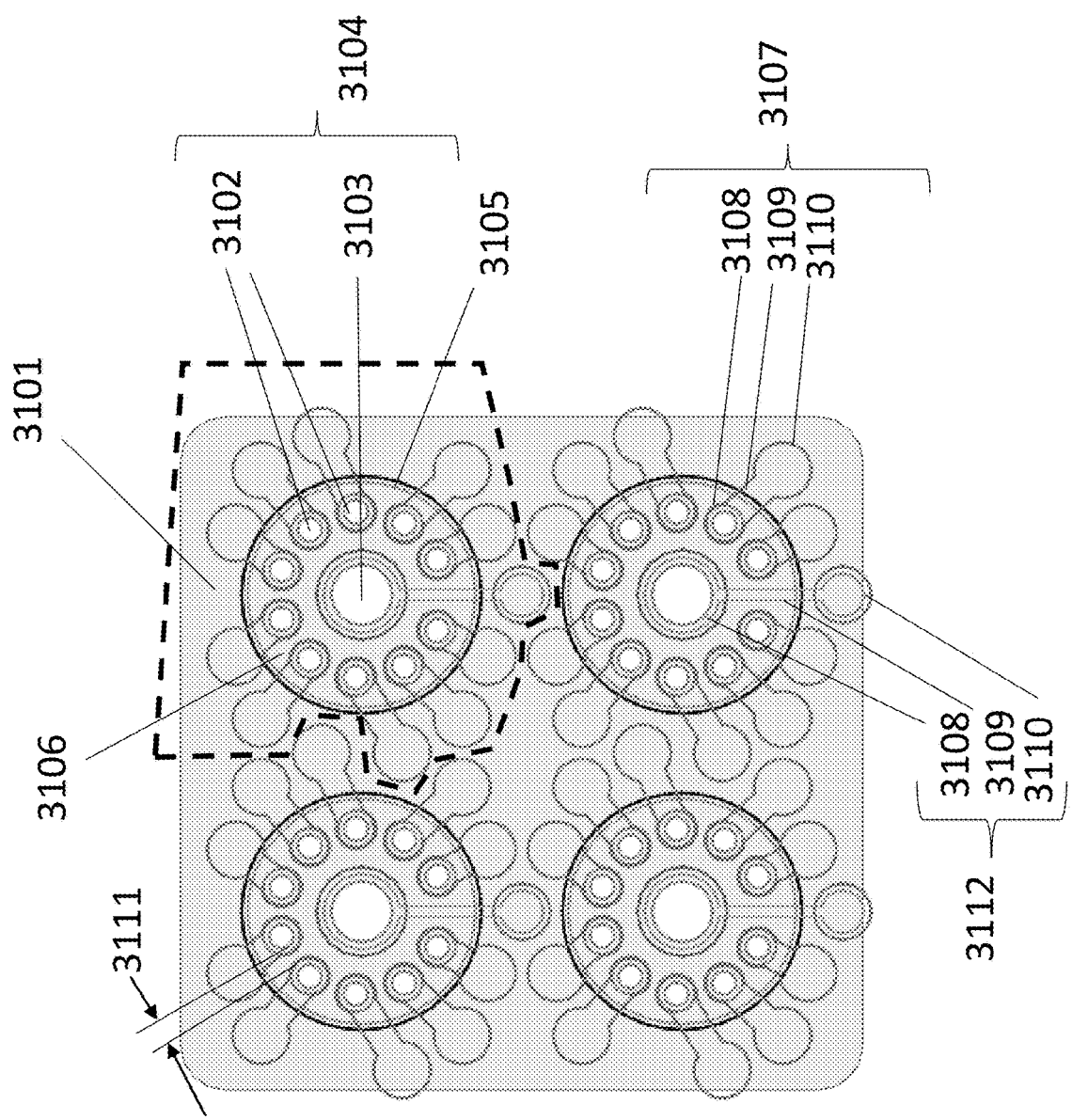

FIG. 39A illustrates an electrode pattern for a portion of a top surface 3190 of a substrate 3100. The illustrated portion shows the features of four well electrode structures 3101 disposed on the top surface 3190 of the substrate 3100. Features belonging to one well electrode structure 3101 are shown outlined with a dashed border. As discussed below, the features of the well electrode structures 3101 are patterned on the top surface 3190 and the bottom surface 3210 of the substrate 3100. The well electrode structures 3101 each include an electrode grouping 3104 including a plurality of working electrodes 3102 and an auxiliary electrode 3103. The working electrodes 3102 are the electrode structures that form the working electrode zones 1002 of the electrochemical cells 1001. As discussed above, in the electrochemical cell 1001, the working electrode zones 1002 are formed by individually electrically isolated working electrodes, e.g., the working electrodes 3102. In further embodiments, as discussed above, working electrode zones 1002 may be formed according to other principles and concepts discussed herein. The auxiliary electrodes 3103 are the electrode structures that form the auxiliary electrode 1003 of the electrochemical cells 1001. Each of the plurality of working electrodes 3102 is electrically isolated from the auxiliary electrode 3103 and a remainder of the plurality of working electrodes 3102, as discussed in greater detail below with respect to the patterning process.

The electrode groupings 3104 are disposed within a well area 3106 defined by a well perimeter 3105. When the substrate 3100 is adhered to the top plate 210, the well areas 3106 are configured to correspond to the top plate openings 3002 to form the bottom of the wells 3003.

Figure 39B:
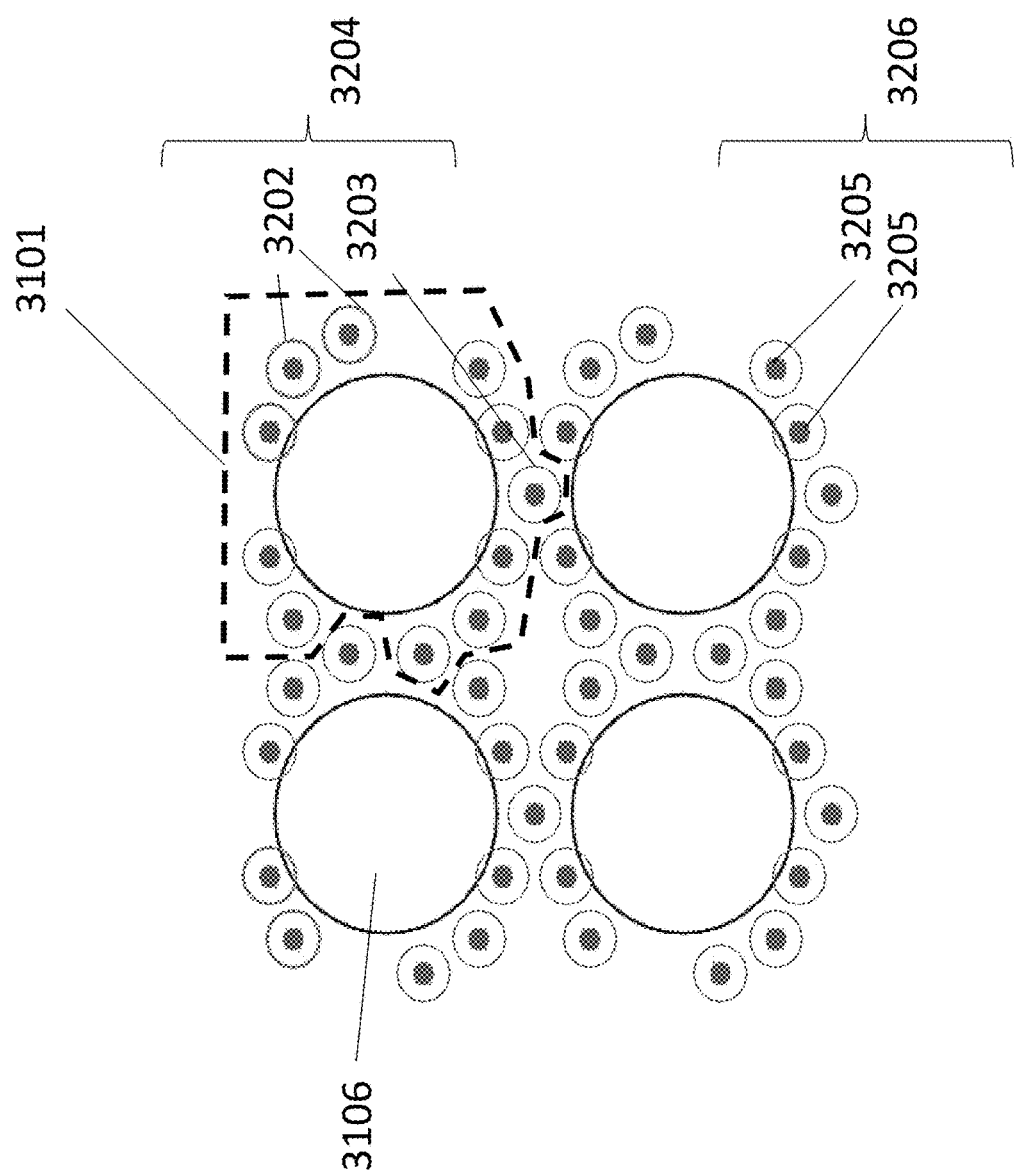

FIG. 39B illustrates an electrode contact pattern for a portion of the bottom surface 3210 of the substrate 3100. The electrode contact groupings 3204 (four are shown) each corresponds to an electrode contact grouping 3204 of the respective well electrode structure 3101. Features belonging to one well electrode contact grouping 3204 are shown outlined with a dashed border. Each electrode contact grouping 3204 includes a plurality of electrode contacts including a plurality of working electrode contacts 3202 and an auxiliary electrode contact 3203. The electrode contact groupings 3204 are disposed outside of the well areas 3106.

The portions of the well electrode structures 3101 patterned on the top surface 3190 of the substrate 3100 are connected to the portions of the well electrode structures 3101 on the bottom surface 3210 of the substrate by a plurality of vias 3205 arranged in a plurality of via groupings 3206, wherein each via grouping 3206 corresponds to the electrode contact grouping 3204 and the electrode grouping 3104 of a respective well electrode structure 3101. The via groupings 3206 provide an electrical connection between the electrode contact groupings 3204 and the electrode groupings 3104, as follows.

The well electrode structures 3101 each further include an electrode trace grouping that includes a plurality of electrical traces 3107 patterned on the top surface 3190. Each electrode trace 3107 provides an electrical connection between the vias 3205 and either a working electrode 3102 or an auxiliary electrode 3103, as follows. The electrical traces 3107 each include a via contact spot 3110 (shown in FIG. 39A) electrically connected to a via 3205 (shown in FIG. 39B) and disposed outside of the well area 3106, an electrical bridge 3109 extending from the contact spot 3110 into the well area 3106, and an electrode contact spot 3108 electrically connected to the electrical bridge 3109 and a corresponding electrode working electrode 3102 inside the well area 3106. The electrode trace groupings also include at least one auxiliary electrode trace 3112, which includes a via contact spot 3110 (shown in FIG. 39A) electrically connected to a via 3205 (shown in FIG. 39B) and disposed outside of the well area 3106, an electrical bridge 3109 extending from the contact spot 3110 into the well area 3106, and an electrode contact spot 3108 electrically connected to the electrical bridge 3109 and a corresponding auxiliary 3103. Thus, a continuous electrical pathway is established between each working electrode 3102 and a corresponding working electrode contact 3202 through a corresponding via 3205, and a corresponding electrode trace 3107, which includes a corresponding via contact spot 3110, a corresponding electrical bridge 3109, and a corresponding electrode contact spot 3108. Similarly, a continuous electrical pathway is established between each auxiliary electrode 3103 and a corresponding auxiliary electrode contact 3203 through a corresponding via 3205, and a corresponding auxiliary electrode trace 3112, which includes a corresponding via contact spot 3110, a corresponding electrical bridge 3109, and a corresponding electrode contact spot 3108.

In an example, the well electrode structures 3101 may be arranged as follows. The auxiliary electrode 3103 may be arranged approximately in a center of the well area 3106. The area of the auxiliary electrode 3103 may encompass the center of the well area 3106. The auxiliary electrode 3103 may be approximately concentric with the well area 3106. The working electrodes 3102 may be arranged in a circle approximately equidistant from the auxiliary electrode 3103. The working electrodes may be separated from each other in the circle by a plurality of working electrode spacings 3111. In embodiments, at least one of the plurality of working electrode spacings 3111 may be sized to permit the disposition therein or therethrough of the electrical bridge 3109 of an auxiliary electrode trace 3112 of the plurality of electrode traces 3112 connecting an auxiliary electrode 3103 to auxiliary electrode contact 3203. Thus, the electrical bridge 3109 of an auxiliary electrode trace 3112 spans adjacent working electrodes 3102. The sizing of the at least one of the plurality of working electrode spacings 3111 may include, for example, positioning at least two adjacent working electrodes at a greater distance from one another vis-à-vis the remaining working electrodes 3102 (creating a gap between those two working electrodes). In this example, the working electrodes 3102 can form a C-shaped pattern. Accordingly, at least one of the plurality of working electrode spacings 3111 may be larger than a remainder of the plurality of working electrode spacings 3111. In other embodiments, the distances between all adjacent working electrodes 3102 can be the same (or approximately the same), with sufficient distance between each adjacent pair to permit the disposition therein or therethrough of one or more electrical bridge 3109 of one or more auxiliary electrode traces 3112. In this example, the working electrodes form a concentric circle shape. Although these examples relate to circular-shaped wells, other well shapes (e.g., squares, rectangles, ovals, etc.) are contemplated as well.

Thus, as described in FIGS. 39A and 39B, each well electrode structure 3101 includes an electrode grouping 3104, an electrical trace grouping including a plurality of electrode traces 3107 and an auxiliary trace 3112, an electrode contact grouping 3204, and a via grouping 3206. The well electrode structures 3101 may form the electrochemical cells 1001, as discussed herein.

FIGS. 39C-39J illustrate individual layers related to the construction of the well electrode structures 3101 according to embodiments disclosed herein.

Figure 39C:
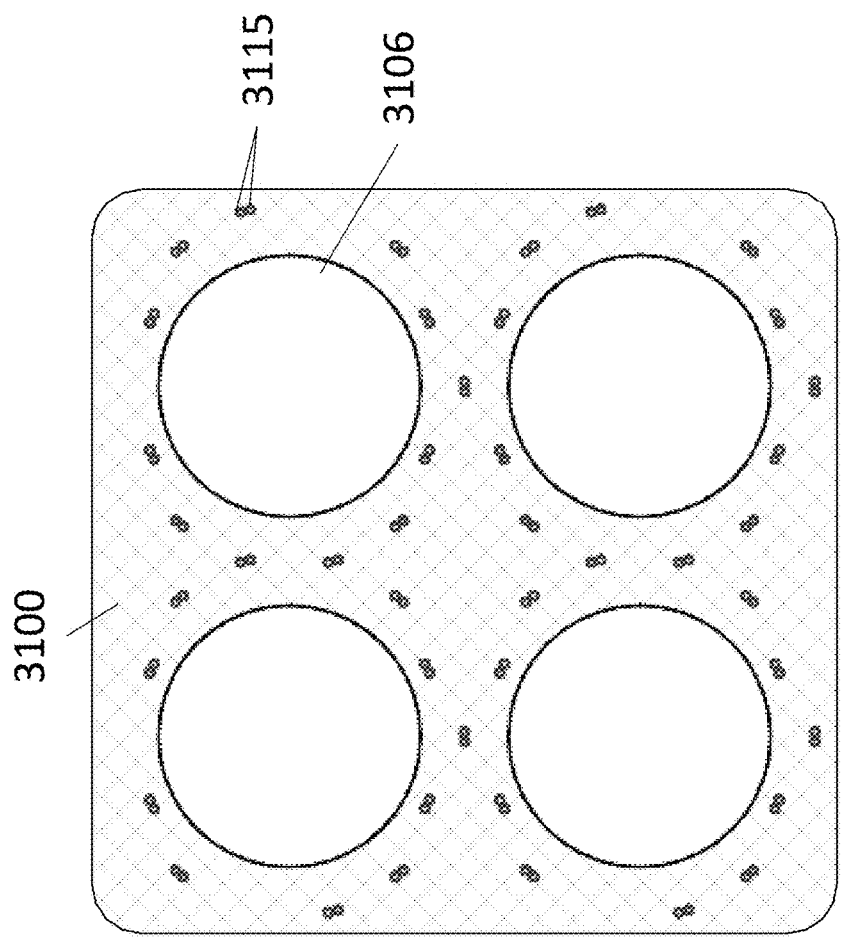

FIG. 39C illustrates a pattern of holes formed in the substrate. The holes 3115 are formed in the substrate 3100 outside of the well area 3106. The holes 3115 may be laser cut, micro-drilled, or formed by any other suitable method. The holes 3115 are formed in pairs, with one pair corresponding to each via 3205, for redundancy purposes.

The holes 3115 may range in nominal diameter between approximately 0.004" and 0.010" in diameter. The holes 3115 are distanced from the well area by approximately 0.019". The positioning of the holes 3115 permits approximately 0.019" of potential variation in registration between the well areas 3106 and top plate openings 3002 when the substrate 3100 is attached to the top plate 3001.

Figure 39D:
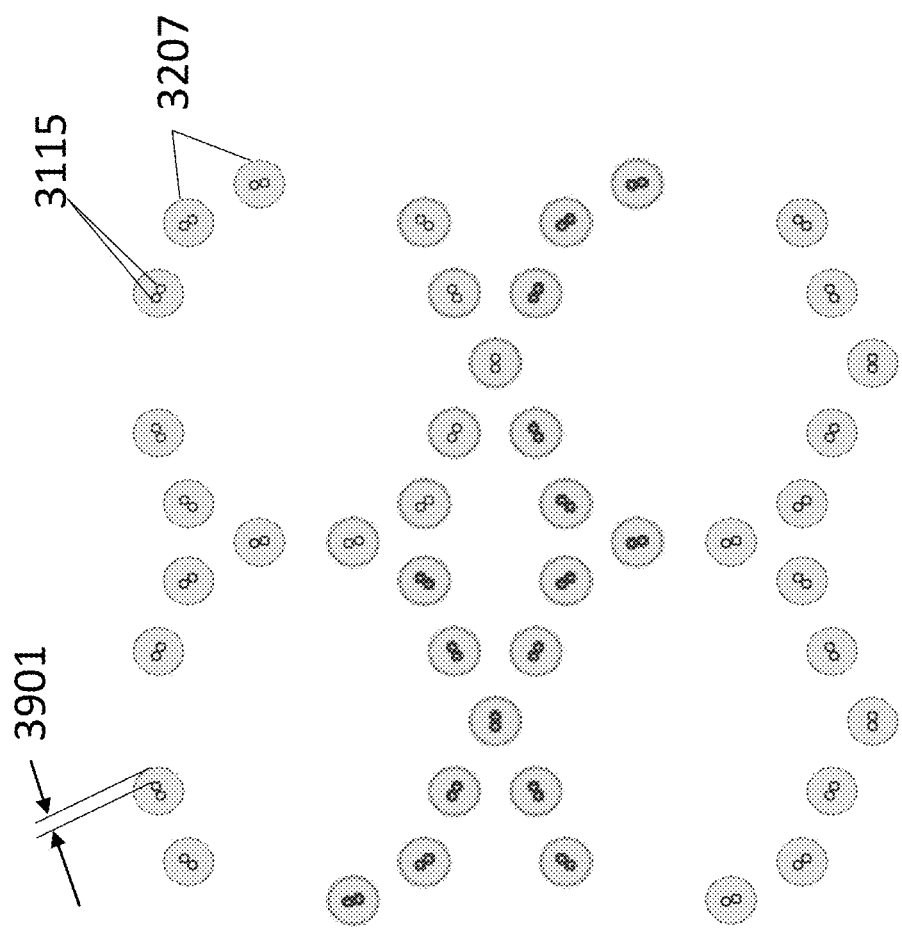

FIG. 39D illustrates a pattern of a layer applied to a bottom surface of the substrate to fill the holes 3115 to form the vias 3205. A conductive layer is applied to the bottom surface 3210 of the substrate 3100. The conductive layer flows through the holes 3115 and fills the same to form the electrically conductive vias 3205. The conductive layer is arranged in a plurality of via spots 3207, each corresponding to one of the pairs of holes 3115. In embodiments, the conductive layer forming the via spots 3207 may be silver or another conductive material, such as, for example other metals (e.g., gold, platinum, nickel, steel, iridium, copper, aluminum), conductive inks, conductive alloys, or the like.

The via spots 3207 are configured as approximately circular, with a nominal dimension 3901 of approximately 0.015" between the edge of the spots via 3207 and the edge of the holes 3115. Because the holes 3115 are arranged in pairs, the distance between the edges of the holes 3115 and the edges of the spots may vary and may be as large as approximately 0.018" in places. Selecting a nominal value of approximately 0.0015" for the nominal dimension 3901 accounts for potential registration errors between the conductive layer forming the via spots 3207 and the holes 3115.

Figure 39E:
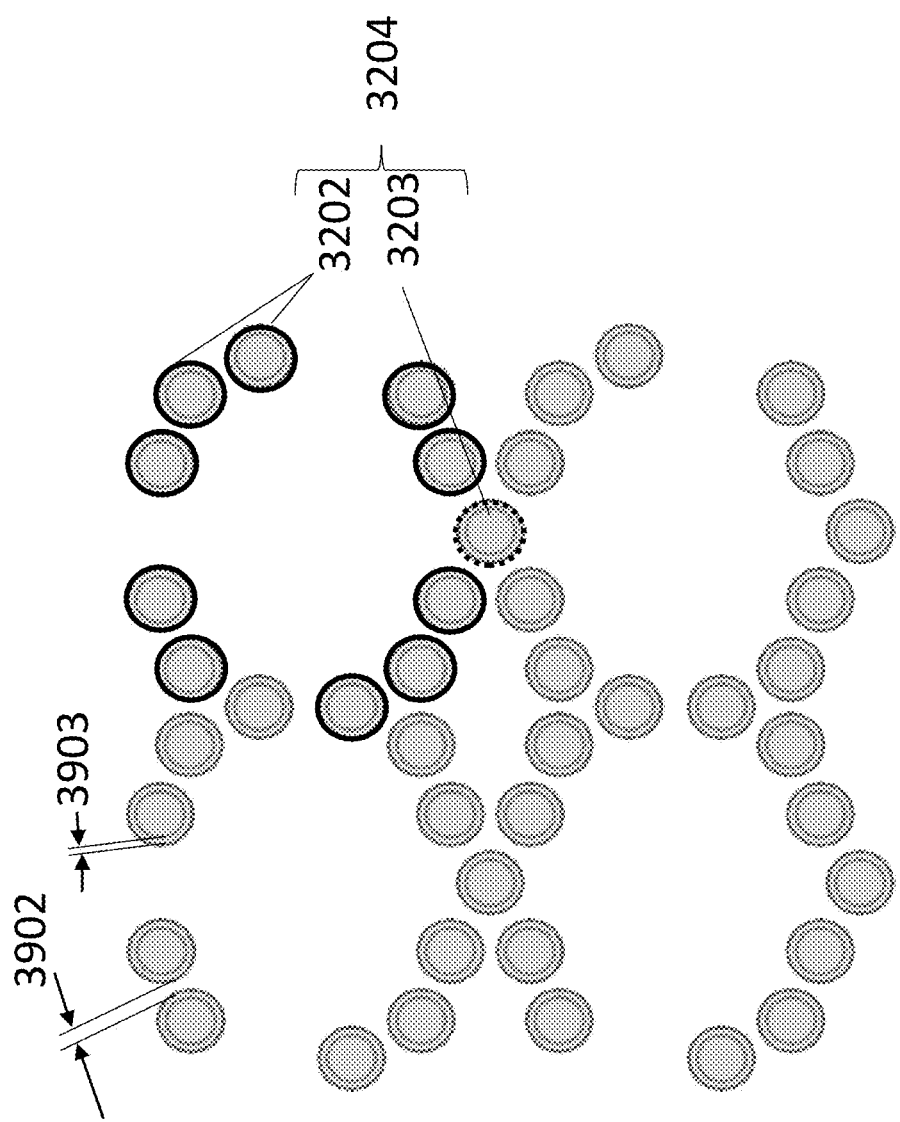

FIG. 39E illustrates a pattern of a layer applied to a bottom surface of the substrate to form the electrode contact groupings. The electrode contact groupings 3204 are formed from a conductive layer applied to the bottom surface 3210 of the substrate 3100. Each of the electrode contact groupings 3204 include a plurality of working electrode contacts 3202 (in this example, 10) and at least one auxiliary electrode contact 3203 (in this example, 1). FIG. 39E illustrates a portion of the bottom surface 3210 of the substrate 3100 having four electrode contact groupings 3204. The electrode contacts belonging to a single electrode contact grouping 3204 are shown with a bold outline in FIG. 39E, with the working electrode contacts 3202 outlined in a solid bold line and the auxiliary electrode contacts 3203 outlined in a dashed bold line. Each of the other electrode contact groupings 3204 are arranged and positioned in the same pattern. To preserve individual addressability of the spots in the wells, the electrode contacts of the electrode contact groupings are electrically isolated from one another. In embodiments, the electrode contact groupings 3204 may be formed from a layer of, for example, conductive carbon or any other suitable material. In further embodiments, other electrode contact grouping arrangements that maintain electrical isolation between and among all of the working contacts 3202 and all of the auxiliary electrode contacts 3203 may be employed without departing from the scope of this disclosure.

The working electrode contacts 3202 and the at least one auxiliary electrode contact 3203 are configured with a nominal dimension 3902 between them of approximately 0.012". The nominal dimension 3902 serves to account for potential printing errors that may cause two electrode contacts to connect with each other, which may be detrimental to isolation. The working electrode contacts 3203 and the at least one auxiliary electrode contact 3203 may be configured to extend beyond the via spots 3207 by a nominal dimension 3903 of approximately 0.008". This "overhang" between working electrode contacts 3202 and the at least one auxiliary electrode contact 3203 and the via spots 3207 serves to account for potential errors in registration between the layer of FIG. 39D and the layer of FIG. 39E.

Figure 39F:
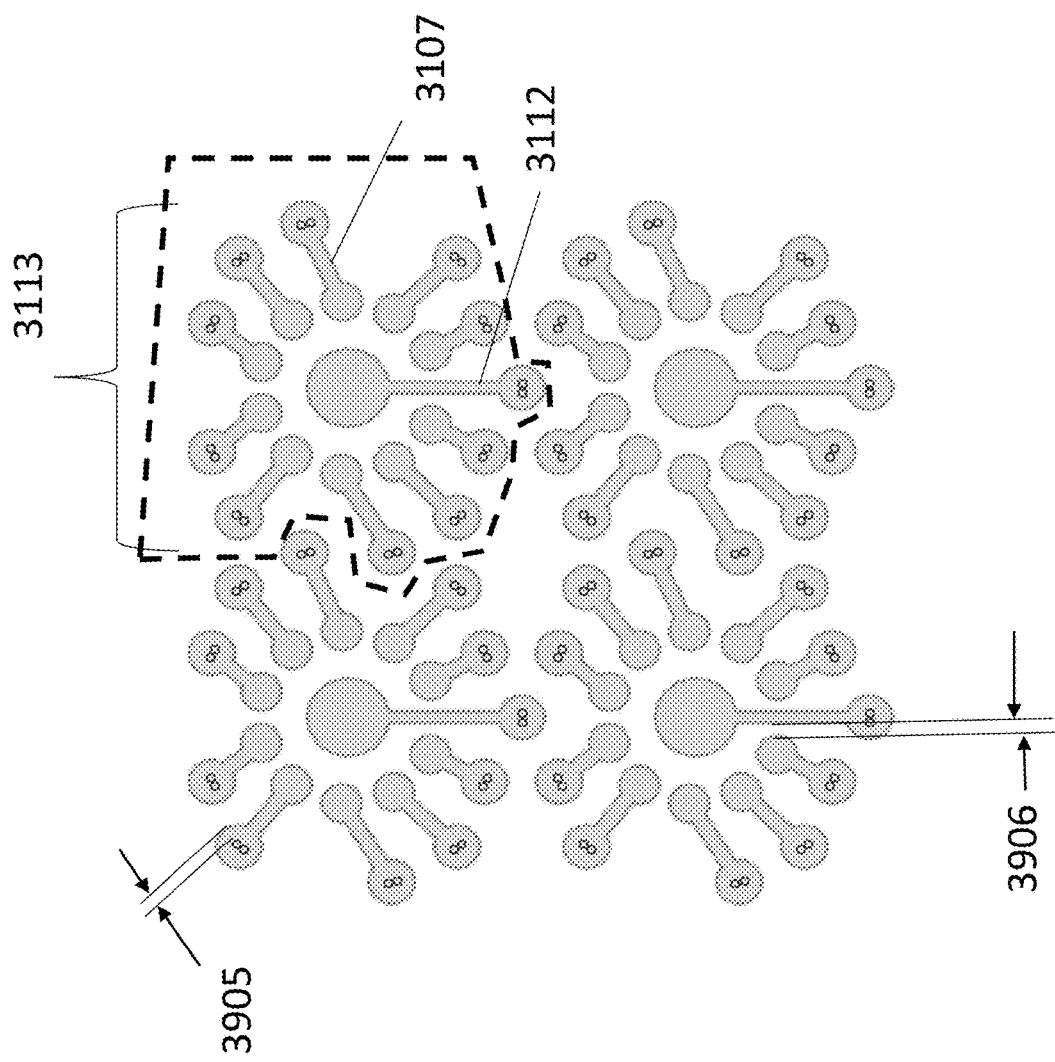

FIG. 39F illustrates a layer pattern applied to a top surface of the substrate to form the electrode trace groupings. FIG. 39F illustrates four electrode trace groupings 3113 formed from a conductive layer applied to the top surface 3190 of the substrate 3100. A dotted line in shown surrounding a single electrode trace grouping 3113 in FIG. 39F. The electrode trace groupings 3113 each include a plurality of electrical traces 3107 and at least one auxiliary electrode trace 3112. Each electrode trace grouping 3113 belongs to a well electrode structure 3101 and provides electrical connections between the vias 3205 and an electrode grouping 3104. The conductive layer forming the electrode trace groupings 3113 may include, for example, conductive silver. In embodiments, the conductive silver may flow into the holes 3115 and connect to the conductive silver applied to the bottom surface 3210 of the substrate 3100 to complete formation of the vias 3205. In further embodiments, any other suitable conductive material may be used in place of the conductive silver, such as, for example, other metals, (such as gold, platinum, nickel, steel, iridium, copper, aluminum), a conductive alloy, or the like.

The conductive layer illustrated in FIG. 39F is configured with a nominal dimension 3905 of approximately 0.015" between the edge of the conductive layer and the edge of the holes 3115. Selecting a nominal value of approximately 0.0015" for the nominal dimension 3905 accounts for potential registration errors between the conductive layer forming the electrode trace groupings 3113 and the holes 3115. Further, the nominal dimension 3906 between features of the electrode trace groupings 3113 may be approximately 0.013". The nominal dimension 3906 accounts for potential errors in printing the conductive layer forming the electrode trace groupings 3113.

Figure 39G:
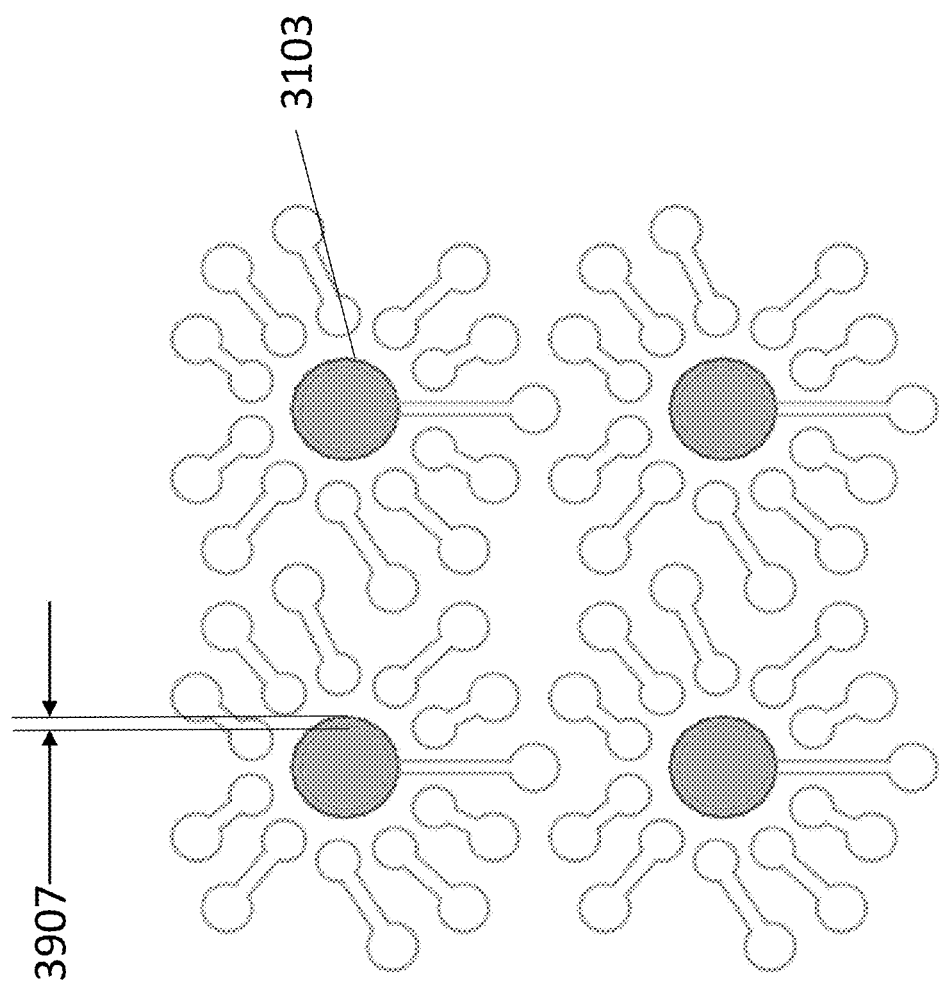

FIG. 39G illustrates a layer pattern applied to a top surface of the substrate to form the auxiliary electrodes 3103. A conductive layer is applied to the top surface 3190 of the substrate 3100 to form at least one auxiliary electrode 3103 for each well electrode structure 3101. The conductive layer forming the at least one auxiliary electrode 3103 may include, for example, carbon and/or Ag—AgCl, and/or other chemical mixtures, including metal oxides with multiple metal oxidation states, e.g., manganese oxide, or other metal/metal oxide couples, e.g., silver/silver oxide, nickel/nickel oxide, zinc/zinc oxide, gold/gold oxide, copper/copper oxide, platinum/platinum oxide, as discussed herein.

The conductive layer illustrated in FIG. 39G, forming the auxiliary electrodes 3103, is configured to extend beyond the conductive layer of FIG. 39F by a nominal dimension 3907 of approximately 0.008". The nominal dimension 3907 accounts for potential registration errors between the conductive layer of FIG. 39F and the conductive layer of FIG. 39G.

Figure 39H:
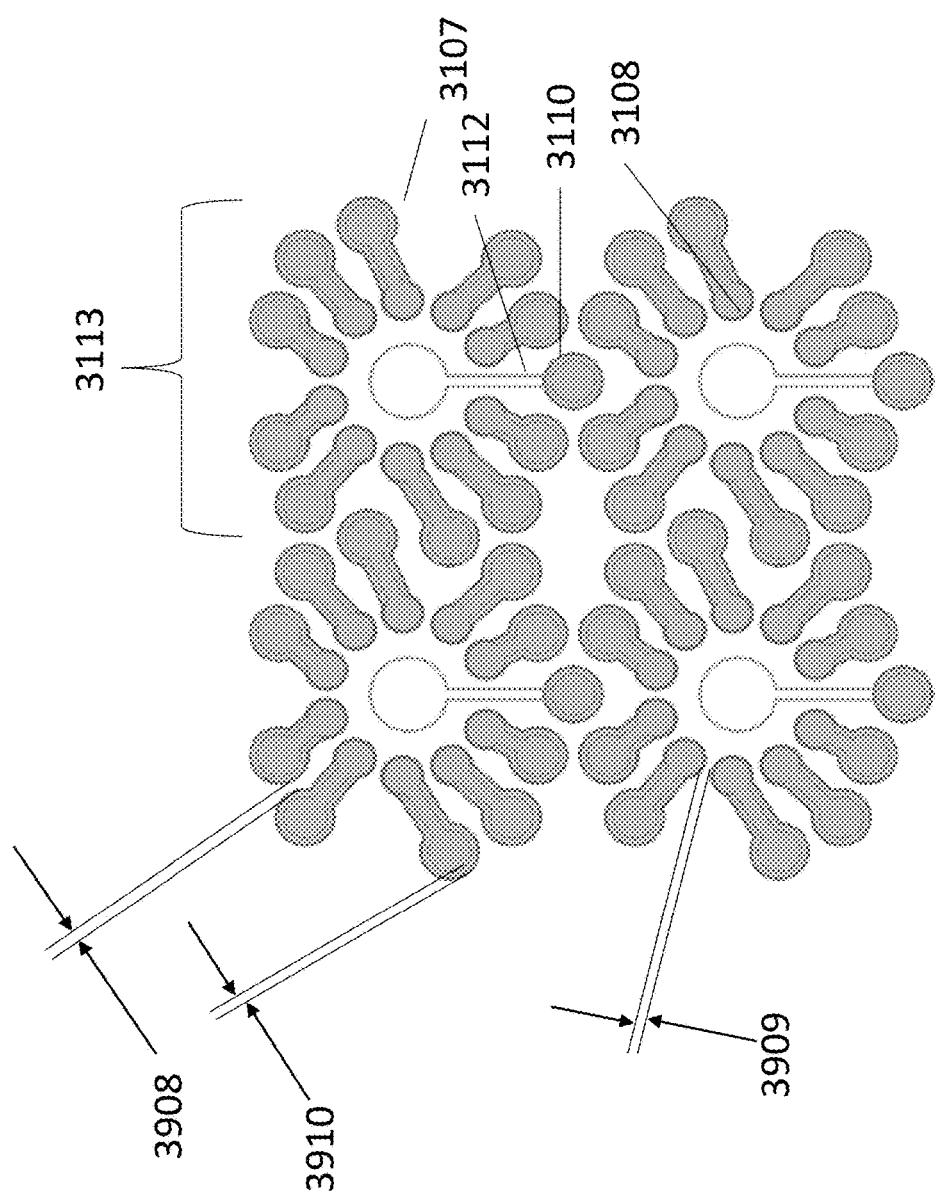

FIG. 39H illustrates a layer pattern applied to a top surface of the substrate to form a portion of the electrode trace groupings 3113. A conductive layer is applied to the top surface 3190 of the substrate 3100 to form the electrode trace groupings 3113. The electrode trace groupings 3113 are formed from two conductive layers atop one another. The first of these is described with respect to FIG. 39F. The second, shown in FIG. 39H, is applied over the entirety of the electrical traces 3107 and to the via contact spot 3110 of the auxiliary electrode traces 3112. In embodiments, the conductive layer forming the second layer of the electrode traces 3107 and the auxiliary electrode traces 3112 may be formed from carbon or any other suitable conductive material, such as one or more of the conductive materials described throughout.

The conductive layer illustrated in FIG. 39H is configured with a nominal dimension 3908 of approximately 0.012" between neighboring via contact spots 3110 and a nominal dimension 3909 of approximately 0.010" between neighboring electrode contact spots 3108. The nominal dimensions 3908 and 3909 account for potential errors in printing the conductive layer forming the electrode traces 3107 and the auxiliary electrode traces 3112. The conductive layer illustrated in FIG. 39H is further configured with a nominal dimension 3910 of approximately 0.002" between the edges of the conductive layer of FIG. 39H and the edges of the conductive layer of FIG. 39F. The nominal dimension 3910 provides overhang to account for potential registration errors between the conductive layer of FIG. 39H and the conductive layer of FIG. 39F to ensure that none of the layer of FIG. 39F is exposed beyond the layer of FIG. 39H.

Figure 39I:
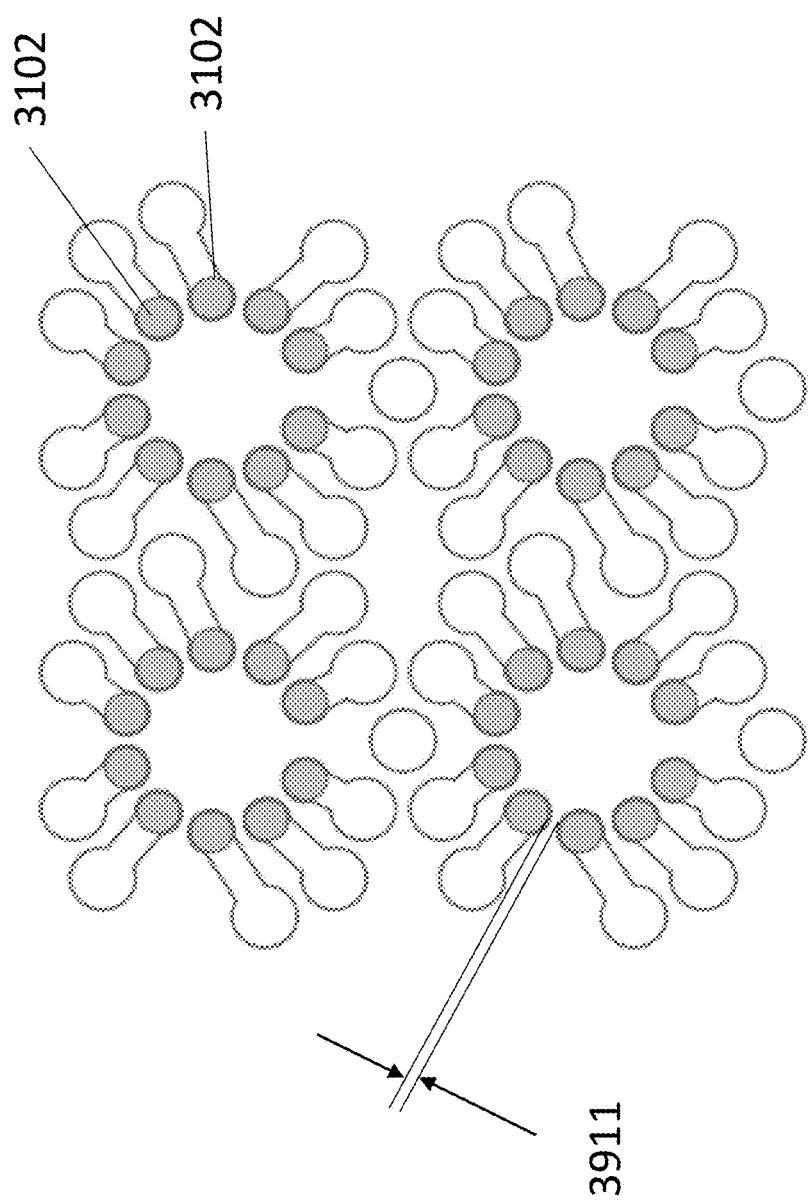

FIG. 39I illustrates a layer pattern applied to a top surface of the substrate to form the working electrodes 3102. A conductive layer is applied to the top surface 3190 of the substrate 3100 to form the working electrodes 3102. The conductive layer of the working electrodes 3102 overlays the two conductive layers of the electrode trace groupings 3113 (FIGS. 39F, 39H). In embodiments, the conductive layer forming the working electrodes 3102 may be formed from a carbon ink or any other suitable conductive material, such as any of the conductive materials described throughout.

The conductive layer illustrated in FIG. 39I is configured with a nominal dimension 3911 of approximately 0.014" between neighboring working electrodes 3102. The nominal dimension 3911 accounts for potential errors in printing the conductive layer forming the working electrodes 3102.

As described with respect to FIGS. 39A-39L, each working electrode 3102 is electrically isolated from each other working electrode 3102 and from each auxiliary electrode 3103 and each auxiliary electrode 3103 is electrically isolated from each other auxiliary electrode 3103 and from each working electrode 3102. Further, the electrode traces 3107, auxiliary electrode traces 3112, vias 3205, working electrode contacts 3202 and auxiliary electrode contacts 3203 associated with each working electrode 3102 or auxiliary electrode 3103 are similarly isolated from all other working electrodes 3102 or auxiliary electrodes 3103 (and their associated connected components) that they are not associated with. This isolation is achieved through physical separation of the isolated components during the production process, as described with respect to FIGS. 39A-39L.

Figure 39J:
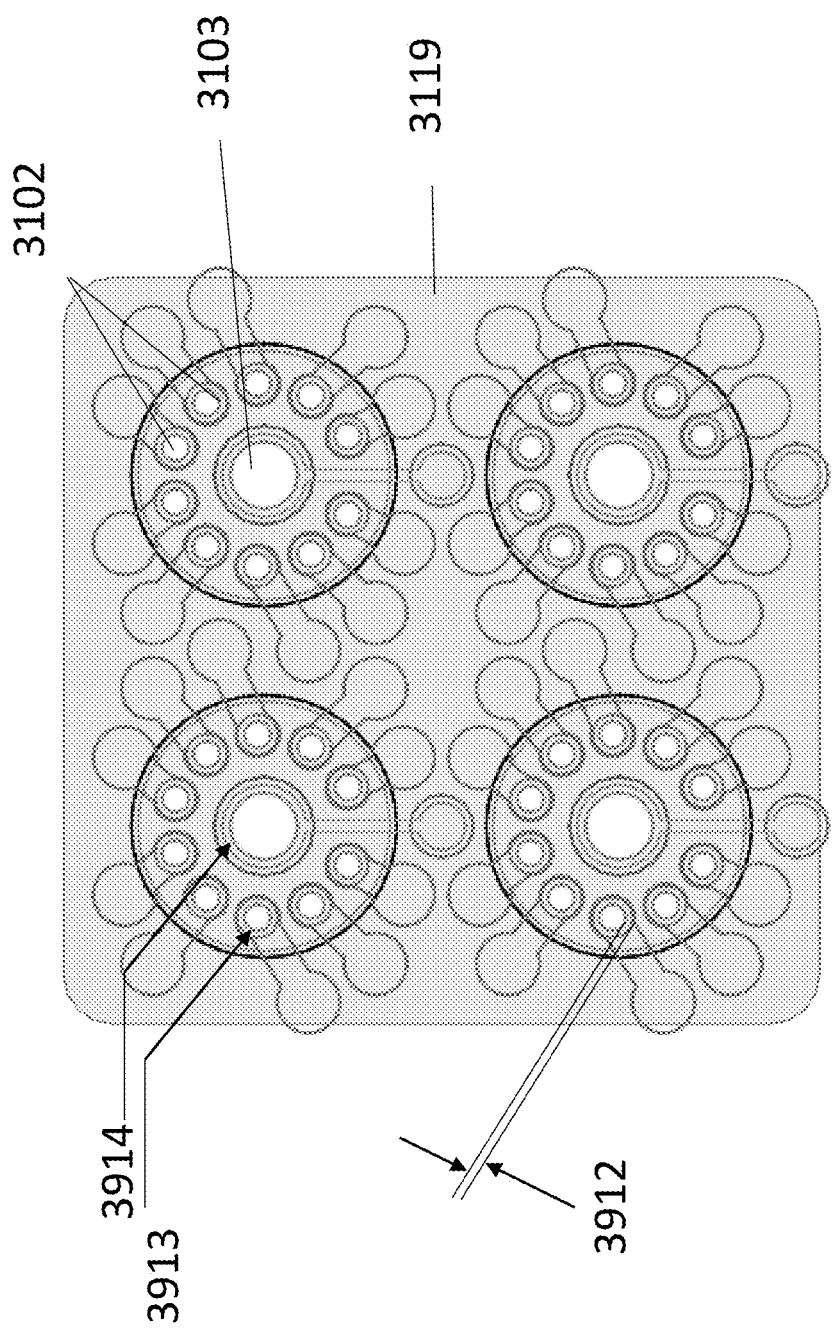

FIG. 39J illustrates a layer applied to a top surface of the substrate to physically isolate the working electrodes 3102 and the auxiliary electrodes 3103. As discussed above, the working electrodes 3102 and the auxiliary electrodes 3103 are electrically isolated from one another due to the layering and printing process that creates physical separation. Electrical isolation between these components is further facilitated by the physical isolation produced by the dielectric or non-conductive layer 3119. A dielectric or non-conductive layer 3119 is applied to the top surface 3190 of the substrate 3100 to physically isolate the working electrodes 3102 and the auxiliary electrode 3103. The dielectric or non-conductive layer 3119 covers the top surface 3190 of the substrate, filling in the gaps between the previously applied layers and leaving only portions of the conductive layers of FIGS. 39G and 39I corresponding to the working electrodes 3102 and the auxiliary electrodes 3103 exposed. In embodiments, the dielectric layer may be applied in a layer raised above the working electrodes 3102 and the auxiliary electrodes 3103, leaving these electrodes at the bottom of an indentation in the dielectric layer or non-conductive layer 3119. Thus, the dielectric layer or non-conductive layer 3119 may at least partially serve to create the "spots" discussed herein. The dielectric layer or non-conductive layer 3119 may therefore serve to at least partially create a physical barrier between the working electrodes 3102 and the auxiliary electrodes 3103. These feature are further illustrated with respect to FIG. 39K.

The dielectric layer or non-conductive layer 3119 illustrated in FIG. 39J is configured with a nominal dimension 3912 of approximately 0.007" between the working electrode 3102 and the exposed portion of the working electrode 3102 (e.g., the working electrode zone 1002) and between the auxiliary electrode 3103 and the exposed portion of the auxiliary electrode 3103. The nominal dimension 3912 accounts for potential errors in registration between the dielectric layer or non-conductive layer 3119 and the layer of FIG. 39I so that the exposed portions of the dielectric layer or non-conductive layer 3119 do not extend past the working electrode 3102 and the auxiliary electrodes 3103. Further, the conductive layer of FIG. 39J is configured to expose a portion of the working electrodes 3102 having a nominal diameter 3913 of approximately 0.027" and to expose a portion of the auxiliary electrodes 3103 having a nominal diameter 3914 of approximately 0.068". The nominal diameters 3913 and 3914 may be selected to achieve specific electrode sizing and may be varied accordingly to achieve selected electrode sizes.

Figure 39K:
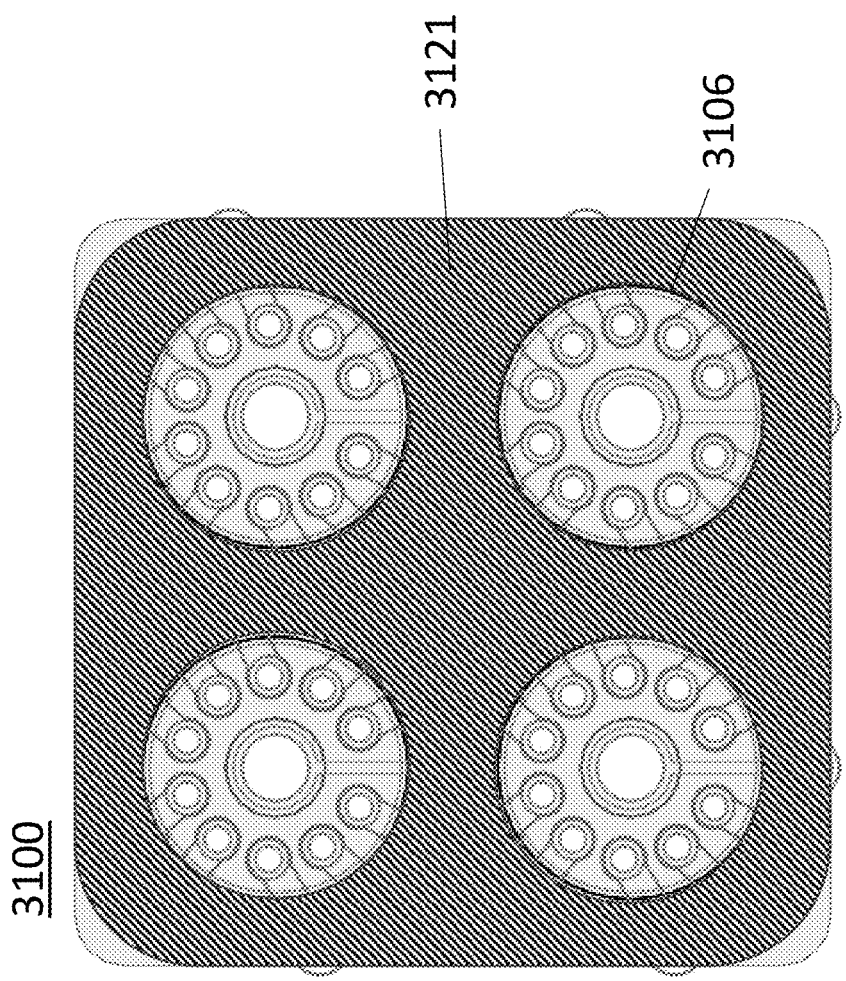

FIG. 39K illustrates an adhesive layer applied to a top surface of the substrate. The adhesive layer 3121 is applied as a top layer to the substrate 3100 after all other layers have been applied. The adhesive layer 3121 is applied to the substrate 3100 in a pattern that leaves the well areas 3106 free of adhesive. The substrate 3100 is then joined with the top plate 3001 such that the top plate openings 3002 correspond to the well areas 3106 to define the wells 3003. The adhesive layer 3121 may be a separate section of adhesive material that is die cut into the correct pattern (e.g., removing material associated with the well areas 3106) before application. The adhesive layer 3121 may be registered and applied first to the top plate 3001 and then the top plate 3001, with adhesive layer 3121, may be registered and adhered to the substrate 3100. In embodiments, the adhesive layer 3121 may be applied first to the substrate 3100 and then the substrate 3100 with adhesive layer 3121 may be applied to the top plate 3001.

The well electrode structures 3101 are configured such that the all of the working electrodes 3102 and all of the auxiliary electrodes 3103 on the substrate 3100 are electrically isolated from one another (e.g., each working electrode 3102 is electrically isolated from the remaining working electrodes, each auxiliary electrode 3103 on the substrate 3100 is electrically isolated from the remaining auxiliary electrodes, each working electrode 3102 is electrically isolated from each auxiliary electrode 3103, etc.). The positioning and patterning of the various layers described above is such that all of the conductive elements (traces, contacts, etc.) related to each working electrode 3102 and to each auxiliary electrode 3103 are set apart from and electrically isolated from one another. This isolation means that each working electrode 3102 of a selected electrode grouping 3104 is configured to be electrically energized in isolation from electrical energization of remaining working electrodes 3102 of the plurality of working electrodes 3102 of the selected electrode grouping 3104. Further, each working electrode 3102 of the entire substrate is configured to be electrically energized independently of the remaining working electrodes 3102 of the substrate. The working electrodes 3102 of the substrate 3100 or of individual well electrode structures 3101 may be separately energized or address and/or may be addressed or energized in any combination.

The layers of substrate 3100 are configured, as discussed above, with selected nominal dimensions to achieve the above described isolation. The nominal dimensions may be selected to permit all of the various features and aspects of substrate 3100 to be located within close proximity of one another without compromising the isolation properties discussed herein. The nominal dimensions are selected to accommodate manufacturing tolerances and increase the likelihood that the manufactured substrates will meet the functional requirements discussed herein. The nominal dimensions discussed herein are by way of example only and provide one example of dimensioning that produces a substrate 3100 having the properties discussed herein. In further embodiments, alternative nominal dimensions may be employed to produce the required functionality without departing from the scope of this disclosure.

FIG. 39L illustrates a cross section of the substrate 3100 after each of the above-discussed layers has been added. FIG. 39L illustrates the dielectric layer 3119 (corresponding with features discussed with respect to FIG. 39J), a first electrode trace conductive layer 3503 (corresponding with electrode trace 3107/3112 features discussed with respect to FIG. 39F), an auxiliary electrode conductive layer 3504 (corresponding with auxiliary electrode 3103 features discussed with respect to FIG. 39G), a second electrode trace conductive layer 3502 (corresponding with electrode trace 3107/3112 features discussed with respect to FIG. 39H), and a working electrode conductive layer 3501 (corresponding with working electrode 3102 feature discussed with respect to FIG. 39I). Example values of thicknesses for these layers are shown below in Table 24. The provided values are examples only, and may vary by 1%, 5%, 10%, etc., based on manufacturing process tolerances. In further examples, alternative values may be used without departing from the scope of this disclosure, including values that vary by 1%, 5%, 10%, 15%, 20%, and more.

TABLE 24

|  | Thickness (mils) | Thickness (microns) |
|---|---|---|
| Dielectric Layer 3119 | 0.5 | 13 |
| Working Electrode Conductive Layer 3501 | 0.4 | 10 |
| Second Electrode Trace Conductive Layer 3502 | 0.4 | 10 |
| First Electrode Trace Conductive Layer 3503 | 0.3 | 8 |
| Auxiliary Electrode Conductive Layer 3504 | 0.5 | 13 |
| Substrate 3100 | 4.8 | 122 |

Figure 40A:
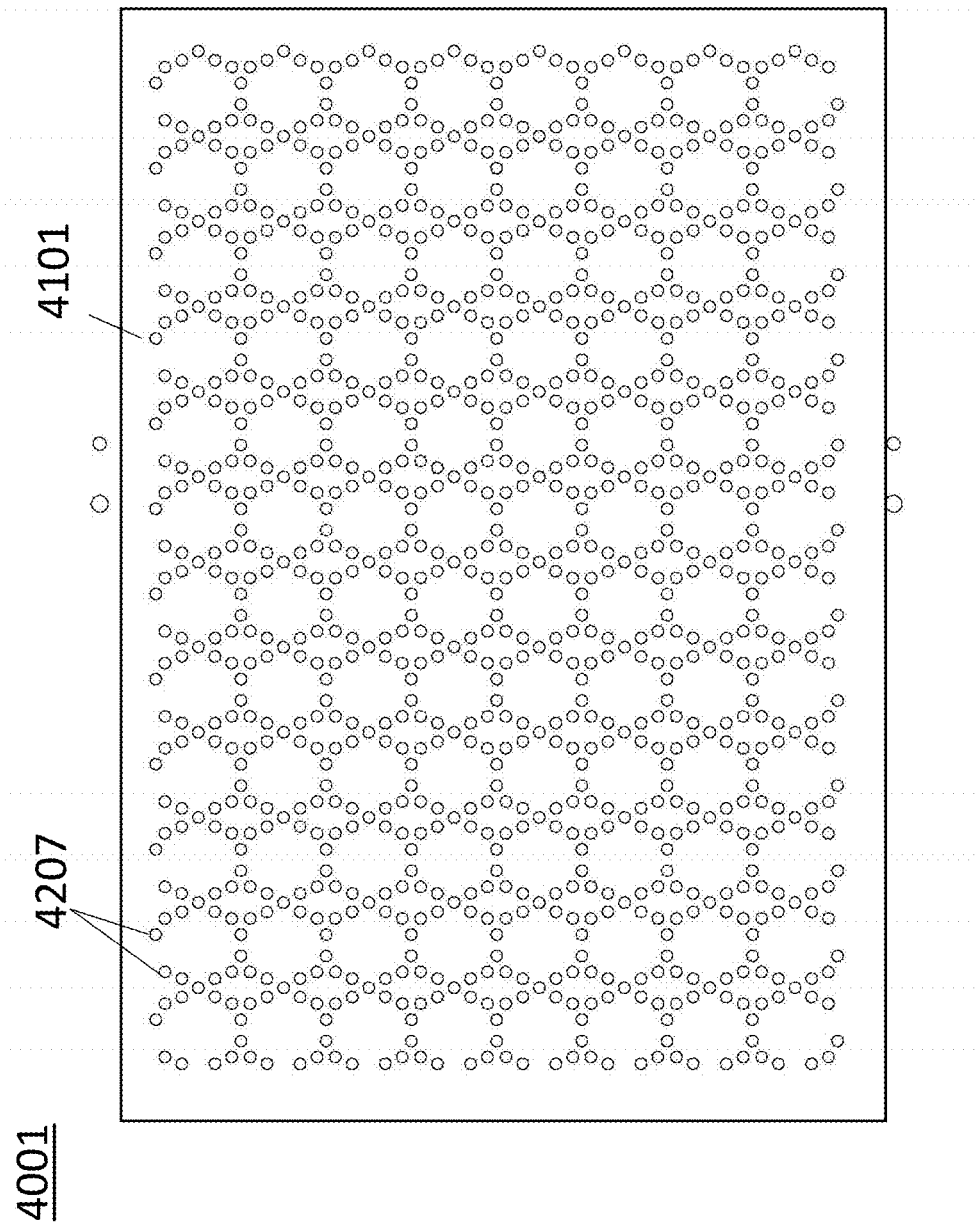
FIGS. 40A-40N illustrate aspects of the construction of a substrate including multiple individually addressable electrode electrochemical cell according to embodiments disclosed herein.
Figure 40B:
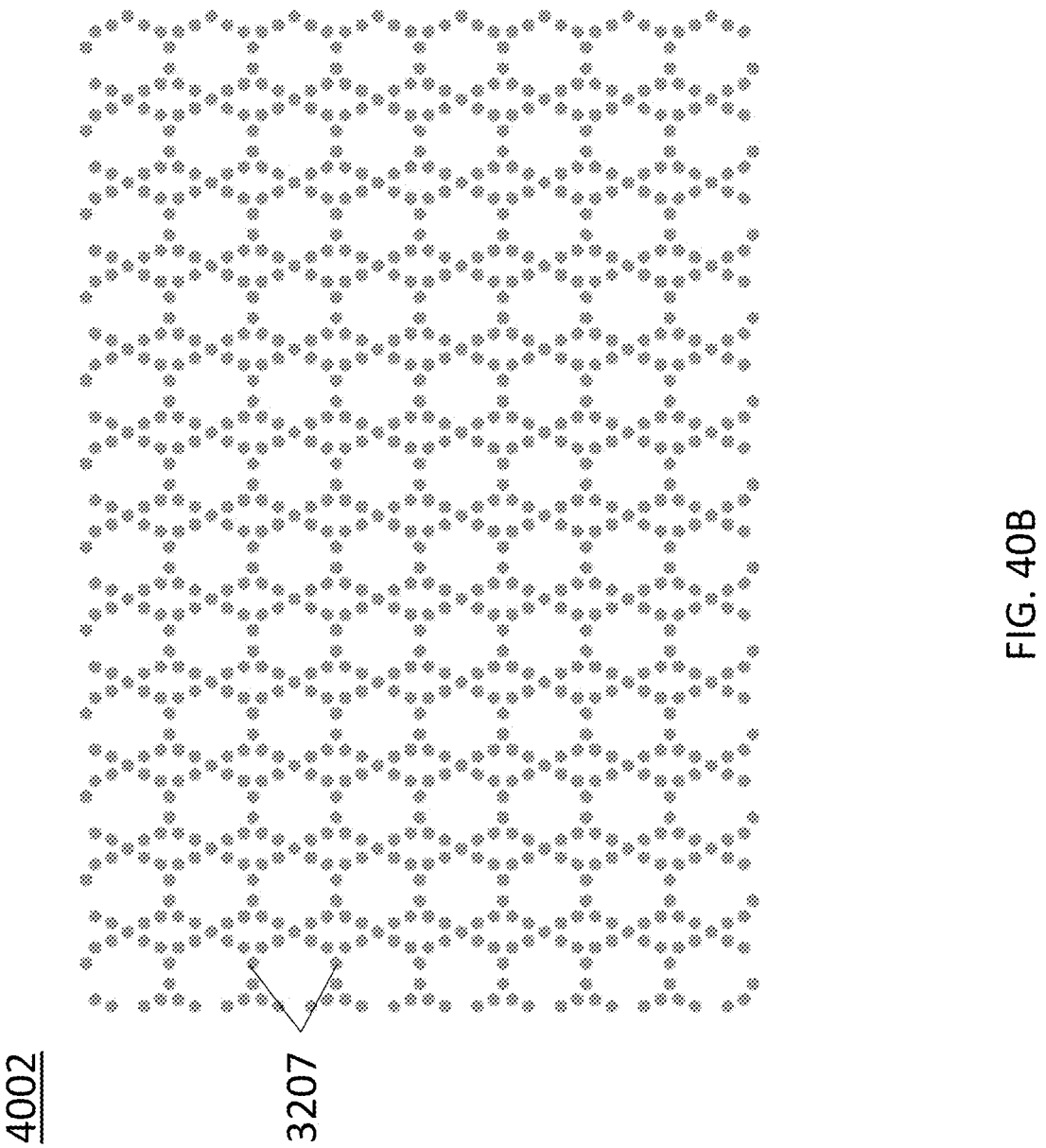
Figure 40C:
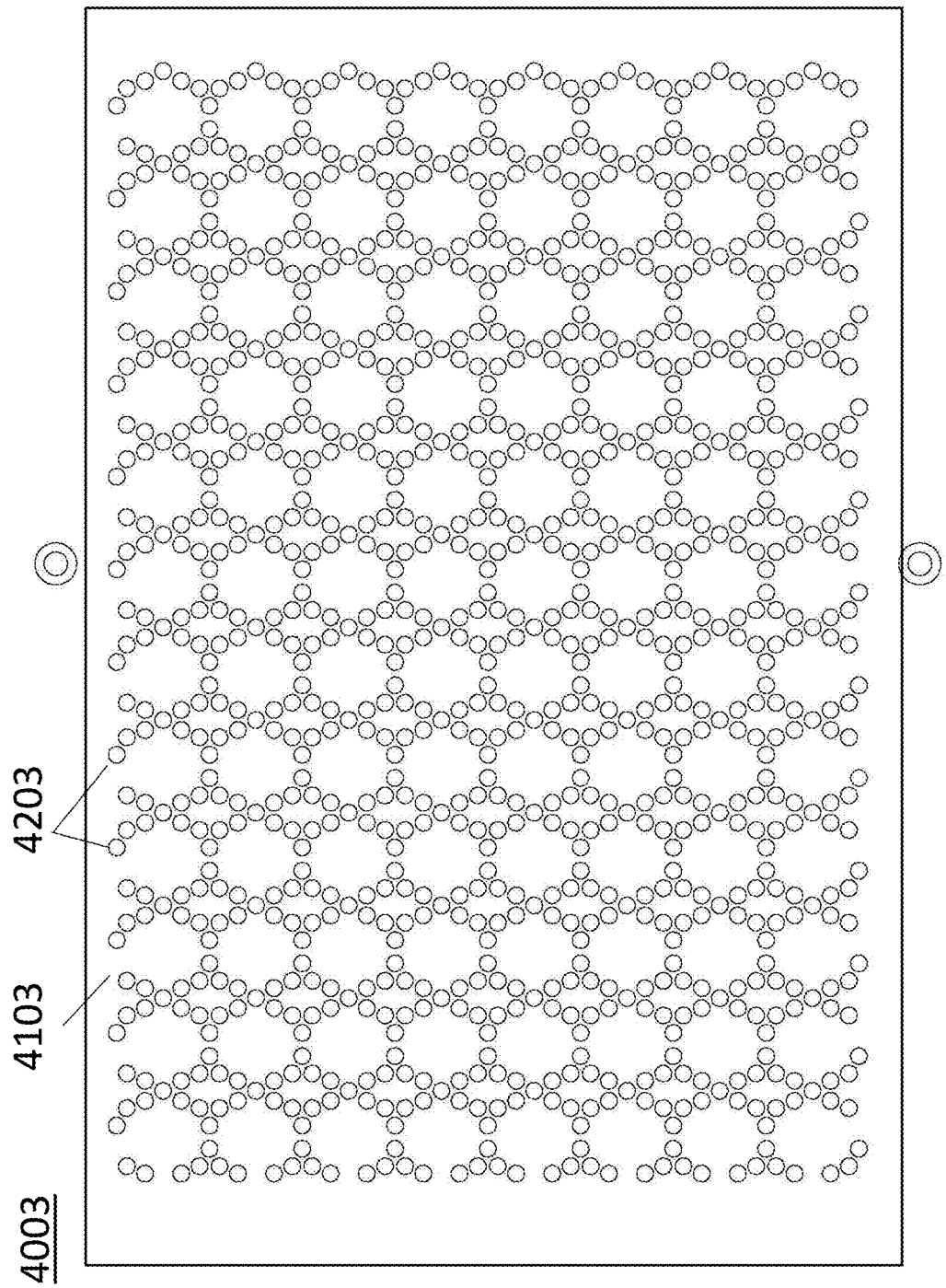
Figure 40D:
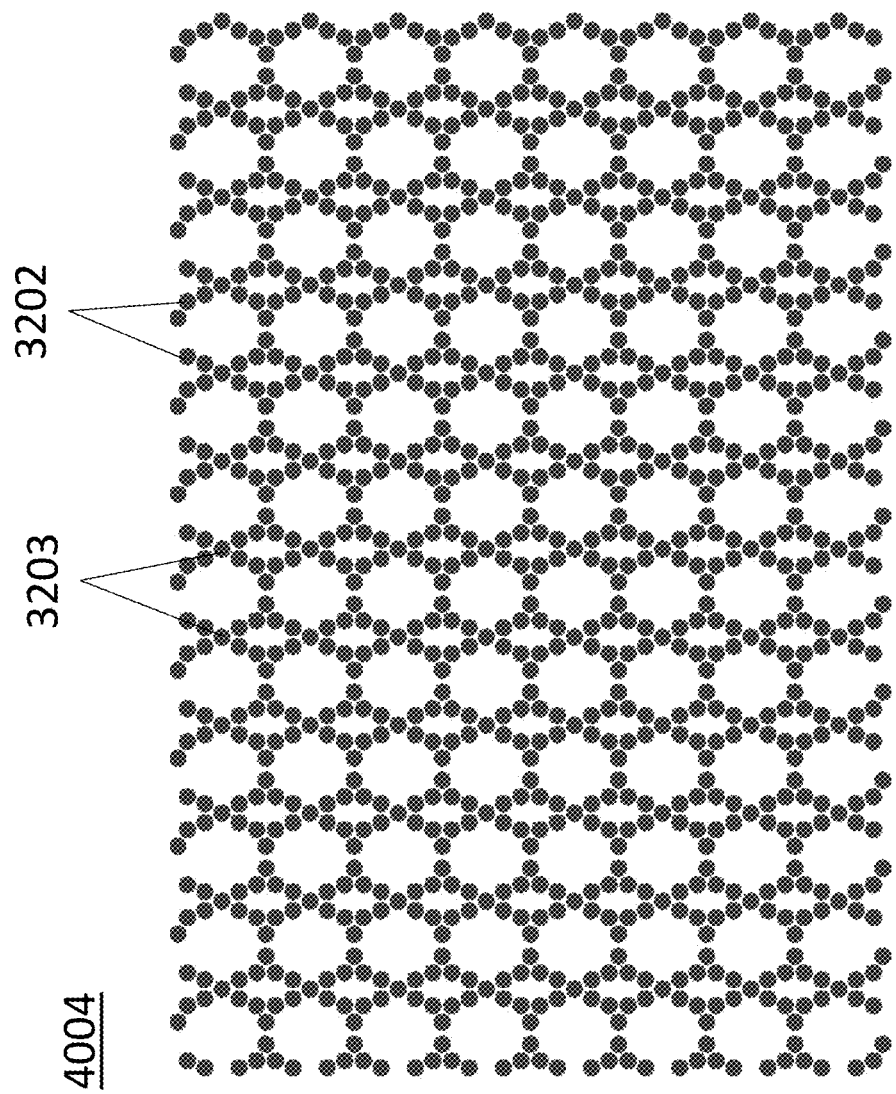
Figure 40E:
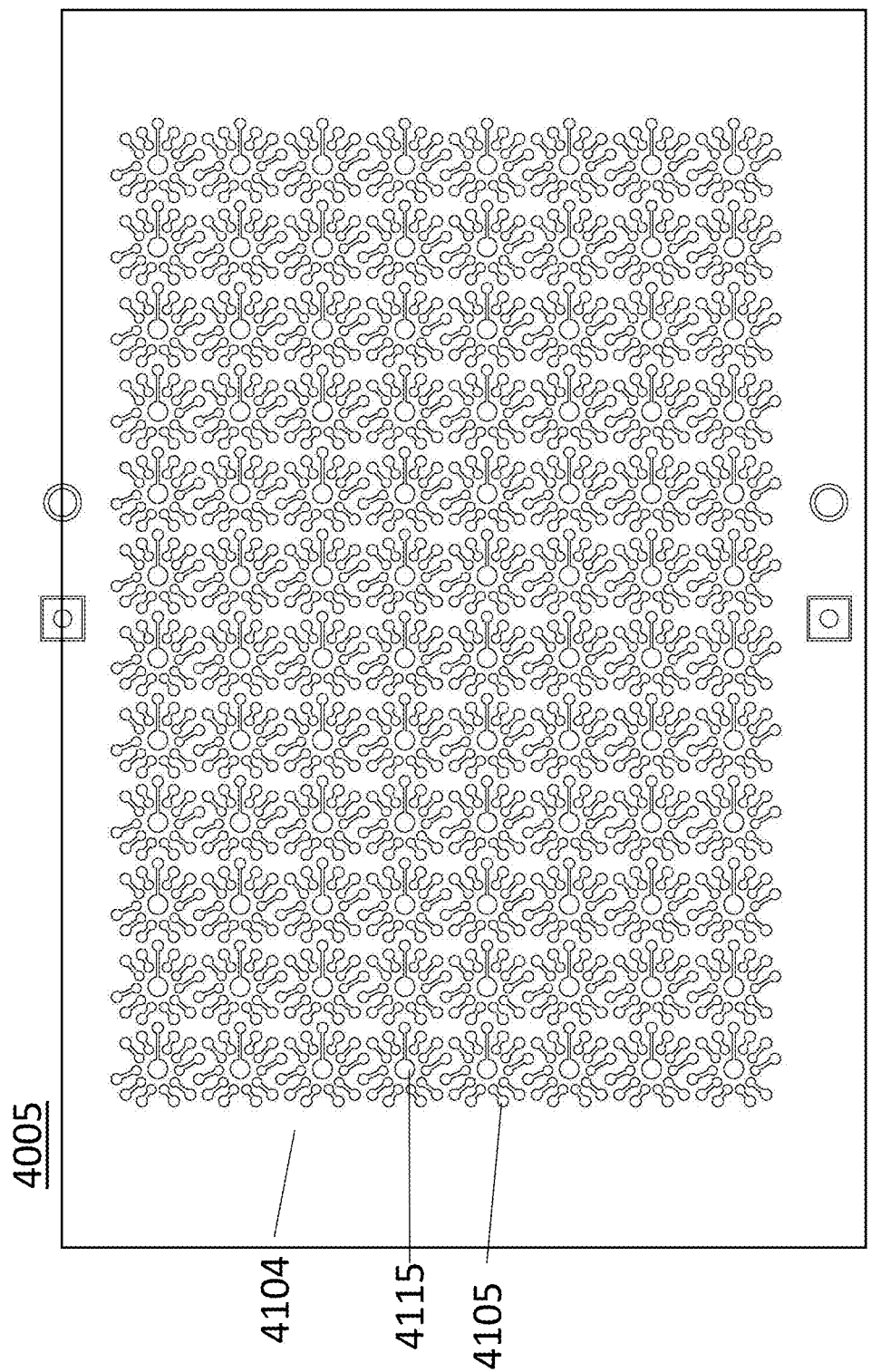
Figure 40F:
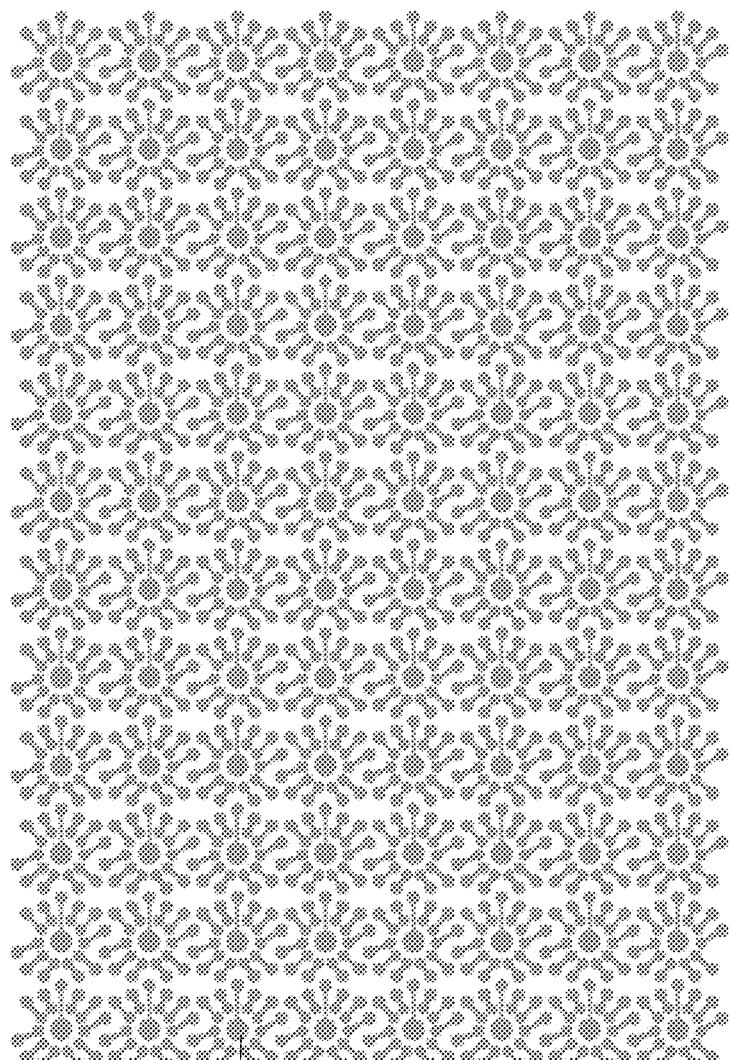
Figure 40G:
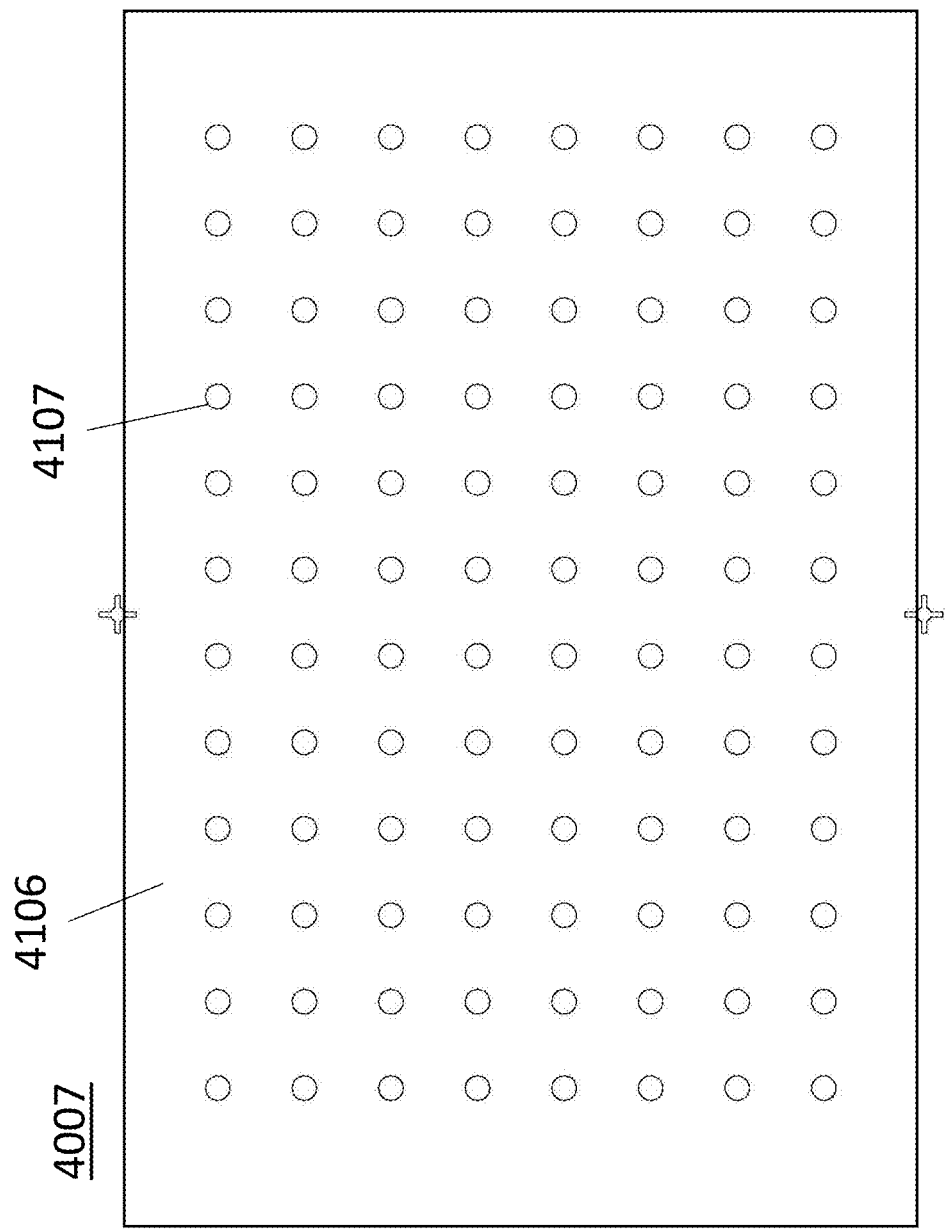
Figure 40H:
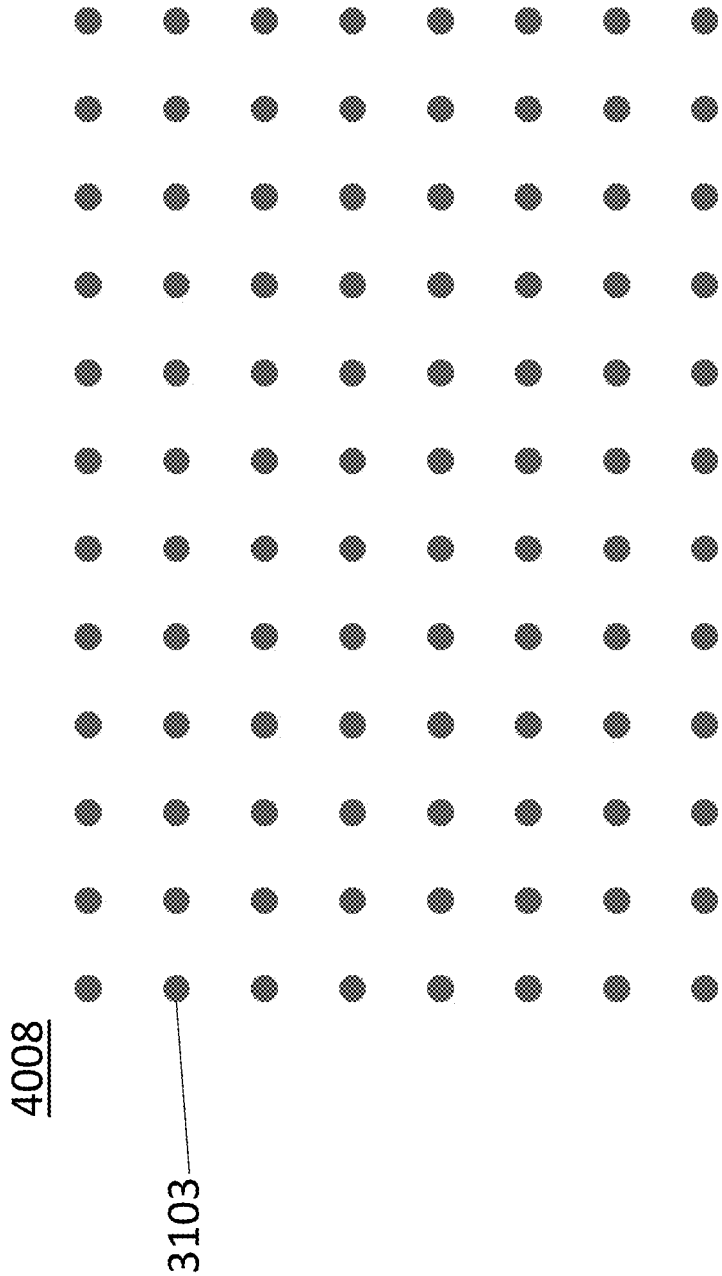
Figure 40I:
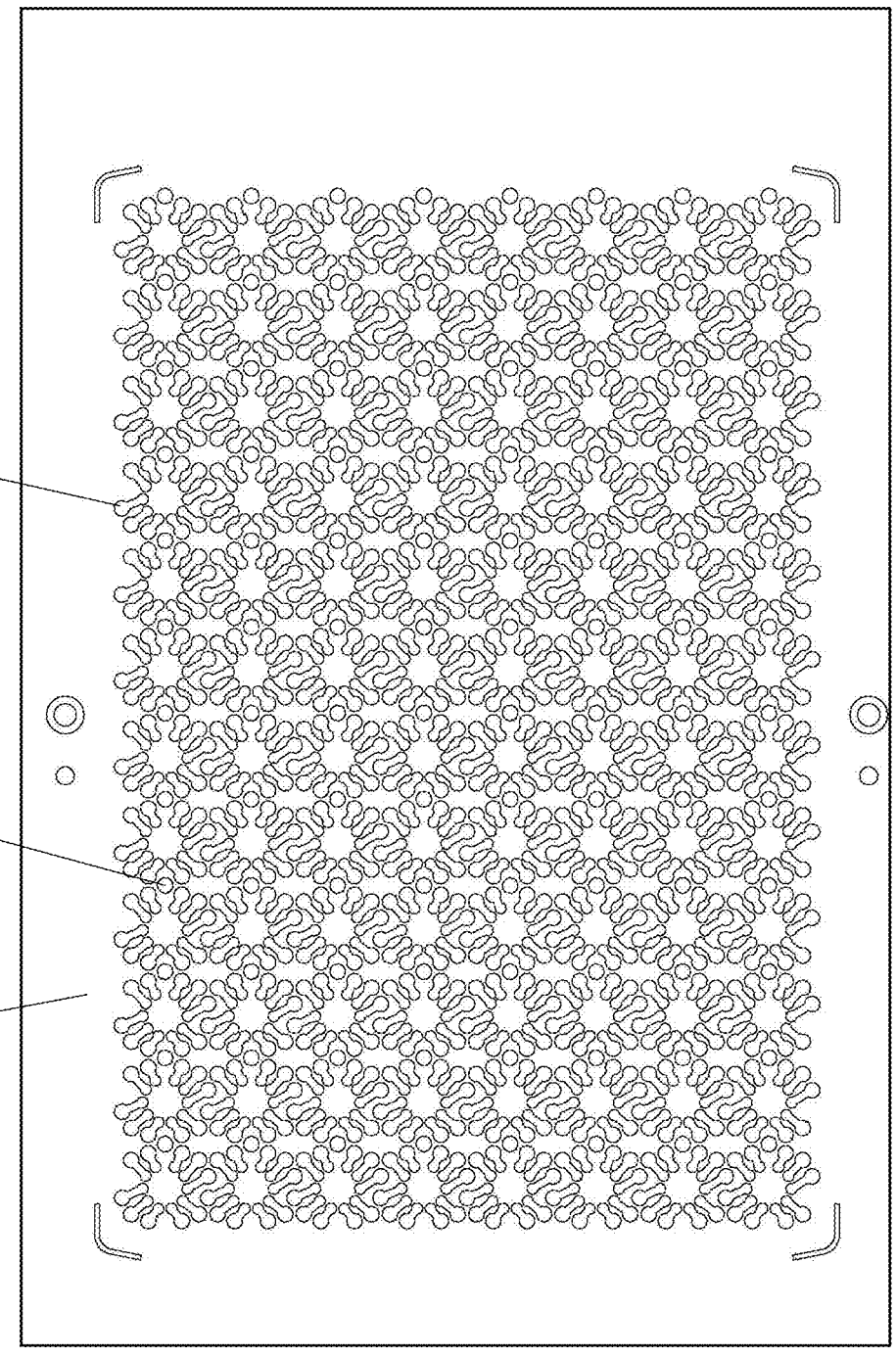
Figure 40J:
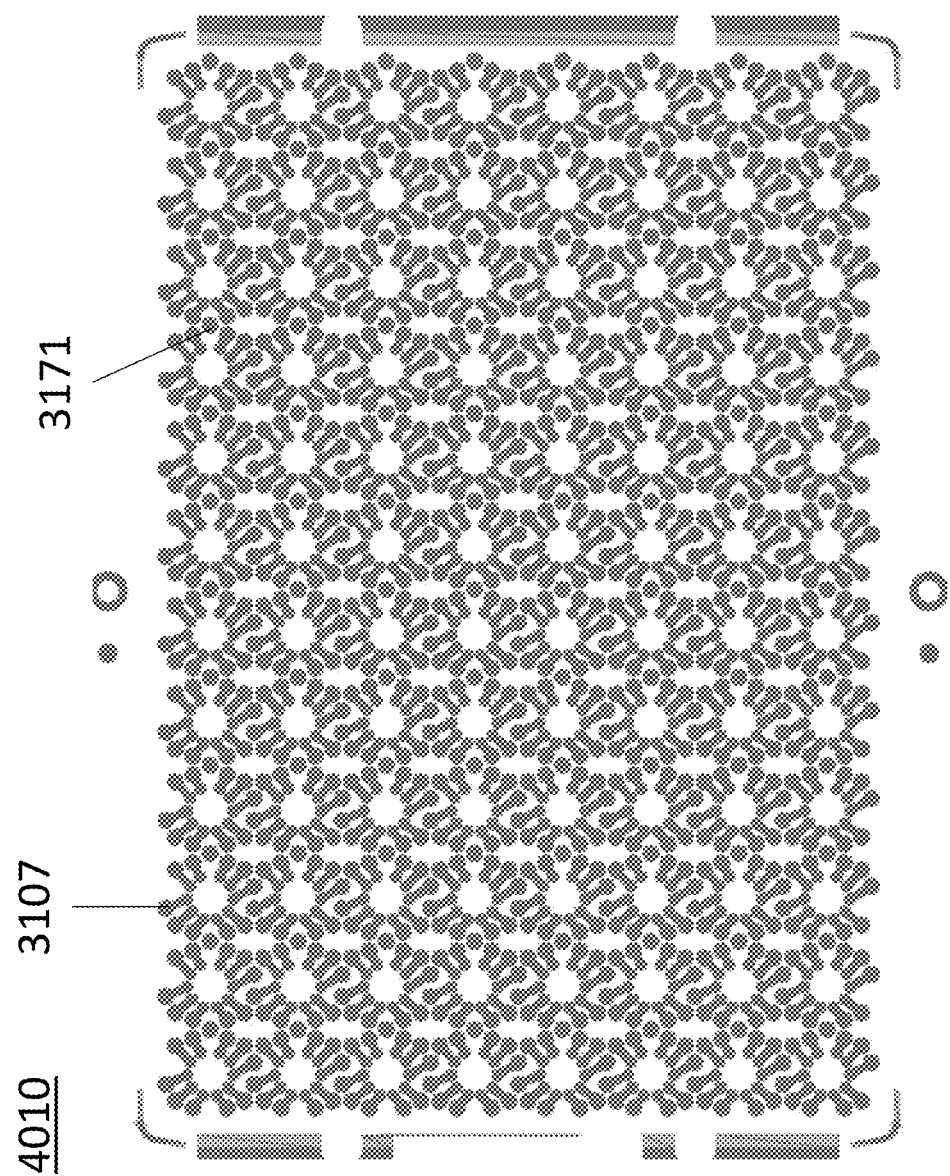
Figure 40K:
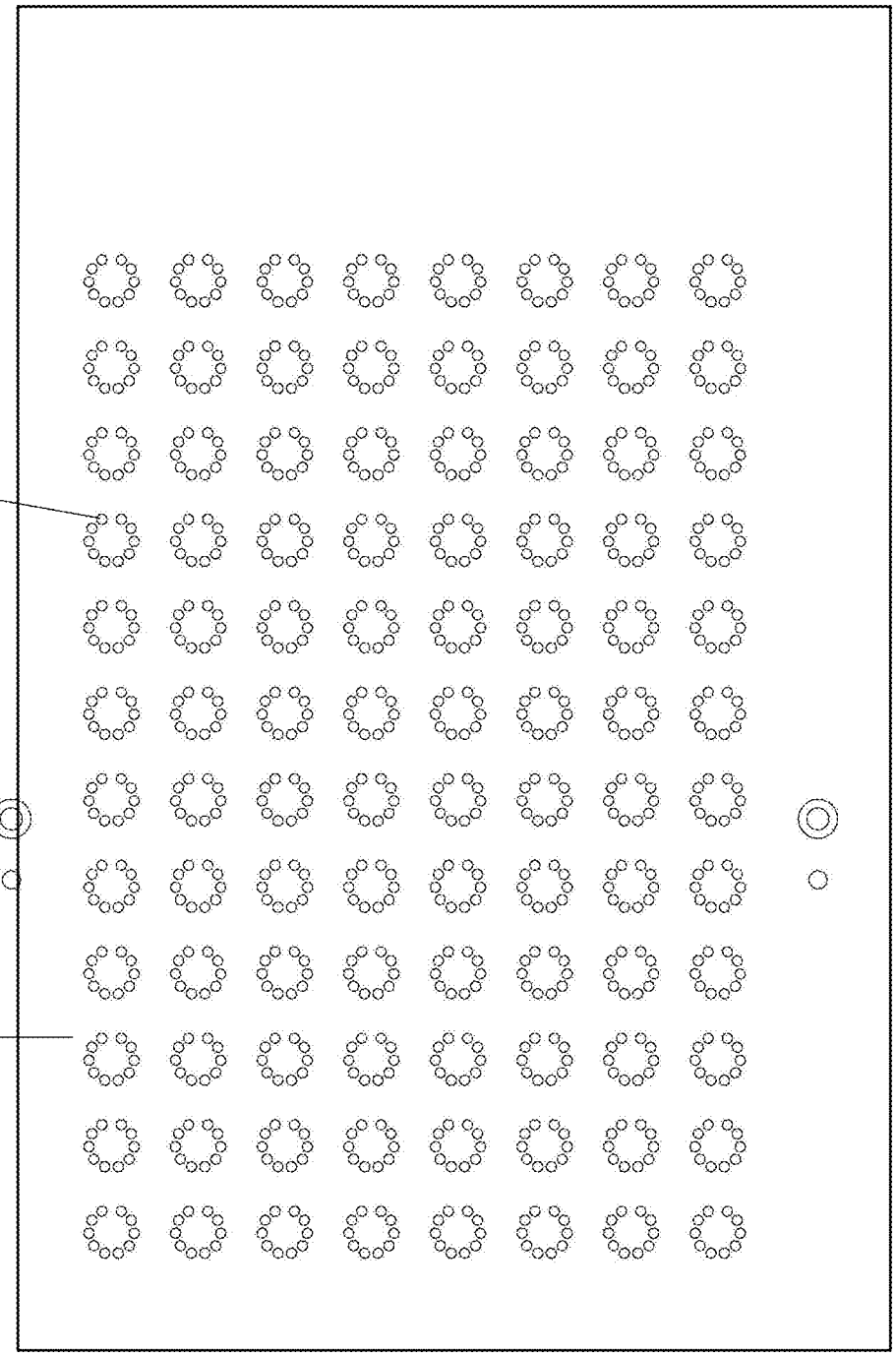
Figure 40L:
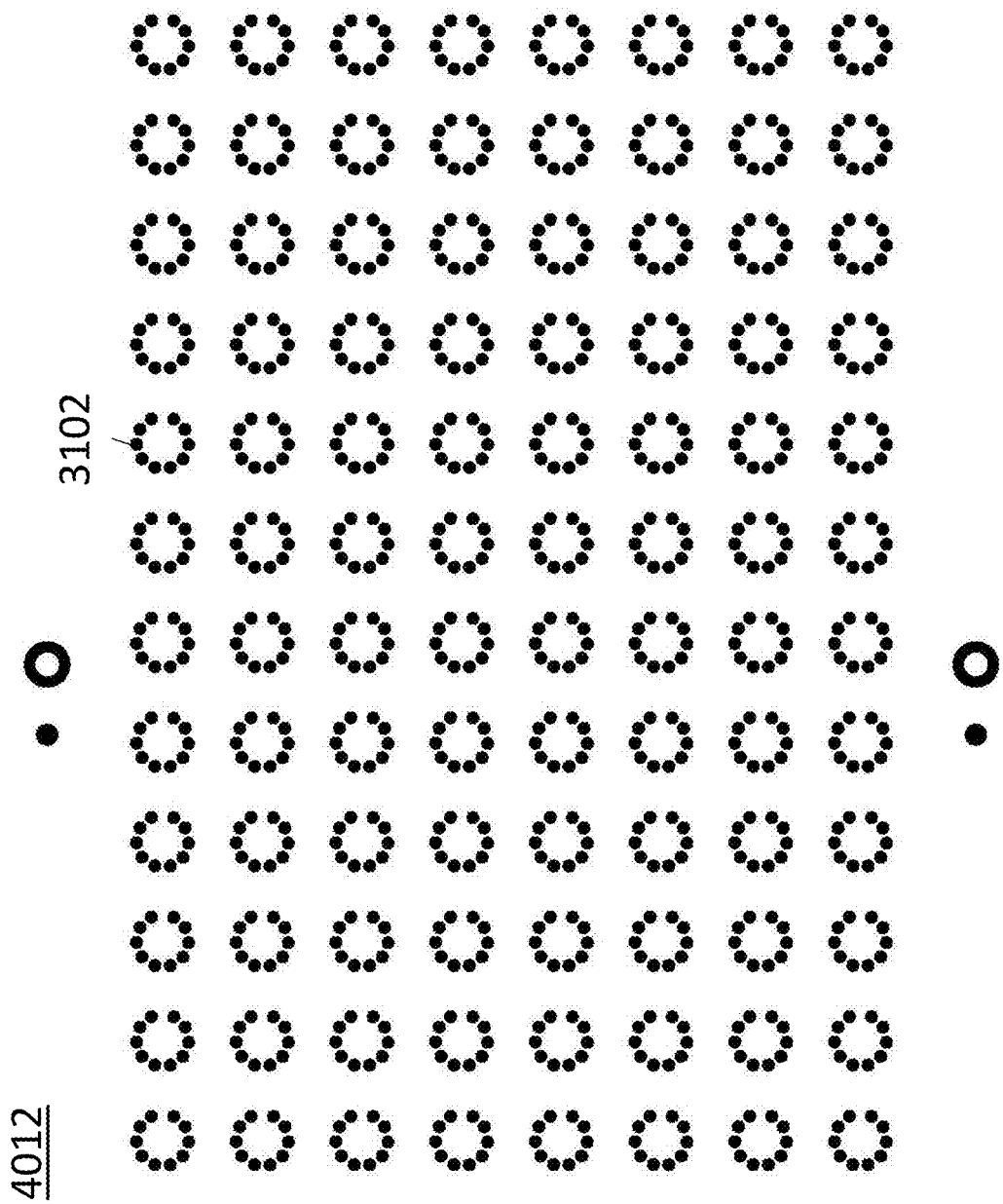
Figure 40M:
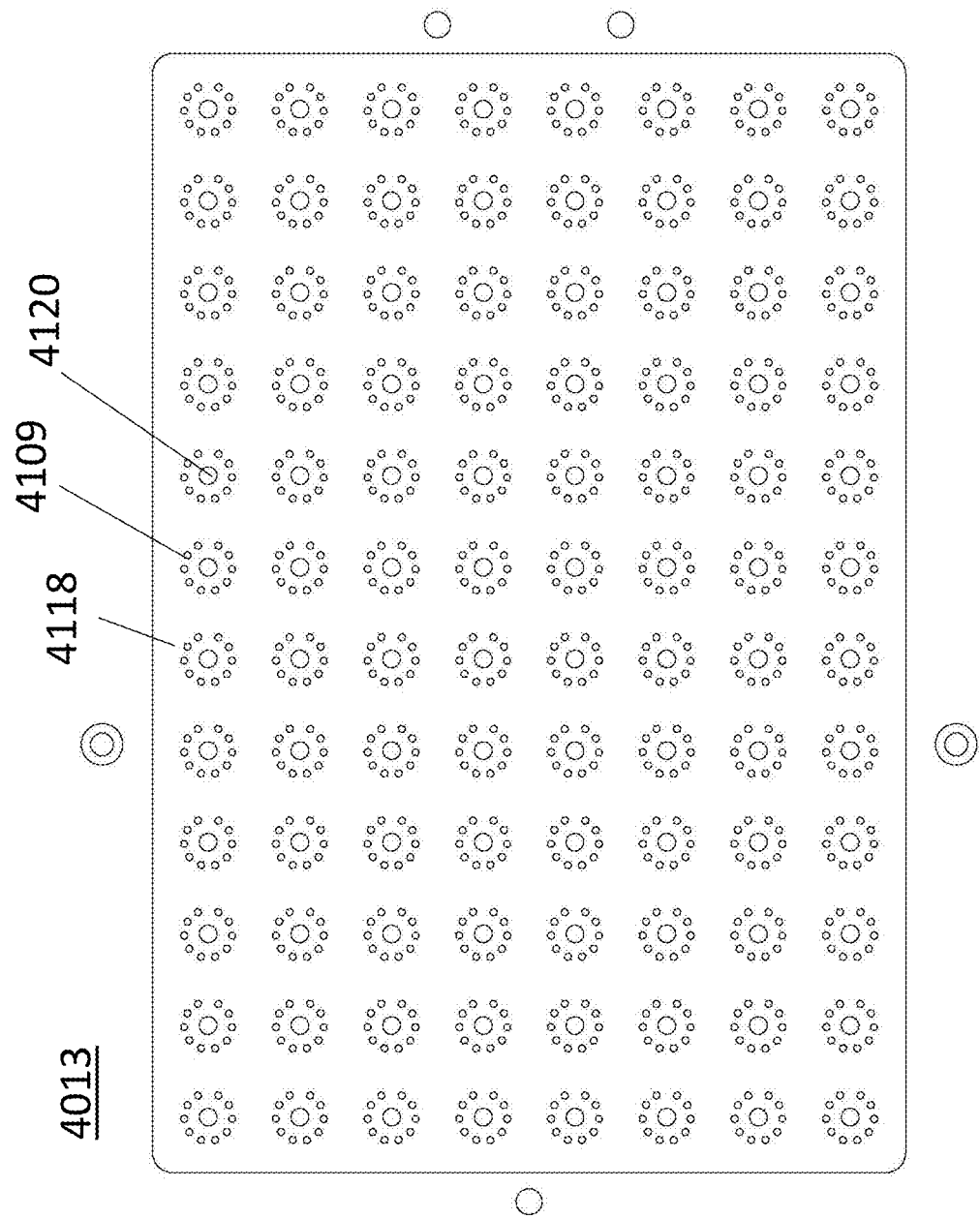
Figure 40N:
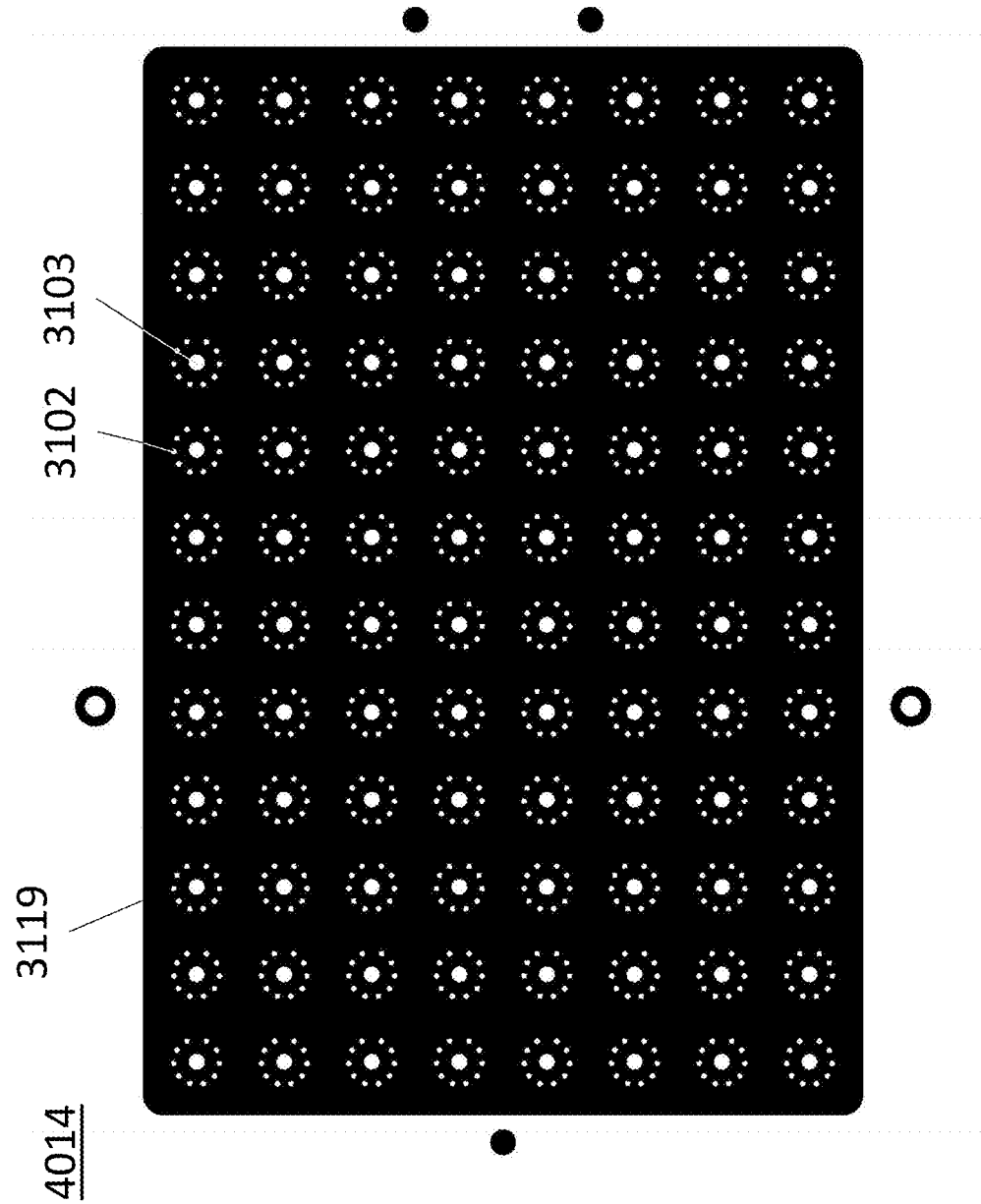

FIGS. 40A-40N illustrate aspects of the construction of a substrate including multiple working electrode structures (forming multiple individually addressable electrode electrochemical cells) according to embodiments disclosed herein. FIGS. 40A-40N illustrate various patterns (e.g., formed by screens) that may be employed in one or more processes to form these structures (e.g., a screen printing process to print the various layers required of a working electrode structure and the printed pattern resulting from use of the respective screens).

FIGS. 40A and 40B, respectively, illustrate a first screen (via spot screen) 4001 and a first printed pattern (via spot pattern) 4002 resulting from use of the first screen 4001 in printing a first conductive layer on a bottom surface of a substrate. The patterns of FIG. 40B correspond to the features illustrated in FIG. 39D. FIG. 40A illustrates a via spot screen pattern 4101 including a plurality of via spot holes 4207. The via spot screen pattern 4101 is patterned onto the via spot screen 4001, which may be manufactured of, e.g., stainless steel, polyester, etc. The via spot screen 4001 is configured to mask a substrate and permit a screen printed ink to pass through the via spot holes 4207 to create the plurality of via spots 3207, as shown in FIG. 40B. Further details of the via spot pattern 4002 created through use of the via spot screen 4001 are provided above with respect to FIG. 39D. As illustrated in FIG. 40A, the via spot screen pattern 4101 may be configured for the printing of via spots 3207 corresponding to 96 wells of a 12 well by 8 well plate. Further embodiments may include screens configured to print the via spot screen pattern 4101 across smaller plates (e.g., 48 well plates, etc.) and/or across multiple plates (e.g., 2, 3, 4, or more 96 well plates).

FIGS. 40C and 40D, respectively, illustrate a second screen (electrode contact screen) 4003 and a second printed pattern (electrode contact pattern) 4004 resulting from use of the second screen 4003 in printing a second conductive layer on a bottom surface of a substrate. The patterns of FIG. 40D correspond to the features illustrated in FIG. 39E. FIG. 40C illustrates an electrode contact screen pattern 4103 including a plurality of electrode contact holes 4203. The electrode contact screen pattern 4103 is patterned onto the electrode contact screen 4003, which may be manufactured of, e.g., stainless steel, polyester, etc. The electrode contact screen 4003 is configured to mask a substrate and permit a screen printed ink to pass through the electrode contact holes 4203 to create the plurality of working electrode contacts 3202 and auxiliary electrode contacts 3203, as shown in FIG. 40D. Further details of the electrode contact pattern 4004 created through use of the electrode contact screen 4003 are provided above with respect to FIG. 39E. As illustrated in FIG. 40C, the electrode contact screen pattern 4103 may be configured for the printing of working electrode contacts 3202 and auxiliary electrode contacts 3203 corresponding to 96 wells of a 12 well by 8 well plate. Further embodiments may include screens configured to print the electrode contact pattern 4004 across smaller plates (e.g., 48 well plates, etc.) and/or across multiple plates (e.g., 2, 3, 4, or more 96 well plates).

FIGS. 40E and 40F, respectively, illustrate a third screen (electrode trace base screen) 4005 and a third printed pattern (electrode trace base pattern) 4006 resulting from use of the third screen in printing a first conductive layer on a top surface of a substrate. The patterns of FIG. 40F correspond to the features illustrated in FIG. 39F. FIG. 40E illustrates an electrode trace base screen pattern 4104 including a plurality of electrode trace holes 4105 and a plurality of auxiliary electrode trace holes 4115. The electrode trace base screen pattern 4104 is patterned onto the electrode trace base screen 4005, which may be manufactured of, e.g., stainless steel, polyester, etc. The electrode trace base screen 4005 is configured to mask a substrate and permit a screen printed ink to pass through the electrode trace holes 4105 and the auxiliary electrode trace holes 4115 to create the plurality of electrode traces 3107 and auxiliary electrode traces 3112, as shown in FIG. 40F. Further details of the electrode trace base pattern 4006 created through use of the electrode trace base screen 4005 are provided above with respect to FIG. 39F. As illustrated in FIG. 40E, the electrode contact base screen pattern 4104 may be configured for the printing of the plurality of electrode traces 3107 and auxiliary electrode traces 3112 corresponding to 96 wells of a 12 well by 8 well plate. Further embodiments may include screens configured to print the electrode trace pattern 4006 across smaller plates (e.g., 48 well plates, etc.) and/or across multiple plates (e.g., 2, 3, 4, or more 96 well plates).

FIGS. 40G and 40H, respectively, illustrate a fourth screen (auxiliary electrode screen) 4007 and a fourth printed pattern (auxiliary electrode pattern) 4008 resulting from use of the fourth screen 4007 in printing a second conductive layer on a top surface of a substrate. The patterns of FIG. 40H correspond to the features illustrated in FIG. 39G. FIG. 40G illustrates an auxiliary electrode screen pattern 4106 including a plurality of auxiliary electrode holes 4107. The auxiliary electrode screen pattern 4106 is patterned onto the auxiliary electrode screen 4007, which may be manufactured of, e.g., stainless steel, polyester, etc. The auxiliary electrode screen 4007 is configured to mask a substrate and permit a screen printed ink to pass through the auxiliary electrode holes 4107 to create the plurality of auxiliary electrodes 3103, as shown in FIG. 40H. Further details of the auxiliary electrode pattern 4008 created through use of the auxiliary electrode screen 4007 are provided above with respect to FIG. 39G. As illustrated in FIG. 40G, the auxiliary electrode screen pattern 4106 may be configured for the printing of the plurality of auxiliary electrodes 3103 corresponding to 96 wells of a 12 well by 8 well plate. Further embodiments may include screens configured to print the auxiliary electrode pattern 4008 across smaller plates (e.g., 48 well plates, etc.) and/or across multiple plates (e.g., 2, 3, 4, or more 96 well plates).

FIGS. 40I and 40J, respectively, illustrate a fifth screen (electrode trace top screen) 4009 and a fifth printed pattern (electrode trace top pattern) 4010 resulting from use of the fifth screen in printing a third conductive layer on a top surface of a substrate. The patterns of FIG. 40J correspond to the features illustrated in FIG. 39H. FIG. 40J illustrates an electrode trace top screen pattern 4108 including a plurality of electrode trace holes 4109 and a plurality of auxiliary electrode spot holes 4119. The electrode trace top screen pattern 4108 is patterned onto the electrode trace top screen 4009, which may be manufactured of, e.g., stainless steel, polyester, etc. The electrode trace top screen 4009 is configured to mask a substrate and permit a screen printed ink to pass through the electrode trace holes 4109 and the auxiliary electrode spot holes 4119 to form the second layer of the plurality of electrode traces 3107 and the via contact spot 3171 of the auxiliary electrode traces 3112, as shown in FIG. 40J. Further details of the electrode trace top pattern 4010 created through use of the electrode trace top screen 4009 are provided above with respect to FIG. 39H. As illustrated in FIG. 40J, the electrode trace top screen pattern 4010 may be configured for the printing of the second layer of the plurality of electrode traces 3107 and the via contact spots 3171 corresponding to 96 wells of a 12 well by 8 well plate. Further embodiments may include screens configured to print the electrode trace top pattern 4010 across smaller plates (e.g., 48 well plates, etc.) and/or across multiple plates (e.g., 2, 3, 4, or more 96 well plates).

FIGS. 40K and 40L, respectively, illustrate a sixth screen (working electrode screen) 4011 and a sixth printed pattern (working electrode pattern) 4012 resulting from use of the sixth screen in printing a fourth conductive layer on a top surface of a substrate. The patterns of FIG. 40L correspond to the features illustrated in FIG. 39I. FIG. 40E illustrates a working electrode screen pattern 4106 including a plurality of working electrode holes 4107. The working electrode screen pattern 4106 is patterned onto the working electrode screen 4011, which may be manufactured of, e.g., stainless steel, polyester, etc. The working electrode screen 4011 is configured to mask a substrate and permit a screen printed ink to pass through the working electrode holes 4107 to create the plurality of working electrodes 3102, as shown in FIG. 40L. Further details of the working electrode pattern 4012 created through use of the working electrode screen 4011 are provided above with respect to FIG. 39I. As illustrated in FIG. 40K, the working electrode screen pattern 4106 may be configured for the printing of the plurality working electrode 3102 corresponding to 96 wells of a 12 well by 8 well plate. Further embodiments may include screens configured to print the working electrode pattern 4012 across smaller plates (e.g., 48 well plates, etc.) and/or across multiple plates (e.g., 2, 3, 4, or more 96 well plates).

FIGS. 40M and 40N, respectively, illustrate a seventh screen (insulation screen) 4013 and a seventh printed pattern (insulation pattern) 4014 resulting from use of the seventh screen in printing a fifth layer on a top surface of a substrate. The patterns of FIG. 40N correspond to the features illustrated in FIG. 39J. FIG. 40M illustrates an insulation screen pattern 4118 including a working electrode insulation holes 4109 and a plurality of auxiliary electrode insulation holes 4120. The insulation screen pattern 4118 is patterned on the insulation screen 4013, which may be manufactured of, e.g., stainless steel, polyester, etc. The insulation screen 4013 is configured to mask a substrate and permit the non-conductive layer 3119 to be applied to the substrate at all locations except for those of the working electrodes 3102 and the auxiliary electrodes 3103. Further details of the insulation pattern 4014 created through use of the insulation screen 4013 are provided above with respect to FIG. 39J. The insulation screen 4013 is dimensioned according to the dimensional requirements of the insulation pattern 4014 discussed above with respect to FIG. 39J. As illustrated in FIG. 40M, the insulation screen pattern 4118 may be configured for masking the substrate to permit the application of the non-conductive layer 3119 corresponding to 96 wells of a 12 well by 8 well plate. Further embodiments may include screens configured for smaller plates (e.g., 48 well plates, etc.) and/or for multiple plates (e.g., 2, 3, 4, or more 96 well plates).

FIGS. 41A-M illustrate different views of a substrate including multiple working electrode structures (forming individually addressable electrode electrochemical cells) according to embodiments disclosed herein.

Figure 41B:
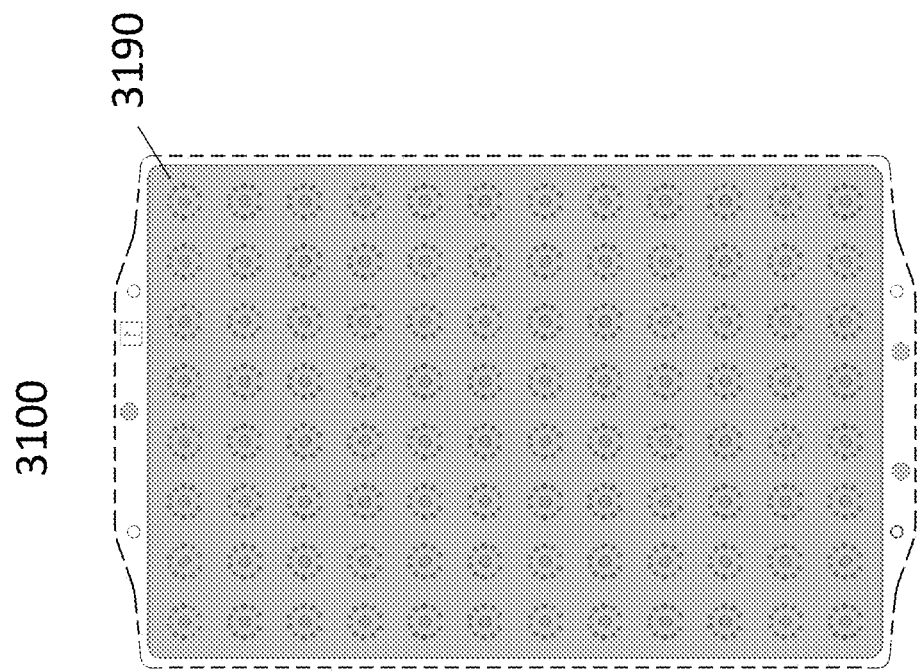
FIGS. 41A-41M illustrate different views of a substrate including multiple individually addressable electrode electrochemical cell according to embodiments disclosed herein.
Figure 41A:
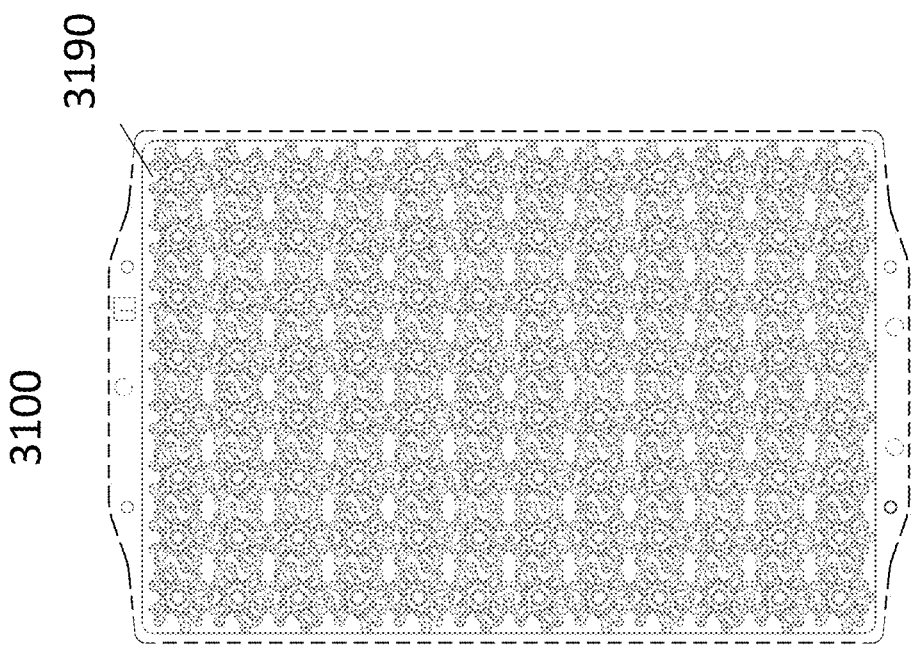
Figure 41D:
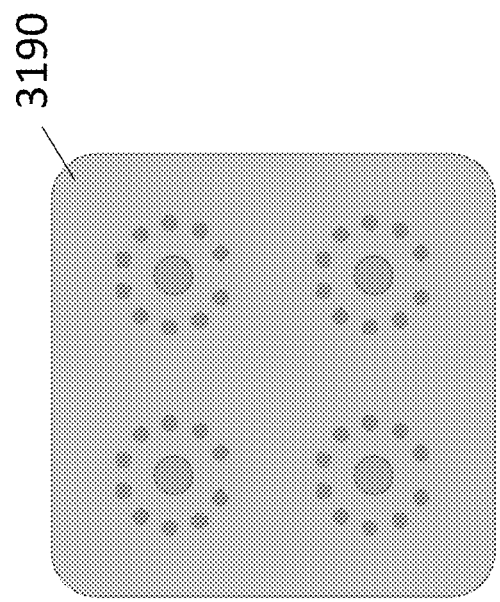
Figure 41C:
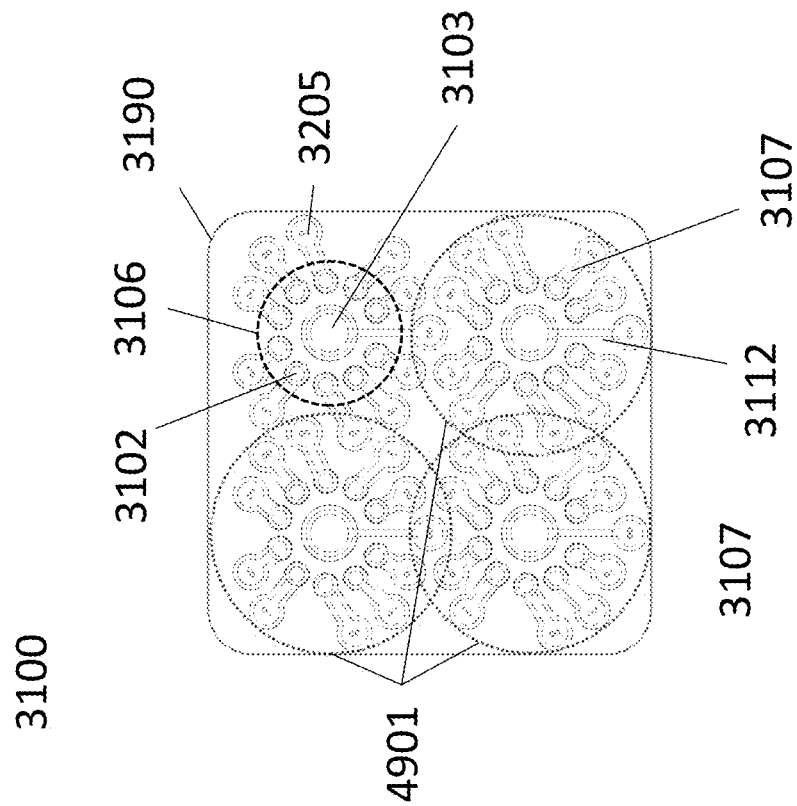

FIG. 41A illustrates the top surface 3190 of the substrate 3100, showing all conductive layers. FIG. 41B illustrates the top surface 3190 of the substrate 3100, showing only the visible layers with all other layers covered by the dielectric layer. FIGS. 41C and 41D are close up views of portions of FIG. 41A and FIG. 41B respectively, showing the top surface 3190 of the substrate 3100 showing all conductive layers and only visible layers, respectively.

As can be seen in FIG. 41A and in more detail in FIG. 41C, fitting all of the required features for isolated working electrodes 3102 and auxiliary electrodes 3103 on the substrate 3100 requires careful consideration of geometry and dimensioning. The feature dimensions and locations discussed with respect to FIGS. 39A-L are selected to maintain appropriate distances between electrically conductive features so as to prevent short circuiting or other interference (electrical or otherwise) within the limits provided by manufacturing precision. The sizing and dimensionality of certain features may be constrained, for example, the overall substrate size and well size is standardized in the industry. The sizing and dimensionality of certain features may be selected to maximize, increase, optimize, or otherwise improve the electrochemical functionality of the multi-well plates. For example, as discussed above, it may be desirous to maintain a specific ratio between the surface areas of the auxiliary electrodes 3103 and the working electrodes 3102. This requires specific sizing of these electrodes. The sizing and dimensionality of additional features may be designed or selected to accommodate the constraints and functional requirements.

For example, it is advantageous to position the vias 3205 far enough away from the working electrodes 3102 to provide tolerance when positioning the top plate 3001 to attach to the substrate 3100. As discussed above, the top plate 3001 is attached to the substrate 3100 via an adhesive layer 3121. If the vias 3205 are located beneath the adhesive layer 3121, away from the well area 3106, misregistration of the top plate 3001 to the substrate 3100 is less likely to result in a situation where area of the top plate openings 3002 include the vias 3205, potentially causing fluid leakage or electrical shorting or interference. Increasing the distance between the vias 3205 and the well areas 306, however, must be balanced with ensuring that the vias 3205 of one well electrode structure 3101 do not interfere with the vias 3205 of a second well electrode structure 3101.

In embodiments, to meet these challenges, the circular footprints 4901 of the well electrode structures 3101 are configured to overlap. As used herein, the circular footprint 4901 of the well electrode structures 3101 refers to the smallest diameter circle that provides an area encompassing all of the features of a single well electrode structure 3101. To accommodate the above-described positioning of the vias 3205 (as well as the via contact spots 3110 associated therewith), e.g., increasing the distance between the vias 3205 and their corresponding well areas 3106 while reducing potential interference between the vias 3205 of respective well electrode structures 3101, the circular footprints 4901 are configured to overlap. One or more vias 3205 (and/or at least a portion of one or more via contact spots 3110 associated therewith) from one well electrode structure 3101 are positioned within the circular footprint 4901 of a neighboring well electrode structure 301. In embodiments, this pattern may be repeated across the substrate 3100, such that each well electrode structure 3101 has a circular footprint 4901 overlapping with that of one or more neighboring well electrode structures 3101. In embodiments, each well electrode structure 3101 may have a circular footprint 4901 overlapping with each of its neighboring well electrode structures 3101.

Figure 41F:
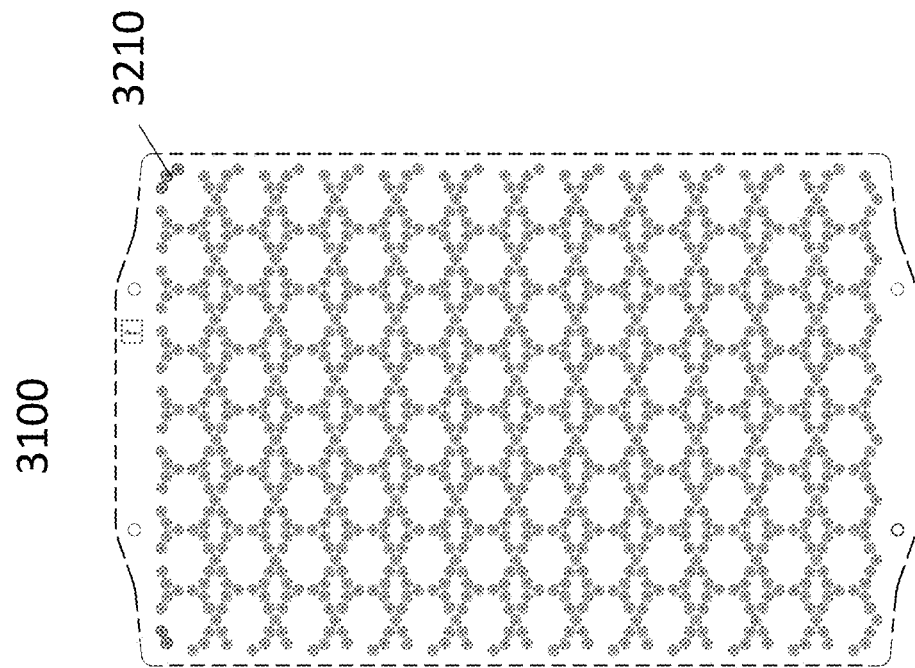
Figure 41E:
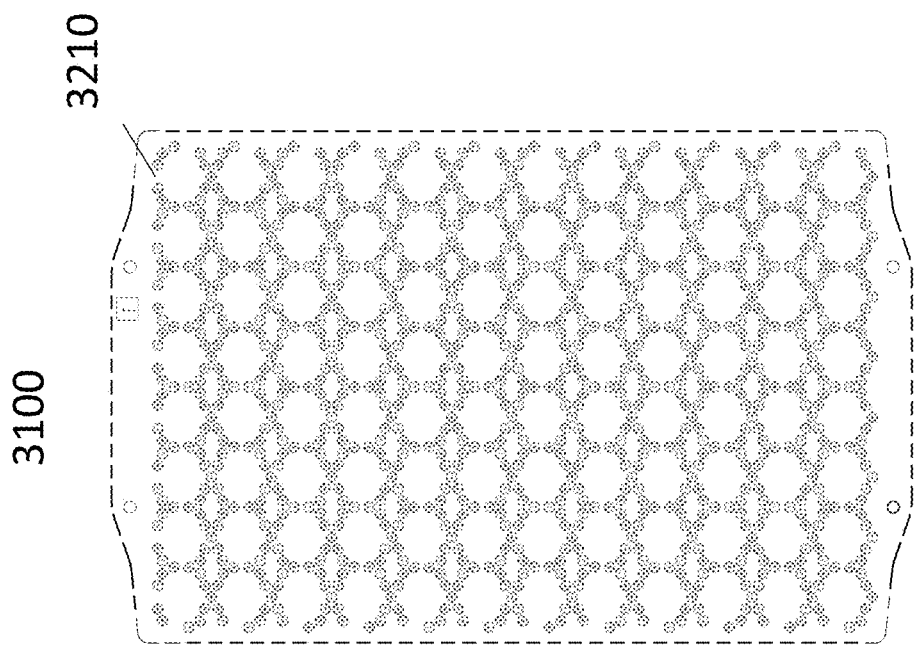
Figure 41H:
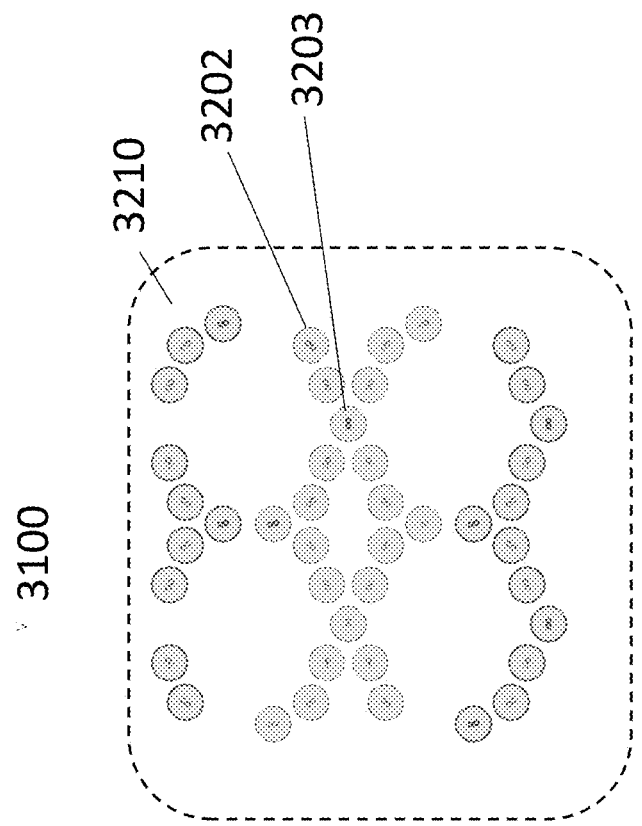
Figure 41G:
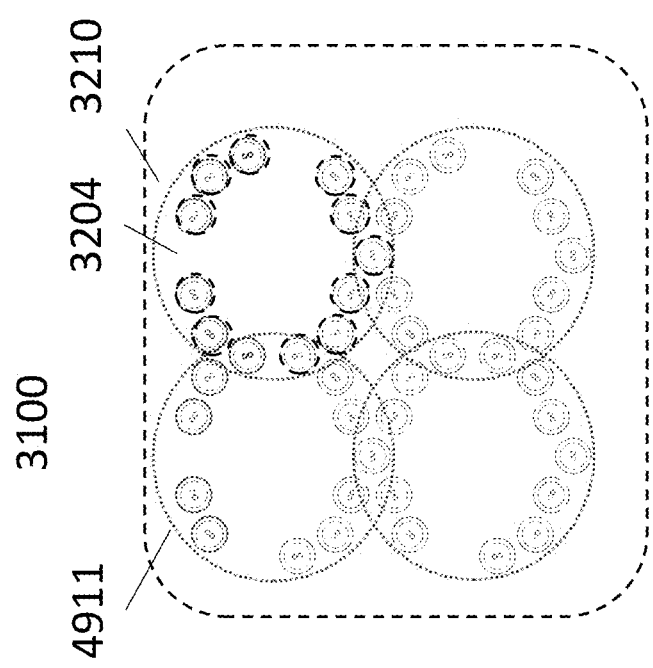

FIG. 41E illustrates the bottom surface 3210 of the substrate 3100, showing all conductive layers. FIG. 41F illustrates the bottom surface 3210 of the substrate 3100, showing only the visible layers with all other layers covered by the final layer. FIGS. 41G and 41H are close up views of portions of FIG. 41E and FIG. 41F respectively, showing the bottom surface 3210 of the substrate 3100 showing all conductive layers and only visible layers, respectively. As illustrated in FIGS. 41E-41H, the consequences of the via 3205 placement, as described above, carries through to the bottom surface 3210 of the substrate 3100. The placement, dimensioning, and sizing of each electrode contact grouping 3204 (including working electrode contacts 3202 and an auxiliary electrode contact 3203) is at least partially determined by the placement of the vias 3205. The size of the working electrode contacts 3202 and the auxiliary electrode contacts 3203 may further be determined according to the operation and structure of the plate electrical connector, as discussed below. In embodiments, the circular footprint 4911 of the electrode contact groupings 3204 may overlap with the circular footprints 4911 of one or more neighboring electrode contact groupings 3204. In embodiments, the circular footprint 4911 of each electrode contact grouping 3204 may overlap with the circular footprints 4911 of all neighboring electrode contact groupings 3204.

Figure 41I:
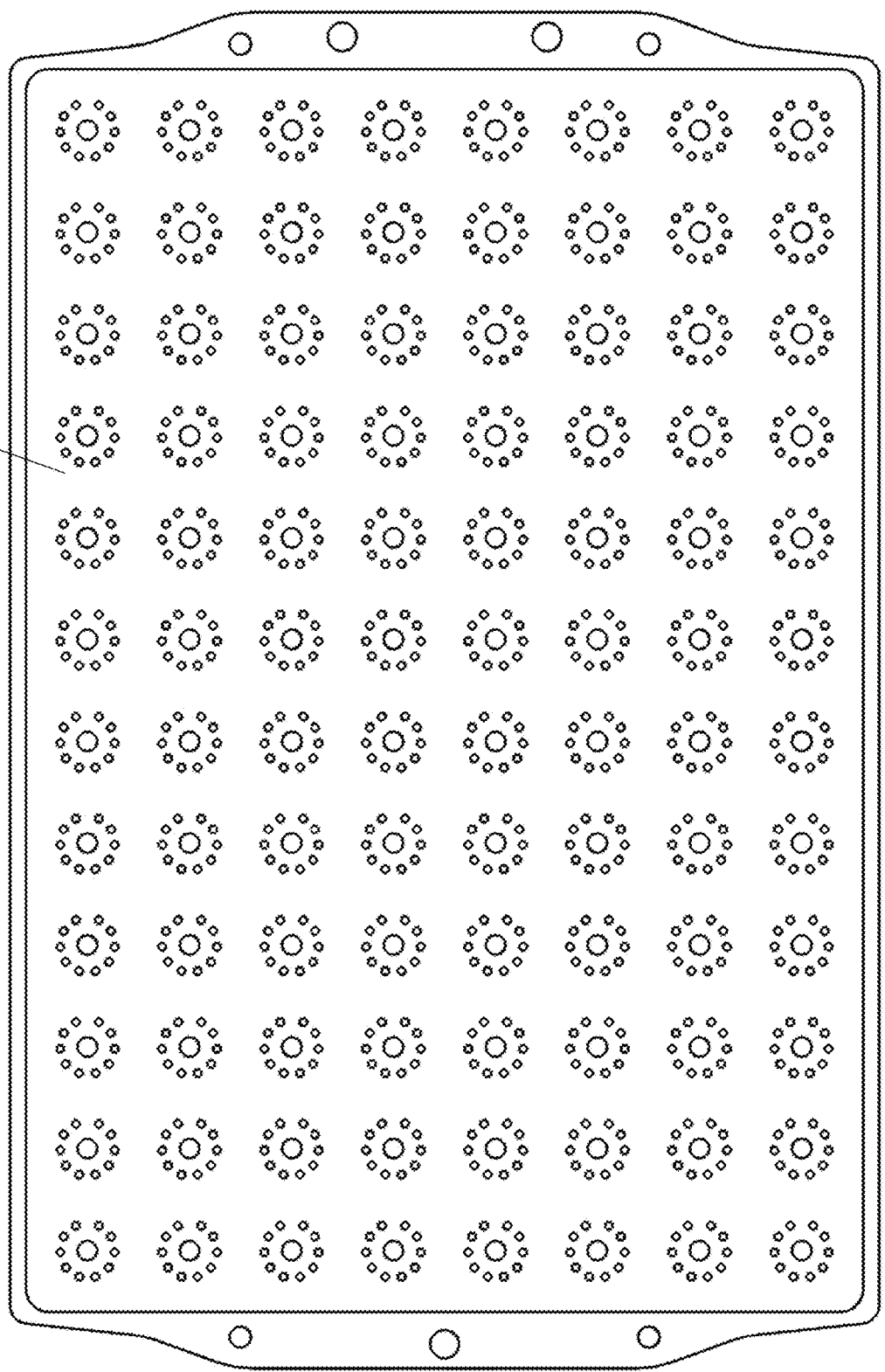
Figure 41J:
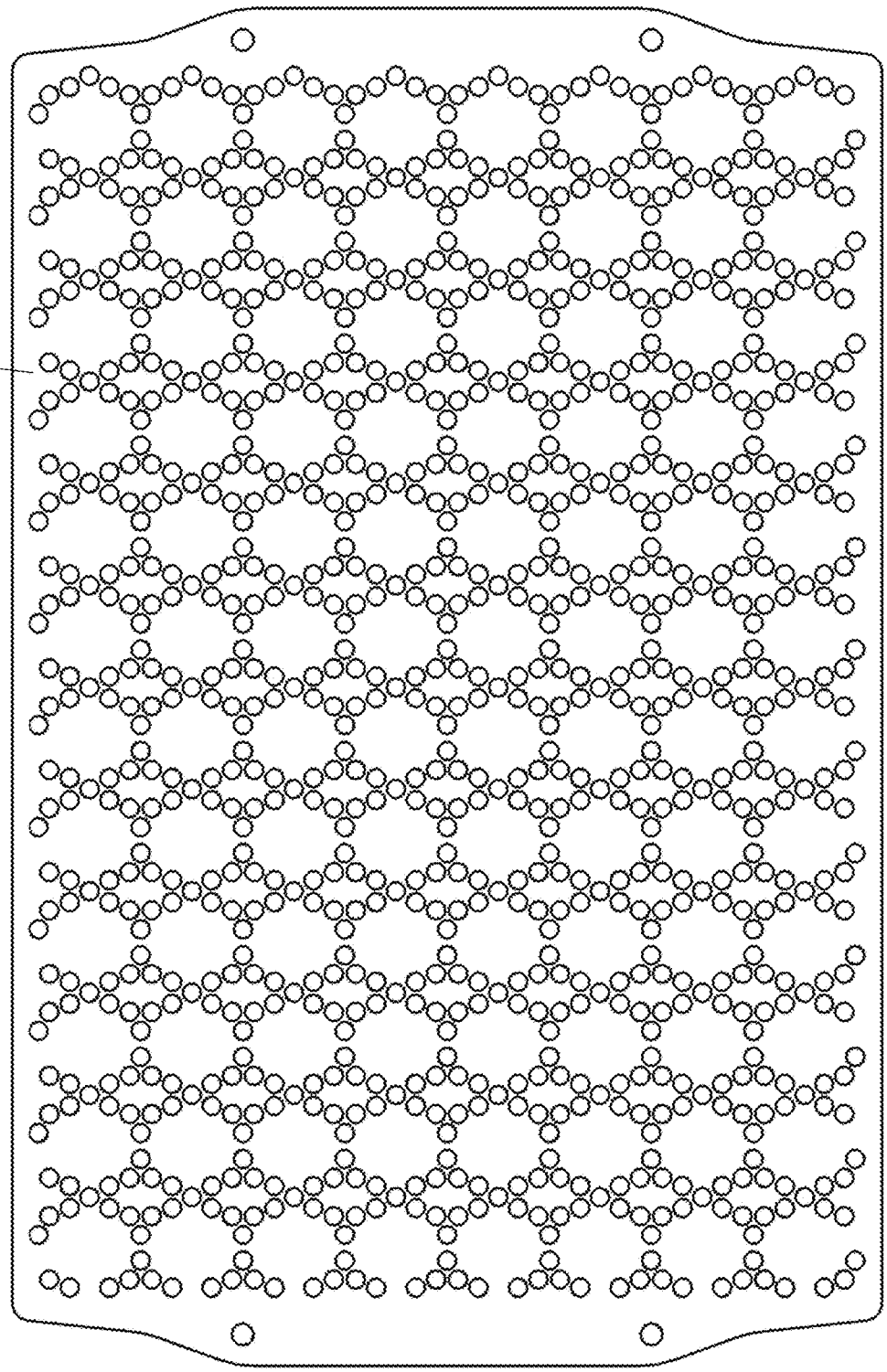
Figure 41K:
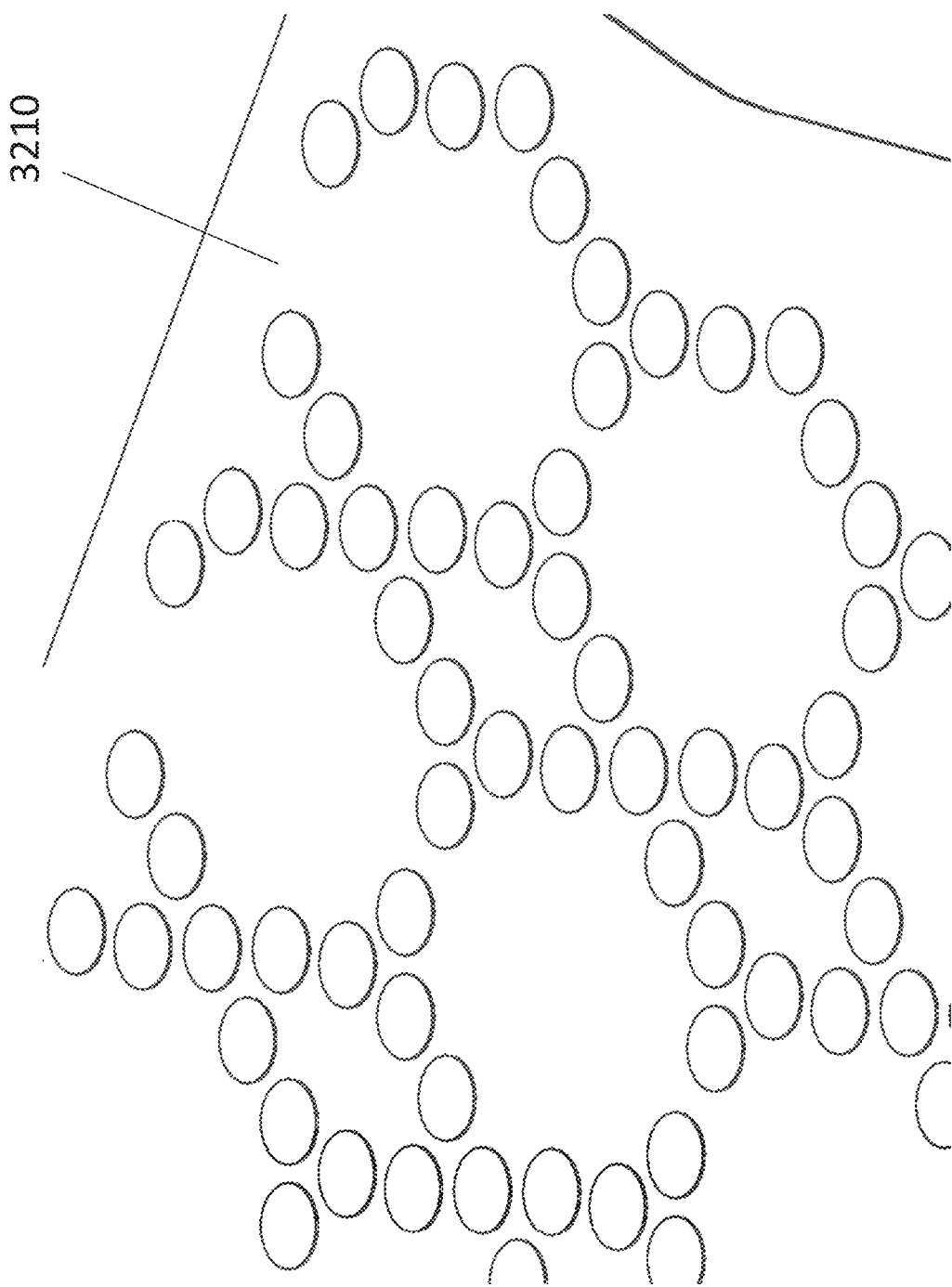
Figure 41L:
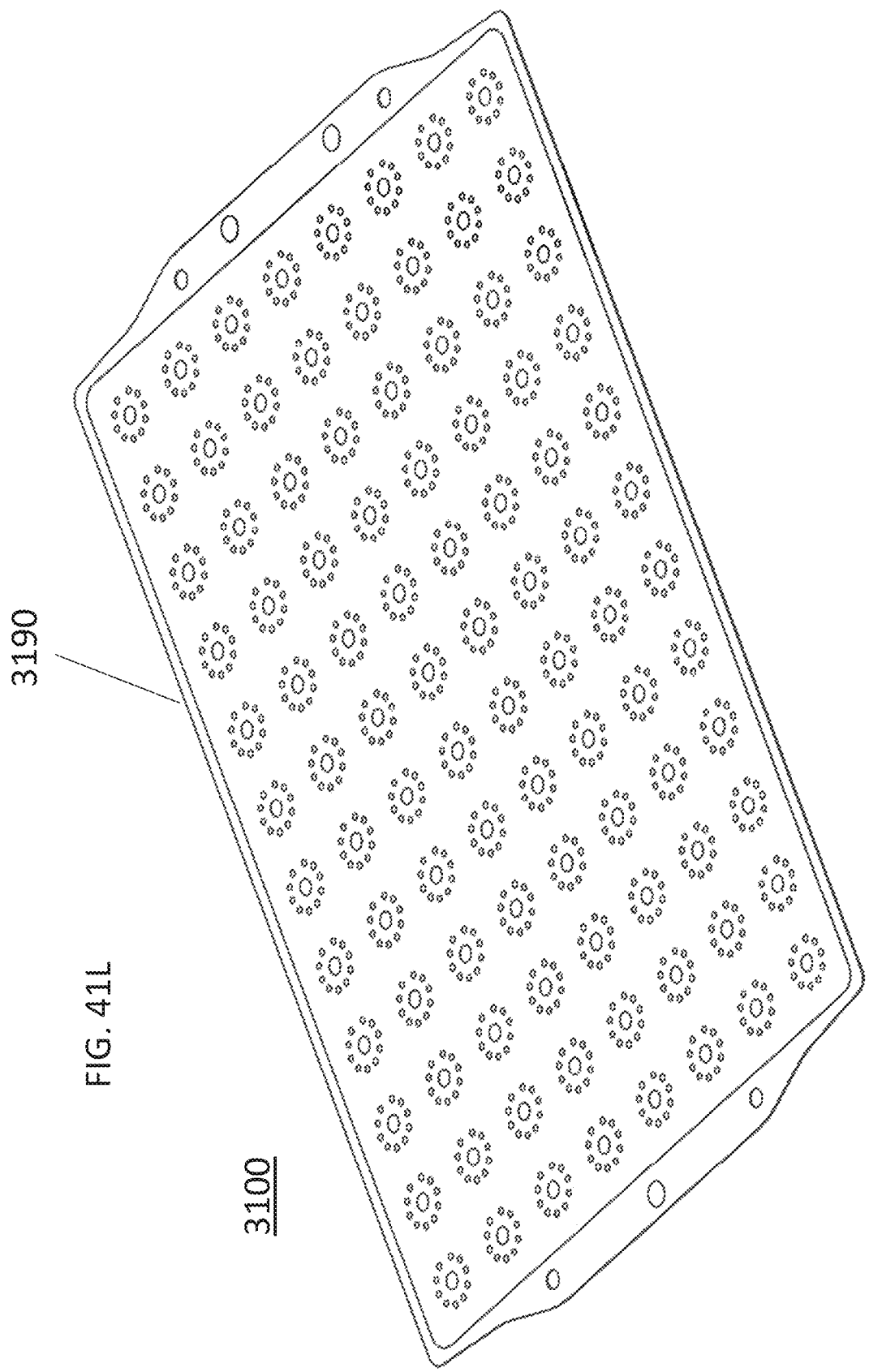
Figure 41M:
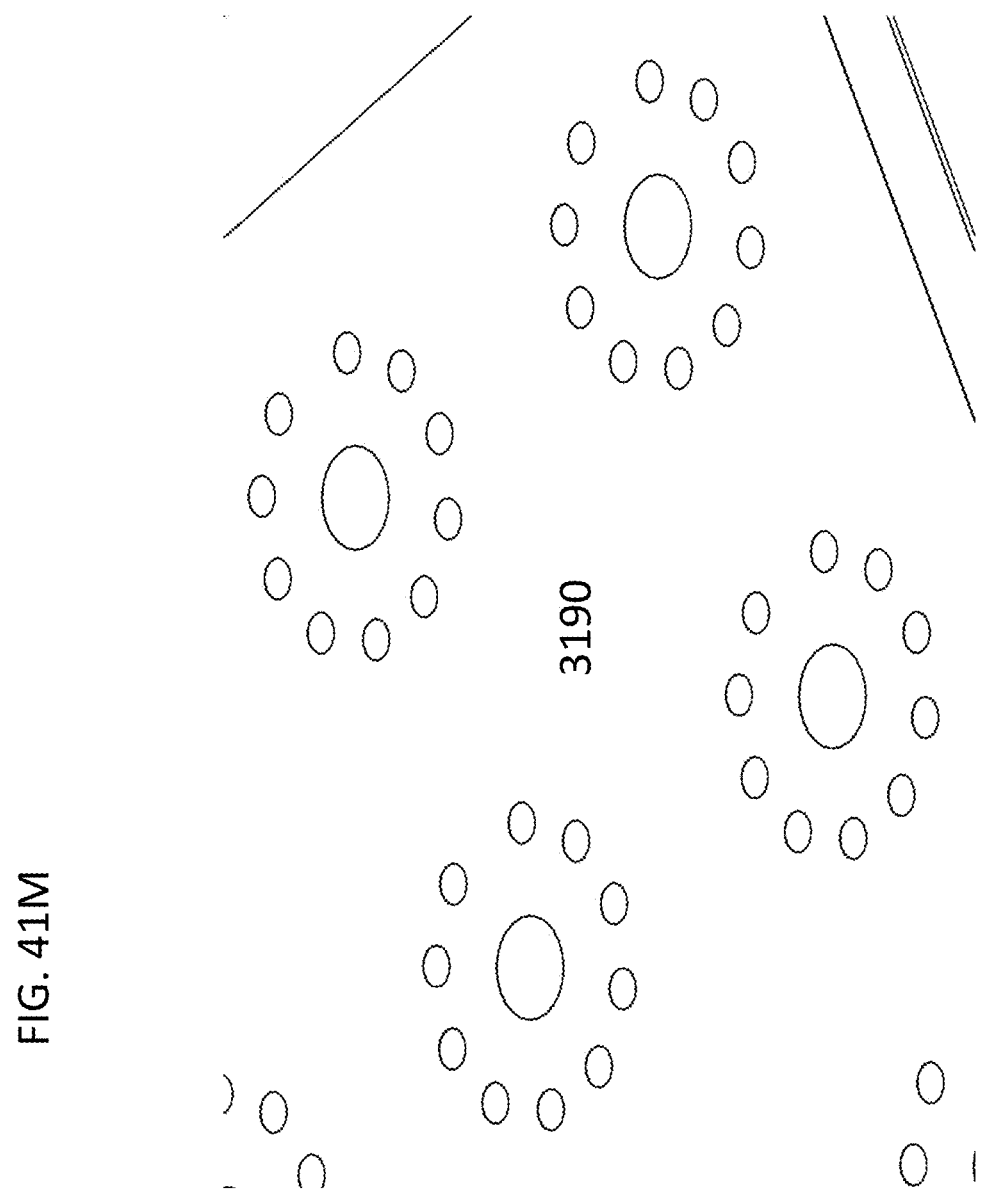

FIG. 41I is a plan view of a top surface 3190 of the substrate 3100, corresponding to the state of the substrate 3100 after the layering process described with respect to FIG. 39J. FIG. 41J is a plan view of a bottom surface 3210 of the substrate 3100, corresponding to the state of the substrate 3100 after the layering process described with respect to FIG. 39B. FIG. 41K is a close-up perspective view of a portion of the bottom surface 3210 of the substrate 3100, corresponding to a close-up perspective of FIG. 41J. FIG. 41L is a perspective view of the top surface 3190 of the substrate 3100, corresponding to a perspective view of FIG. 41I. FIG. 41M is a close-up perspective view of a portion of the top surface 3200 of the substrate 3100, corresponding to a close-up view of FIG. 41L.

A multi-well assay plate having individually addressable electrodes is described above with respect to FIGS. 38A-41M. The multi-well assay plates described herein may be provided with one or more variations without departing from the scope of this disclosure. FIGS. 42A-46B illustrate several variations on the designs discussed above. Each of the additional or different features presented with respect to FIGS. 42A-46B may be incorporated into any of the previously described embodiments as appropriate.

FIGS. 42A-42I illustrate an electrode structure pattern having features to accommodate orientation neutral plate loading. As discussed herein, orientation neutral plate loading may include methods of plate loading that accommodate more than one plate orientation. As described herein, many multi-well assay plates are rectangular in nature. Some multi-well assay plates may be designed such that an instrument or device into which they are loaded is configured to accommodate the multi-well assay plate when loaded in one orientation but not when loaded in an orientation that is rotated by 180 degrees. As discussed herein, orientation neutral designs permit the loading or reading of multi-well plates in at least two orientations. In the case of rectangular multi-well assay plates, the multi-well assay plates may be configured for operation when inserted in a first orientation and when inserted or loaded in a second orientation, 180 degrees different (in the horizontal X-Y plane) than the first orientation. In embodiments that may include square multi-well assay plates, orientation neutral designs may include designs that are functional when inserted or loaded in four orientations, each orientation being 90 degrees different than another orientation. Thus, an operation of orientation neutral plate loading includes loading or inserting a multi-well assay plate into an assay system or other suitable instrument in either a first orientation or a second orientation 180 degrees different than the first orientation (or in any of four orientations, for example, for a square plate).

In the orientation neutral loading method, generating and measuring voltage potentials provides valid electrical assay conditions or intended assay electrical conditions in any of the acceptable plate orientations, because the electrode contacts properly align with electrical connectors of the assay instruments. "Valid electrical assay conditions" and "intended assay electrical conditions" may include, for example, assay test conditions generated according to a voltage potential generated between an intended working electrode and auxiliary electrode at substantially (e.g., within 15%, 10%, 5%, 3%, or 1%) the intended voltage potential. Thus, if it is the intention to measure the effects of a specific voltage potential between the 1-spot working electrode of a well electrode structure and its corresponding auxiliary electrode, valid electrical assay conditions or intended assay electrical conditions are obtained if substantially the specific voltage potential is applied between the 1-spot working electrode and its corresponding auxiliary electrode and the response is measured. An invalid electrical assay condition may be obtained, for example, if a voltage potential that substantially differs (e.g., differs by 20% or more) from the specific voltage potential is applied between the intended 1-spot working electrode and its corresponding auxiliary electrode and the response is measured or, for example, if a voltage potential applied to a different portion of the multi-well assay plate affects the assay results in the intended working electrode. The terms "valid electrical assay conditions" and "intended assay electrical conditions" may also include, for example, electrical connections established in the intended, designed for, or expected manner when a multi-well assay plate is loaded or inserted into an assay instrument or device. "Valid electrical assay conditions" or "intended assay electrical conditions" may be established when a multi-well assay plate is loaded or inserted into an assay instrument or device and electrical connections are established between the electrode contacts of the multi-well assay plate and an electrical connector of an assay instrument or device in the manner intended for that assay instrument or device. For example, electrical connectors associated with assay instruments or devices may have one or more sets of electrical contact pins or pads configured to contact the working and auxiliary electrodes associated with one well electrode structure. "Valid electrical assay conditions" or "intended assay electrical conditions" may be established when each set of electrical contact pins or pads makes appropriate electrical connections with corresponding well electrode structures and does not establish electrical connections with additional well electrode structures for which it is not intended or designed to. An invalid electrical assay condition or unintended assay electrical condition may be obtained when the electrodes of a multi-well assay plate are improperly connected to an assay instrument, for example, a voltage potential is applied between a working electrode and no corresponding auxiliary electrodes (e.g., either no auxiliary electrodes at all or only auxiliary electrodes not associated with the target working electrode. An invalid electrical assay condition or unintended assay electrical condition may also be obtained, for example, if an additional and unintended electrical connection is established to either a working electrode or an auxiliary electrode that causes unintended energization and/or interferes with intended energization. For example, invalid electrical assay conditions of unintended assay electrical conditions may occur where a system is configured to address a specific working electrode or combination of working electrodes and an additional working electrode (of the same or different well electrode structure) is addressed.

Figure 42A:
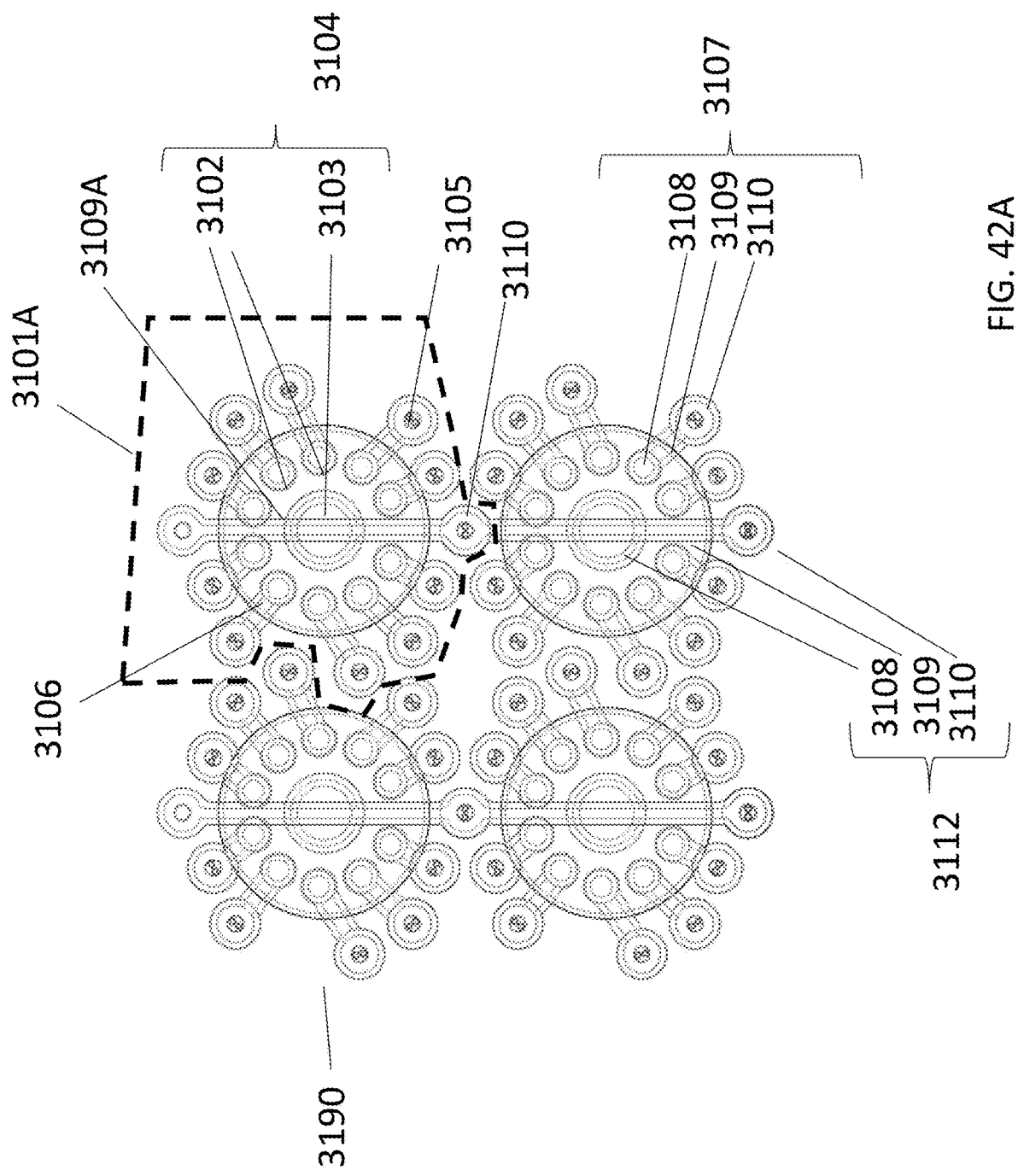
Figure 42B:
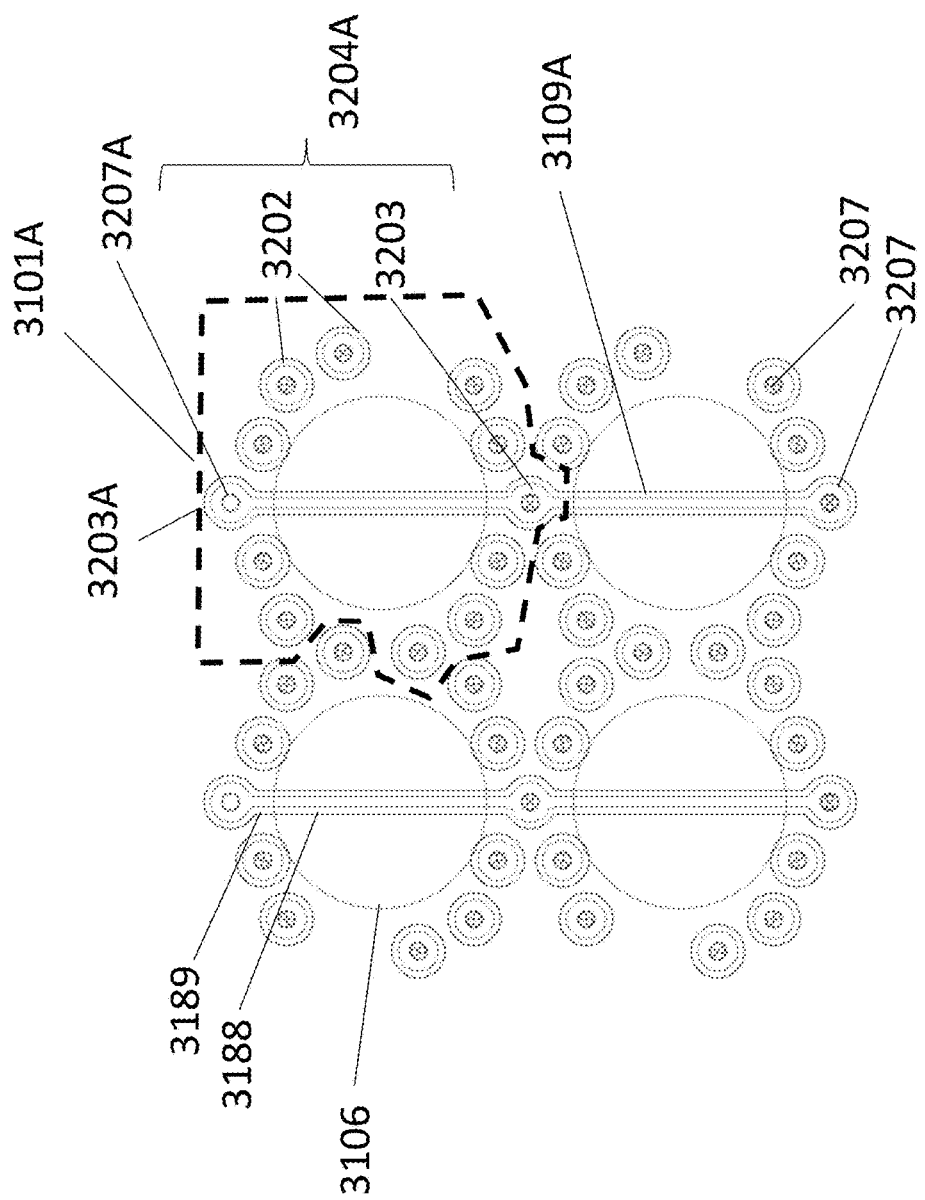

As discussed below, the orientation neutral electrode structure pattern of FIGS. 42A-42I employs a bus bar to achieve orientation neutrality. FIG. 42A illustrates an electrode pattern for a portion of a top surface 3190 of a substrate 3100 while FIG. 42B illustrates an electrode contact pattern for a portion of the bottom surface 3210 of the substrate 3100. FIGS. 42C-42I provide comparisons between electrode structure patterns configured to accommodate orientation neutral plate loading and an electrode structure pattern configured for orientation specific plate loading.

Referring now to FIGS. 42C and 42D, some results of an electrode structure pattern that is orientation specific are illustrated. FIG. 42C illustrates contact between the electrode contact grouping 3204, which includes the plurality of electrode contacts including a plurality of working electrode contacts 3202 and an auxiliary electrode contact 3203A. The working electrode contacts 3202A and the auxiliary electrode contact 3203A each belong to the same well electrode structure 3101. Also illustrated is an auxiliary electrode contact 3203 belonging to a neighboring well electrode structure 3101. When the multi-well assay plate is positioned inside an instrument, the working electrode contacts 3202 align with and contact working electrode connectors 4201A and the auxiliary electrode contact 3203A aligns with and contacts the auxiliary electrode connectors 4201B. This pattern repeats itself across all of the working/auxiliary electrode connectors 4201A and 4201B that are present in the assay reading instrument. The working/auxiliary electrode connectors 4201A and the auxiliary electrode connectors 4201B may be contact pins (e.g., spring loaded pins, pogo pins, etc.), contact pads, and/or any other suitable contact based connector, as described in greater detail below. If the multi-well assay plate is inserted in an opposite orientation (e.g., rotated 180 degrees in the X-Y plane), as shown in FIG. 42D, working electrode connectors 4201A align with and contact the working electrode contacts 3202C, but the auxiliary electrode connector 4201B fails to contact the appropriate auxiliary electrode contact 3203C, instead contacting the auxiliary electrode contact 3203D of a neighboring well electrode structure 3101. This misalignment may cause a malfunction or read error in the assay instrument.

FIG. 42A illustrates an orientation neutral electrode pattern for a substrate 3100, largely similar to the electrode pattern shown in FIG. 39A. FIG. 42A illustrates all layers of the electrode pattern. FIG. 42B illustrates an orientation neutral electrode contact pattern for a portion of the bottom surface 3210 of the substrate 3100. Except where explicitly noted, the features of FIGS. 42A and 42B bearing the same identifiers as those of FIGS. 39A and 39B are substantially similar in structure and function. The illustrated portion shows the features of four well electrode structures 3101A that may be disposed on the top surface 3190 of the substrate 3100. Features belonging to one well electrode structure 3101A are shown outlined with a dashed border. The well electrode structure 3101A of FIG. 42A differs from the well electrode structure 3101 of FIG. 39A in that it includes a bus bar 3109A that is shared between two neighboring well electrode structures 3101A, an additional via spot 3207A, and an additional auxiliary electrode contact 3203A (shown in FIG. 42B). The additional via spot 3207A is referred to as such due to its structural similarity to the via spots 3207 (e.g., forming a base layer of an electrode contact). As illustrated in FIGS. 42A and 42B, the additional via spot 3207A may not be associated with any vias 3115 in the substrate 3100. The bus bar 3109A (which may also be referred to as an extended electrical bridge 3109A) extends from the via spot 3207 of a first well electrode structure 3101A, through the well area 3106 at the center of the first well electrode structure 3101A, to the via spot 3207 of second well electrode structure 3101A, through the well area 3106 at the center of the second well electrode structure 3101A, and to the additional via spot 3207A of the second well electrode structure 3101A. Thus, a continuous electrical pathway is established between the via spots 3207/3207A and thus of the auxiliary electrode contacts 3203/3203A. The continuous electrical pathway between the auxiliary electrode contacts 3203/3203A is further in electrical connection with the auxiliary electrode 3103 through the auxiliary electrode trace 3112. As further explained below, it will be noted that the additional via spot 3207A is, in most cases, the via spot 3207 from a neighboring well electrode structure 3101A and does not necessarily require the addition of a new structure to the multi-well plate. Also as explained below, due to the repeating nature of the pattern of the well electrode structures 3101A, the bus bar 3109A may act as a bus bar for all auxiliary electrodes 3103 and auxiliary electrode contacts 3203/3203A in a single row of well electrode structures 3101A.

FIG. 42B illustrates an orientation neutral electrode contact pattern for a portion of the bottom surface 3210 of the substrate 3100. The electrode contact groupings 3204A (four are shown) each corresponds to an electrode contact grouping 3204 of the respective well electrode structure 3101A. Features belonging to one well electrode contact grouping 3204A are shown outlined with a dashed border. Each electrode contact grouping 3204A includes a plurality of electrode contacts including a plurality of working electrode contacts 3202 and two auxiliary electrode contacts 3203/3203A. The auxiliary electrode contact 3203 is the same as that shown in FIG. 39B while the auxiliary electrode contact 3203A is an additional auxiliary electrode contact 3203A (having a corresponding additional via spot 3207A) for that electrode contact grouping 3204A. As further explained below, it will be noted that the additional auxiliary electrode contact 3203A is, in most cases, an auxiliary electrode contact 3203 from a neighboring well electrode structure 3101 and does not necessarily require the addition of new structure to the multi-well plate.

In embodiments, to achieve the bus bar 3109A, an alteration in the printing process may be applied. The bus bar 3109A, additional via spot 3207A, and additional auxiliary electrode 3203A may be formed on the bottom surface 3210 of the substrate 3100. The bus bar 3109A may be formed having a top layer 3188 and a bottom layer 3189. The bottom layer 3189 of the bus bar 3109A and the additional via spot 3207A may be formed in a step that adds the conductive layer including the via spots 3207, as described with reference to FIGS. 39D, 40A, and 40B. Accordingly, the bottom layer 3189 of the bus bar 3109A and the additional via spot 3207A may be printed of a same material (e.g., silver or other conductive metal) as the via spots 3207. The top layer 3188 of the bus bar 3109A and the additional auxiliary electrode 3203A may be formed in a step that adds the conductive layer including the electrode contact groupings 3204, as described with reference to FIGS. 39E, 40C, and 40D. Accordingly, the top layer 3188 of the bus bar 3109A and the additional auxiliary electrode 3203A may be printed of a same material as the electrode contact groupings 3204 (conductive carbon or any other suitable material). In further embodiments, the bus bar 3109A, the additional via spot 3207A, and the additional auxiliary electrode 3203A may be added at any suitable time during the manufacturing process and at any suitable layer.

The results of the orientation neutral electrode contact pattern of FIG. 42B are illustrated in FIGS. 42E and 42F. As shown in FIG. 42E, when the multi-well assay plate is positioned inside an instrument, the working electrode contacts 3202 align with and contact working electrode connectors 4201A and the auxiliary electrode contact 3203A aligns with and contacts the auxiliary electrode connectors 4201B. This pattern repeats itself across all of the working electrode connectors 4201A and 4201B that are present in the assay reading instrument. As discussed above, the auxiliary electrode contacts 3203A are all connected to one another. If the multi-well assay plate is inserted in an opposite orientation, as shown in FIG. 42D, the working electrode connectors 4201A align with and contact the working electrode contacts 3202C and the auxiliary electrode connector 4201B contacts an auxiliary electrode contact 3203C. Because each of the auxiliary electrode contacts 3203C are connected to one another, there is no resulting malfunction or read error.

Figure 42G:
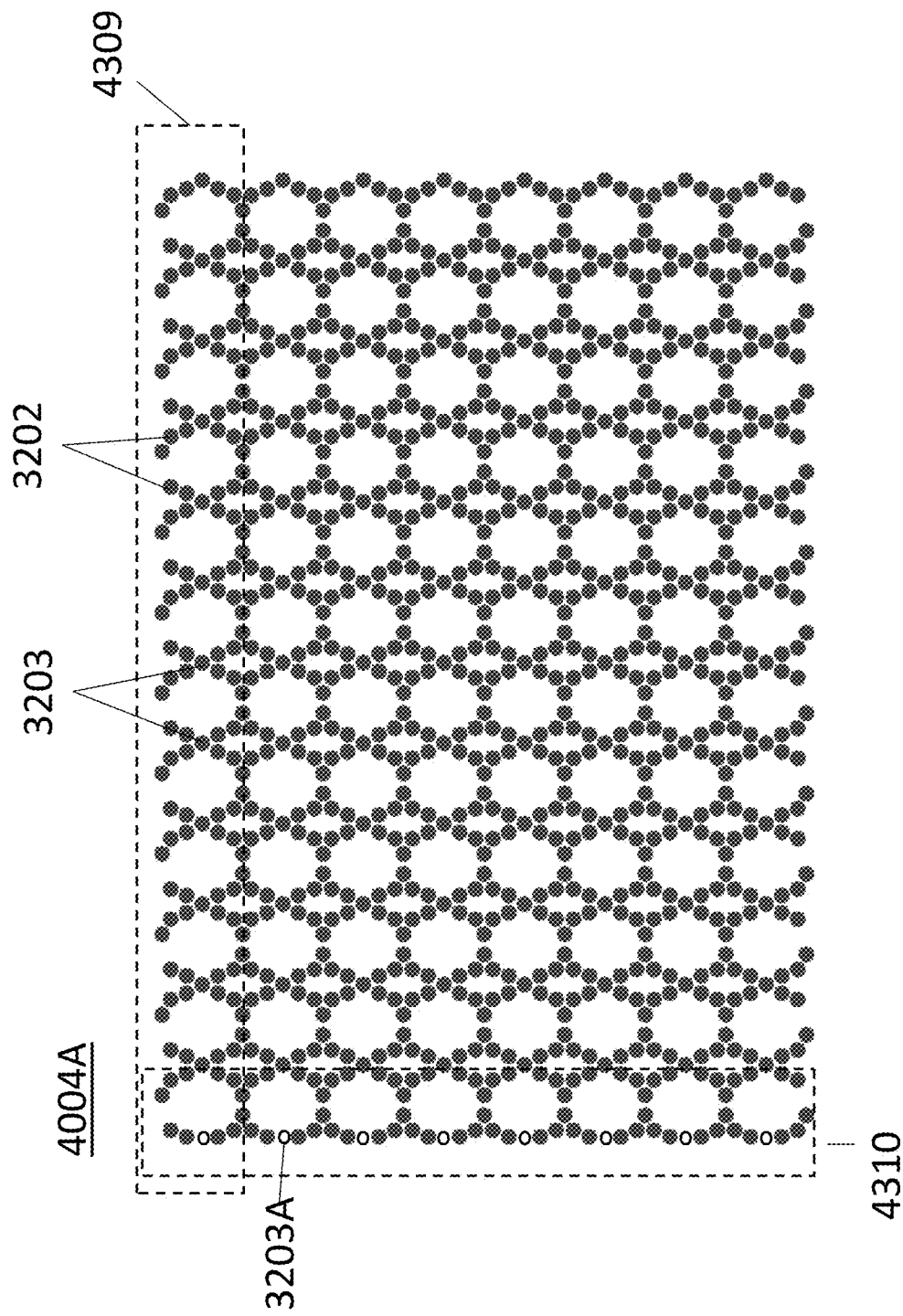

FIG. 42G illustrates an orientation neutral electrode contact pattern 4004A that incorporates the additional auxiliary electrode contacts 3203A. In the electrode contact pattern of FIG. 39B, each well electrode structure 3101 corresponds to a single auxiliary electrode contact 3203, positioned at one side of the well area 3106. In this design, when the pattern of the well electrode structures 3101 is repeated, the auxiliary electrode contact 3203 of each well electrode structure 3101 is disposed in a gap in the pattern of a neighboring well electrode structure 3101. The circular footprints 4911 of each well electrode structure 3101 may overlap with neighboring footprints 4911, as discussed with respect to FIGS. 41G and 41H. Thus, the orientation neutral electrode contact pattern 4004A may require the addition of only a few additional auxiliary electrode contacts 3203A to fill gaps at one end of the pattern. In a 96-well plate, having 12 columns 4310 of 8 rows 4309, it may be necessary to add 8 additional auxiliary electrode contacts 3203A, as shown in FIG. 42E. In the orientation neutral multi-well plate, each auxiliary electrode contact 3203/3203A for a specific row 4309 may be connected internally by the extended electrical bridge 3109A acting as a bus bar.

Figure 42H:
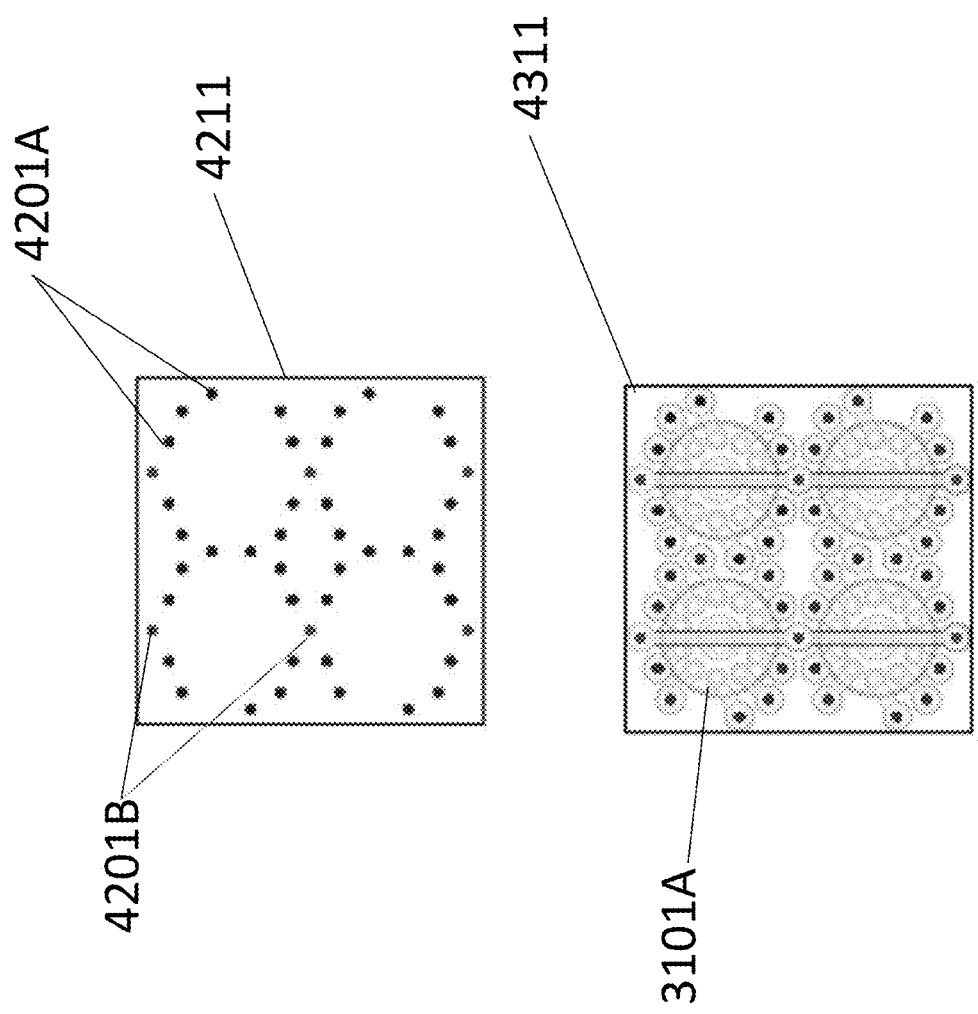

FIGS. 42H and 42I illustrate the operation of patterns of orientation neutral well electrode structures 3101A with respect to various electrode connector patterns. FIG. 42H illustrates a 2×2 sector 4311 of well electrode structures 3101A and a corresponding sector electrical connector 4211. The sector electrical connector 4211 has working electrode connectors 4201A and auxiliary electrode connectors 4201B arranged in an orientation neutral pattern corresponding to a 2×2 sector of the electrode contact groupings 3204A of well electrode structures 3101A. As can be seen in FIG. 42H, reversing the orientation of the sector 4311 permits proper alignment and plate reading and does not prevent the sector electrical connector 4211 from making appropriate contact.

FIG. 42I illustrates a two columns 4310A/4310B of well electrode structures 3101A and a corresponding columnar electrical connector 4212. The columnar electrical connector 4212 has working electrode connectors 4201A and auxiliary electrode connectors 4201B arranged in an orientation neutral pattern corresponding to an 8 well column of electrode contact groupings 3204A of well electrode structures 3101A. As can be seen in FIG. 42I, reversing the orientation of the columns 4310A/4310B permits proper alignment and plate reading and does not prevent the columnar electrical connector 4212 from making appropriate contact.

Figure 43A:
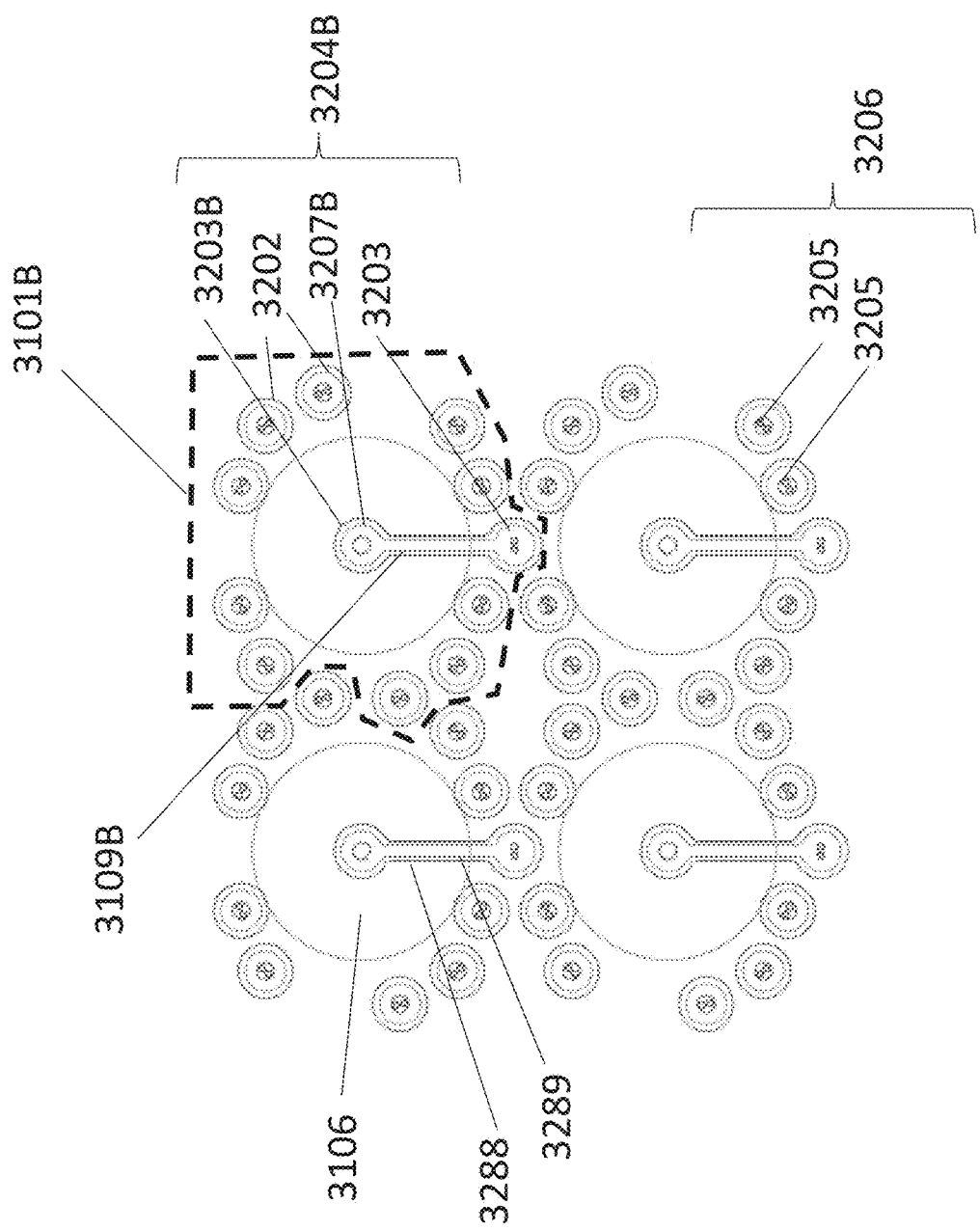
Figure 43B:
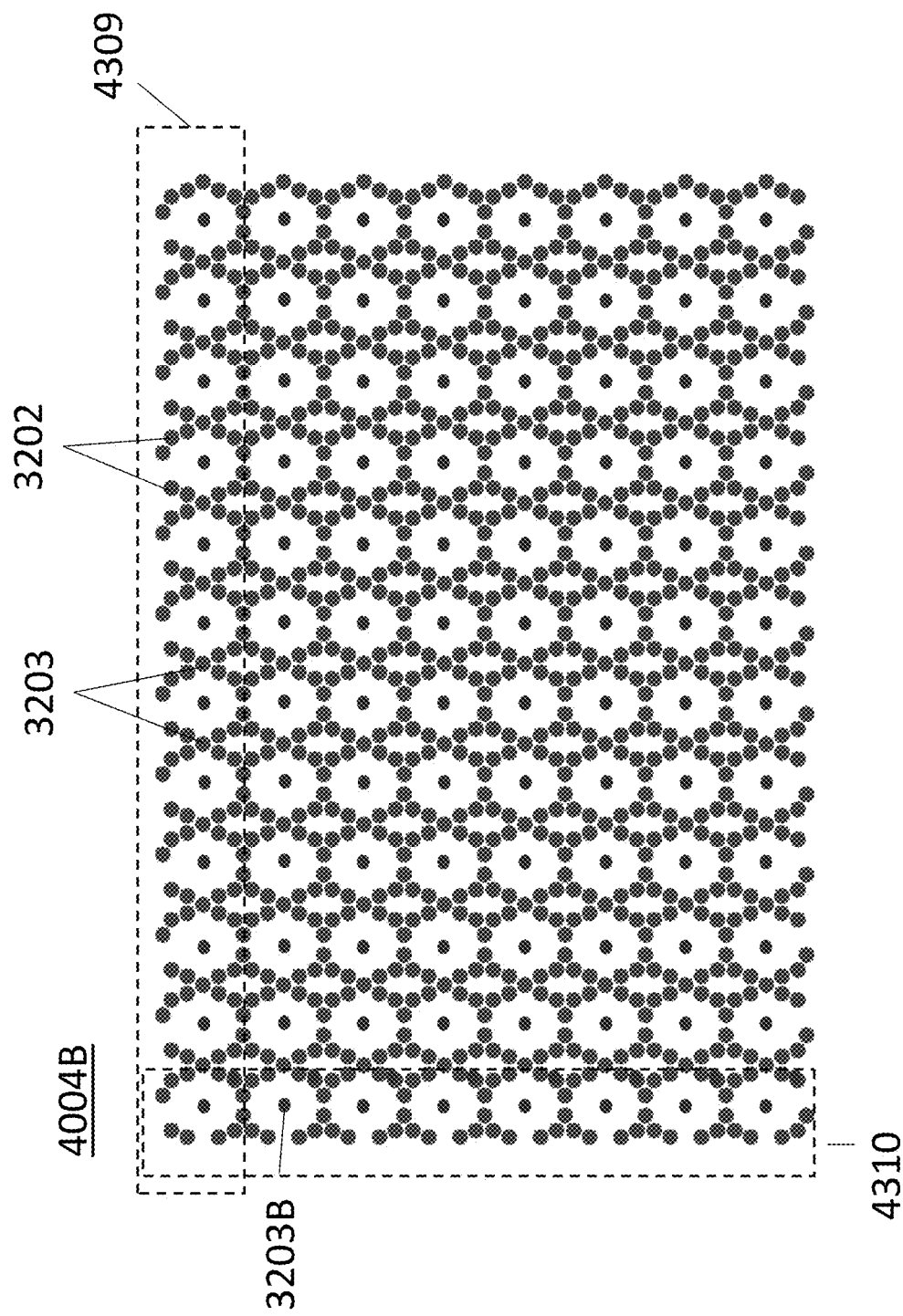

FIGS. 43A-D illustrate an electrode structure pattern having features to accommodate orientation neutral plate loading. As discussed below, the electrode structure pattern of FIGS. 43A-43D use a centered auxiliary electrode contact to achieve orientation neutrality. FIG. 43A illustrates an electrode contact pattern for a portion of the bottom surface 3210 of the substrate 3100. FIG. 43B illustrates the orientation neutral electrode structure pattern across an entire substrate while FIGS. 43C and-43D provide a comparison between an electrode structure pattern configured to accommodate orientation neutral plate loading and an electrode structure pattern configured for orientation specific neutral plate loading.

FIG. 43A illustrates an orientation neutral electrode pattern for a portion of a bottom surface 3210 of a substrate 3100, largely similar to the electrode contact pattern shown in FIG. 39B. Except where explicitly noted, the features of FIG. 43A bearing the same identifiers as those of FIG. 39B are substantially similar in structure and function. The illustrated portion shows the features of four well electrode structures 3101B that may be disposed on the top surface 3190 of the substrate 3100. Features belonging to one well electrode structure 3101B are shown outlined with a dashed border. The well electrode structure 3101B of FIG. 43A differs from the well electrode structure 3101 of FIG. 39A in that it includes an additional centered auxiliary electrode contact 3203B, an additional via spot 3207B, and a bus bar 3109B extending between the additional centered auxiliary electrode contact 3203B and the auxiliary electrode contact 3203. The additional via spot 3207B is referred to as such due to its structural similarity to the via spots 3207 (e.g., forming a base layer of an electrode contact). As illustrated in FIG. 43A, the additional via spot 3207B may not be associated with any vias 3115 in the substrate 3100. The orientation neutral electrode pattern of FIG. 43A does not require alterations to the top surface 3190 of the substrate 3100 as compared, for example, to FIG. 39A.

The bus bar 3109B functions to provide an electrical pathway between the additional centered auxiliary electrode contact 3203B and the auxiliary electrode contact 3203 for each well structure 3101B. The additional centered auxiliary electrode contact 3203B is disposed at or near the center of the well area 3106. The additional centered auxiliary electrode contact 3203B may be centered within the well area 3106. The additional centered auxiliary electrode contact 3203B may thus be located on the bottom surface 3210 of the substrate 3100 in a position opposing or opposite of the auxiliary electrode 3103 located on the top surface 3190 of the substrate 3100. Accordingly, as discussed below, a pin or other electrical contact aligned with the center of the well electrode structure 3101B (and the additional centered auxiliary electrode contact 3203B) will be in electrical contact with the auxiliary electrode 3103, via the bus bar 3109B, the auxiliary electrode contact 3203, and the auxiliary electrode trace 3112.

In embodiments, to achieve the additional centered auxiliary electrode 3203B, an alteration in the printing process may be applied. The bus bar 3109B, additional via spot 3207B, and additional centered auxiliary electrode 3203B may be formed on the bottom surface 3210 of the substrate 3100. The bus bar 3109B may be formed having a top layer 3288 and a bottom layer 3289. The bottom layer 3289 of the bus bar 3109B and the additional via spot 3207B may be formed in a step that adds the conductive layer including the via spots 3207, as described with reference to FIGS. 39D, 40A, and 40B. Accordingly, the bottom layer 3289 of the bus bar 3109B and the additional via spot 3207B may be printed of a same material (e.g., silver or other conductive metal) as the via spots 3207. The top layer 3288 of the bus bar 3109B and the additional centered auxiliary electrode 3203B may be formed in a step that adds the conductive layer including the electrode contact groupings 3204, as described with reference to FIGS. 39E, 40C, and 40D. Accordingly, the top layer 3288 of the bus bar 3109B and the additional auxiliary electrode 3203B may be printed of a same material as the electrode contact groupings 3204 (conductive carbon or any other suitable material). In further embodiments, the bus bar 3109B, the additional via spot 3207B, and the additional auxiliary electrode 3203B may be added at any suitable time during the manufacturing process and at any suitable layer.

FIG. 43B illustrates an orientation neutral electrode contact pattern 4004B that incorporates the additional auxiliary electrode contacts 3203B across the entirety of the bottom surface 3210 of the substrate 3100. In the orientation neutral electrode contact pattern 4004B, each well electrode structure 3101B may have two auxiliary electrode contacts 3203 and 3203B or may only have the centered auxiliary electrode contact 3203B. Unlike the orientation neutral electrode contact pattern 4004A, the auxiliary electrode contacts 3203B of a row 4309 remain electrically isolated from one another.

FIGS. 43C and 43D illustrate the operation of patterns of orientation neutral well electrode structures 3101B with respect to various electrode connector patterns. FIG. 43C illustrates a 2×2 sector 4313 of well electrode structures 3101B and a corresponding sector electrical connector 4213. The sector electrical connector 4213 has working electrode connectors 4201A and auxiliary electrode connectors 4201B arranged in an orientation neutral pattern corresponding to a 2×2 sector of the electrode contact groupings 3204B of well electrode structures 3101B. As can be seen in FIG. 43C, reversing the orientation of the sector 4313 will not prevent the sector electrical connector 4213 from making appropriate contact.

FIG. 43D illustrates a two columns 4310A/4310B of well electrode structures 3101B and a corresponding columnar electrical connector 4214. The columnar electrical connector 4214 has working electrode connectors 4201A and auxiliary electrode connectors 4201B arranged in an orientation neutral pattern corresponding to an 8 well column of electrode contact groupings 3204B of well electrode structures 3101B. This orientation neutral pattern includes an auxiliary electrode connector 4201B located generally in a center of the working electrode connectors 4201A, corresponding to the additional centered auxiliary electrode contact 3203B. Further, a connector that may have corresponded to the originally located auxiliary electrode contact 3203 may be excluded. As can be seen in FIG. 43D, reversing the orientation of the columns 4310A/4310B will not prevent the columnar electrical connector 4214 from making appropriate contact.

Figure 44A:
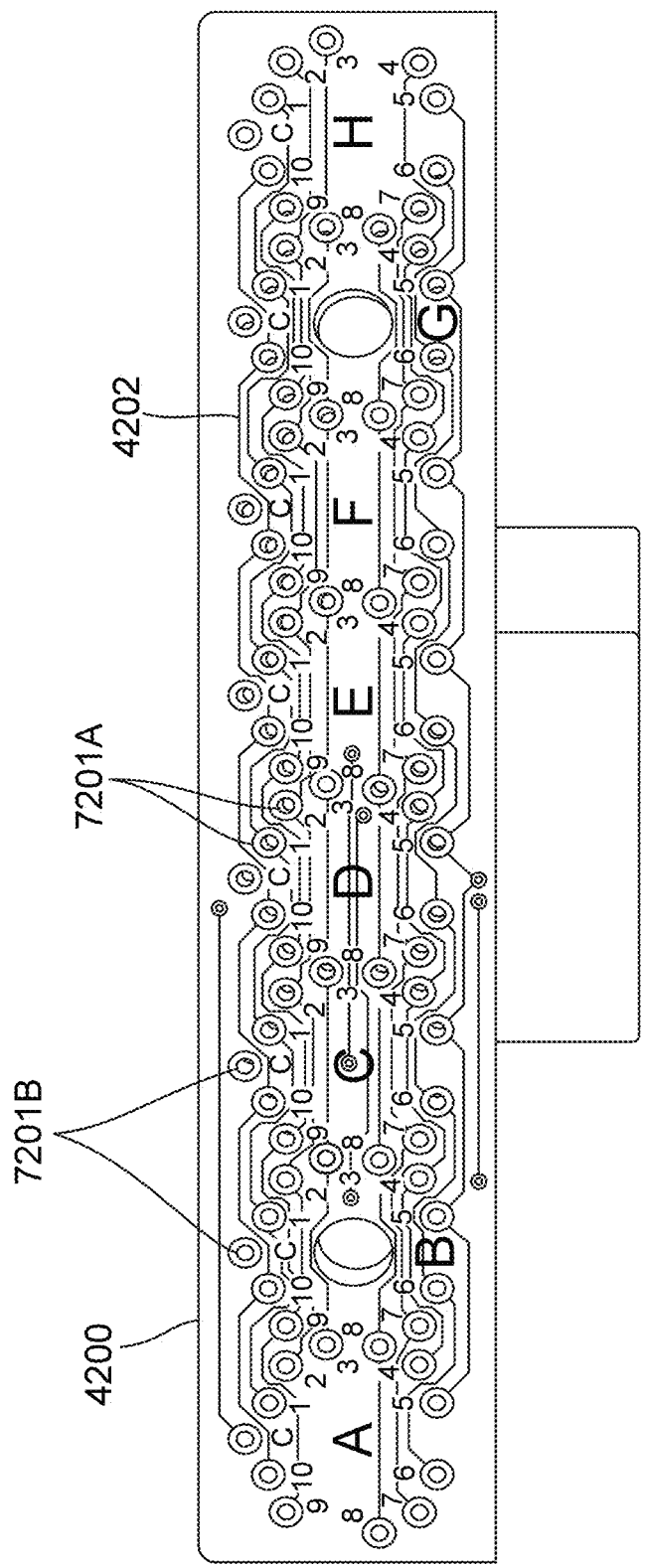
Figure 44C:
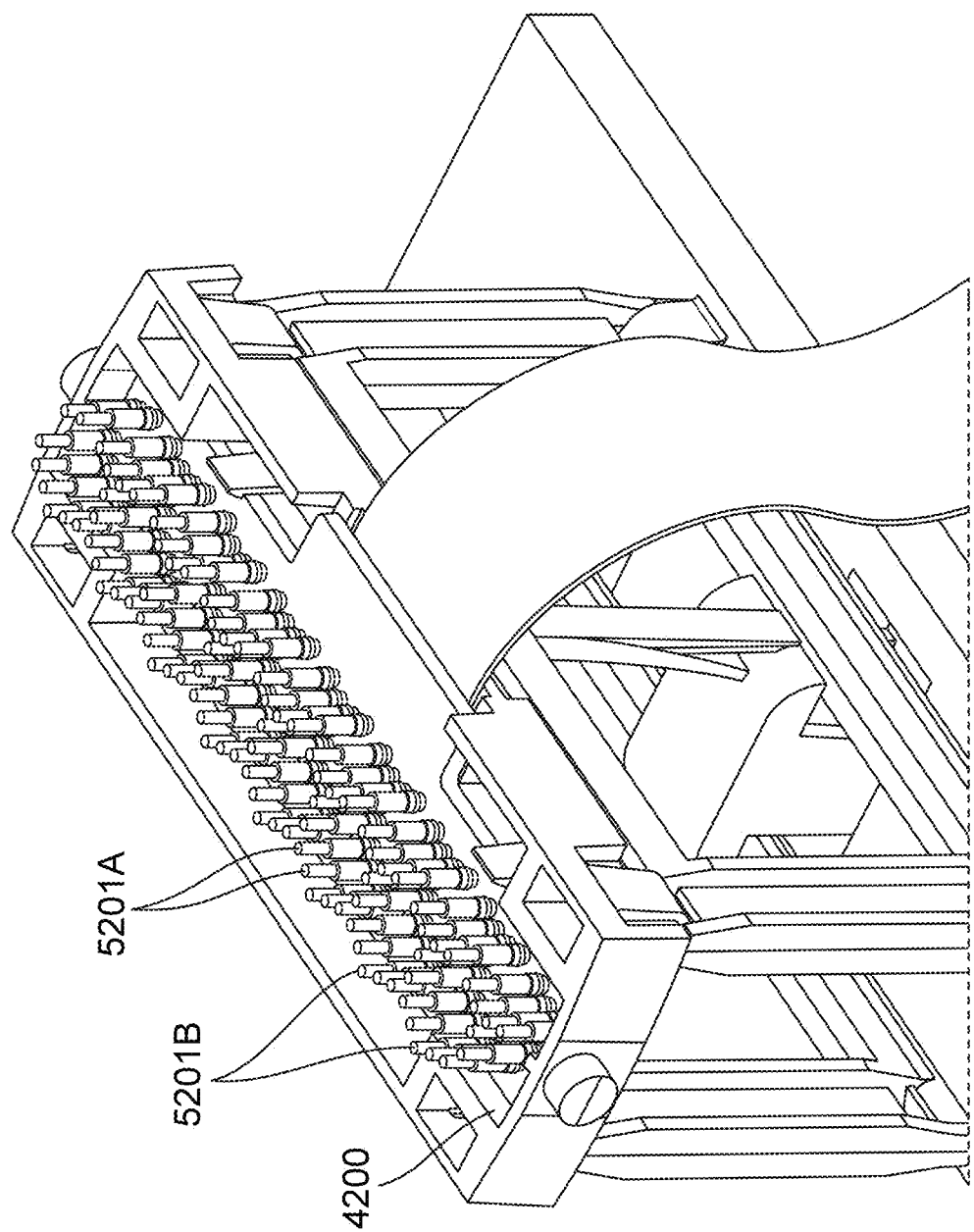

FIGS. 44A-C illustrate a columnar electrical connector 4200 consistent with embodiments discussed herein. The columnar electrical connector 4200 may be similar to the plate electrical connector 902 as depicted in FIG. 9A. The columnar electrical connector 4200 includes a plurality of contact leads 7201A and 7201B corresponding to contact pins 5201A and 5201B (as shown in FIGS. 44B and 4C) and associated circuitry 4202. The contact pins 5201A/5201B may be spring loaded pins, pogo pins, or any other suitable pin-type electrical contact. The contact pins 5201A are configured to align with and contact working electrode contacts 3202 of a multi-well assay plate 2000 as discussed herein. The contact pins 5201B are configured to align with and contact auxiliary electrode contacts 3203 of a multi-well assay plate 2000 as discussed herein. The columnar electrical connector 4200 is configured to address 8 wells (one column) of the multi-well assay plate 2000 simultaneously. The plurality of contact pins 5201A/5201B are positioned and configured to correspond to the electrode contacts of the electrode contact groupings 3204 of the substrate 3100 having well electrode structures 3101. The plurality of contact pins 5201A/5201B are connected to an appropriate plate reading apparatus via the circuitry 4202 of the columnar electrical connector 4200. As illustrated in FIGS. 44A-44C, the columnar electrical connector 4200 may include a plurality of contact pins 5201A/5201B corresponding to eight well electrode structures 3101.

In embodiments, e.g., as shown in FIG. 44A, the contact pins 5201A corresponding to the specific electrodes having the same position within the well electrode structures may be electrically connected via the circuitry 4202. Thus, the contact pin 5201A configured to contact the working electrode contact 3202 in the first position (labeled 1) in each well electrode structure 3101 (labeled A, B, C, D, E, F, G, H) is configured to contact the first working electrode contact 3202 in its respective well electrode structure 3101 and is further connected to each other contact pin 5201A configured to contact the first working electrode contacts 3202 in each other well electrode structure 3101. Accordingly, a single electrical signal may excite or address all working electrodes 3102 (in the group of 8 well electrode structures contacted by the columnar electrical connector 4200) having a same position. The contact pins 5201B configured to align with and contact the auxiliary electrode contacts 3203 are not electrically connected with one another.

In an embodiment, a total of eighty eight contact pins 5201A/5201B are provided. In this example embodiment, eighty of the eighty eight contact pins 5201A are provided for the working electrodes 3102 in a single electrochemical cell (one each for the ten individual spots of all eight wells, e.g., all eight spot 1 s, 2 s, etc.) and the remaining eight contact pins 5201B are provided for each of the eight auxiliary electrodes 3103. In this manner, each auxiliary electrode 3103 can be individually energized and each of the individual working electrodes 3102 from the eight-well sector can be individually energized (e.g., energizing spot 1 for all eight wells, spot 2 for all eight well, etc.). For this 88-pin design, in embodiments, fewer than all eight of the auxiliary electrodes 3103 may be utilized such that only a subset of the working electrodes 3102 are energized in the eight-well sector simultaneously. For example, if one auxiliary electrode contact pin 5201B is tied to ground and the remaining seven are floating, by applying a potential to one of the spots among the working electrodes 3102 (e.g., spot 1), only the working electrode 3102 (spot 1) from the well 3003 with a grounded auxiliary electrode 3102 will be energized, while the others will not. Other examples may be used as well (e.g., grounding 2, 3, 4, etc. auxiliary electrode contact pins 5201B which leaving the remains ones floating)

In embodiments, each contact pin 5201A/5201B may be electrically isolated from each other contact pin 5201A/5201B, permitting each electrode (working and auxiliary) of the substrate to be individually addressed or addressed in any combination. In still further embodiments, any number of contact pins 5201A/5201B may be provided to address any number of well electrode structures simultaneously. Thus, while the columnar electrical connector 4200 is configured to address eight well electrode structures simultaneously, further plate electrical connectors may be configured to address fewer (e.g., sub-sets or "sectors" of 4, 2, 1 wells, etc.) or greater (e.g., sectors of 12, 16, 24, 32, 36, 40, 48, 56, 60, 64, 72, 80, 84, 88, 96 wells, etc.). Further, such plate electrical connectors may be arranged in differing orientations, e.g., 2×2, 4×1, etc. Sectors are described in greater detail throughout, for example, with reference FIGS. 9A and 9B and the descriptions associated therewith. In further embodiments, the contact pins 5201A/5201B may be electrically connected or isolated from one another in any other suitable combination, regardless of the arrangement of well electrode structures. For example, all contact pins 5201A across the connector may be electrically connected while all contact pins 5201B across the connector are also electrically connected. This arrangement energizes all working and auxiliary electrodes 3202/3203 simultaneously. In another arrangement, all of the contact pins 5201A corresponding to working electrodes 3202 from individual well electrode structures 3101 may be connected, permitting all spots in each well 3003 to be energized simultaneously while not energizing any other spots.

It will be noted that the columnar electrical connector 4200 includes a pin arrangement suitable for connection to the electrode contact pattern 4004. Further, the orientation neutral electrode contact pattern 4004A is also compatible with the pin arrangement of the columnar electrical connector 4200, because the bus bars 3109A ensure that the single contact pin 5201B corresponding to the auxiliary electrode contacts 3203 for each well electrode structure 3101 will be electrically connected to the auxiliary electrode 3103 in either orientation.

In further embodiments, the contact pins 5201A/5201B may be configured to accommodate any additional or different well electrode structure 3101 as required. For example, the columnar electrical connector 4200 may be altered to provide the orientation neutral patterns of columnar electrical connectors 4212 (FIG. 42I) and 4214 (FIG. 43D). In other embodiments, the columnar electrical connector 4200 may include more or fewer pins as may be required to accommodate various electrode contact groupings, including, for example groupings that include additional auxiliary electrode contacts per grouping (e.g., 2, 3, 4, or more, etc.) and/or more or fewer working electrode contacts per grouping.

Accordingly, the columnar electrical connector 4200 may be provided to permit any combination of working electrode and auxiliary electrodes in plate of any size (e.g., 48 wells, 96 wells, etc.) to be addressed. As discussed above, each working electrode 3102 and each auxiliary electrode 3103 of a given multi-well plate are electrically isolated from one another. Thus, columnar electrical connectors 4200 provided with an appropriate number of isolated contact pins may be used to address any number of working electrodes 3202 and auxiliary electrodes 3103 of the multi-well plate 2000 in any combination.

FIG. 45A-45F illustrate sector electrical connectors 5200/5200A/5200B consistent with embodiments discussed herein. The sector electrical connectors 5200/5200A/5200B may be similar to the plate electrical connector 902 as depicted in FIG. 9A. The sector electrical connectors 5200/5200A/5200B includes a plurality of contact pins 5201A/5201B and associated circuitry. The contact pins 5201A/5201B may be spring loaded pins, pogo pins, or any other suitable pin-type electrical contact. The contact pins 5201A are configured to align with and contact working electrode contacts 3202 of a multi-well assay plate 2000 as discussed herein. The contact pins 5201B are configured to align with and contact auxiliary electrode contacts 3203 of a multi-well assay plate 2000 as discussed herein. The sector electrical connectors 5200/5200A/5200B are configured to address 4 wells 3003 in a 2×2 sector of the multi-well assay plate 2000 simultaneously. The plurality of contact pins 5201A/5201B are positioned and configured to correspond to the electrode contacts of the electrode contact groupings 3204 of the substrate 3100 having well electrode structures 3101. The plurality of contact pins 5201A/5201B are connected to an appropriate plate reading apparatus via circuitry of the sector electrical connectors 5200/5200A/5200B.

Figure 45A:
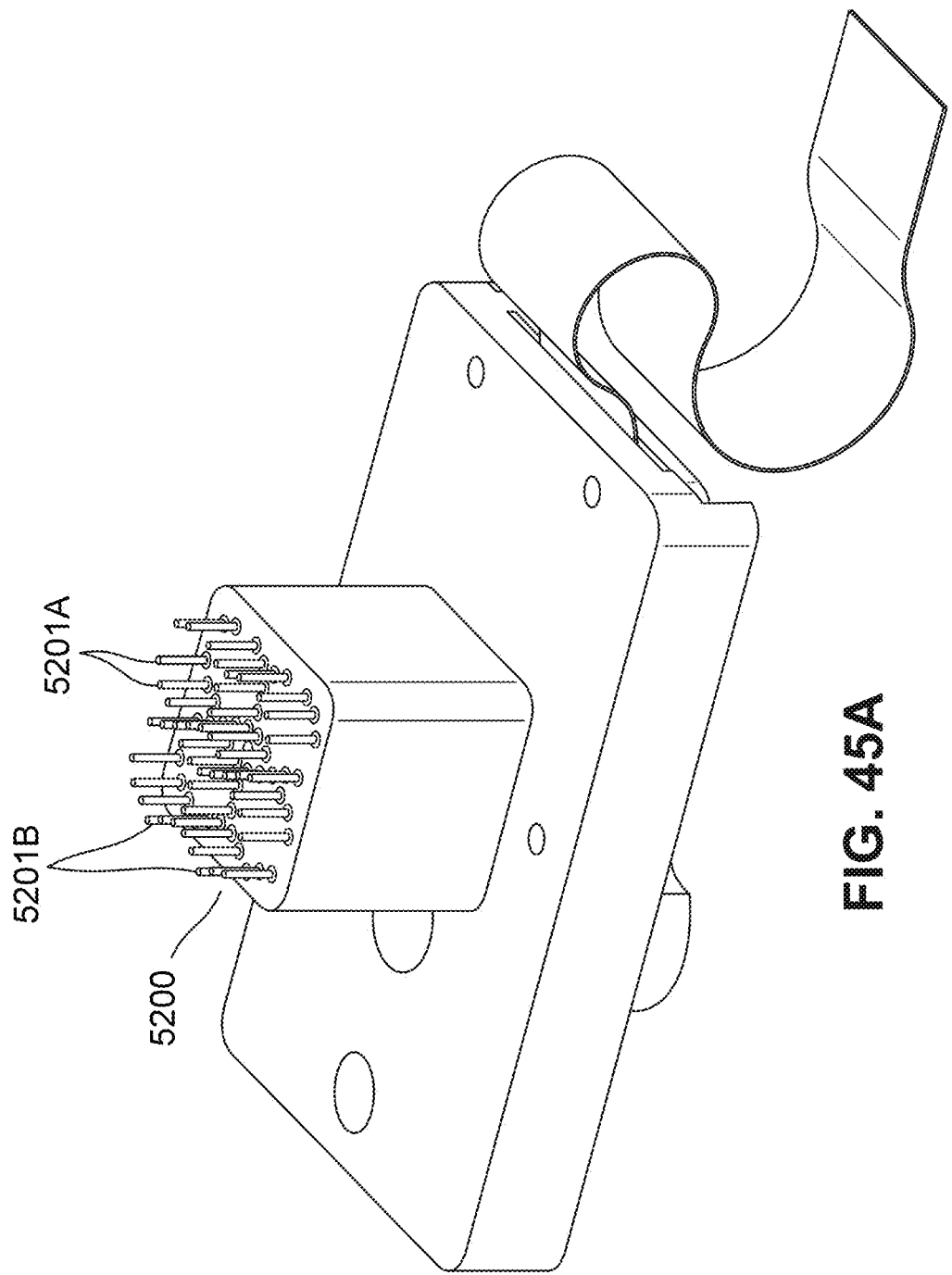
Figure 45C:
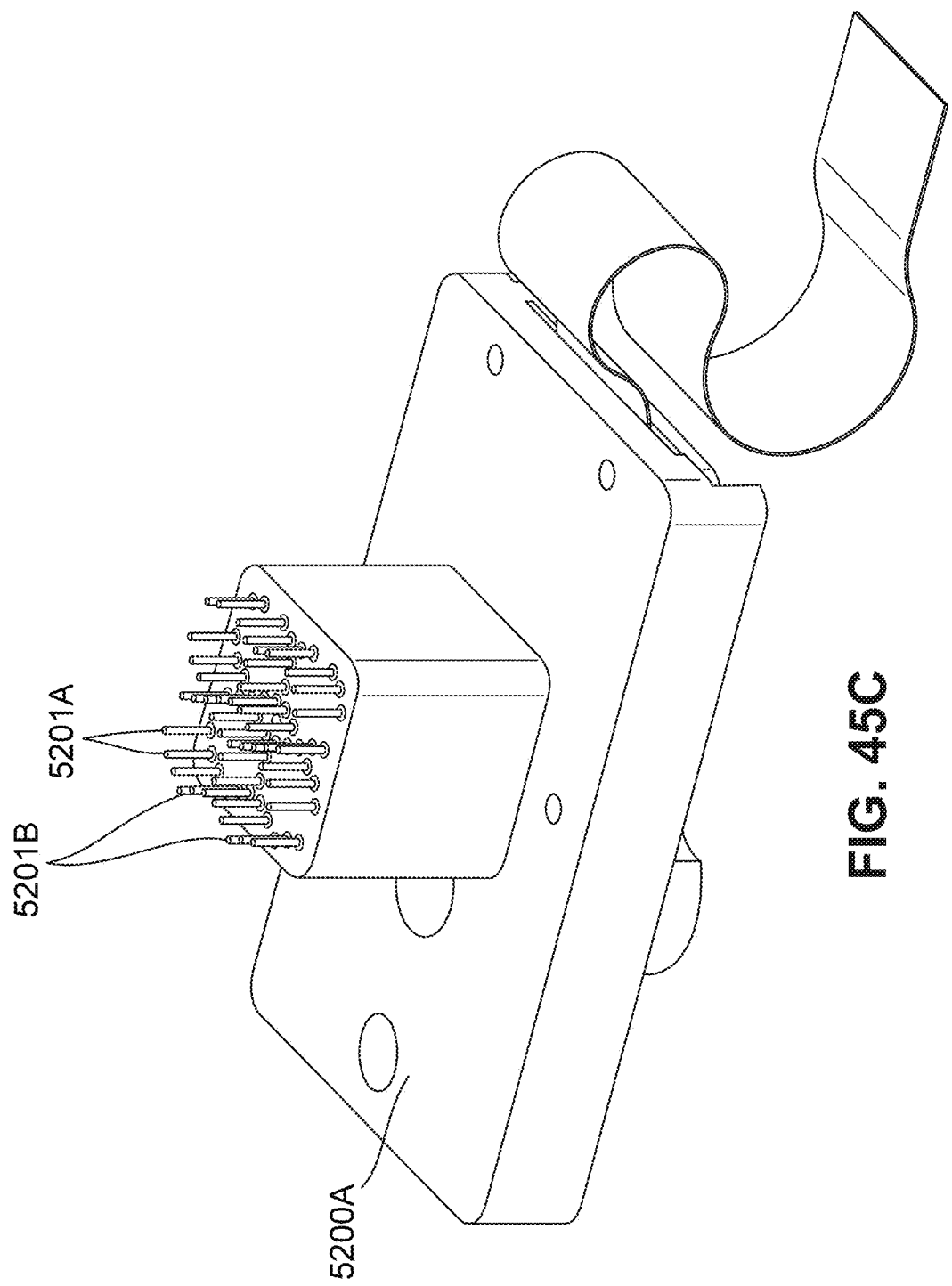

FIGS. 45A and 45B illustrate sector electrical connector 5200 configured to address a multi-well assay plate 2000 configured according to the electrode contact pattern 4004. The orientation neutral nature of the electrode contact pattern 4004A may also be accommodated by the sector electrical connector 5200. FIGS. 45C and 45D illustrate a sector electrical connector 5200A configured to address a multi-well assay plate 2000 configured according to the orientation neutral electrode contact pattern 4004A. The arrangement of the contact pins 5201A/5201B of sector electrical connector 5200A corresponds to the electrical connectors 4201A/4201B of the orientation neutral sector electrical connector 4211 shown in FIG. 42H FIGS. 45E and 45F illustrate a sector electrical connector 5200B configured to address a multi-well assay plate 2000 configured according to the electrode contact pattern 4004B. The arrangement of the contact pins 5201A/5201B of sector electrical connector 5200B corresponds to the electrical connectors 4201A/4201B of the orientation neutral sector electrical connector 4213 shown in FIG. 43C.

In embodiments, electrical connections between the contact pins 5201A/5201B of the sector electrical connectors 5200/5200A/5200B may be made in similar combinations as discussed above with respect to the columnar electrical connector 4200. The following examples may be implemented in any of the sector electrical connectors 5200/5200A/5200B. For example, in an embodiment, all contact pins 5201A/5201B of the sector electrical connectors 5200/5200A/5200B may be isolated from one another, permitting the energization of any working electrode 3102 and any auxiliary electrode 3103 of a multi-well assay plate 2000 in any combination with appropriate multiplexing. In embodiments, the contact pins 5201A associated with the working electrodes 3202 in same positions in each well 3003 of the 2×2 sector may be electrically connected, while the contact pins 5201B associated with the auxiliary electrodes 3202 remain isolated, permitting the energization of any combination of working electrodes 3202 in a single well 3003 and the energization of the same combination in any of the other three wells 3003. In embodiments, the contact pins 5201A associated with all working electrodes 3202 in a single well 3003 may be electrically connected but isolated from the contact pins 5201 associated with the working electrodes 3202 of each other well 3003, permitting all working electrodes 3202 in a single well 3003 to be energized simultaneously separately from the other wells 3003. In embodiments, the contact pins 5201A associated with all working electrodes 3202 of the 2×2 sector may be electrically connected and the contact pins 5201B associated with all of the auxiliary electrodes 3202 of the 2×2 sector may be electrically connected, causing all working electrodes 3202 in the 2×2 sector to be energized simultaneously.

In further embodiments, the contact pins 5201A/5201B of the sector electrical connectors 5200/5200A/5200B may be arranged to accommodate more or fewer well electrode structures 3101 at any given time, including arrangements of 3×3, 4×4, 8×8, 8×12, 8×2, 8×4, 4×2, and any other suitable arrangement.

In further embodiments, the contact pins 5201A/5201B may be configured to accommodate any additional or different well electrode structure 3101 as required. In embodiments, the sector electrical connectors 5200/5200A/5200B may include more or fewer pins as may be required to accommodate various electrode contact groupings, including, for example groupings that include additional auxiliary electrode contacts per grouping (e.g., 2, 3, 4, or more, etc.) and/or more or fewer working electrode contacts per grouping. The sector electrical connectors 5200/5200A/5200B may be provided to permit any combination of working electrode and auxiliary electrodes in plate of any size (e.g., 48 wells, 96 wells, etc.) to be addressed. As discussed above, each working electrode 3102 and each auxiliary electrode 3103 of a given multi-well assay plate 2000 are electrically isolated from one another. Thus, the sector electrical connectors 5200/5200A/5200B provided with an appropriate number of isolated contact pins may be used to address any number of working electrodes 3202 and auxiliary electrodes 3103 of the multi-well plate 2000 in any combination.

FIGS. 46A-46E illustrate a sector flex electrical connector consistent with embodiments hereof. The columnar electrical connector 4200 and the sector electrical connectors 5200/5200A/5200B may have 88 contact pins and 44 contact pins respectively, as shown. The use of 88 or 44 spring loaded contact pins may generate a significant amount of force when all are brought into contact and compressed. For example, because the columnar electrical connector 4200 and the sector electrical connectors 5200/5200A/5200B contact only a portion of the multi-well assay plate 2000, the force applied by the respective connectors may cause undesirous effects (torquing, flexing, etc.) related to an off-center force. Accordingly, in some embodiments, it may be advantageous to use a connector that imparts a smaller force to the multi-well assay plate 2000.

Figure 46C:
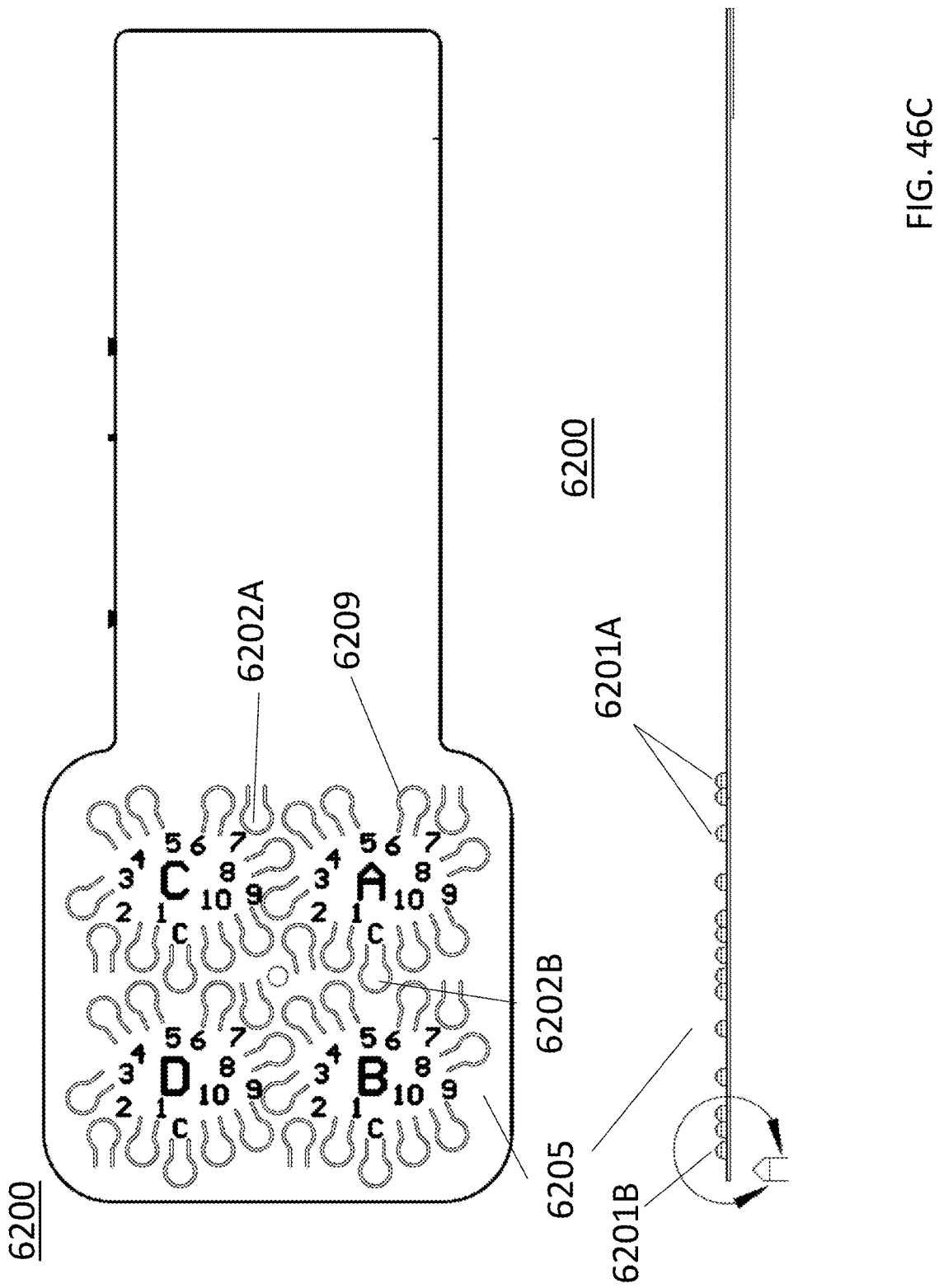

FIG. 46A illustrates a substrate of a sector flex electrical connector consistent with embodiments hereof. FIG. 46B illustrates opposing sides of circuitry laid on the sector flex electrical connector substrate consistent with embodiments hereof. FIG. 46C illustrates contact pins disposed on the sector flex electrical connector consistent with embodiments hereof. FIG. 46D illustrates an example system for employing the sector flex electrical connector consistent with embodiments hereof.

The sector flex electrical connector 6200 may be similar to the plate electrical connector 902 as depicted in FIG. 9A. The sector flex electrical connector 6200 includes a plurality of contact pads 6202A/6202B and associated circuitry 6202. The contact pads 6202A/6202B include contact pins 6201A/6201B disposed thereon. An embodiment of the shape of the contact pins 6201A/6201B is illustrated in FIG. 46E. Each contact pin 6201A/6201B includes a substantially cylindrical base 7110, tapered midsection 7111, and a domed contact portion 7112. The contact pins 6201A are configured to align with and contact working electrode contacts 3202 of a multi-well assay plate 2000 as discussed herein. The contact pins 6201B are configured to align with and contact auxiliary electrode contacts 3203 of a multi-well assay plate 2000 as discussed herein. The sector flex electrical connector 6200 is configured to address 4 wells (a 2×2 sector) of the multi-well assay plate 2000 simultaneously (although other configurations are addressable by additional embodiments, as discussed below).

The plurality of contact pins 6201A/6201B are positioned and configured to correspond to the electrode contacts of the electrode contact groupings 3204 of the substrate 3100 having well electrode structures 3101. The plurality of contact pins 6201A/6201B may be connected to an appropriate plate reading apparatus via the circuitry 6202 of the sector flex electrical connector 6200. As illustrated in FIGS. 46A-46E, the sector flex electrical connector 6200 may include a plurality of contact pins 6201A/6201B corresponding to four well electrode structures 3101.

FIG. 46A illustrates a substrate 6205 of the sector flex electrical connector 6200. The substrate 6205 may be, for example, a flexible PCB of any material suitable for such a PCB. The substrate 6205 includes channels 6209 cut through the full depth of the substrate 6205. The channels 6209 may be keyhole shaped, as illustrated in FIG. 46A or any other suitable shape. The channels 6209 are cut around and define the contact pads 6202A/6202B and contact pad tabs 6211. The contact pad tabs 6211 are generally narrower than the contact pads 6202A/6202B and connect the contact pads 6202A/6202B to the remainder of the substrate 6205. The channels 6209 permit the pad tabs 6211 and the contact pads 6202A/6202B to bend or flex independently of one another.

FIG. 46B illustrates the electrical connections on the substrate 6205. Disposed on the substrate 6205 (e.g., by circuit printing or other suitable techniques) are electrical contacts 6203A/6203B, which correspond to the respective contact pads 6202A/6202B. Electrical contacts 6203A/6202B may be of a suitable conductive material. The electrical contacts 6203A/6203B are connected by suitable circuitry 6204 to connection leads 6207, which are configured to interface with an assay instrument or device or for attachment to a connector configured to interface with an assay instrument or device.

FIG. 46C illustrates contact pins 6201A/6201B which are disposed on and extend from respective contact pads 6202A/6202B and are electrically connected to respective electrical contacts 6203A/6203B. The contact pins 6201A disposed on the contact pads 6202A and electrically connected to the electrical contacts 6203A are configured for alignment with the working electrode contacts 3202 of a multi-well assay plate 2000. The contact pins 6201B disposed on the contact pads 6202B and electrically connected to the electrical contacts 6203B are configured for alignment with the auxiliary electrode contacts 3203 of a multi-well assay plate 2000.

In embodiments, e.g., as shown in FIGS. 46A-C, the contact pins 6201A corresponding to the specific electrodes having the same position within the well electrode structures 3101 may be electrically connected via the circuitry 6202. Thus, the electrical contacts $6203A_1$ configured to accommodate the contact pin 6201A configured to contact the working electrode contact 3202 in the first position in each well electrode structure 3101 is further connected to each other electrical contact $6203A_1$ in the first position in its well electrode structure 3101. Accordingly, a single electrical signal may excite or address all working electrodes 3202 (in the sector of 4 well electrode structures contacted by the sector flex electrical connector 6200) having a same position. The contact pads 6203B configured to align with and contact the auxiliary electrodes 3203 are not electrically connected with one another, permitting selective engagement of each of the four well electrode structures 3101 in each sector.

In an embodiment, a total of forty four contact pins 6201A/6201B are provided. In this example embodiment, forty of the forty four contact pins 6201A are provided for the working electrodes 3102 in the electrochemical cells (one each for the ten individual spots of all four wells, e.g., all eight spot 1 s, 2 s, etc.) and the remaining four contact pins 6201B are provided for each of the four auxiliary electrodes 3103. In this manner, each auxiliary electrode 3103 can be individually energized and each of the individual working electrodes 3102 from the four-well sector can be individually energized (e.g., energizing spot 1 for all eight wells, spot 2 for all eight well, etc.). For this 44-pin design, in embodiments, fewer than all four of the auxiliary electrodes 3103 may be utilized such that only a subset of the working electrodes 3102 are energized in the four-well sector simultaneously. For example, if one auxiliary electrode contact pin 6201B is tied to ground and the remaining three are floating, by applying a potential to one of the spots among the working electrodes 3102 (e.g., spot 1), only the working electrode 3102 (spot 1) from the well 3003 with a grounded auxiliary electrode 3102 will be energized, while the others will not. Other examples may be used as well (e.g., grounding 2, 3, 4, etc. auxiliary electrode contact pins 6201B which leaving the remains ones floating). According to this embodiment, any combination of working electrodes 3102 within a single well electrode structure 3101 may be addressed. This same combination may be addressed in any (or all) of the other three remaining well electrode structures 3101.

In further embodiments (not shown), each contact pin 6201A/6201B may be electrically isolated from each other contact pin 6201A/6201B, permitting each electrode (working and auxiliary) of the substrate to be individually addressed or addressed in any combination. In still further embodiments, any number of contact pins 6201A/6201B may be provided to address any number of well electrode structures simultaneously. Thus, while the sector electrical connector 6200 is configured to address four well electrode structures simultaneously, further flex electrical connectors may be configured to address fewer (e.g., sub-sets or "sectors" of 2 or 1 well 3003) or greater (e.g., sectors of 12, 16, 24, 32, 36, 40, 48, 56, 60, 64, 72, 80, 84, 88, 96 wells, etc.). Further, such plate electrical connectors may be arranged in differing orientations, e.g., 2×2, 4×1, 8×1, 8×2 etc. Sectors are described in greater detail throughout, for example, with reference FIGS. 9A and 9B and the descriptions associated therewith. In further embodiments, the contact pins 6201A/6201B may be electrically connected or isolated from one another in any other suitable combination, regardless of the arrangement of well electrode structures 3101. For example, all contact pins 6201A across the connector may be electrically connected while all contact pins 6201B across the connector are also electrically connected. This arrangement energizes all working and auxiliary electrodes 3202/3203 simultaneously. In another arrangement, all of the contact pins 6201A corresponding to working electrodes 3202 from individual well electrode structures 3101 may be connected, permitting all spots in each well 3003 to be energized simultaneously while not energizing any other spots.

It will be noted that the sector flex electrical connector 6200 includes a pin arrangement suitable for connection to the electrode contact pattern 4004. Further, the orientation neutral contact pattern 4004A is also compatible with the pin arrangement of the sector flex electrical connector 6200, because the bus bars 3109A ensure that the single contact pin 6201B corresponding to the auxiliary electrode contacts 3203 for each well electrode structure 3101 will be electrically connected to the auxiliary electrode 3103 in either orientation.

In further embodiments, the contact pins 6201A/6201B may be configured to accommodate any additional or different well electrode structure 3101 as required (e.g., orientation neutral electrode contact pattern 4004A and 4004B). For example, the sector flex electrical connector 6200 may be altered to provide the orientation neutral patterns of sector electrical connectors 4213 (FIG. 43C) and 4211 (FIG. 42H). In embodiments, the sector flex electrical connector 6200 may be altered to accommodate the columnar arrangement of columnar electrical connectors 4212 (FIG. 42I) and 4214 (FIG. 43D). In other embodiments, the sector flex electrical connector 6200 may include more or fewer pins as may be required to accommodate various electrode contact groupings, including, for example groupings that include additional auxiliary electrode contacts per grouping (e.g., 2, 3, 4, or more, etc.) and/or more or fewer working electrode contacts per grouping. It is understood that any and all embodiments of electrical connectors and patterns (including at least electrical connectors 902, 4200, 4211, 4212, 4213, 4214, 5200/5200A/5200C and variants described herein) implemented according to the flexible connector structures and methods described herein with respect to FIGS. 46A-46E are explicitly disclosed.

Accordingly, the sector flex electrical connector 6200 may be provided to permit any combination of working electrode and auxiliary electrodes in plate of any size (e.g., 48 wells, 96 wells, etc.) to be addressed. As discussed above, each working electrode 3102 and each auxiliary electrode 3103 of a given multi-well plate are electrically isolated from one another. Thus, the sector flex electrical connector 6200 provided with an appropriate number of isolated contact pins may be used to address any number of working electrodes 3202 and auxiliary electrodes 3103 of the multi-well plate 2000 in any combination.

FIG. 46D illustrates an example of a system configured to use a sector flex electrical connector 6200 (or any electrical connector employing the flexible structures of the sector flex electrical connector 6200) in conjunction with a multi-well assay plate 2000. The multi-well assay plate 2000 is supported by a plate carriage frame, as described for example, in U.S. Pat. No. 10,281,678, issued on May 7, 2019, the contents of which are hereby incorporated by reference in their entirety, that leaves the electrode contact pattern 4004/4004A/4004B on the underside of the multi-well assay plate 2000 exposed. The plate carriage frame is moved via actuators in the horizontal plane to align the exposed electrode contacts 3202/3203 with the contact pins 6201A/6201B as described above. A contact system 7000 is then operated to bring the sector flex electrical connector 6200 into contact with the exposed electrode contacts 3202/3203. Operation of the contact system 7000 includes engagement of an actuator 7002 to press a flexible pad 7001 into the sector flex electrical connector 6200 to make contact with the electrode contacts 3202/3203 on the underside of the multi-well assay plate 2000. The actuator 7002 may include, for example, a hydraulic actuator, stepper motor, motor/linkage system, or any other suitable actuator configured to provide controlled motion. The flexible pad 7001 may include an elastomer, rubber, or any other suitable flexible material. Due to the flexible nature of the sector flex electrode electrical 6200, this method of engagement may impart less force to the multi-well assay plate 2000 than a connector employing contact pins and may thus avoid or reduce some issues associated therewith.

FIGS. 44A-46E illustrate several example electrical connectors that may be used to address (or energize or interrogate) different combinations of working electrodes 3102 and auxiliary electrodes 3103. The electrical connectors and electrode combinations discussed above are by way of example only, and the nature of the multi-well assay plate 2000 permits any combination of working electrodes 3102 and auxiliary electrodes 3103 to be addressed without addressing the remaining working electrodes 3102 or auxiliary electrodes 3103. The working electrodes 3102 and auxiliary electrodes 3103 selected to be addressed may be referred to as selected working electrodes and selected auxiliary electrodes. The selected working and auxiliary electrodes 3102/3103 may be selected from a set of well electrode structures 3101. Within each well electrode structure, the selected working electrodes 3102 may be referred to as designated working electrodes 3102. Some example combinations of selected working electrodes 3102 may include: all working electrodes 3102 in a single well electrode structure 3101, designated working electrodes 3102 located in same positions (e.g., every working electrode in the 3102 in the 1 position, the 2 position, the 3 position, etc., as well as combinations such as every working electrode 3102 in the 1, 2, and 5 positions, etc.) within a set of well electrode structures 3101, wherein the set of well electrode structures 3101 may include a 2×2, 4×4, 8×8, or N×N sector, an 8×1 or 8×2, or 8×N column, or a 12×1, 12×2, or 12×N row.

In embodiments, the present invention may be embodied as a computer program product that may include a computer readable storage medium (or media) and/or a computer readable storage device. Such computer readable storage medium or device may store computer readable program instructions for causing a processor to carry out one or more methodologies described here. In one embodiment, the computer readable storage medium or device includes a tangible device that can retain and store instructions for use by an instruction execution device. Examples of the computer readable storage medium or device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples. The computer readable medium can comprise both computer readable storage media (as described above) or computer readable transmission media, which can include, for example, coaxial cables, copper wire, and fiber optics. Computer readable transmission media may also take the form of acoustic or light waves, such as those generated during radio frequency, infrared, wireless, or other media including electric, magnetic, or electromagnetic waves.

The terms "computer system" as may be used in the present application may include a variety of combinations of fixed and/or portable computer hardware, software, peripherals, mobile, and storage devices. The computer system may include a plurality of individual components that are networked or otherwise linked to perform collaboratively or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Further embodiments of the present disclosure include at least the following.

Embodiment 1 is a multi-well assay plate including: a top plate having top plate opening defining wells of the multi-well assay plate arranged in a well pattern, each well being defined by a well area; a base plate including a substrate having a top surface and a bottom surface, the top surface being mated to the top plate; and a plurality of well electrode structures, each of the plurality of well electrode structures including: an electrode grouping patterned on the top surface and having an auxiliary electrode and a plurality of working electrodes electrically isolated from the auxiliary electrode and remainder of the plurality of working electrodes; and an electrode contact grouping patterned on the bottom surface corresponding to the electrode grouping and including a plurality of electrode contacts including a plurality of working electrode contacts electrically connected to corresponding working electrodes and an auxiliary electrode contact electrically connected to the auxiliary electrode.

Embodiment 2 is the plate of embodiment 1, wherein each working electrode of a selected electrode grouping is configured to be electrically energized in isolation from electrical energization of remaining working electrodes of the plurality of working electrodes of the selected electrode grouping.

Embodiment 3 is the plate of embodiments 1 or 2, wherein multiple working electrodes of a selected electrode grouping are configured to be separately electrically energized.

Embodiment 4 is the plate of embodiments 1 to 3, wherein each well electrode structure is electrically isolated from remaining ones of the plurality of well electrode structures.

Embodiment 5 is the plate of embodiments 1 to 4, wherein the top surface further includes an adhesive layer corresponding to the well pattern on the top surface, wherein the well areas are free of adhesive.

Embodiment 6 is the plate of embodiments 1 to 5, wherein the electrode grouping is disposed within the well area and the electrode contact grouping is disposed outside of the well area, and wherein each of the plurality of well electrode structure further includes: a via grouping including a plurality of vias electrically connected to the plurality of electrode contacts and passing through the substrate.

Embodiment 7 is the plate of embodiments 1 to 6, wherein each of the plurality of well electrode structure further includes an electrode trace grouping including a plurality of electrical traces patterned on the top surface and electrically connecting the plurality of vias to the electrode grouping.

Embodiment 8 is the plate of embodiment 1 to 7, wherein the plurality of vias are each disposed approximately 0.019 inches outside of the well areas.

Embodiment 9 is the plate of embodiments 1 to 8, wherein the plurality of vias includes two vias connecting each of the plurality of electrode contacts with each of the plurality of electrode traces.

Embodiment 10 is the plate of embodiments 1 to 9, wherein each of the plurality of electrode contacts includes: a first electrically conductive layer extending at least approximately 0.015 inches from a corresponding one of the plurality of vias, and a second electrically conductive layer extending at least approximately 0.0008 inches from the first electrically conductive layer.

Embodiment 11 is the plate of embodiments 1 to 10, wherein the plurality of electrical traces provide electrical connection between the electrode contact grouping arranged outside of the well area to the electrode grouping arranged inside of the well area.

Embodiment 12 is the plate of embodiments 1 to 11, wherein the plurality of electrode traces each include: a via contact spot in electrical communication with a corresponding one of the plurality of vias outside the well area and extending at least approximately 0.015 inches from a corresponding one of the plurality of vias, an electrical bridge extending from the via contact spot into the well area, and an electrode contact spot connected to the electrical bridge inside the well area.

Embodiment 13 is the plate of embodiments 1 to 12, wherein the plurality of electrode traces each include: a first electrically conductive layer, and a second electrically conductive layer extending at least approximately 0.002" beyond the first electrically conductive layer, and wherein: in the first electrically conductive layer, each of the plurality of electrode traces is disposed at least approximately 0.013 inches away from a remainder of the plurality of electrode traces, and in the second electrically conductive layer, each of the plurality of electrode traces is disposed at least approximately 0.010 inches away from the remainder of the plurality of electrode traces.

Embodiment 14 is the plate of embodiments 1 to 13, the auxiliary electrode is disposed at an approximate center of the well area, the working electrodes are arranged in a circle approximately equidistant from the auxiliary electrode.

Embodiment 15 is the plate of embodiments 1 to 14, wherein, the working electrodes are separated from each other in the circle by a plurality of working electrode spacings and at least one of the plurality of working electrode spacings is sized to permit the disposition therein of an auxiliary electrode trace of the plurality of electrode traces connecting the auxiliary electrode to the auxiliary electrode contact.

Embodiment 16 is the plate of embodiment 1 to 15, wherein the auxiliary electrode includes a third electrically conductive layer extending at least approximately 0.008 inches past the electrode contact spot corresponding to the auxiliary electrode.

Embodiment 17 is the plate of embodiments 1 to 16, wherein the plurality of working electrode each include a fourth conductive layer disposed over the electrode contact spot associated with a corresponding working electrode.

Embodiment 18 is the plate of embodiments 1 to 17, wherein each of the plurality of working electrodes are disposed at least approximately 0.0014 inches away from the remainder of the plurality of working electrodes.

Embodiment 19 is the plate of embodiments 1 to 18, wherein the top surface of the substrate further includes a first insulating layer disposed in a pattern that exposes the electrode grouping of each of the plurality of electrode well structures and covers a remainder of the top surface of the substrate.

Embodiment 20 is the plate of embodiments 1 to 19, wherein the plurality of well electrode structures includes 48 well electrode structures.

Embodiment 21 is the plate of embodiments 1 to 20, wherein the plurality of well electrode structures includes 96 well electrode structures.

Embodiment 22 is the plate of embodiments 1 to 21, wherein the electrode contact grouping is arranged in an orientation neutral pattern.

Embodiment 23 is the plate of embodiments 1 to 22, further comprising a bus bar patterned on the bottom surface of the substrate and configured to provide an electrical connection between the auxiliary electrode contact and a neighboring auxiliary electrode contact of a neighboring well electrode structure.

Embodiment 24 is the plate of embodiments 1 to 23, further comprising a bus bar patterned on the bottom surface of the substrate and configured to provide an electrical connection between the auxiliary electrode contact and an additional centered auxiliary electrode contact disposed on the bottom surface of the substrate opposite the auxiliary electrode disposed on the top surface of the substrate.

Embodiment 25 is the plate of embodiments 1 to 24, wherein the at least one auxiliary electrode includes Ag/AgCl.

Embodiment 26 is a method of using a multi-well assay plate, the multi-well assay plate including: a plurality of wells arranged in a well pattern; a plurality of well electrode structures, each corresponding to a well of the plurality of wells, each of the plurality of well electrode structures including: an electrode grouping patterned at a bottom of the well and having an auxiliary electrode and a plurality of working electrodes electrically isolated from the auxiliary electrode and a remainder of the plurality of working electrodes; the method including: generating a voltage potential between a selected working electrode and a selected auxiliary electrode associated with a selected well electrode structure; maintaining substantial electrical isolation of unenergized working electrodes of the selected well electrode structure; and measuring a response to the voltage potential.

Embodiment 27 is the method of embodiment 26, further including: generating a plurality of voltage potentials between selected working electrodes and corresponding auxiliary electrodes from a plurality of selected well electrode structures; maintaining substantial electrical isolation of unenergized working electrodes within each of the plurality of selected well electrode structures; and measuring a plurality of responses to the plurality of voltage potentials.

Embodiment 28 is the method of embodiment 26 or 27, wherein generating the plurality of voltage potentials and measuring the plurality of responses are performed substantially simultaneously.

Embodiment 29 is the method of embodiments 26 to 28, further including: subsequent to measuring the plurality of responses, sequentially for the unenergized working electrodes in each of the plurality of selected well electrode structures: generating sequential pluralities of voltage potentials between each of the unenergized working electrodes contacts and corresponding auxiliary electrodes from each of the plurality of selected well electrode structures; maintaining substantial electrical isolation of the unenergized working electrodes within each of the plurality of selected well electrode structures; and measuring a plurality of responses to the sequential pluralities of voltage potentials.

Embodiment 30 is the method of embodiments 26 to 29, further including: generating a second voltage potential between second selected working electrodes and the selected auxiliary electrode associated with the selected well electrode structure; maintaining substantial electrical isolation of the unenergized working electrodes of the selected well electrode structure; and measuring second responses to the second voltage potential.

Embodiment 31 is the method of embodiments 26 to 30, wherein the multi-well assay plate further includes an electrode contact grouping patterned on a bottom surface of the multi-well assay plate and including a plurality of electrode contacts including a plurality of working electrode contacts electrically connected to corresponding working electrodes and an auxiliary electrode contact electrically connected to the auxiliary electrode, and wherein generating the voltage potential includes: contacting the plurality of electrode contacts with a plate electrical connector including a plurality of pins arranged to correspond to the plurality of electrode contacts, applying a voltage to a selected electrode contact from the plurality of electrode contacts, the selected electrode contact being electrically connected to a selected working electrode from the plurality of working electrodes.

Embodiment 32 is the method of embodiments 26 to 31, further comprising generating the voltage potential between one and only one selected working electrode and one and only one selected auxiliary electrode associated with the selected well electrode structure.

Embodiment 33 is the method of embodiments 26 to 32, further comprising generating the voltage potential between a plurality of selected working electrodes less than all of the plurality of working electrodes of the electrode grouping and the selected auxiliary electrode.

Embodiment 34 is the method of embodiments 26 to 33, further comprising depositing a biological sample in at least one well of the plurality of wells.

Embodiment 35 is the method of embodiments 26 to 34, further comprising loading the multi-well assay plate into an instrument configured to generate the voltage potential, wherein the multi-well assay plate is configured for orientation neutral loading in a first orientation or a second orientation 180 degrees different than the first orientation.

Embodiment 36 is the method of embodiments 26 to 35, wherein the multi-well assay plate is a first multi-well assay plate, the method further comprising: loading the first multi-well assay plate into an instrument configured to generate the voltage potential in a first orientation; and loading the second multi-well assay plate into the instrument in a second orientation 180 degrees different than the first direction, wherein the voltage potential produces valid assay electrical conditions in the first multi-well assay plate in the first orientation and in the second multi-well assay plate in the second orientation.

Embodiment 37 is the method of embodiments 26 to 35, wherein the selected working electrodes include all of the working electrodes of a selected well electrode structure.

Embodiment 38 is the method of embodiments 26 to 36, wherein the selected working electrodes are selected from a set of electrode well structures, the set of working electrodes including a same number of designated working electrodes from each well electrode structure of a set of well electrode structures, wherein the designated working electrodes of the set of working electrodes are positioned at same respective locations in each well electrode structure of the set of well electrode structures.

Embodiment 39 is the method of embodiments 26 to 37, wherein the set of electrode well structures includes a 2×2, 4×4, or 8×8 sector of electrode well structures.

Embodiment 40 is the method of embodiments 26 to 38, wherein the set of electrode well structures includes an 8×1 column or a 12×1 row of electrode well structures.

Embodiment 41 is the method of embodiments 26 to 39, wherein the designated working electrodes include one selected working electrode or a combination of two, three, four, five, six, seven, eight, or nine selected working electrodes in each well electrode structure.

Embodiment 42 is a method of making a multi-well assay plate, the method including: forming a plurality of holes in a substrate; applying a first conductive layer of material on a first side of the substrate, the first conductive layer filling the plurality of holes to form a plurality of vias; applying a second conductive layer of material on the first side of the substrate, the second conductive layer overlaying the first conductive layer to form a plurality of electrode contacts; applying a third conductive layer of material on a second side of the substrate, the third conductive layer forming a plurality of electrical traces, the plurality of electrical traces connecting the plurality of vias to a plurality of auxiliary electrodes and a plurality of working electrodes; applying a fourth conductive layer of material on the second side of the substrate, the fourth conductive layer forming the plurality of auxiliary electrodes; applying a fifth conductive layer of material overlaying the third conductive layer on the second side of the substrate; applying a sixth conductive layer of material on the second side of the substrate, the sixth conductive layer forming the plurality of working electrodes; applying an insulating layer of material on the second side of the substrate, the insulating layer exposing the plurality of auxiliary electrodes and the plurality of working electrodes and insulating a remainder of the second side of the substrate; and adhering the substrate to a top plate having top plate openings defining wells of the multi-well assay plate arranged in a well pattern, each well being defined by a well area.

Embodiment 43 is the method of embodiment 42, wherein the plurality of auxiliary electrodes, the plurality of working electrodes, the plurality of electrical traces, the plurality of vias, and the plurality of electrode contacts are arranged in a plurality of well electrode structures, each well electrode structure including: an electrode grouping of electrodes patterned on the second side and having an auxiliary electrode from the plurality of auxiliary electrodes electrically isolated from the plurality of auxiliary electrodes and a remainder of the plurality of working electrodes, an electrode contact grouping including working electrode contacts from the plurality of electrode contacts electrically connected to corresponding working electrodes and an auxiliary electrode contact electrically connected to the auxiliary electrode, a via grouping including vias from the plurality of vias connected to corresponding ones of the electrode contact grouping, and an electrical trace grouping including electrical traces from the plurality of electrical traces connecting corresponding vias of the via grouping to corresponding electrodes of the electrode grouping.

Embodiment 44 is the method of embodiments 42 to 43, wherein the auxiliary electrode is surrounded by a circularly arranged group of working electrodes from the plurality of working electrodes.

Embodiment 49 is the method of embodiments 42 to 44, wherein forming the plurality of holes includes forming pairs of holes disposed at least approximately 0.019 inches from the well areas.

Embodiment 45 is the method of embodiments 42 to 45, wherein applying the first conductive layer includes applying the first conductive layer in substantially circular patterns around the vias.

Embodiment 47 is the method of embodiments 42 to 46, wherein the substantially circular patterns extend at least approximately 0.0015 inches from corresponding vias.

Embodiment 48 is the method of embodiment 42 to 47, wherein applying the second conductive layer includes extending the second conductive layer approximately 0.008 inches from boundaries of the first conductive layer.

Embodiment 49 is the method of embodiments 42 to 43, wherein applying the third conductive layer includes providing an electrical connection between the plurality of vias located outside of the well areas to the plurality of auxiliary electrodes and the plurality of working electrodes located inside of the well areas.

Embodiment 50 is the method of embodiments 42 to 49, wherein applying the third conductive layer includes maintaining at least approximately 0.013 inches between portions of the third conductive layer corresponding to different ones of the plurality of electrical traces, and extending the third conductive layer at least approximately 0.015 inches from corresponding vias of the plurality of vias.

Embodiment 51 is the method of embodiments 42 to 50, wherein applying the fourth conductive layer includes positioning the plurality of auxiliary electrodes in centers of circular groupings of working electrodes.

Embodiment 52 is the method of embodiments 42 to 51, wherein applying the fifth conductive layer includes extending the fifth conductive layer approximately 0.002 inches from the third conductive layer.

Embodiment 53 is the method of embodiments 42 to 52, wherein applying the fifth conductive layer includes maintaining at least approximately 0.010 inches between portions of the fifth conductive layer corresponding to different ones of the plurality of electrical traces.

Embodiment 54 is the method of embodiments 42 to 53, wherein applying the sixth conductive layer includes applying the working electrodes and maintaining a gap of approximately 0.014 inches between neighboring ones of the plurality of working electrodes.

Embodiment 55 is the method of embodiments 42 to 54, wherein applying the insulating layer includes extending the insulating layer approximately 0.007 inches inward from edges of the plurality of working electrodes.

Embodiment 56 is the method of embodiments 42 to 55, wherein adhering the substrate to the top plate includes applying an adhesive to the second side of the substrate outside of the well areas.

Embodiment 57 is an electrochemical cell for performing electrochemical analysis, the electrochemical cell including: a plurality of working electrode zones disposed, and defining a pattern, on a surface of the cell; and at least one auxiliary electrode disposed on the surface, wherein each of the plurality of working electrode zones are electrically isolated from one another and from the auxiliary electrode.

Embodiment 58 is the cell of embodiment 57, wherein the pattern is configured to provide sufficient distance between the working electrode zones so as to prevent a short circuit.

Embodiment 59 is the cell of embodiments 57 or 58, wherein individual working electrode zones of the plurality of working electrode zones are configured to be electrically energized while maintaining a remainder of the plurality of the working electrode zones in an unenergized state.

Embodiment 60 is the cell of embodiments 57 to 59, wherein electrically energizing an individual working electrode zone of the plurality of working electrode zones includes generating a voltage potential between the individual working electrode zone and the auxiliary electrode.

Embodiment 61 is the cell of embodiment 57 to 60, wherein electrically energizing individual working electrode zones of the plurality of working electrode zones includes generating a plurality of voltage potentials between different ones of the individual working electrode zones and the auxiliary electrode.

Embodiment 62 is the cell of embodiments 57 to 61, wherein the electrochemical cell is part of a plate.

Embodiment 63 is the cell of embodiments 57 to 62, wherein the electrochemical cell is part of a cartridge.

Embodiment 64 is the cell of embodiments 57 to 63, wherein the electrochemical cell is part of a flow cell.

Embodiment 65 is the cell of embodiments 57 to 64, wherein: the auxiliary electrode is disposed at a center of the electrochemical cell, the working electrodes are arranged in a circle approximately equidistant from the auxiliary electrode, the circle includes a gap configured to permit passage of an auxiliary electrode trace to connect the auxiliary electrode to an auxiliary electrode contact.

Embodiment 66 is the cell of embodiments 57 to 65, wherein the electrochemical analysis includes electrochemiluminescence (ECL) analysis.

Embodiment 67 is the cell of embodiment 57 to 66, wherein the at least one auxiliary electrode includes Ag/AgCl.

Embodiment 68 is an electrical connector configured to provide an interface between a multi-well assay plate and an assay instrument, the electrical connector including: a first plurality of electrode connectors arranged according to a pattern of working electrode contacts on a bottom surface of a multi-well assay plate; a second plurality of electrode connectors arranged according to a pattern of auxiliary electrode contacts on the bottom surface of the multi-well assay plate; and a plurality of circuits configured to connect the first plurality of electrode connectors and the second plurality of electrode connectors to the assay instrument.

Embodiment 69 is the electrical connector of embodiment 68, wherein the first plurality of electrode connectors and the second plurality of electrode connectors are electrically isolated from one another.

Embodiment 70 is the electrical connector of embodiment 68 or 69, wherein: the first plurality of electrode connectors are divided into sets of electrode connectors, each set of electrode connectors having individual connectors arranged for connection with working electrode contacts of a single well of the multi-well assay plate, individual electrode connectors located at same positions within of each set of electrode connectors are electrically connected to one another and electrically isolated from other individual electrode connectors, and the second plurality of electrode connectors are electrically isolated from one another.

Embodiment 71 is the electrical connector of embodiments 68 to 70, wherein the first plurality of electrode connectors and the second plurality of electrode connectors each include contact pins.

Embodiment 72 is the electrical connector of embodiments 68 to 71, wherein the first plurality of electrode connectors and the second plurality of electrode connectors each include contact pads.

Embodiment 73 is the electrical connector of embodiments 68 to 72, wherein each of the first plurality of electrode connectors and each of the second plurality of electrode connectors are electrically isolated from one another.

Embodiment 74 is the electrical connector of embodiments 65 to 73, wherein the electrode connector is configured to energize individual ones of the first plurality of electrode connectors and a first plurality of associated working electrodes of the multi-well assay plate of each set of electrode connectors without energizing the other individual electrode connectors and a second plurality of associated working electrodes of the multi-well assay plate.

Embodiment 75 is the electrical connector of embodiments 68 to 74, wherein the electrode connector is configured to energize the individual electrode connectors located at same positions within each set of electrode connectors and a first plurality of associated working electrodes of the multi-well assay plate of each set of electrode connectors without energizing the other individual electrode connectors and a second plurality of associated working electrodes of the multi-well assay plate.

Embodiment 76 is the electrical connector of embodiments 68 to 75, wherein the second plurality of electrode connectors are configured to contact a multi-well assay plate in an orientation neutral manner in a first orientation or a second orientation 180 degrees different than the first orientation.

Embodiment 77 is a of using one or more multi-well assay plates, each multi-well assay plate including: a plurality of wells arranged in a well pattern; a plurality of well electrode structures, each corresponding to a well of the plurality of wells, each of the plurality of well electrode structures including: an electrode contact grouping patterned in an orientation neutral pattern at a bottom of multi-well assay plate and having an auxiliary electrode contact in electrical communication with an auxiliary electrode and a plurality of working electrode contacts in electrical communication with a plurality of working electrodes; the method including: loading a first multi-well assay plate of the one or more multi-well assay plates into an instrument configured to generate the voltage potential, generating a voltage potential between a selected working electrode and a selected auxiliary electrode associated with a selected well electrode structure of the first multi-well assay plate; and measuring a response to the voltage potential, wherein the voltage potential produces valid assay electrical conditions.

Embodiment 78 is the method of embodiment 77, wherein loading the multi-well assay plate is performed in an orientation neutral loading operation and wherein the voltage potential produces valid assay electrical conditions in either of a first orientation and a second orientation of the orientation neutral loading operation.

Embodiment 79 is the method of embodiments 77 or 78, further comprising: loading the first multi-well assay plate into an instrument configured to generate the voltage potential in a first orientation; and loading a second multi-well assay plate into the instrument in a second orientation 180 degrees different than the first direction, wherein the voltage potential produces valid assay electrical conditions result in the first multi-well assay plate in the first orientation and in the second multi-well assay plate in the second orientation.

Embodiment 80 is a multi-well assay plate including: a top plate having top plate opening defining wells of the multi-well assay plate arranged in a well pattern, each well being defined by a well area; a base plate including a substrate having a top surface and a bottom surface, the top surface being mated to the top plate; and a plurality of well electrode structures, each of the plurality of well electrode structures including: an electrode grouping patterned on the top surface; and an electrode contact grouping patterned on the bottom surface in an orientation neutral pattern corresponding to the electrode grouping and including a plurality of electrode contacts including a plurality of working electrode contacts electrically connected to corresponding working electrodes and an auxiliary electrode contact electrically connected to the auxiliary electrode.

Embodiment 81 is the plate of embodiment 80, further comprising a bus bar patterned on the bottom surface of the substrate and configured to provide an electrical connection between the auxiliary electrode contact and a neighboring auxiliary electrode contact of a neighboring well electrode structure.

Embodiment 82 is the plate of embodiment 80 or 81, further comprising a bus bar patterned on the bottom surface of the substrate and configured to provide an electrical connection between the auxiliary electrode contact and an additional centered auxiliary electrode contact disposed opposite the auxiliary electrode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single module or unit for purposes of clarity, it should be understood that the features and functions described herein may be performed by any combination of units or modules. Thus, various changes and modifications may be affected by one skilled in the art without departing from the spirit or scope of the invention.

While various embodiments according to the present disclosure have been described above, it should be understood that they have been presented by way of illustration and example only, and not limitation. It will be apparent to persons skilled in the relevant art that various changes in form and detail may be made therein without departing from the spirit and scope of the present disclosure. Thus, the breadth and scope of the present disclosure should not be limited by any of the above-described exemplary embodiments but should be defined only in accordance with the appended claims and their equivalents. It will also be understood that each feature of each embodiment discussed herein, and of each reference cited herein, may be used in combination with the features of any other embodiment. Stated another way, aspects of the above multi-well plate may be used in any combination with other methods described herein or the methods may be used separately. All patents and publications discussed herein are incorporated by reference herein in their entirety.

The invention claimed is:

1. A multi-well assay plate including:
   a top plate having top plate opening defining wells of the multi-well assay plate arranged in a well pattern, each well being defined by a well area;
   a base plate including a substrate having a top surface and a bottom surface, the top surface being mated to the top plate;
   a plurality of well electrode structures, each of the plurality of well electrode structures including: an electrode grouping patterned on the top surface and having an auxiliary electrode and a plurality of working electrodes electrically isolated from the auxiliary electrode and a remainder of the plurality of working electrodes; and
   an electrode contact grouping patterned on the bottom surface corresponding to the electrode grouping and including a plurality of electrode contacts including a plurality of working electrode contacts electrically connected to corresponding working electrodes and an auxiliary electrode contact electrically connected to the auxiliary electrode, wherein:
   the top surface further includes an adhesive layer corresponding to the well pattern on the top surface, wherein the well areas are free of adhesive,
   the electrode grouping is disposed within the well area and the electrode contact grouping is disposed outside of the well area,
   each of the plurality of well electrode structures further includes a via grouping including a plurality of vias electrically connected to the plurality of electrode contacts and passing through the substrate, and
   each of the plurality of electrode contacts includes a first electrically conductive layer extending at least approximately 0.015 inches from a corresponding one of the plurality of vias, and a second electrically conductive layer extending at least approximately 0.0008 inches from the first electrically conductive layer.

2. The plate of claim 1, wherein each working electrode of a selected electrode grouping is configured to be electrically energized in isolation from electrical energization of remaining working electrodes of the plurality of working electrodes of the selected electrode grouping.

3. The plate of claim 1, wherein multiple working electrodes of a selected electrode grouping are configured to be separately electrically energized.

4. The plate of claim 1, wherein each well electrode structure is electrically isolated from remaining ones of the plurality of well electrode structures.

5. The plate of claim 1, wherein the plurality of vias are each disposed approximately 0.019 inches outside of the well areas.

6. The plate of claim 1, wherein the auxiliary electrode includes Ag/AgCl.

7. The plate of claim 1, wherein each of the plurality of well electrode structures further includes an electrode trace grouping including a plurality of electrical traces patterned on the top surface and electrically connecting the plurality of vias to the electrode grouping.

8. The plate of claim 7, wherein the plurality of vias includes two vias connecting each of the plurality of electrode contacts with each of the plurality of electrode traces.

9. The plate of claim 7, wherein the plurality of electrical traces provide electrical connection between the electrode contact grouping arranged outside of the well area to the electrode grouping arranged inside of the well area.

10. The plate of claim 1, wherein a plurality of electrode traces each include:
a via contact spot in electrical communication with a corresponding one of the plurality of vias outside the well area and extending at least approximately 0.015 inches from a corresponding one of the plurality of vias, an electrical bridge extending from the via contact spot into the well area, and an electrode contact spot connected to the electrical bridge inside the well area.

11. The plate of claim 10, wherein the plurality of electrode traces each include:
a first electrically conductive layer, and
a second electrically conductive layer extending at least approximately 0.002 inches beyond the first electrically conductive layer, and wherein:
in the first electrically conductive layer, each of the plurality of electrode traces is disposed at least approximately 0.013 inches away from a remainder of the plurality of electrode traces, and in the second electrically conductive layer, each of the plurality of electrode traces is disposed at least approximately 0.010 inches away from the remainder of the plurality of electrode traces.

12. The plate of claim 10, wherein the auxiliary electrode is disposed at an approximate center of the well area, and the working electrodes are arranged in a circle approximately equidistant from the auxiliary electrode.

13. The plate of claim 12, wherein the working electrodes are separated from each other in the circle by a plurality of working electrode spacings, and at least one of the plurality of working electrode spacings is sized to permit disposition therein of an auxiliary electrode trace of the plurality of electrode traces connecting the auxiliary electrode to the auxiliary electrode contact.

14. The plate of claim 13, wherein the auxiliary electrode includes a third electrically conductive layer extending at least approximately 0.008 inches past the electrode contact spot corresponding to the auxiliary electrode.

15. The plate of claim 13, wherein the top surface of the substrate further includes a first insulating layer disposed in a pattern that exposes the electrode grouping of each of the plurality of electrode well structures and covers a remainder of the top surface of the substrate.

16. The plate of claim 13, wherein the plurality of working electrodes each include a fourth conductive layer disposed over the electrode contact spot associated with a corresponding working electrode.

17. The plate of claim 16, wherein each of the plurality of working electrodes are disposed at least approximately 0.0014 inches away from the remainder of the plurality of working electrodes.

18. An electrochemical cell for performing electrochemical analysis, the electrochemical cell being formed on a base plate having a top surface and a bottom surface, the electrochemical cell including:
a plurality of working electrode zones disposed, and defining a pattern, on the top surface of the base plate;
at least one auxiliary electrode disposed on the top surface, wherein each of the plurality of working electrode zones are electrically isolated from one another and from the auxiliary electrode; and
an electrode contact grouping patterned on the bottom surface corresponding to the plurality of working electrode zones and including a plurality of electrode contacts including a plurality of working electrode contacts electrically connected to corresponding working electrode zones and an auxiliary electrode contact electrically connected to the auxiliary electrode, wherein:
the top surface further includes an adhesive layer surrounding the plurality of working electrode zones and defining an adhesive free well area on the top surface,
the working electrode zones are disposed within the well area and the electrode contact grouping is disposed outside of the well area,
the electrochemical cell further includes a plurality of vias electrically connected to the plurality of electrode contacts and passing through the base plate, and
each of the plurality of electrode contacts includes a first electrically conductive layer extending at least approximately 0.015 inches from a corresponding one of the plurality of vias, and a second electrically conductive layer extending at least approximately 0.0008 inches from the first electrically conductive layer.

19. A multi-well assay plate including:
a top plate having top plate opening defining wells of the multi-well assay plate arranged in a well pattern, each well being defined by a well area;
a base plate including a substrate having a top surface and a bottom surface, the top surface being mated to the top plate;
a plurality of well electrode structures, each of the plurality of well electrode structures including: an electrode grouping patterned on the top surface and having an auxiliary electrode and a plurality of working electrodes electrically isolated from the auxiliary electrode and a remainder of the plurality of working electrodes; and
an electrode contact grouping patterned on the bottom surface corresponding to the electrode grouping and including a plurality of electrode contacts including a plurality of working electrode contacts electrically connected to corresponding working electrodes and an auxiliary electrode contact electrically connected to the auxiliary electrode, wherein:
the top surface further includes an adhesive layer corresponding to the well pattern on the top surface, wherein the well areas are free of adhesive,
the electrode grouping is disposed within the well area and the electrode contact grouping is disposed outside of the well area,
each of the plurality of well electrode structures further includes a via grouping including a plurality of vias electrically connected to the plurality of electrode contacts and passing through the substrate and an electrode trace grouping including a plurality of electrical traces patterned on the top surface and electrically connecting the plurality of vias to the electrode grouping,
the plurality of electrode traces each include:
a via contact spot in electrical communication with a corresponding one of the plurality of vias outside the well area and extending at least approximately 0.015 inches from a corresponding one of the plurality of vias, an electrical bridge extending from the via contact spot into the well area,
an electrode contact spot connected to the electrical bridge inside the well area,
a first electrically conductive layer within which each of the plurality of electrode traces is disposed at least approximately 0.013 inches away from a remainder of the plurality of electrode traces
a second electrically conductive layer extending at least approximately 0.002 inches beyond the first electrically conductive layer and within which each of the plurality of electrode traces is disposed at least approximately 0.010 inches away from the remainder of the plurality of electrode traces.

20. The plate of claim 19, wherein each working electrode of a selected electrode grouping is configured to be electrically energized in isolation from electrical energization of remaining working electrodes of the plurality of working electrodes of the selected electrode grouping.

21. The plate of claim 19, wherein multiple working electrodes of a selected electrode grouping are configured to be separately electrically energized.

22. The plate of claim 19, wherein each well electrode structure is electrically isolated from remaining ones of the plurality of well electrode structures.

23. The plate of claim 19, wherein each of the plurality of well electrode structures further includes an electrode trace grouping including a plurality of electrical traces patterned on the top surface and electrically connecting the plurality of vias to the electrode grouping.

24. The plate of claim 19, wherein the plurality of vias are each disposed approximately 0.019 inches outside of the well areas.

25. The plate of claim 19, wherein the plurality of vias includes two vias connecting each of the plurality of electrode contacts with each of the plurality of electrode traces.

26. The plate of claim 19, wherein each of the plurality of electrode contacts includes:
   a first electrically conductive layer extending at least approximately 0.015 inches from a corresponding one of the plurality of vias, and a second electrically conductive layer extending at least approximately 0.0008 inches from the first electrically conductive layer.

27. The plate of claim 19, wherein plurality of electrical traces provide electrical connection between the electrode contact grouping arranged outside of the well area to the electrode grouping arranged inside of the well area.

28. The plate of claim 19, wherein the auxiliary electrode is disposed at an approximate center of the well area, and the working electrodes are arranged in a circle approximately equidistant from the auxiliary electrode.

29. The plate of claim 28, wherein the working electrodes are separated from each other in the circle by a plurality of working electrode spacings and at least one of the plurality of working electrode spacings is sized to permit disposition therein of an auxiliary electrode trace of the plurality of electrode traces connecting the auxiliary electrode to the auxiliary electrode contact.

30. The plate of claim 29, wherein the auxiliary electrode includes a third electrically conductive layer extending at least approximately 0.008 inches past the electrode contact spot corresponding to the auxiliary electrode.

31. The plate of claim 29, wherein the top surface of the substrate further includes a first insulating layer disposed in a pattern that exposes the electrode grouping of each of the plurality of electrode well structures and covers a remainder of the top surface of the substrate.

32. The plate of claim 29, wherein the plurality of working electrode each include a fourth conductive layer disposed over the electrode contact spot associated with a corresponding working electrodes.

33. The plate of claim 32, wherein each of the plurality of working electrodes are disposed at least approximately 0.0014 inches away from the remainder of the plurality of working electrodes.

34. An electrochemical cell for performing electrochemical analysis, the electrochemical cell being formed on a base plate having a top surface and a bottom surface, the electrochemical cell including:
   a plurality of working electrode zones disposed, and defining a pattern, on the top surface of the base plate; and
   at least one auxiliary electrode disposed on the top surface, wherein each of the plurality of working electrode zones are electrically isolated from one another and from the auxiliary electrode
   an electrode contact grouping patterned on the bottom surface corresponding to the plurality of working electrode zones and including a plurality of electrode contacts including a plurality of working electrode contacts electrically connected to corresponding working electrode zones and an auxiliary electrode contact electrically connected to the auxiliary electrode, wherein:
   the top surface further includes an adhesive layer surrounding the plurality of working electrode zones and defining an adhesive free well area on the top surface,
   the working electrode zones are disposed within the well area and the electrode contact grouping is disposed outside of the well area,
   the electrochemical cell further includes a plurality of vias electrically connected to the plurality of electrode contacts and passing through the base plate and an electrode trace grouping including a plurality of electrical traces patterned on the top surface and electrically connecting the plurality of vias to the electrode grouping,
   the plurality of electrode traces each include:
      a via contact spot in electrical communication with a corresponding one of the plurality of vias outside the well area and extending at least approximately 0.015 inches from a corresponding one of the plurality of vias, an electrical bridge extending from the via contact spot into the well area,
      an electrode contact spot connected to the electrical bridge inside the well area,
      a first electrically conductive layer within which each of the plurality of electrode traces is disposed at least approximately 0.013 inches away from a remainder of the plurality of electrode traces
   a second electrically conductive layer extending at least approximately 0.002 inches beyond the first electrically conductive layer and within which each of the plurality of electrode traces is disposed at least approximately 0.010 inches away from the remainder of the plurality of electrode traces.

\* \* \* \* \*